US012030763B2

(12) United States Patent
Nguyen

(10) Patent No.: US 12,030,763 B2
(45) Date of Patent: Jul. 9, 2024

(54) FORK ASSEMBLY FOR FORKLIFTS

(71) Applicant: Nhon Hoa Nguyen, Bankstown (AU)

(72) Inventor: Nhon Hoa Nguyen, Bankstown (AU)

( * ) Notice: Subject to any disclaimer, the term of this patent is extended or adjusted under 35 U.S.C. 154(b) by 0 days.

(21) Appl. No.: 18/372,194

(22) Filed: Sep. 25, 2023

(65) Prior Publication Data

US 2024/0010480 A1 Jan. 11, 2024

Related U.S. Application Data

(63) Continuation-in-part of application No. 17/708,330, filed on Mar. 30, 2022, now Pat. No. 11,767,208.

(60) Provisional application No. 63/280,223, filed on Nov. 17, 2021.

(51) Int. Cl.

*B66F 9/12* (2006.01)
*B66F 9/14* (2006.01)
*B66F 9/18* (2006.01)
*B66F 9/20* (2006.01)

(52) U.S. Cl.

CPC .............. *B66F 9/122* (2013.01); *B66F 9/183* (2013.01); *B66F 9/185* (2013.01); *B66F 9/20* (2013.01); *B66F 9/144* (2013.01)

(58) Field of Classification Search

CPC .......... B66F 9/122; B66F 9/142; B66F 9/143; B66F 9/144; B66F 9/146–149; B66F 9/188; B66F 9/18; B66F 9/183; B65G 49/06–066; B65G 67/02; B65G 67/04; B65G 67/12; B65G 67/20; B60P 1/843

See application file for complete search history.

(56) References Cited

U.S. PATENT DOCUMENTS 6,135,704 A * 10/2000 Seaberg .................. B66F 9/183 414/789.6

* cited by examiner

*Primary Examiner* — Tyrone V Hall, Jr.
(74) *Attorney, Agent, or Firm* — Tue Nguyen

(57) ABSTRACT

A fork assembly can include multiple forks configured to surround a load. Multiple attachments can be made on the forks to couple to straps for support a load. The fork assembly can further include multiple fork extensions having end attachments to couple to straps for pulling on the load. Alternatively, the fork assembly can include multiple fork lifters having blades rotatable between a non-lift position and a lift position. The fork extensions can also have blades rotatable between a non-pullable position and a pullable position. The blade rotation can be performed by a remote rotate mechanism by an operator operating the fork assembly. In some embodiments, the fork attachment assembly for a forklift or a forklift vehicle can include roller legs coupled at far ends of the fork beams or the fork extensions. The fork assembly can include roller legs coupled at far ends of the fork beams or the fork extensions. The fork assembly can include a clamping device coupled at a far end of the fork beam or the fork extension.

19 Claims, 64 Drawing Sheets

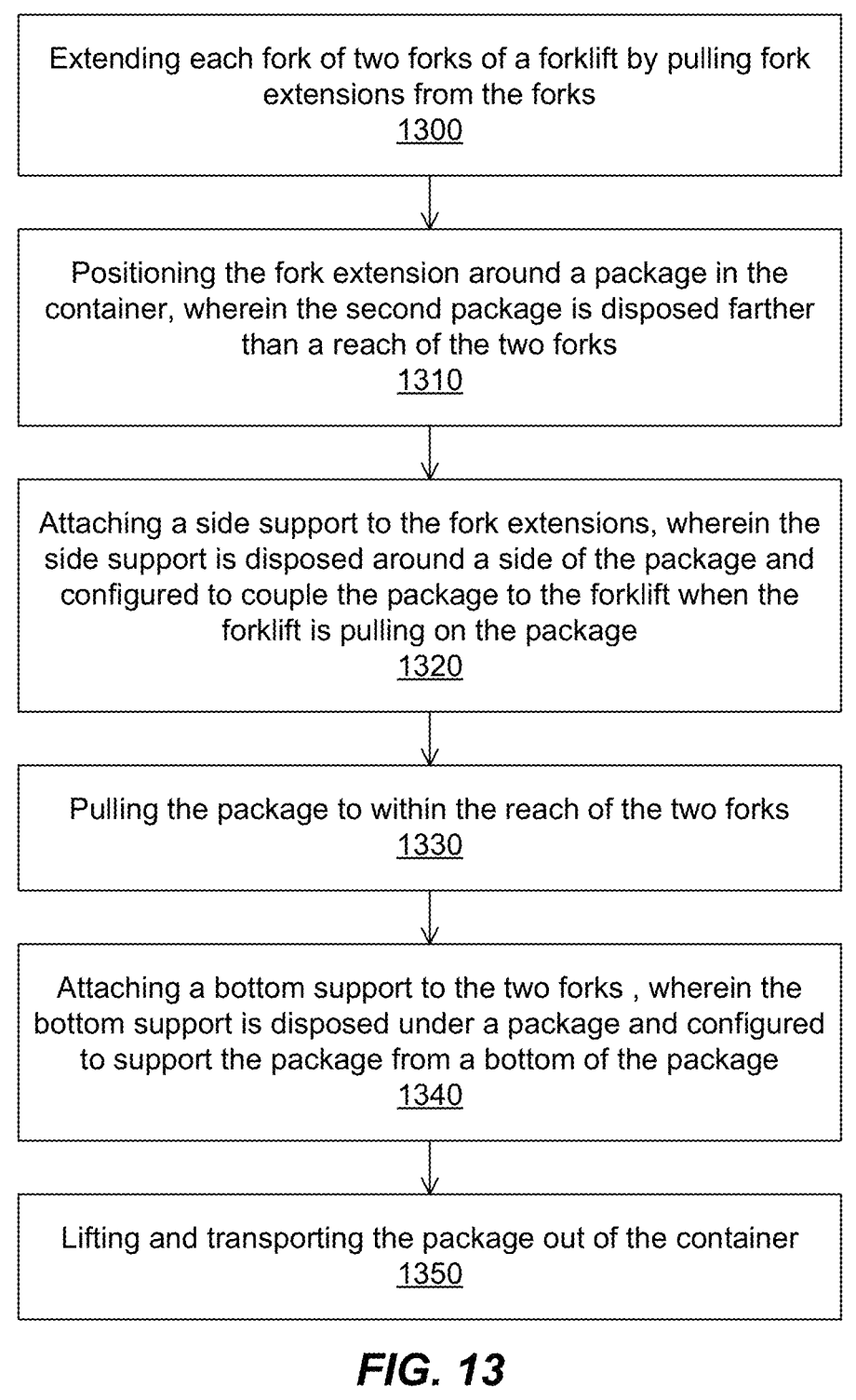

Extending each fork of two forks of a forklift by pulling fork extensions from the forks
1300

↓

Positioning the fork extension around a package in the container, wherein the second package is disposed farther than a reach of the two forks
1310

↓

Attaching a side support to the fork extensions, wherein the side support is disposed around a side of the package and configured to couple the package to the forklift when the forklift is pulling on the package
1320

↓

Pulling the package to within the reach of the two forks
1330

↓

Attaching a bottom support to the two forks , wherein the bottom support is disposed under a package and configured to support the package from a bottom of the package
1340

↓

Lifting and transporting the package out of the container
1350

*FIG. 13*

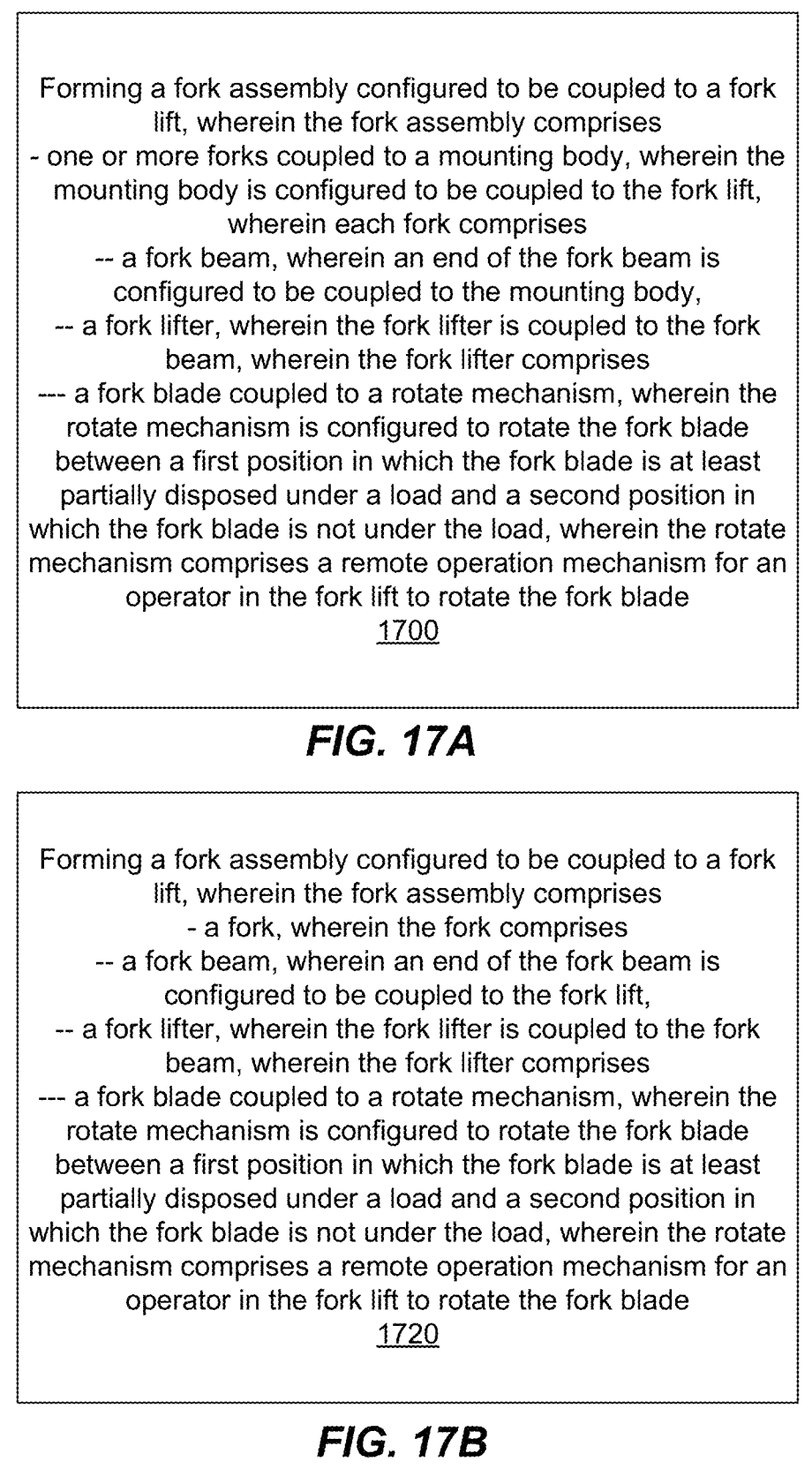

Forming a fork assembly configured to be coupled to a fork lift, wherein the fork assembly comprises
- one or more forks coupled to a mounting body, wherein the mounting body is configured to be coupled to the fork lift, wherein each fork comprises
-- a fork beam, wherein an end of the fork beam is configured to be coupled to the mounting body,
-- a fork lifter, wherein the fork lifter is coupled to the fork beam, wherein the fork lifter comprises
--- a fork blade coupled to a rotate mechanism, wherein the rotate mechanism is configured to rotate the fork blade between a first position in which the fork blade is at least partially disposed under a load and a second position in which the fork blade is not under the load, wherein the rotate mechanism comprises a remote operation mechanism for an operator in the fork lift to rotate the fork blade
1700

*FIG. 17A*

Forming a fork assembly configured to be coupled to a fork lift, wherein the fork assembly comprises
- a fork, wherein the fork comprises
-- a fork beam, wherein an end of the fork beam is configured to be coupled to the fork lift,
-- a fork lifter, wherein the fork lifter is coupled to the fork beam, wherein the fork lifter comprises
--- a fork blade coupled to a rotate mechanism, wherein the rotate mechanism is configured to rotate the fork blade between a first position in which the fork blade is at least partially disposed under a load and a second position in which the fork blade is not under the load, wherein the rotate mechanism comprises a remote operation mechanism for an operator in the fork lift to rotate the fork blade
1720

*FIG. 17B*

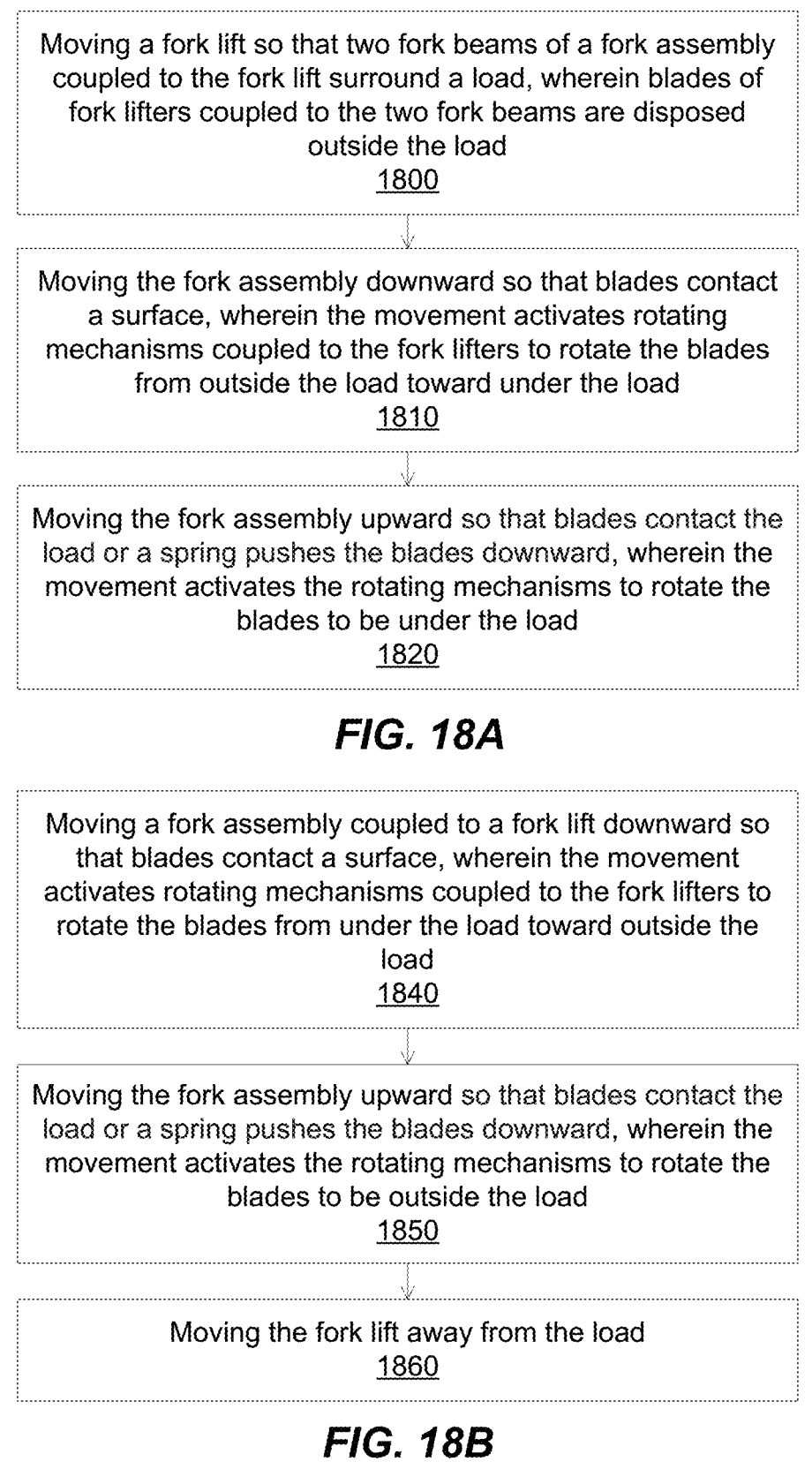

Moving a fork lift so that two fork beams of a fork assembly coupled to the fork lift surround a load, wherein blades of fork lifters coupled to the two fork beams are disposed outside the load
1800

Moving the fork assembly downward so that blades contact a surface, wherein the movement activates rotating mechanisms coupled to the fork lifters to rotate the blades from outside the load toward under the load
1810

Moving the fork assembly upward so that blades contact the load or a spring pushes the blades downward, wherein the movement activates the rotating mechanisms to rotate the blades to be under the load
1820

*FIG. 18A*

Moving a fork assembly coupled to a fork lift downward so that blades contact a surface, wherein the movement activates rotating mechanisms coupled to the fork lifters to rotate the blades from under the load toward outside the load
1840

Moving the fork assembly upward so that blades contact the load or a spring pushes the blades downward, wherein the movement activates the rotating mechanisms to rotate the blades to be outside the load
1850

Moving the fork lift away from the load
1860

*FIG. 18B*

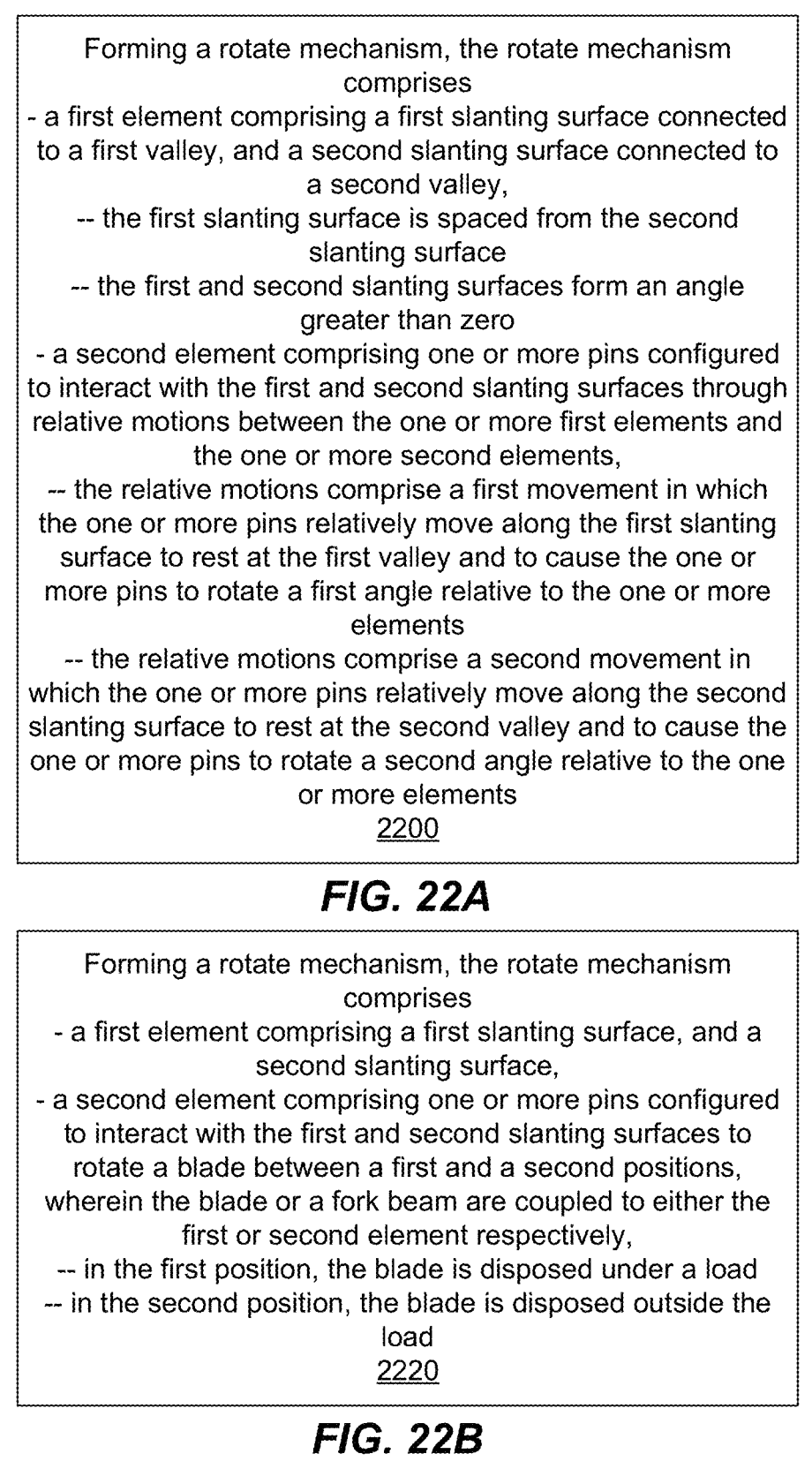

Forming a rotate mechanism, the rotate mechanism comprises
- a first element comprising a first slanting surface connected to a first valley, and a second slanting surface connected to a second valley,
-- the first slanting surface is spaced from the second slanting surface
-- the first and second slanting surfaces form an angle greater than zero
- a second element comprising one or more pins configured to interact with the first and second slanting surfaces through relative motions between the one or more first elements and the one or more second elements,
-- the relative motions comprise a first movement in which the one or more pins relatively move along the first slanting surface to rest at the first valley and to cause the one or more pins to rotate a first angle relative to the one or more elements
-- the relative motions comprise a second movement in which the one or more pins relatively move along the second slanting surface to rest at the second valley and to cause the one or more pins to rotate a second angle relative to the one or more elements
2200

*FIG. 22A*

Forming a rotate mechanism, the rotate mechanism comprises
- a first element comprising a first slanting surface, and a second slanting surface,
- a second element comprising one or more pins configured to interact with the first and second slanting surfaces to rotate a blade between a first and a second positions, wherein the blade or a fork beam are coupled to either the first or second element respectively,
-- in the first position, the blade is disposed under a load
-- in the second position, the blade is disposed outside the load
2220

*FIG. 22B*

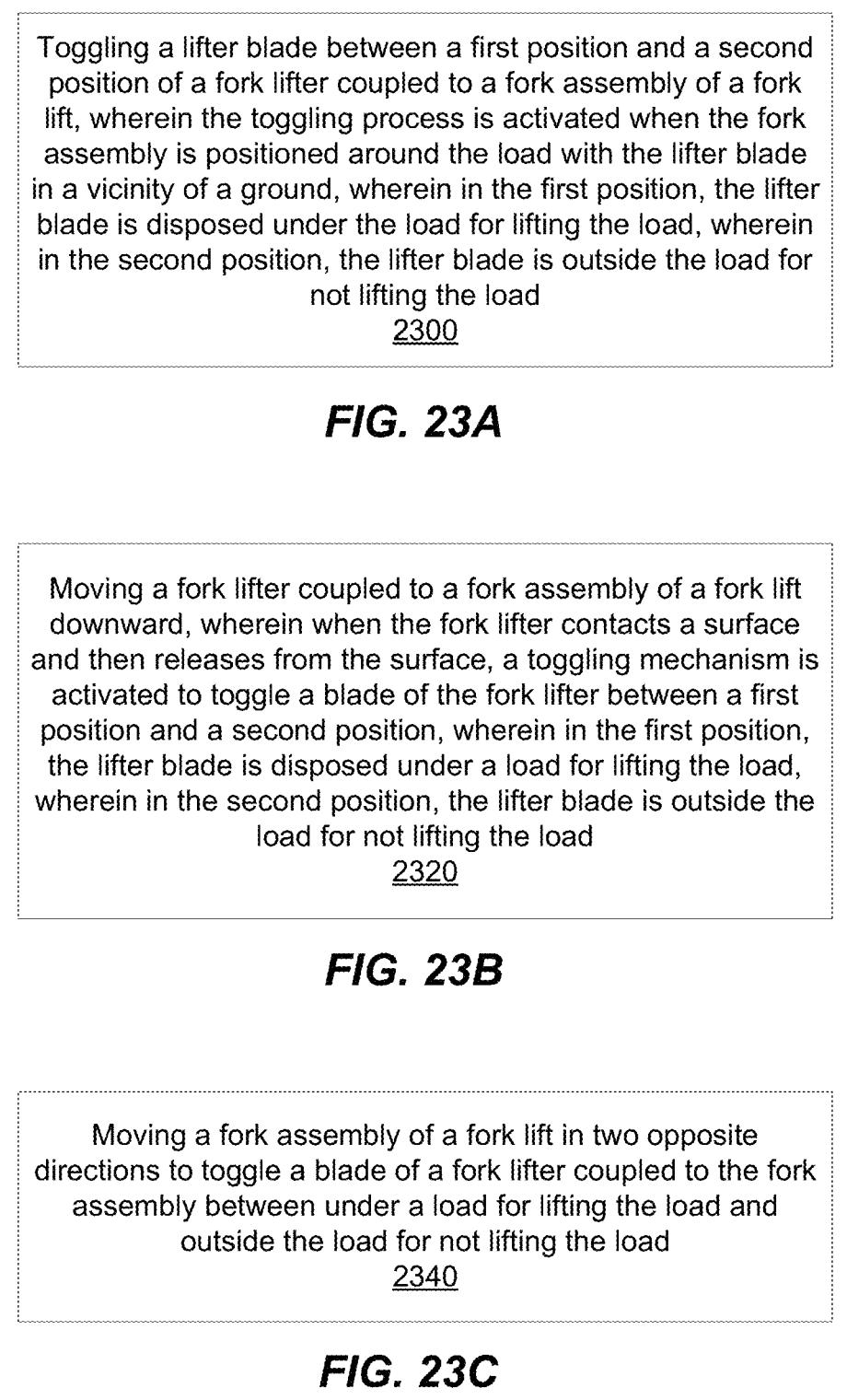

Toggling a lifter blade between a first position and a second position of a fork lifter coupled to a fork assembly of a fork lift, wherein the toggling process is activated when the fork assembly is positioned around the load with the lifter blade in a vicinity of a ground, wherein in the first position, the lifter blade is disposed under the load for lifting the load, wherein in the second position, the lifter blade is outside the load for not lifting the load
2300

*FIG. 23A*

Moving a fork lifter coupled to a fork assembly of a fork lift downward, wherein when the fork lifter contacts a surface and then releases from the surface, a toggling mechanism is activated to toggle a blade of the fork lifter between a first position and a second position, wherein in the first position, the lifter blade is disposed under a load for lifting the load, wherein in the second position, the lifter blade is outside the load for not lifting the load
2320

*FIG. 23B*

Moving a fork assembly of a fork lift in two opposite directions to toggle a blade of a fork lifter coupled to the fork assembly between under a load for lifting the load and outside the load for not lifting the load
2340

*FIG. 23C*

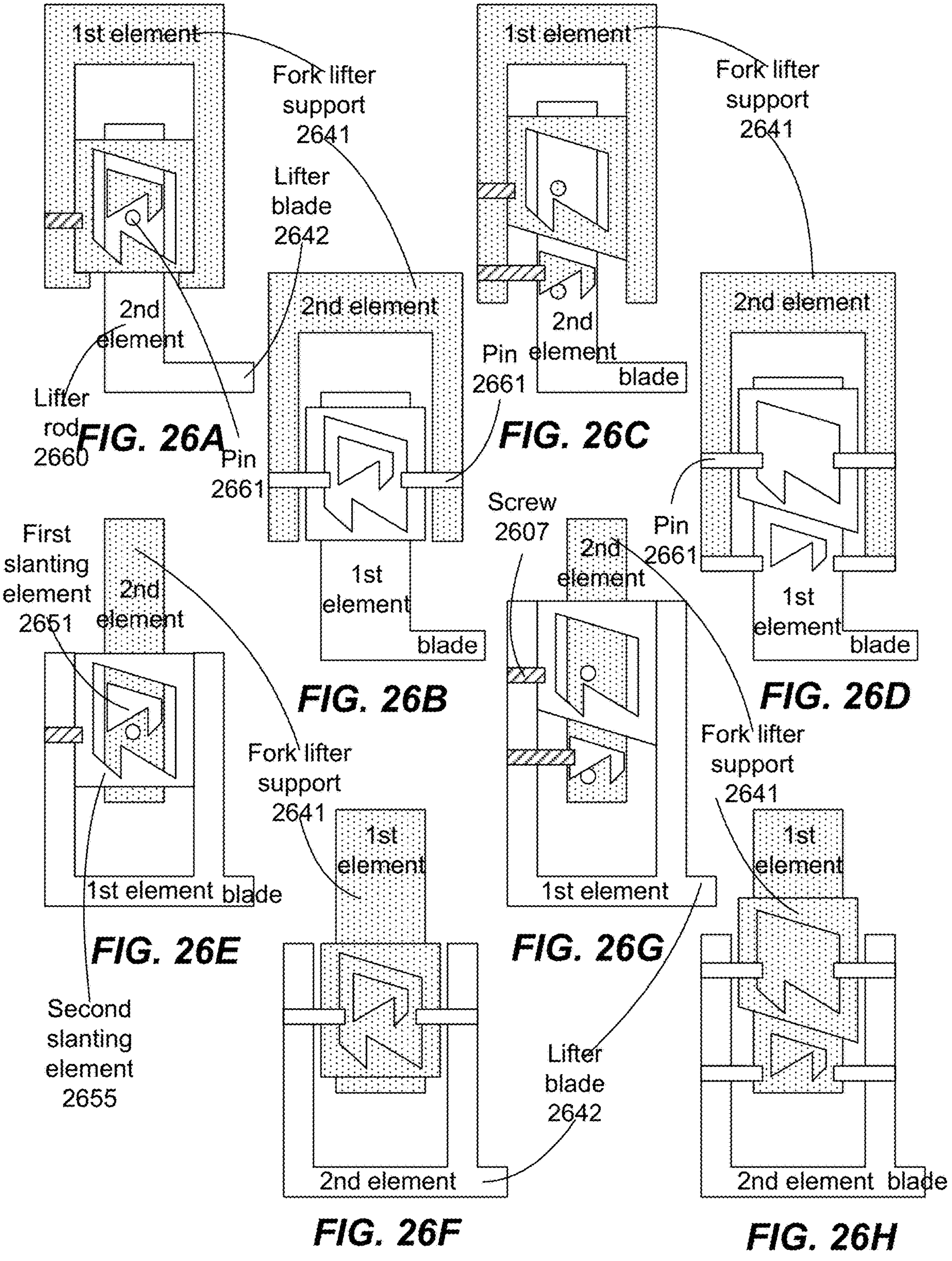
1st element
Fork lifter support 2641
Lifter blade 2642
2nd element
Lifter rod 2660
Pin 2661
FIG. 26A
2nd element
1st element
blade
FIG. 26B
1st element
Fork lifter support 2641
2nd element
Pin 2661
blade
FIG. 26C
2nd element
Pin 2661
1st element
blade
FIG. 26D
First slanting element 2651
2nd element
1st element
blade
FIG. 26E
Second slanting element 2655
Fork lifter support 2641
1st element
2nd element
FIG. 26F
Screw 2607
2nd element
1st element
FIG. 26G
Lifter blade 2642
Fork lifter support 2641
1st element
2nd element
blade
FIG. 26H Forming a rotate mechanism,
the rotate mechanism is configured to rotate a lifter blade 270 degree in a first rotation direction from a first position to a second position of a fork lifter coupled to a fork assembly of a fork lift,
the rotate mechanism is configured to rotate a lifter blade 270 degree in the first rotation direction from the second position to the first position,
wherein in the first position, the lifter blade is disposed under the load for lifting the load, wherein in the second position, the lifter blade is outside the load for not lifting the load
2700

FIG. 27A

Forming a rotate mechanism,
the rotate mechanism is configured to rotate a lifter blade 270 degree in a first rotation direction from a first position to a second position of a fork lifter coupled to a fork assembly of a fork lift,
the rotate mechanism is configured to rotate a lifter blade 270 degree in a second rotation direction opposite the first rotation direction from the second position to the first position,
wherein in the first position, the lifter blade is disposed under the load for lifting the load, wherein in the second position, the lifter blade is outside the load for not lifting the load
2700

FIG. 27B

Fork assembly
2820
Rotate
mechanism
2850
Fork beam
2821A
Fork
2821
Fork
strenthener
2821C
Fork plate
2821B
Fork
coupler
2838
Mounting
body
2824
First
slanting
element
2851
Load
lifter
2840
Lifter
support
2841
Lifter
blade
2842
Fork beam
2821A
Pin
2861

Load
2811
Actuator
2838B
Mounting
coupler
2824A
Second
slanting
element
2855
Lifter
support
2841
Spring
2862
Short
direction
2816
Long
direction
2817
Load
lifter
2840
Load
beam
2815

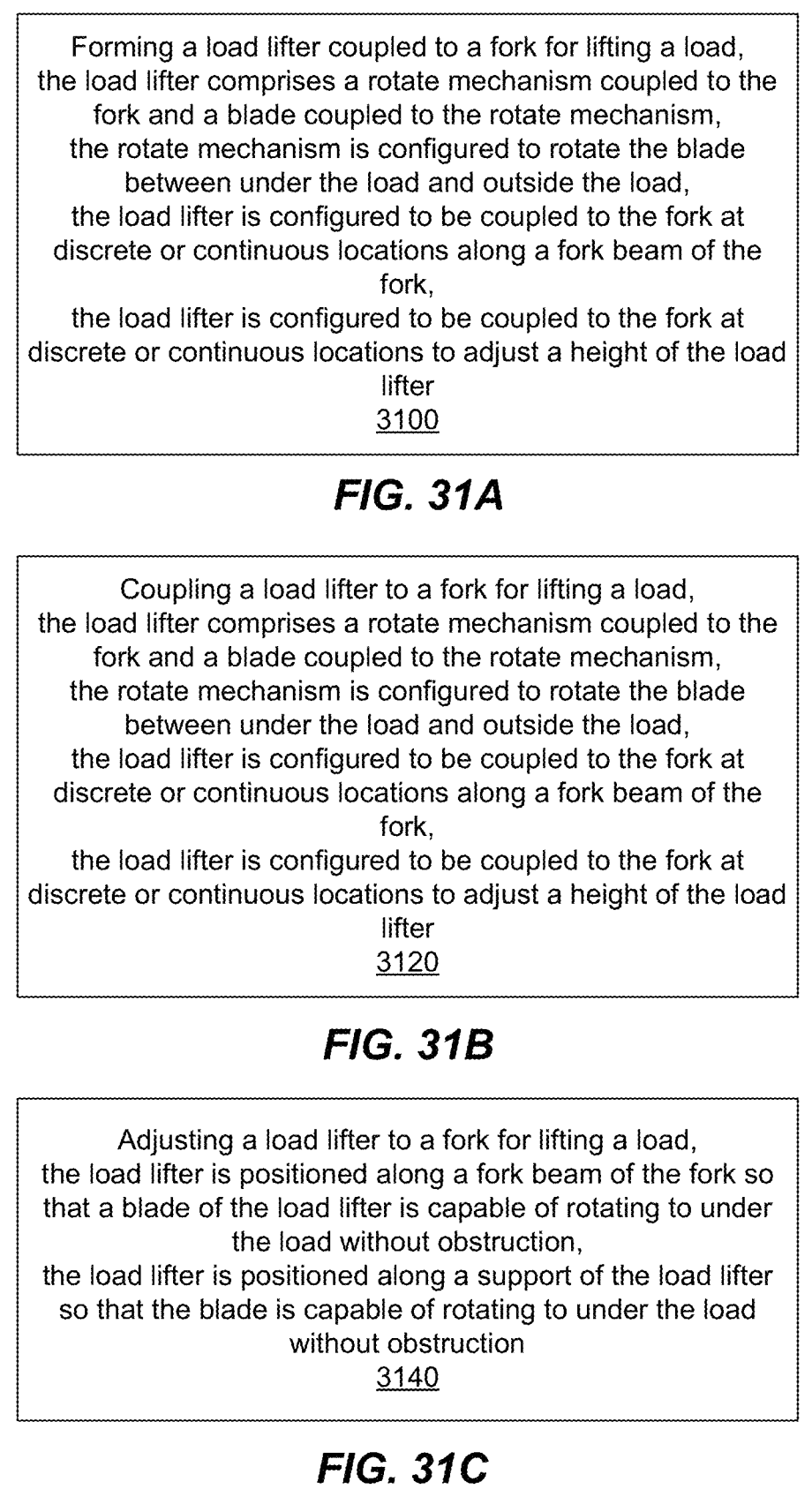

Forming a load lifter coupled to a fork for lifting a load,
the load lifter comprises a rotate mechanism coupled to the fork and a blade coupled to the rotate mechanism,
the rotate mechanism is configured to rotate the blade between under the load and outside the load,
the load lifter is configured to be coupled to the fork at discrete or continuous locations along a fork beam of the fork,
the load lifter is configured to be coupled to the fork at discrete or continuous locations to adjust a height of the load lifter
3100

*FIG. 31A*

Coupling a load lifter to a fork for lifting a load,
the load lifter comprises a rotate mechanism coupled to the fork and a blade coupled to the rotate mechanism,
the rotate mechanism is configured to rotate the blade between under the load and outside the load,
the load lifter is configured to be coupled to the fork at discrete or continuous locations along a fork beam of the fork,
the load lifter is configured to be coupled to the fork at discrete or continuous locations to adjust a height of the load lifter
3120

*FIG. 31B*

Adjusting a load lifter to a fork for lifting a load,
the load lifter is positioned along a fork beam of the fork so that a blade of the load lifter is capable of rotating to under the load without obstruction,
the load lifter is positioned along a support of the load lifter so that the blade is capable of rotating to under the load without obstruction
3140

*FIG. 31C*

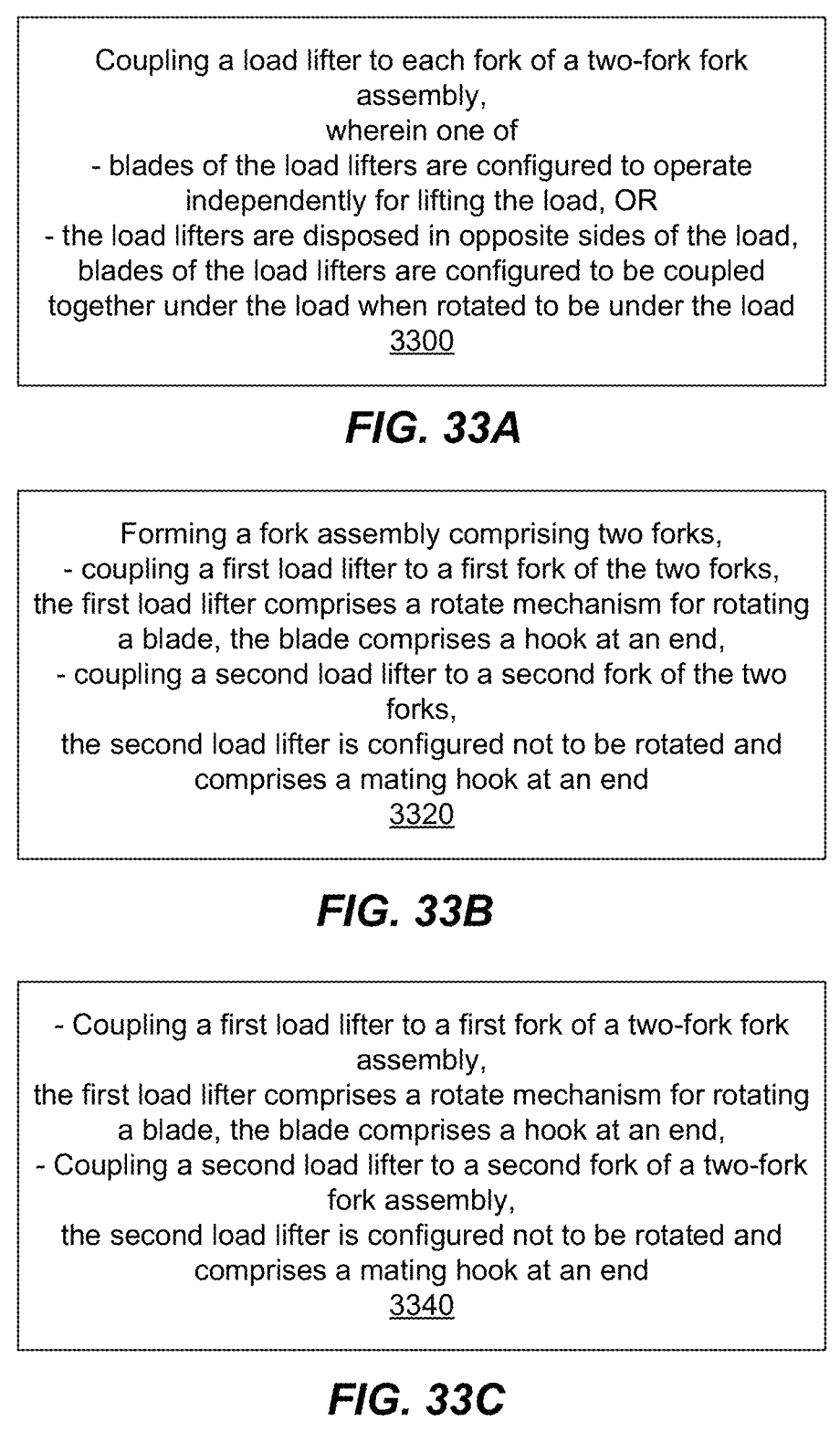

Coupling a load lifter to each fork of a two-fork fork assembly,
wherein one of
- blades of the load lifters are configured to operate independently for lifting the load, OR
- the load lifters are disposed in opposite sides of the load, blades of the load lifters are configured to be coupled together under the load when rotated to be under the load
3300

FIG. 33A

Forming a fork assembly comprising two forks,
- coupling a first load lifter to a first fork of the two forks, the first load lifter comprises a rotate mechanism for rotating a blade, the blade comprises a hook at an end,
- coupling a second load lifter to a second fork of the two forks,
the second load lifter is configured not to be rotated and comprises a mating hook at an end
3320

FIG. 33B

- Coupling a first load lifter to a first fork of a two-fork fork assembly,
the first load lifter comprises a rotate mechanism for rotating a blade, the blade comprises a hook at an end,
- Coupling a second load lifter to a second fork of a two-fork fork assembly,
the second load lifter is configured not to be rotated and comprises a mating hook at an end
3340

FIG. 33C

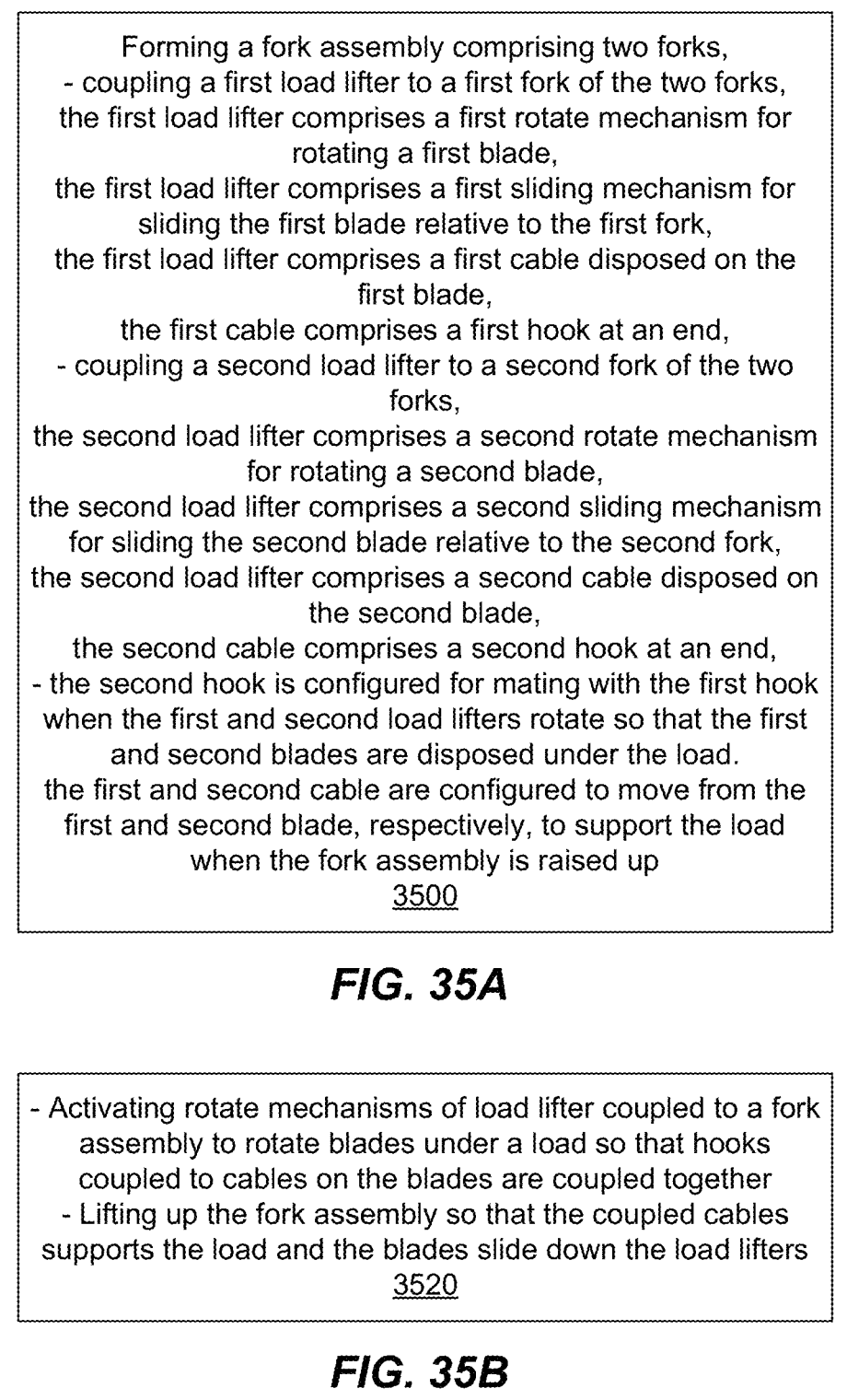

Forming a fork assembly comprising two forks,
- coupling a first load lifter to a first fork of the two forks,
the first load lifter comprises a first rotate mechanism for rotating a first blade,
the first load lifter comprises a first sliding mechanism for sliding the first blade relative to the first fork,
the first load lifter comprises a first cable disposed on the first blade,
the first cable comprises a first hook at an end,
- coupling a second load lifter to a second fork of the two forks,
the second load lifter comprises a second rotate mechanism for rotating a second blade,
the second load lifter comprises a second sliding mechanism for sliding the second blade relative to the second fork,
the second load lifter comprises a second cable disposed on the second blade,
the second cable comprises a second hook at an end,
- the second hook is configured for mating with the first hook when the first and second load lifters rotate so that the first and second blades are disposed under the load.
the first and second cable are configured to move from the first and second blade, respectively, to support the load when the fork assembly is raised up
3500

*FIG. 35A*

- Activating rotate mechanisms of load lifter coupled to a fork assembly to rotate blades under a load so that hooks coupled to cables on the blades are coupled together
- Lifting up the fork assembly so that the coupled cables supports the load and the blades slide down the load lifters
3520

*FIG. 35B*

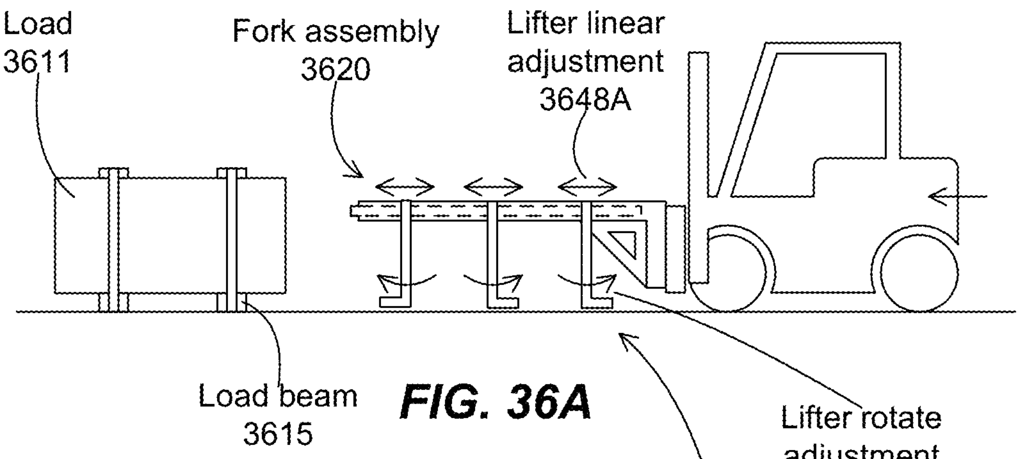
FIG. 36A
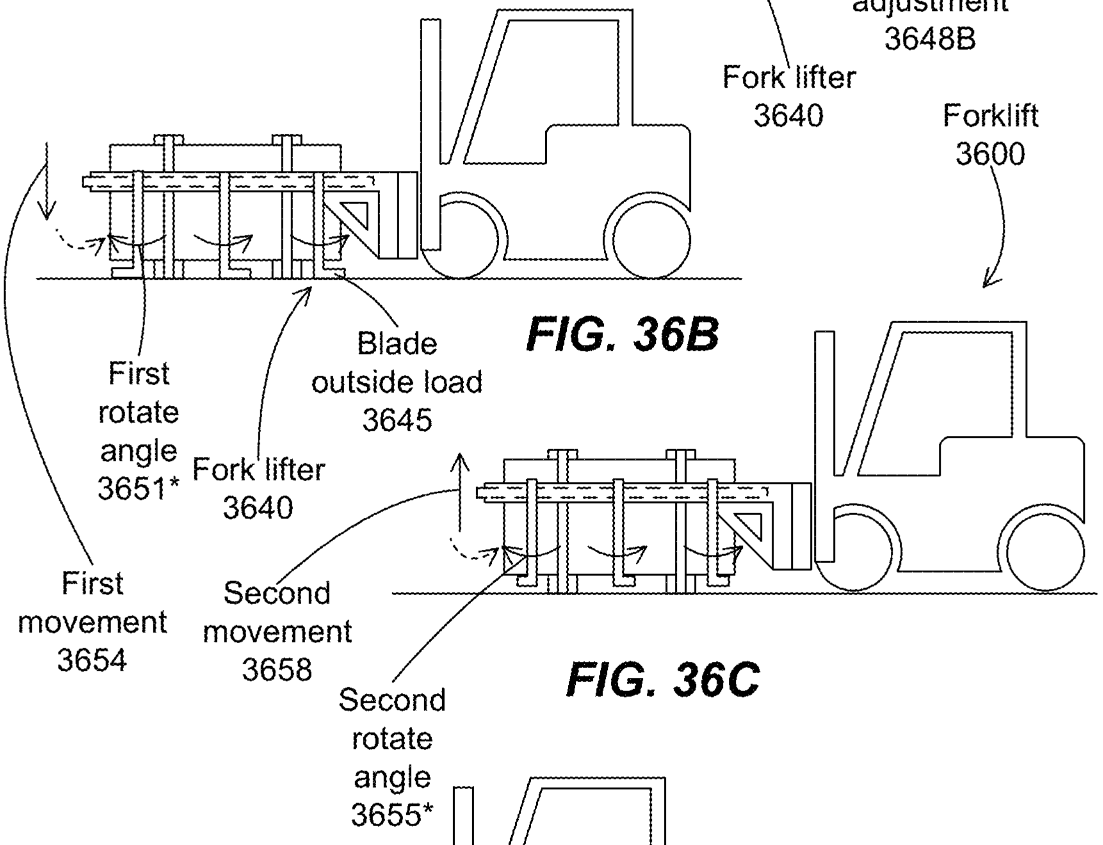
FIG. 36B
FIG. 36C
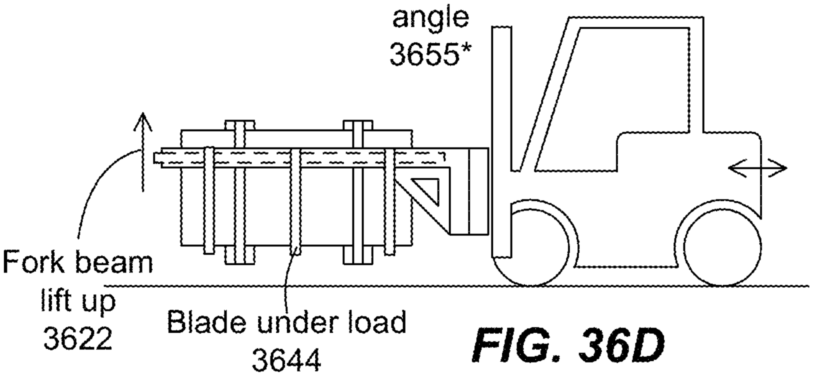
FIG. 36D

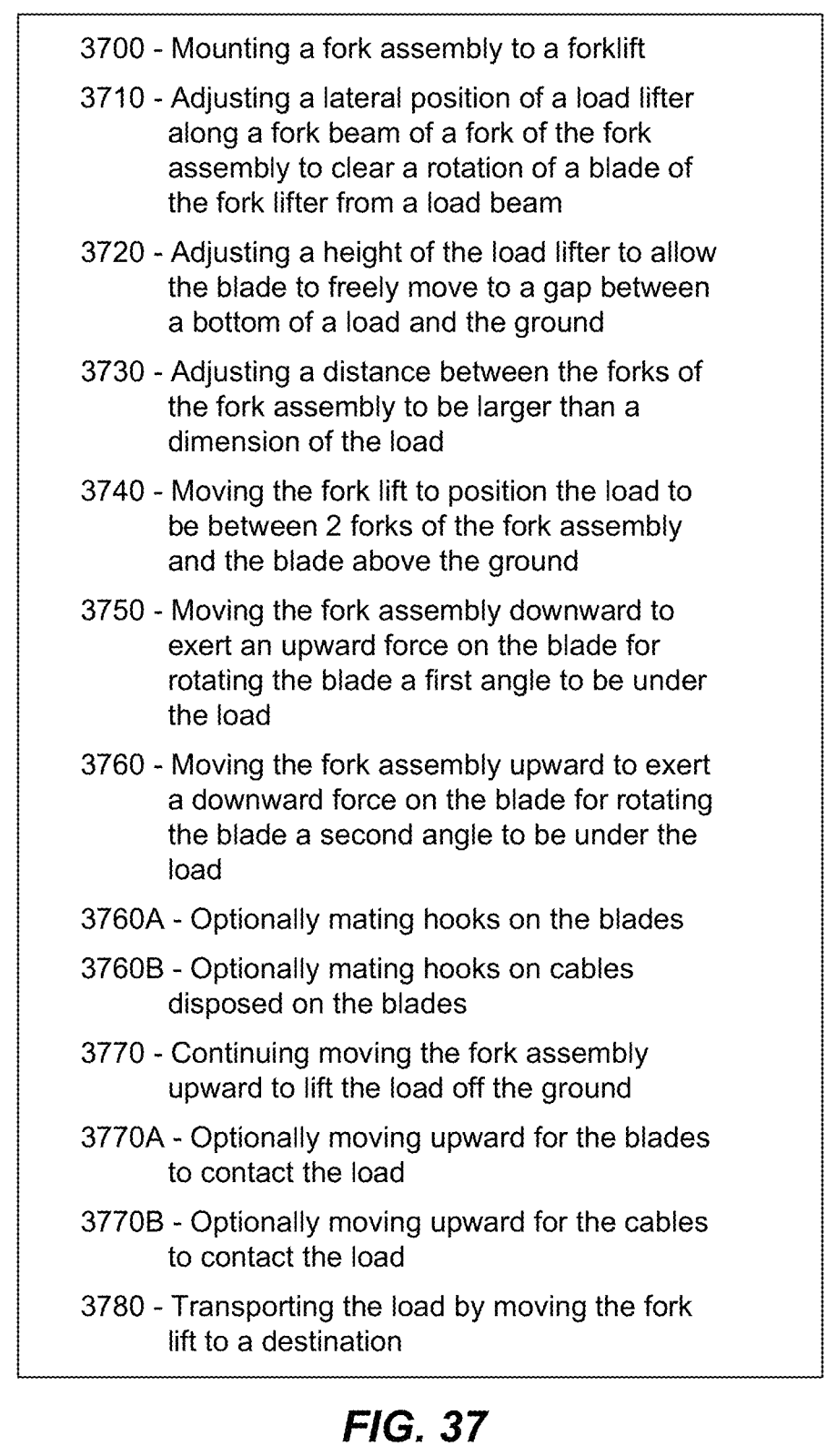

3700 - Mounting a fork assembly to a forklift

3710 - Adjusting a lateral position of a load lifter along a fork beam of a fork of the fork assembly to clear a rotation of a blade of the fork lifter from a load beam 3720 - Adjusting a height of the load lifter to allow the blade to freely move to a gap between a bottom of a load and the ground 3730 - Adjusting a distance between the forks of the fork assembly to be larger than a dimension of the load 3740 - Moving the fork lift to position the load to be between 2 forks of the fork assembly and the blade above the ground 3750 - Moving the fork assembly downward to exert an upward force on the blade for rotating the blade a first angle to be under the load 3760 - Moving the fork assembly upward to exert a downward force on the blade for rotating the blade a second angle to be under the load 3760A - Optionally mating hooks on the blades 3760B - Optionally mating hooks on cables disposed on the blades 3770 - Continuing moving the fork assembly upward to lift the load off the ground 3770A - Optionally moving upward for the blades to contact the load 3770B - Optionally moving upward for the cables to contact the load 3780 - Transporting the load by moving the fork lift to a destination

*FIG. 37*

Load
3811
Fork beam
lowering
3823
Blade under load
3844

Forklift
3800
First
rotate
angle
3851*
Fork lifter
3840
Blade under
load
3844

First
movement
3854
Second
movement
3858
Second
rotate
angle
3855*

Fork lifter
3840
Blade outside load
3845

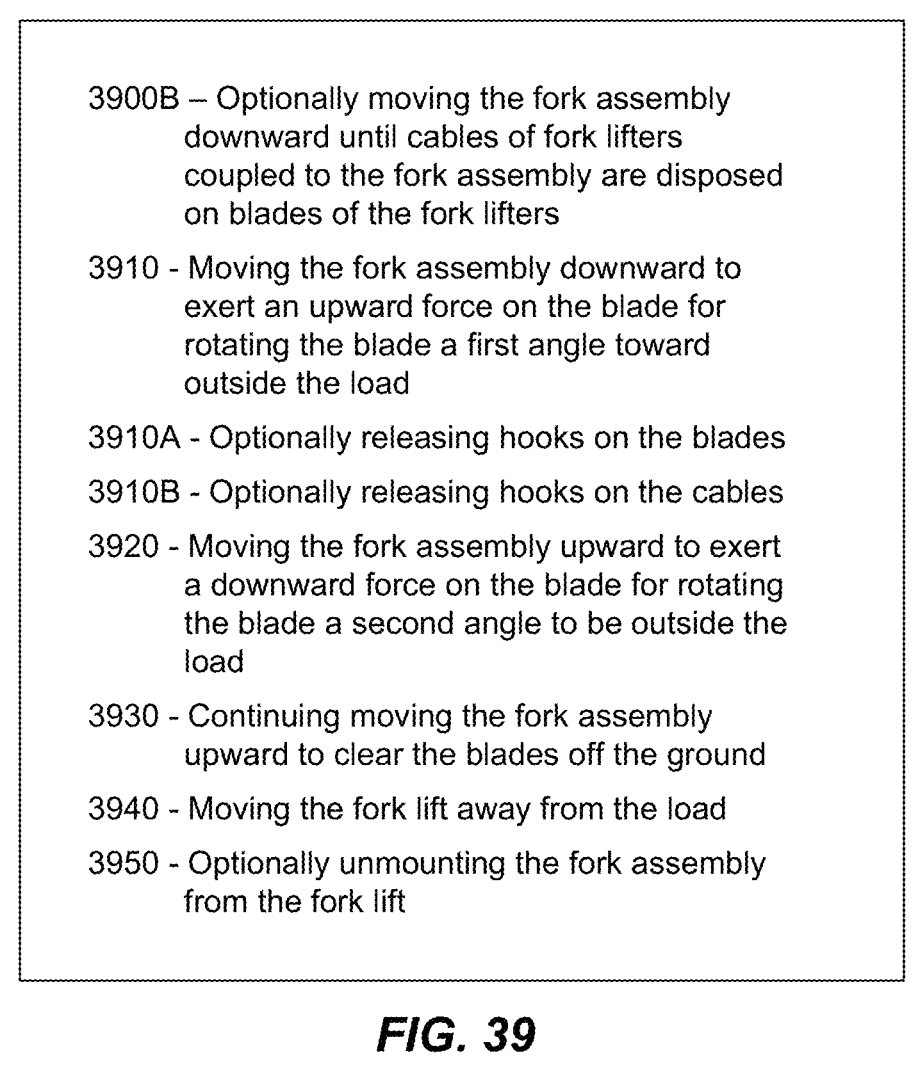

3900B – Optionally moving the fork assembly downward until cables of fork lifters coupled to the fork assembly are disposed on blades of the fork lifters 3910 - Moving the fork assembly downward to exert an upward force on the blade for rotating the blade a first angle toward outside the load 3910A - Optionally releasing hooks on the blades 3910B - Optionally releasing hooks on the cables 3920 - Moving the fork assembly upward to exert a downward force on the blade for rotating the blade a second angle to be outside the load 3930 - Continuing moving the fork assembly upward to clear the blades off the ground 3940 - Moving the fork lift away from the load 3950 - Optionally unmounting the fork assembly from the fork lift

*FIG. 39*

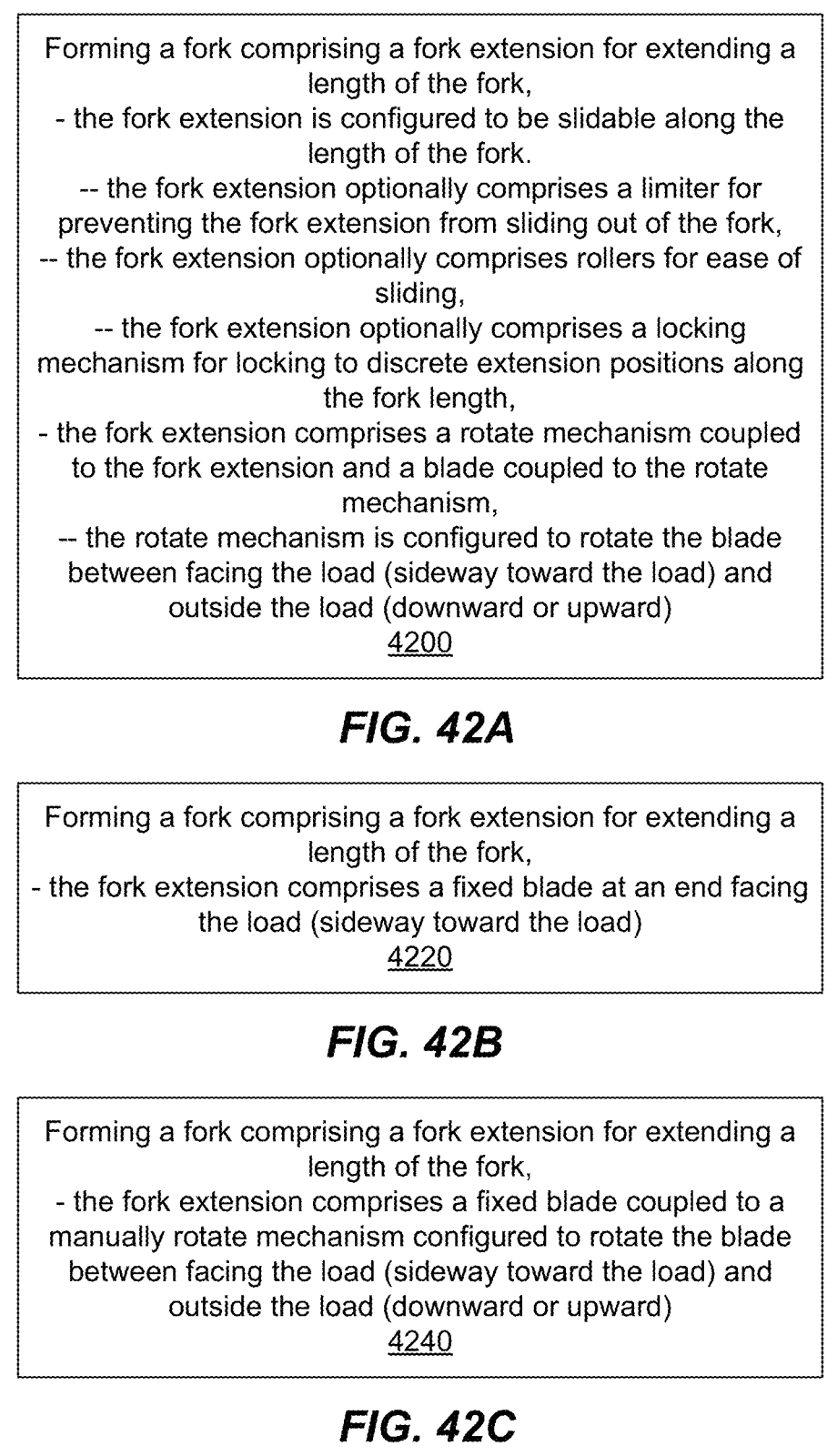

Forming a fork comprising a fork extension for extending a length of the fork,
- the fork extension is configured to be slidable along the length of the fork.
-- the fork extension optionally comprises a limiter for preventing the fork extension from sliding out of the fork,
-- the fork extension optionally comprises rollers for ease of sliding,
-- the fork extension optionally comprises a locking mechanism for locking to discrete extension positions along the fork length,
- the fork extension comprises a rotate mechanism coupled to the fork extension and a blade coupled to the rotate mechanism,
-- the rotate mechanism is configured to rotate the blade between facing the load (sideway toward the load) and outside the load (downward or upward)
4200

*FIG. 42A*

Forming a fork comprising a fork extension for extending a length of the fork,
- the fork extension comprises a fixed blade at an end facing the load (sideway toward the load)
4220

*FIG. 42B*

Forming a fork comprising a fork extension for extending a length of the fork,
- the fork extension comprises a fixed blade coupled to a manually rotate mechanism configured to rotate the blade between facing the load (sideway toward the load) and outside the load (downward or upward)
4240

*FIG. 42C*

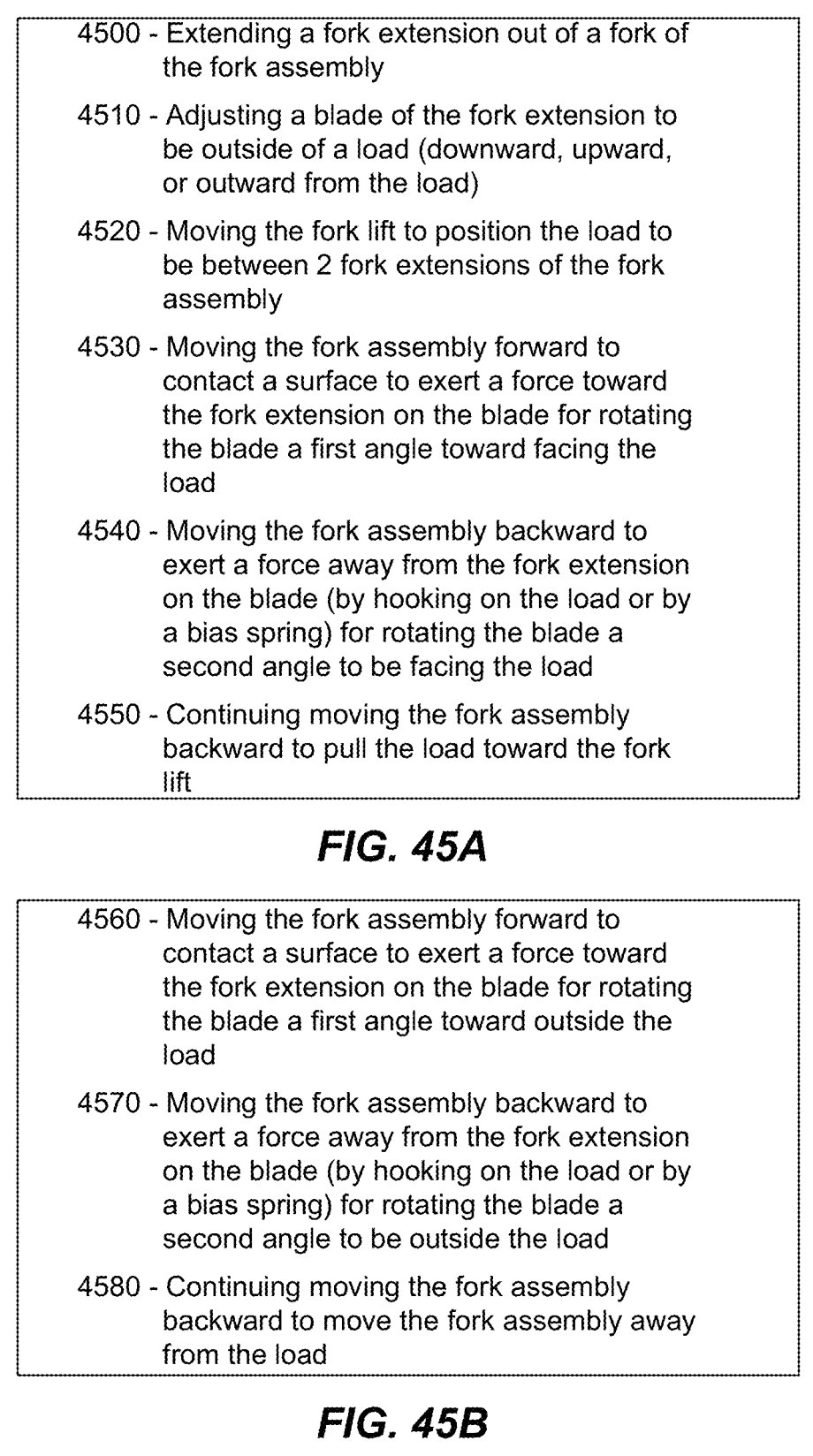

4500 - Extending a fork extension out of a fork of the fork assembly

4510 - Adjusting a blade of the fork extension to be outside of a load (downward, upward, or outward from the load)

4520 - Moving the fork lift to position the load to be between 2 fork extensions of the fork assembly 4530 - Moving the fork assembly forward to contact a surface to exert a force toward the fork extension on the blade for rotating the blade a first angle toward facing the load 4540 - Moving the fork assembly backward to exert a force away from the fork extension on the blade (by hooking on the load or by a bias spring) for rotating the blade a second angle to be facing the load 4550 - Continuing moving the fork assembly backward to pull the load toward the fork lift

*FIG. 45A*

4560 - Moving the fork assembly forward to contact a surface to exert a force toward the fork extension on the blade for rotating the blade a first angle toward outside the load 4570 - Moving the fork assembly backward to exert a force away from the fork extension on the blade (by hooking on the load or by a bias spring) for rotating the blade a second angle to be outside the load 4580 - Continuing moving the fork assembly backward to move the fork assembly away from the load

*FIG. 45B*

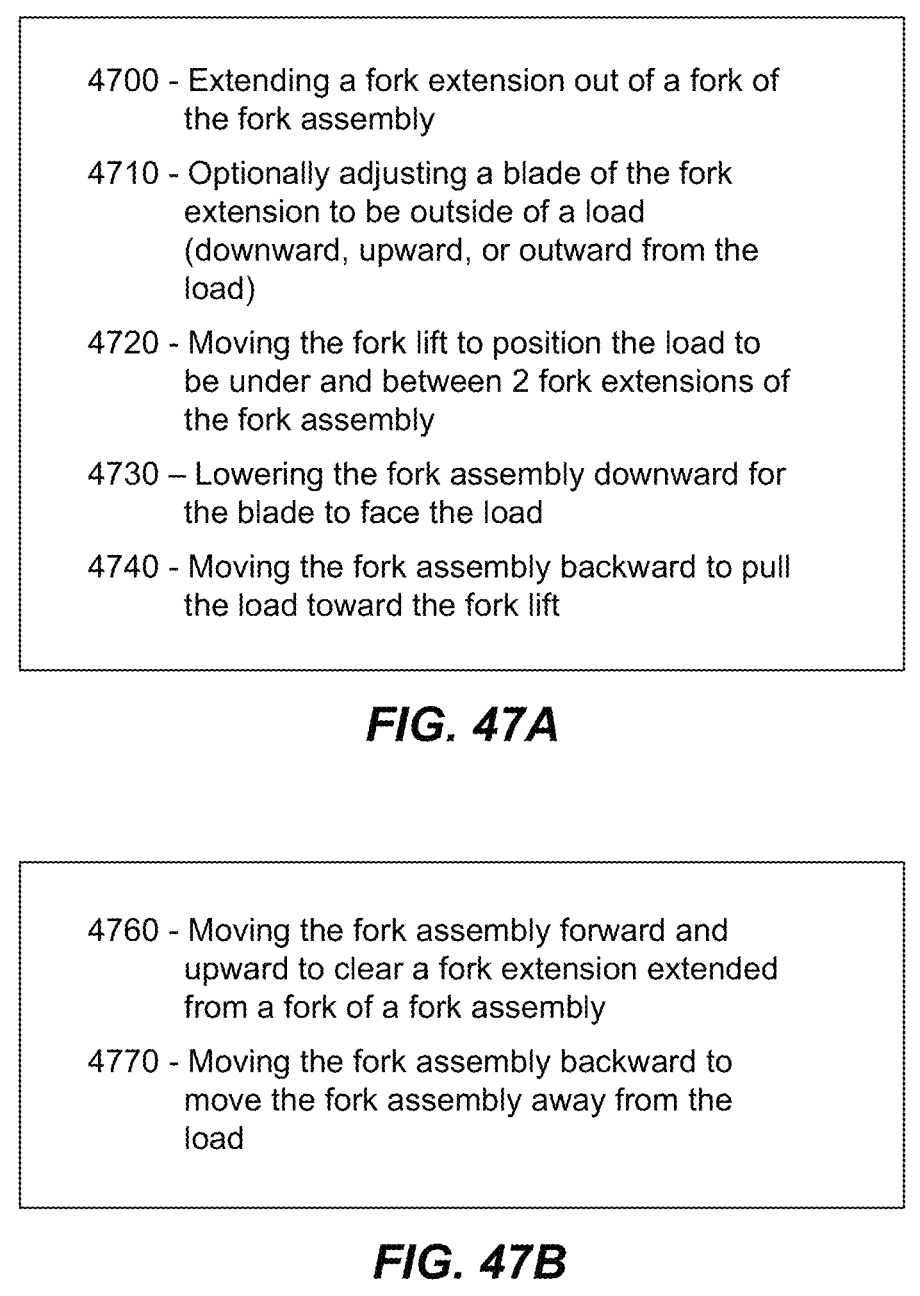

4700 - Extending a fork extension out of a fork of the fork assembly

4710 - Optionally adjusting a blade of the fork extension to be outside of a load (downward, upward, or outward from the load)

4720 - Moving the fork lift to position the load to be under and between 2 fork extensions of the fork assembly 4730 – Lowering the fork assembly downward for the blade to face the load 4740 - Moving the fork assembly backward to pull the load toward the fork lift

*FIG. 47A*

4760 - Moving the fork assembly forward and upward to clear a fork extension extended from a fork of a fork assembly 4770 - Moving the fork assembly backward to move the fork assembly away from the load

*FIG. 47B*

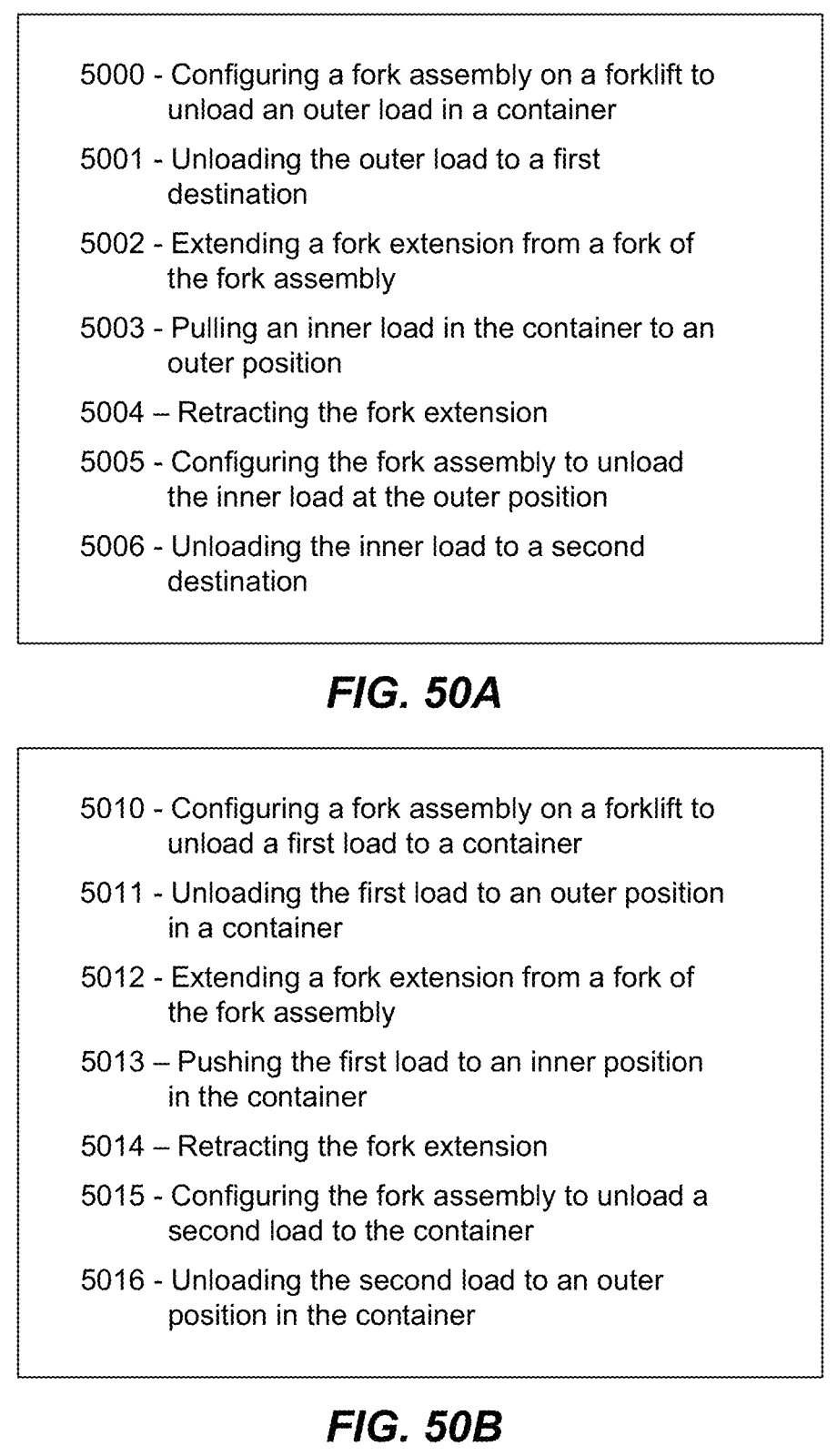

5000 - Configuring a fork assembly on a forklift to unload an outer load in a container 5001 - Unloading the outer load to a first destination 5002 - Extending a fork extension from a fork of the fork assembly 5003 - Pulling an inner load in the container to an outer position 5004 – Retracting the fork extension 5005 - Configuring the fork assembly to unload the inner load at the outer position 5006 - Unloading the inner load to a second destination

*FIG. 50A*

5010 - Configuring a fork assembly on a forklift to unload a first load to a container 5011 - Unloading the first load to an outer position in a container 5012 - Extending a fork extension from a fork of the fork assembly 5013 – Pushing the first load to an inner position in the container 5014 – Retracting the fork extension 5015 - Configuring the fork assembly to unload a second load to the container 5016 - Unloading the second load to an outer position in the container

*FIG. 50B*

5105A - Extending a fork extension out of a fork of the fork assembly

5105B - Assembling a roller leg on the fork extension

5105C - Moving the fork lift to position a load to be between 2 fork extensions of the fork assembly 5105D - Moving the fork assembly backward to pull the load toward the fork lift with the roller legs supporting the fork extensions

*FIG. 53*

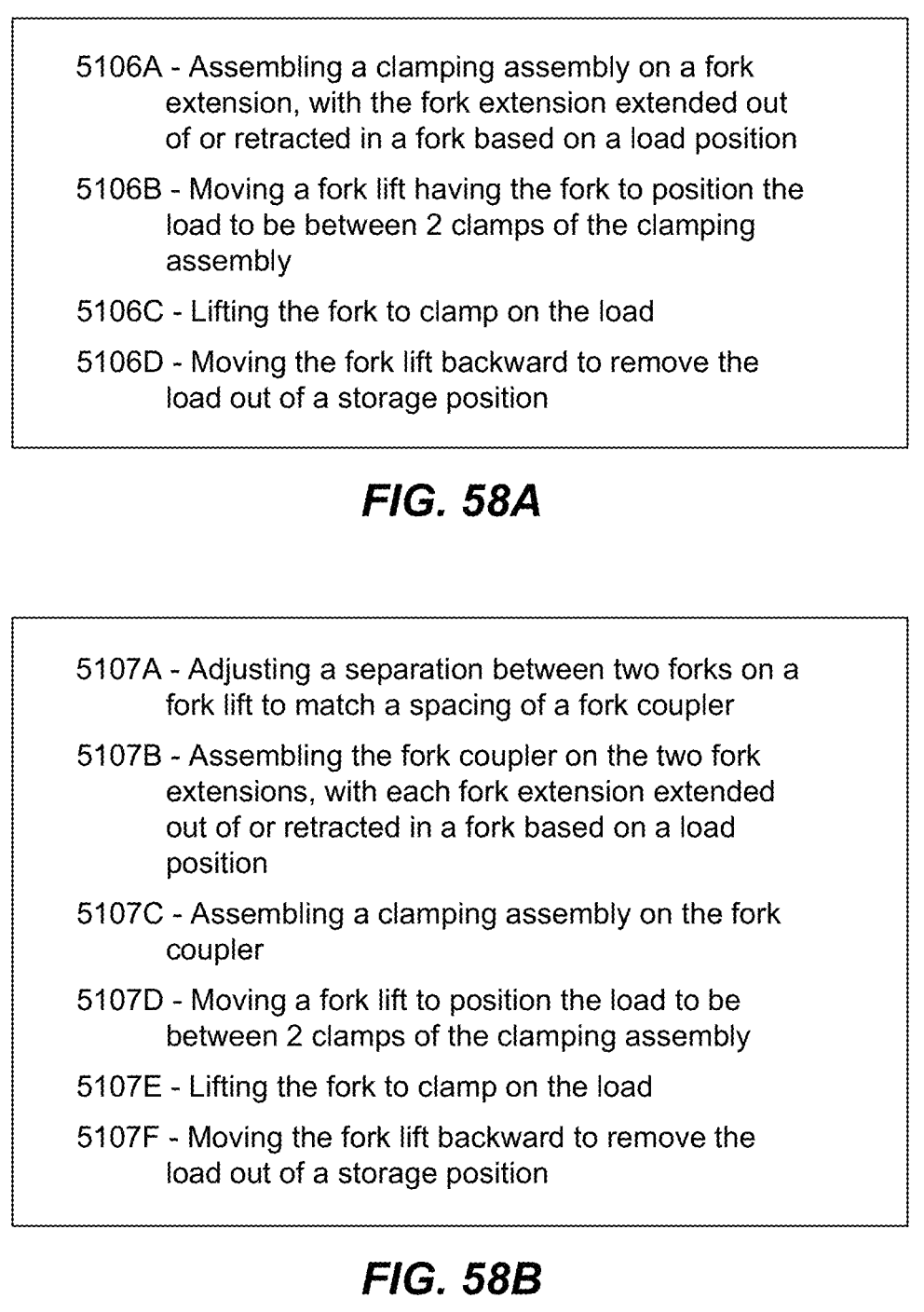

5106A - Assembling a clamping assembly on a fork extension, with the fork extension extended out of or retracted in a fork based on a load position 5106B - Moving a fork lift having the fork to position the load to be between 2 clamps of the clamping assembly 5106C - Lifting the fork to clamp on the load 5106D - Moving the fork lift backward to remove the load out of a storage position

*FIG. 58A*

5107A - Adjusting a separation between two forks on a fork lift to match a spacing of a fork coupler 5107B - Assembling the fork coupler on the two fork extensions, with each fork extension extended out of or retracted in a fork based on a load position 5107C - Assembling a clamping assembly on the fork coupler 5107D - Moving a fork lift to position the load to be between 2 clamps of the clamping assembly 5107E - Lifting the fork to clamp on the load 5107F - Moving the fork lift backward to remove the load out of a storage position

*FIG. 58B*

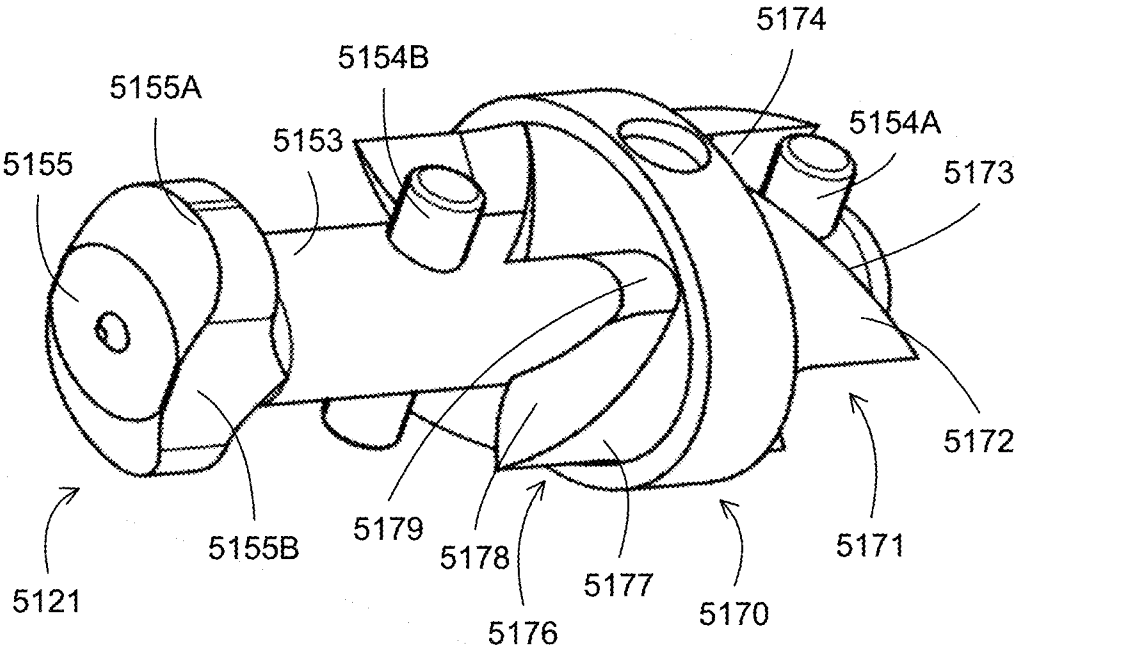
FIG. 60A
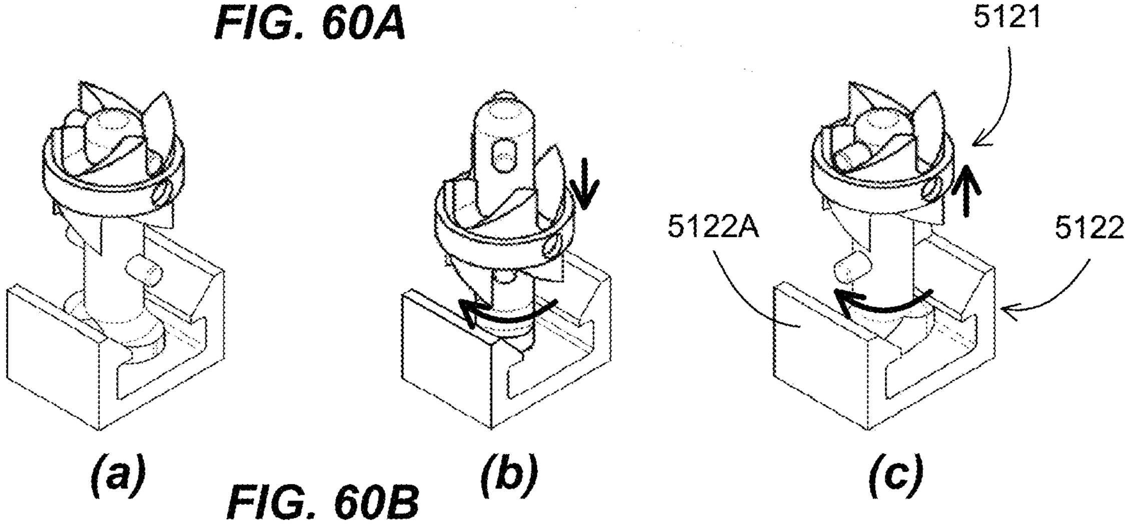
(a) (b) (c)
FIG. 60B
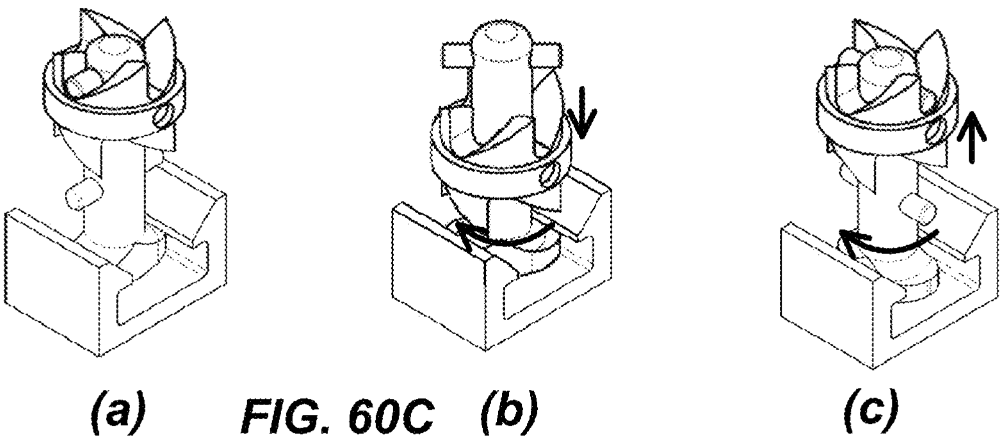
(a) FIG. 60C (b) (c)

FORK ASSEMBLY FOR FORKLIFTS

The present application is a continuation-in-part of application Ser. No. 17/708,330, filed on Mar. 30, 2022, entitled "Fork assembly for forklifts", now U.S. Pat. No. 11,767,208, which claims priority from U.S. Provisional Patent Application Ser. No. 63/280,223, filed on Nov. 17, 2021 entitled "Fork assembly for forklifts" which are incorporated herein by reference.

BACKGROUND OF THE INVENTION

Forklifts include powered industrial moving trucks, e.g., forklift vehicles, and manual pallet trucks. Forklifts can be used to lift and move materials, such as pallets or loads, over short distances, such as within a building or a warehouse.

A forklift can include a truck frame, which is the base of the forklift machine to which components of the forklift are attached. The forklift can include a mast, which is a vertical assembly that can be tilted for tilting the load. The mast can function as a support for a carriage to move along in a vertical direction. Forks, typically two, are mounted to the carriage, and function to support the load. By raising or lowering the carriage, the forks also move, which then raises or lowers the load.

Forklifts or forklift vehicles are used to lift a load and or transport a load from one location to another location. To lift a load, the forklift vehicle will drive the one or more forks beneath the load, and position the forks in contact with the underside of the load. The forks are then raised by the mast of the forklift vehicle, lifting the load resting upon the forks. The load lifted by the forklift vehicle is commonly a standard sized container or pallet, however it is not uncommon for the forklift vehicle to be used to lift or transport an abnormally shaped load, or load that is not properly sized for transport by a forklift vehicle.

Certain forklift vehicles allow the forks to be moved on a horizontal plane together or separately. Horizontal movement of the forks together allows the forks to be repositioned to the left or right of center of the forklift vehicle, and is commonly used when the forklift vehicle cannot be centered directly in front of the load. Horizontal movement of the forks separately allows the forks to be horizontally separated from one another, increasing or decreasing the width between the forks of the forklift vehicle. However, the distance between the forks of the forklift vehicle is limited by the structural design of the forklift vehicle, and not all forklift vehicles allow for the horizontal movement of the forks.

FIGS. 1A-1C illustrate a prior art forklift vehicle and its operations. In FIG. 1A, a forklift 100 can include a truck frame, which has a body 100B and wheels 100A for moving as a vehicle. The forklift 100 can include a mast 103, which is coupled to the forklift body, and is disposed in a typically vertical direction. The mast can be tilted to tilt the forks and the load supported by the forks. The forklift can include a carriage 102, which is movably coupled to the mast 103 for sliding along the mast, e.g., to be raised or lowered along the mast.

Two forks 101 can be mounted on the carriage 102, for example, by a hooking assembly 104. A fork can have a hook 104A, which is mounted to a mating hook receptacle 104B in the carriage. The hook receptacle can be formed along the carriage, thus can allow the fork to move in a horizontal direction, for example, to adjust a relative distance between the forks. The fork can include a blade 101A coupled at an angle to a shank 101B.

In operation, the forklift can move toward the load, and position the forks to be under the load. The load can be placed on a pallet, so that the load is raised from the floor. The pallet can have openings to accept the forks. The forks can then be raised to lift the load from the ground. The forklift then can move to transport the load to a destination. At destination, the forks can be lowered to place the pallet on the ground. The forks can be further lowered to be separated from the pallet. The forklift can move backward to move the forks away from the pallet.

In FIG. 1B, a fork extension 105 can be used to extend the length of a fork 101. The fork extension can have a hollow portion to accept the fork. The fork extension can be used to lift loads from a distance farther than the reach of the forks. The fork extension can also be used to lift longer loads, in order to evenly distribute the weight of the load on the forks.

In FIG. 1C, fork extensions 105 are used to extend the length of the forks, to allow the forklift to reach a load 111 disposed far away from the opening of a container 110. With the fork extension, the force 112 acting on the fork mounting area, e.g., on the hooking assembly, can be large, due to the force 113 of the load is far away from the rotating center of the forks.

SUMMARY OF THE EMBODIMENTS

In some embodiments, the present invention discloses an accessory, such as an attachment, for a forklift vehicle, such as a fork assembly for attaching to the forklift vehicle for lifting and pulling a load. The fork assembly is designed to releasably attach to the forklift vehicle on a front end of the forklift vehicle, such as on the carriage of the forklift vehicle, e.g., the carriage that the original forks are attached to, with the original forks removed from the carriage before attaching the present fork assembly. By attaching to the carriage, the fork assembly can move up and down, can move sideway as a whole, or can be tilted.

The fork assembly can be used to modify the carrying capacity of the forklift vehicle, such as lifting loads from a side and lifting loads positioned with only a small gap in between. In addition, the fork assembly can include fork extensions configured for pulling loads closer to the forklift vehicle, so that the fork assembly can be used to pick up the load.

In some embodiments, the fork assembly can include multiple forks, such as 2 forks disposed in parallel, and configured to surround a load. Multiple attachments can be made on the forks, so that straps under the load can be connected to the attachments. The straps can be used for support the load, so that the fork assembly can lift the load.

In some embodiments, the fork assembly can include multiple fork extensions which can protrude from the forks. Attachments can be made at the ends of the fork extension, so that a strap can be connected. The strap at the fork extensions can be used for pulling on the load.

In some embodiments, the fork assembly can include multiple fork lifters having rotatable blades. The blades can be rotatable between a non-lift position, e.g., a position that the blades are disposed outside the load and are not able to lift the load, and a lift position, e.g., a position that the blades are disposed under the load and thus are able to lift the load. The rotation of the blades can be performed by a rotate mechanism, which can remotely activated by an operator operating the forklift vehicle. The remote rotate mechanism can allow the operator to lift and transport the load without the need to leave the forklift vehicle.

In some embodiments, the fork assembly can include multiple fork extensions having rotatable blades, such as blades coupled to the fork extensions through a rotate mechanism. The blades can be rotatable between a non-pullable position, e.g., a position that the blades are disposed outside the load and are not able to pull on the load when the forklift vehicle moves backward, and a pullable position, e.g., a position that the blades are pointing toward the load and thus are able to pull the load. The rotate mechanism can be a remotely rotate mechanism, which can allow the operator to lift and transport the load without the need to leave the forklift vehicle.

In some embodiments, the fork attachment assembly for a forklift or a forklift vehicle can include roller legs coupled at far ends of the fork beams or the fork extensions.

In some embodiments, the fork attachment assembly for a forklift or a forklift vehicle can include a clamping device coupled at a far end of the fork beam or the fork extension.

BRIEF DESCRIPTION OF THE DRAWINGS

FIG. 13 illustrates a flow chart for transporting a load according to some embodiments.

FIGS. 17A-17B illustrate forming processes for a fork assembly according to some embodiments.

FIGS. 18A-18B illustrate processes for loading and unloading a load according to some embodiments.

FIGS. 22A-22B illustrate processes to form a rotate mechanism according to some embodiments.

FIGS. 23A-23C illustrate processes for activating the rotate mechanism with the fork assembly according to some embodiments.

FIGS. 26A-26H illustrate configurations for a rotate mechanism according to some embodiments.

FIGS. 27A-27B illustrate processes to form a rotate mechanism according to some embodiments.

FIGS. 31A-31C illustrate a fork lifter for a fork assembly according to some embodiments.

FIGS. 33A-33C illustrate configurations for blades of a fork lifter according to some embodiments.

FIGS. 35A-35B illustrate a cable lifter for a fork assembly according to some embodiments.

FIGS. 36A-36D illustrate a process for lifting and transferring a load according to some embodiments.

FIG. 37 illustrates a flow chart for moving a forklift to take and transport a load according to some embodiments.

FIG. 39 illustrates a flow chart for moving a forklift to release a load according to some embodiments.

FIGS. 42A-42C illustrate configurations for a fork extension according to some embodiments.

FIGS. 45A-45B illustrate operations of the fork extensions according to some embodiments.

FIGS. 47A-47B illustrate flow charts for an operation of the fork extensions according to some embodiments.

FIGS. 50A-50B illustrate flow charts for unloading multiple loads from a container and for loading multiple loads to a container.

FIG. 53 illustrates a flow chart for removing a load from a far end of a container according to some embodiments.

FIGS. 58A-58B illustrate flow charts for preparing a fork lift vehicle to remove a load from a container according to some embodiments.

FIGS. 60A-60C illustrate a schematic configuration for a locking mechanism or assembly having two slanting surfaces can face away from each other according to some embodiments.

DETAILED DESCRIPTION OF THE EMBODIMENTS

In some embodiments, the present invention discloses a fork attachment assembly for a forklift or a forklift vehicle. The fork attachment can be releasably attached to the forklift or forklift vehicle to expand, extend, or modify the ability of the forklift or forklift vehicle.

The fork assembly can include one or more forks, such as two forks, which, in some embodiments, are disposed away from the ground, e.g., the forks, even in their lowest position, are still above the ground, for example, at a distance greater than 10 cm, greater than 20 cm, or greater than 50 cm, such as between 10 cm and 1 m, between 20 cm and 1 m, or between 50 cm and 1 m. For example, the fork shank is coupled to the fork beam in a downward direction, in contrast to a fork shank coupled to a fork blade in an upward direction in a prior art forklift. The forks can be mounted to a body, which can be mounted to a carriage of a forklift, such as fixedly mounted to the carriage. The carriage can be moved up and down along a mast of a forklift. The mast can be tilted with respect to the body of the forklift.

Support elements, such as straps, cable, wire or chain can be used to couple the load to the forks. For example, the support elements can be disposed under the load and secured to the forks. Thus, when the forks are lifted up, the support elements can raise the load up. The above ground forks, together with the support elements, can be used to lift loads that do not offer a clear path under the load for the prior art forks to enter. For example, a load can be put on multiple parallel beams or the load can include a box having multiple parallel beams at the bottom panel of the box. A forklift thus can put the forks in the direction parallel to the parallel beams but cannot be used to lift the load from a direction perpendicular to the parallel beams.

Figure 1A:
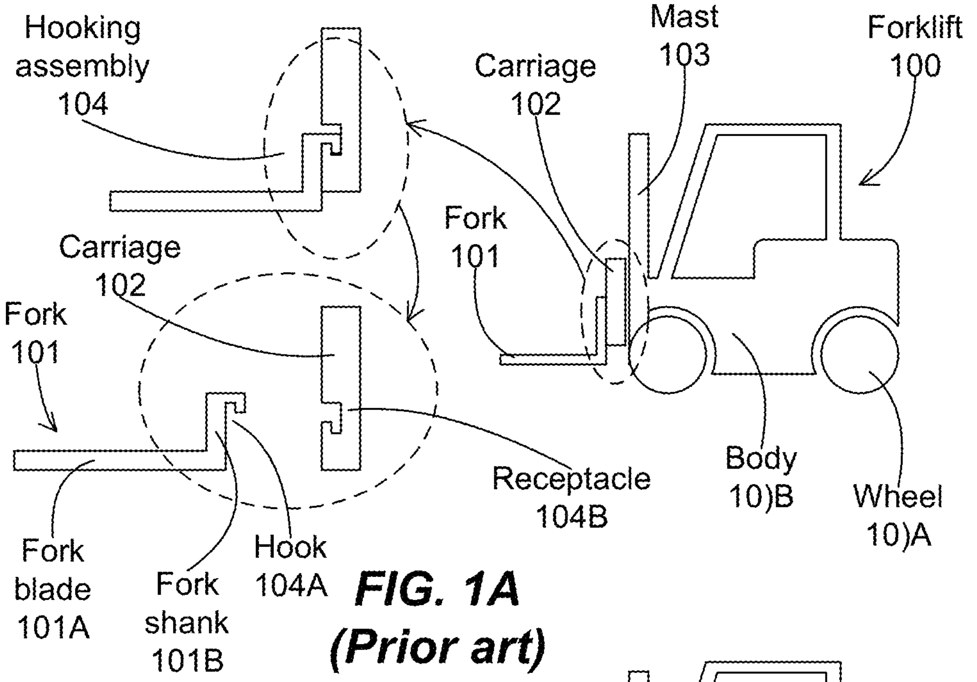
FIG. 1A (Prior art)
FIGS. 1A-1C illustrate a prior art forklift vehicle and its operations.
Figure 1B:
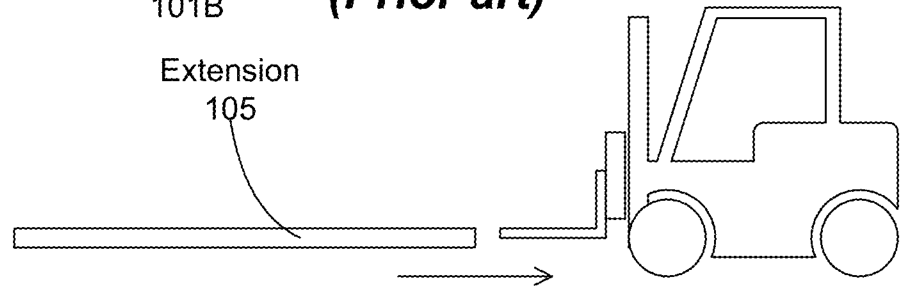
FIG. 1B (Prior art)
Figure 1C:
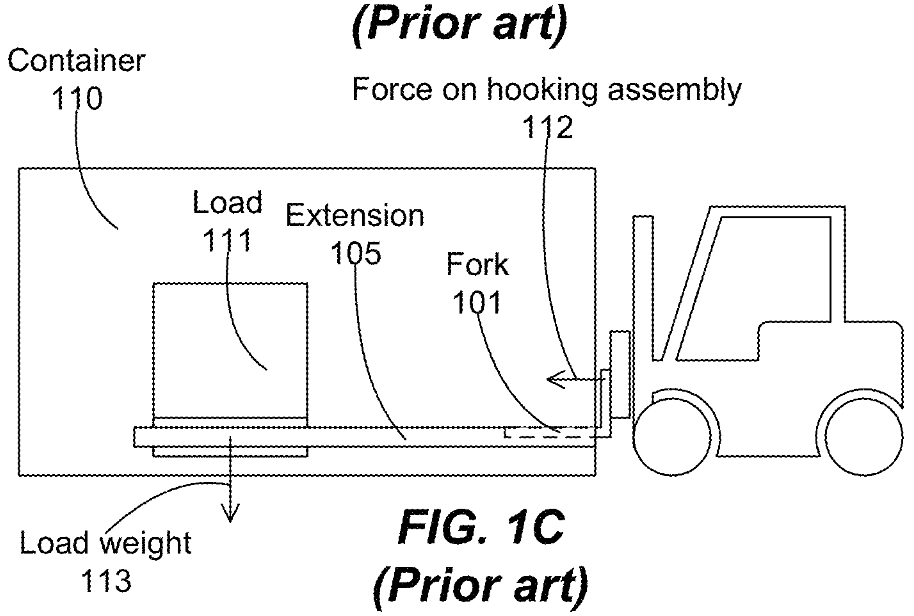
FIG. 1C (Prior art)
Figure 2A:
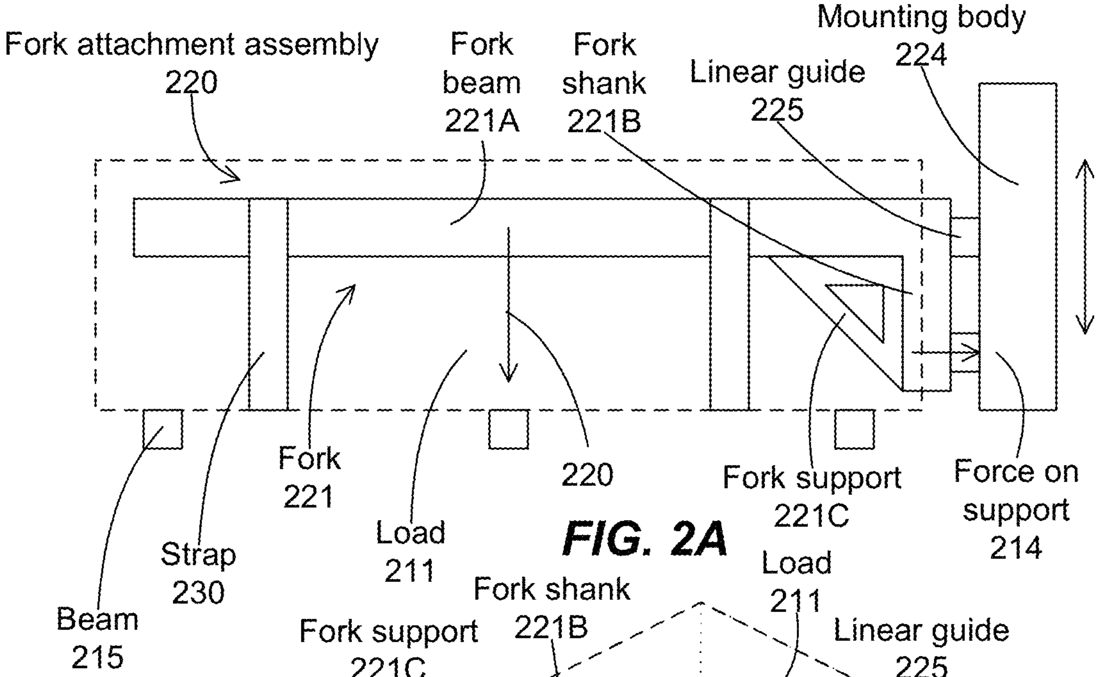
FIGS. 2A-2B illustrate a fork attachment assembly according to some embodiments.
Figure 2B:
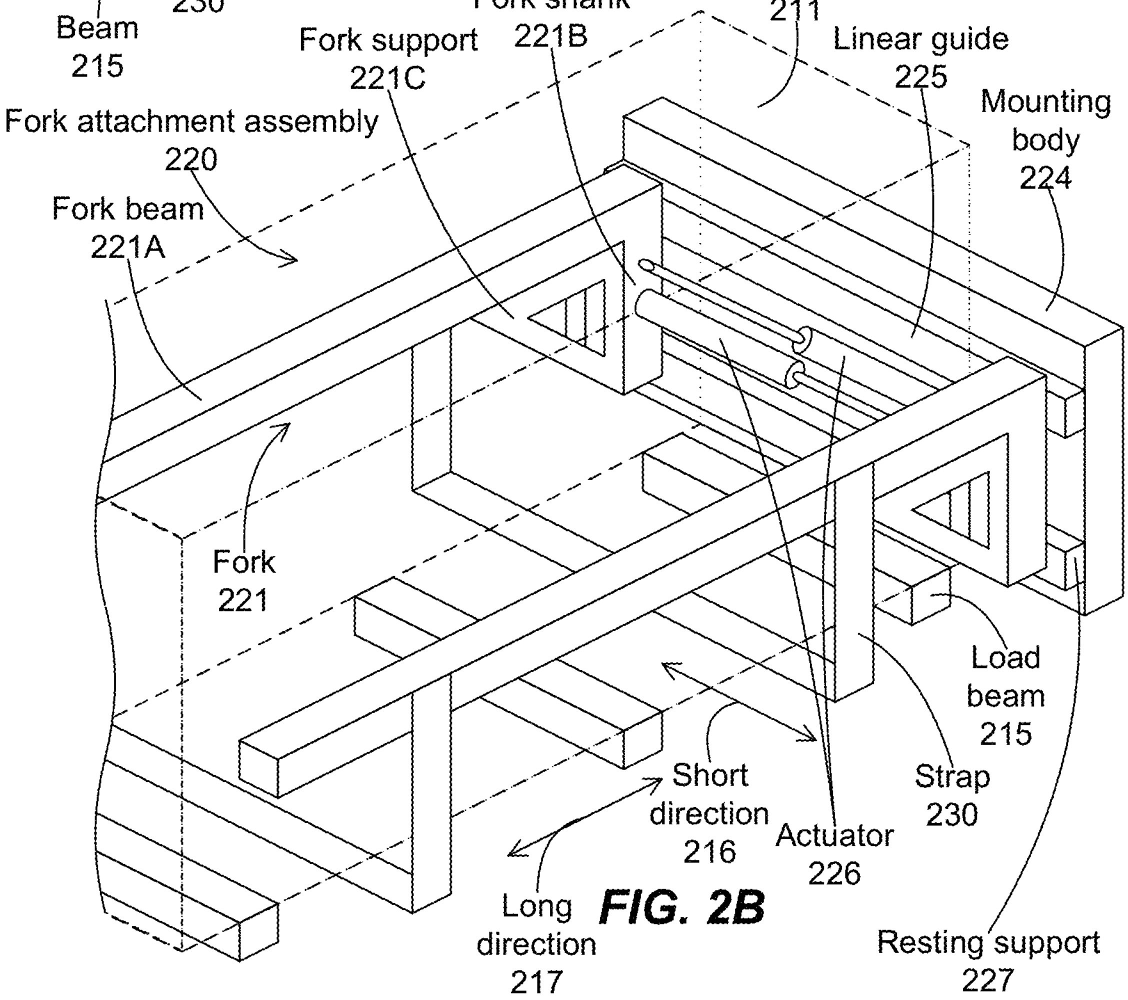

FIGS. 2A-2B illustrate a fork attachment assembly according to some embodiments. FIG. 2A shows a side view and FIG. 2B shows a perspective view of a fork assembly 220. As shown, the fork attachment assembly 220 has two forks 221. Other configurations can be used, such as one fork, or more than two forks.

A fork 221 can include a fork beam 221A having an L shape with a fork shank 221B coupled through a triangle support 221C. The fork shank is coupled to the fork beam toward a portion below the beam, e.g., toward the gravity downward direction. Thus, the fork beam can be disposed off the ground, even at the lowest position of the fork. Since the load lifting mechanism is from load lifting elements, such as straps, connected between the fork beams under the load, the fork beams can normally be above the ground for better load stability. Alternatively, the fork shank can be coupled to the fork beam above the fork beam, to form a back rest support for the load, as in conventional forklift.

The forks 221 can be coupled to a fork assembly mounting body 224. The forks can be slidably coupled to the body, e.g., the forks can slide toward or away from each other, on a linear guide 225 to narrow or to enlarge a distance between the forks. The linear guide can be in the form of a hooking assembly, with the fork 221 having a hook portion and the mounting body 224 having a hook receptacle portion. The forks can rest on a resting support 227, which can be configured to be a consumable part, since the forks can exert a high force on the resting support 227. The movements of the forks can be performed by actuators 226, such as one actuator for moving one fork.

A load 211 can be disposed between the forks 221. The distance between the forks can be adjusted to be larger than a dimension of the load. Load lifting elements, such as straps 230, can be placed under the load with two ends of the straps coupled to the forks 221.

In some embodiments, the fork assembly can be used to lift a load that does not offer access under the load in the direction facing the forklift. As an example, an elongated load 211 can have multiple parallel beams 215 along a short direction 216 of the load. Thus the forklift can access the elongated load in a direction parallel to the short side 216, and not in a direction parallel to the long side 217. This situation can cause difficulty when the elongated load is placed inside a container with the short side of the load facing the only opening of the container. In this example, the fork assembly can be used with the forks placing along the load along the long direction 217, and the load lifting elements, e.g., the straps 230, passing under the load along the short direction 216.

In some embodiments, the fork assembly can include other components to provide additional functionalities or to provide better stability for the fork assembly.

FIGS. 3A-3D illustrate additional components for a fork assembly according to some embodiments. The additional components can include a pulled up cable or cylinder 331, a leg 332 for supporting the fork 321, a wheel assembly 333 for a leg support together with an optional one way movement mechanism 334 to allow the leg to be lengthened by pulling and shortened by disabling the one way movement mechanism with pushing on the leg, and a fork extension 305.

Figures 3A, 3B, 3C, 3D:
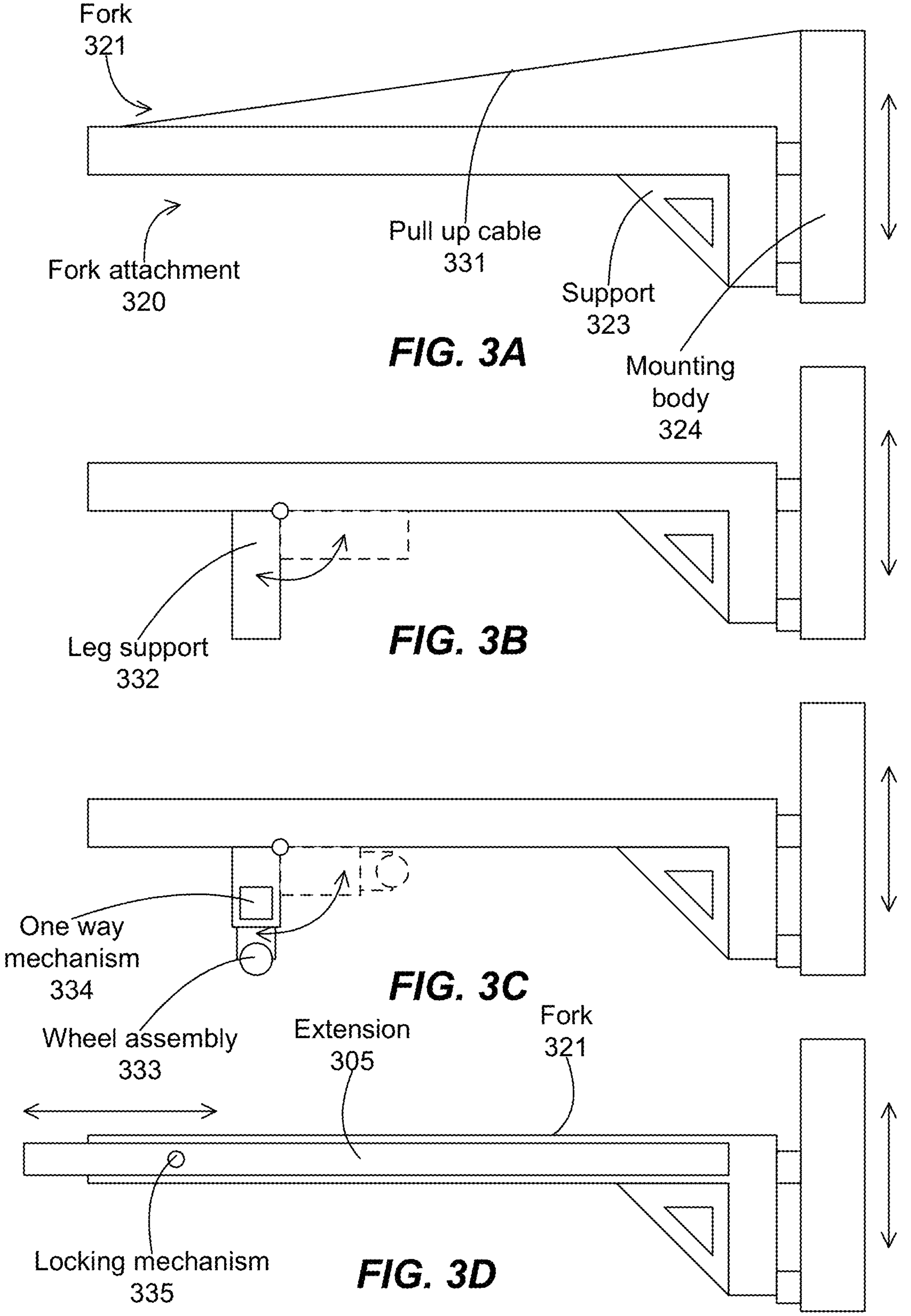
FIGS. 3A-3D illustrate additional components for a fork assembly according to some embodiments.

FIG. 3A shows a fork assembly having a pulled up cable or a cylinder 331. The fork 321 can be long, and there can be a sag portion at the tip of the fork 321 due to the load weight. A cable or a hydraulic cylinder can be used to pull up the tip of the fork. One end of the cable or cylinder can be coupled to the tip of the fork. The other end of the cable or cylinder can be coupled to a high portion, such as to a top portion of a mounting body 324 of the fork attachment assembly 320, or to the carriage or even to the mast of the forklift. A tensioner can be added to increase the tension of the cable.

In some embodiments, the triangle support 323 at the corner of the L shape fork can be lengthened, e.g., toward the tip of the fork 321 in order to provide better support to the fork.

FIG. 3B shows a fork assembly having a leg 332. The leg can be used to support the fork assembly when not being mounted to the forklift, e.g., to raise the fork 321 from the ground. The leg can be mounted to the fork using a hinge, which can allow the leg to be folded along the length of the fork when the fork assembly is being used, e.g., after being mounted to the forklift.

FIG. 3C shows a fork assembly having a fork support that can have a wheel 333 at one end. The fork support can be configured so that the wheel contacts the ground, and thus can offer support for the fork during moving the load. The wheel can be a caster wheel, e.g., an omnidirectional wheel which can be moved in any direction. The wheel portion can be coupled to a body portion through a one way movement mechanism 334, such as a spring or a tooth wheel. The one way mechanism can allow the wheel portion to be extended, so that the wheel always contacts the ground when the fork assembly is lifted up. The one way mechanism can prevent the wheel from being retracted into the body, so that the fork support can offer support to the fork against the load weight. A release mechanism, such as a button, can be used to disable the one way mechanism, to allow the wheel portion to retract. The fork support can be mounted to the fork using a hinge, which can allow the fork support to be folded along the length of the fork, for example, when the fork support is not used.

FIG. 3D shows a fork assembly having a fork extension 305 along the length of the fork 321. For example, the fork 321 can include a hollow tube, such as a hollow square tube, and the fork extension can be disposed in the hollow portion of the hollow fork. The fork extension can be configured to lengthen the length of the fork assembly, for example, to reach loads disposed at the farthest end of a container.

A locking mechanism, such as a pin 334, can be used to secure the fork extension to the fork, in either the extended configuration or in the retract configuration. Further, a limiter can be used to prevent the extension from extending too far out of the fork.

Figure 4A:
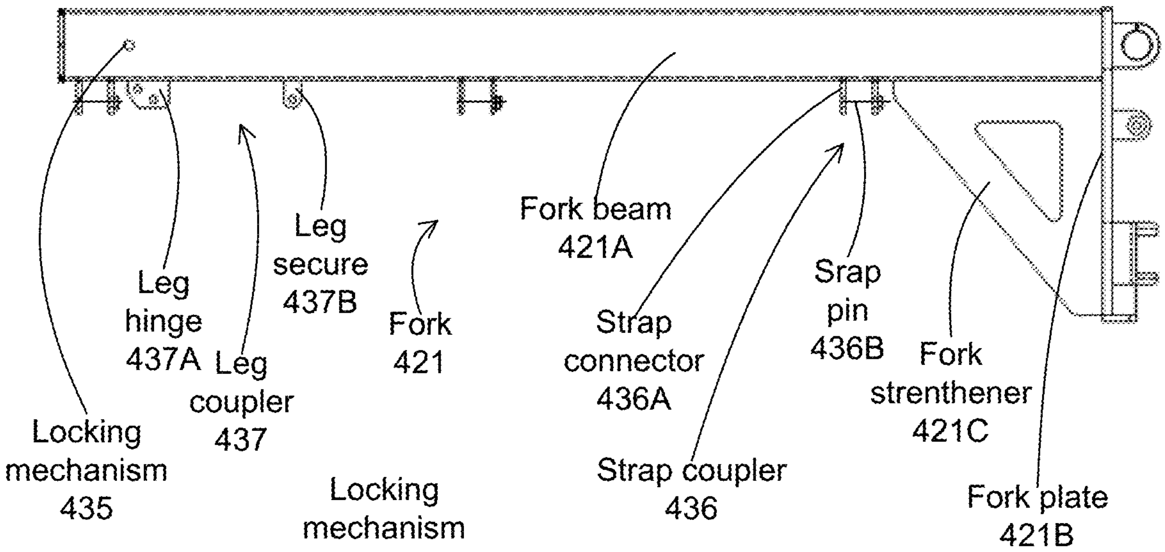
FIGS. 4A-4B illustrate a portion of a fork of a fork assembly according to some embodiments.
Figure 4B:
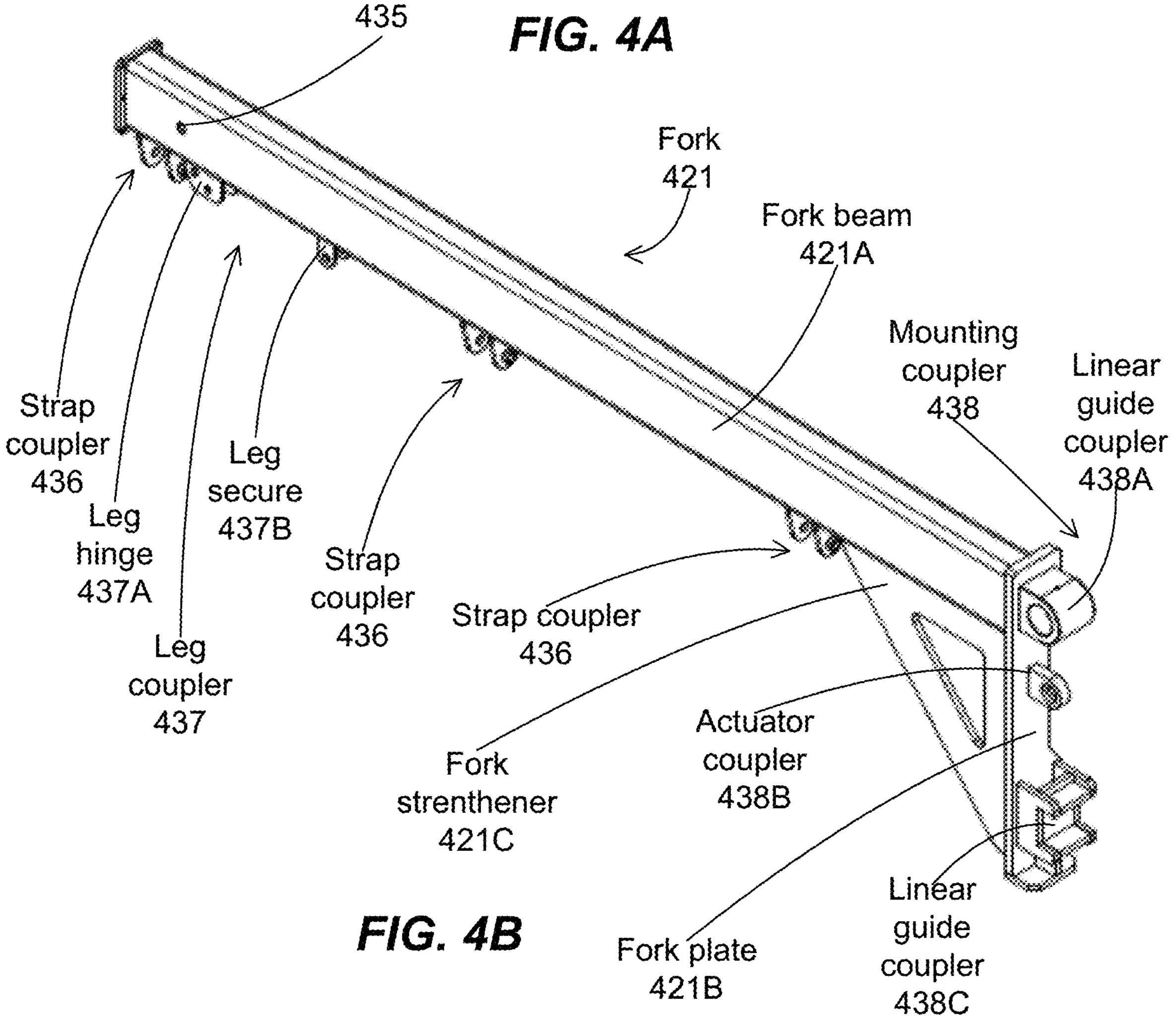

FIGS. 4A-4B illustrate a portion of a fork of a fork assembly according to some embodiments. FIG. 4A shows a side view and FIG. 4B shows a perspective view of a fork ready to be coupled to a fork attachment assembly.

A fork 421 can include a beam or a fork 421A, coupled to a fork shank 421B, which can be a side plate, to form a downward L shape. A triangle plate 421C can be coupled between the fork beam 421A and the fork side plate 421B to provide support to the fork beam, such as to support the fork beam against the weight of the load. The fork beam can include multiple strap couplers 436 for the attachment of load support elements, such as straps running under the load. A coupler 436 can include connectors 436A and a pin 436B passing through holes in the connectors. One end of the strap can be coupled to the coupler 436, for example, by looping through the pin 436B. The strap couplers can be fixedly coupled to the fork beam, such as by welding or by bolting. Alternatively or additionally, the strap couplers can be configured to be slidably coupled to the fork beam, in order to adjust the positions of the straps, such as to avoid the load beams located under the load.

The fork beam can include a leg coupler 437, which includes a hinge 437A for rotatably coupling to a leg, and a leg secure element 437B for securing the leg along the fork beam when the leg is folded for not in use. The length of the leg can be about the same as the fork side plate 421B, so that the leg is unfolded, e.g., rotating around the hinge, the leg can stand on the ground, together with the fork side plate 421B for standing up the fork attachment assembly.

The fork side plate 421B can include a mounting coupler 438 for coupling to a fork mounting body, such as to a linear guide or to an actuator between the fork and the fork mounting body. The coupling elements 438 can include a first linear guide coupler 438A, which can have a round hollow cylinder shape, which can slidably mated to the fork mounting body through a rod. The round hollow cylinder shape 438A can allow the fork to slidably couple to the fork mounting body along the direction of the rod, e.g., the hollow cylinder shape 438A and the rod function as a linear guide to allow the fork to move toward or away from the other fork. The coupling elements 438 can include an actuator coupler 438B, which can be used to coupled to an actuator, such as to a hydraulic or pneumatic cylinder, for moving the fork along the direction of the rod, e.g., toward or away from the other fork. The coupling elements 438 can include a second linear guide coupler 438C, which can have a U shape, and can rest on and mated to a bar coupled to the fork mounting body. The U shape 438C can allow the fork to slidably couple to the fork mounting body along the direction of the bar, e.g., the U shape 438B and the bar function as a linear guide to allow the fork to move toward or away from the other fork. The rod and the bar are configured to be parallel, to serve as a linear guide for guiding the movements of the fork.

The fork beam can include a fork extension, slidably coupled to the interior of the fork beam. Rollers can be included at the fork and at the fork extension to allow smooth movements of the fork extension. In addition, movement limiter can be included to prevent the fork extension from slipping out of the fork. A secure element 435 can be used to secure the fork extension, such as securing the fork extension in an extended configuration or in a retract configuration.

Figure 5A:
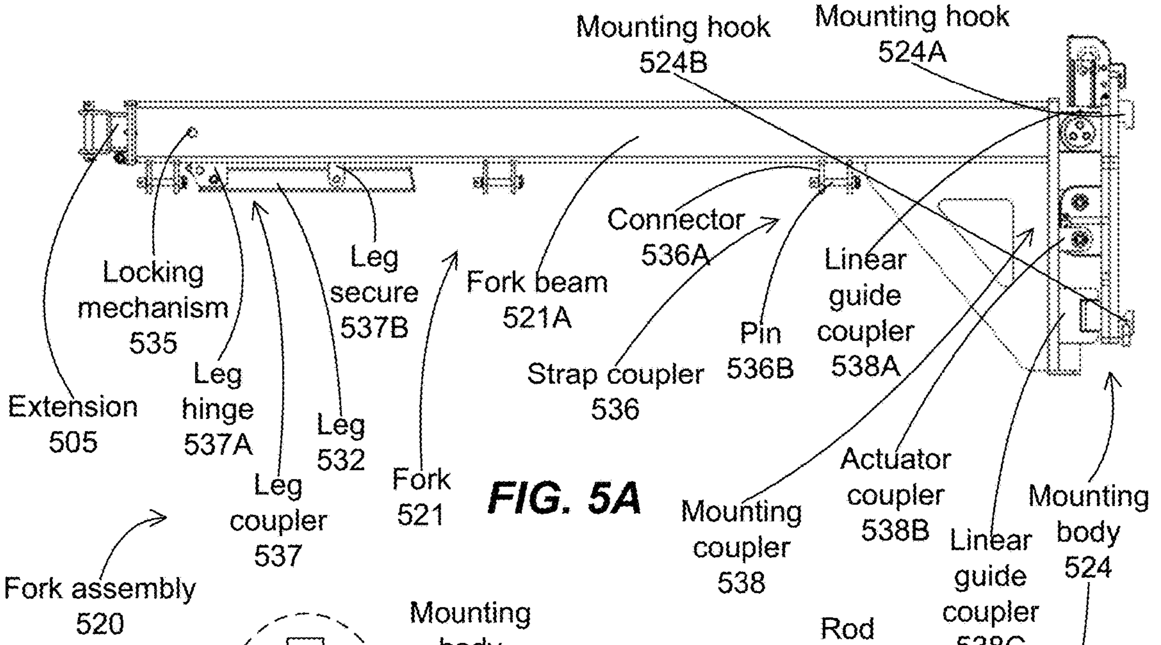
FIGS. 5A-5C illustrate a fork assembly according to some embodiments.
Figure 5C:
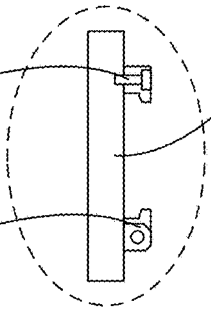
Figure 5B:
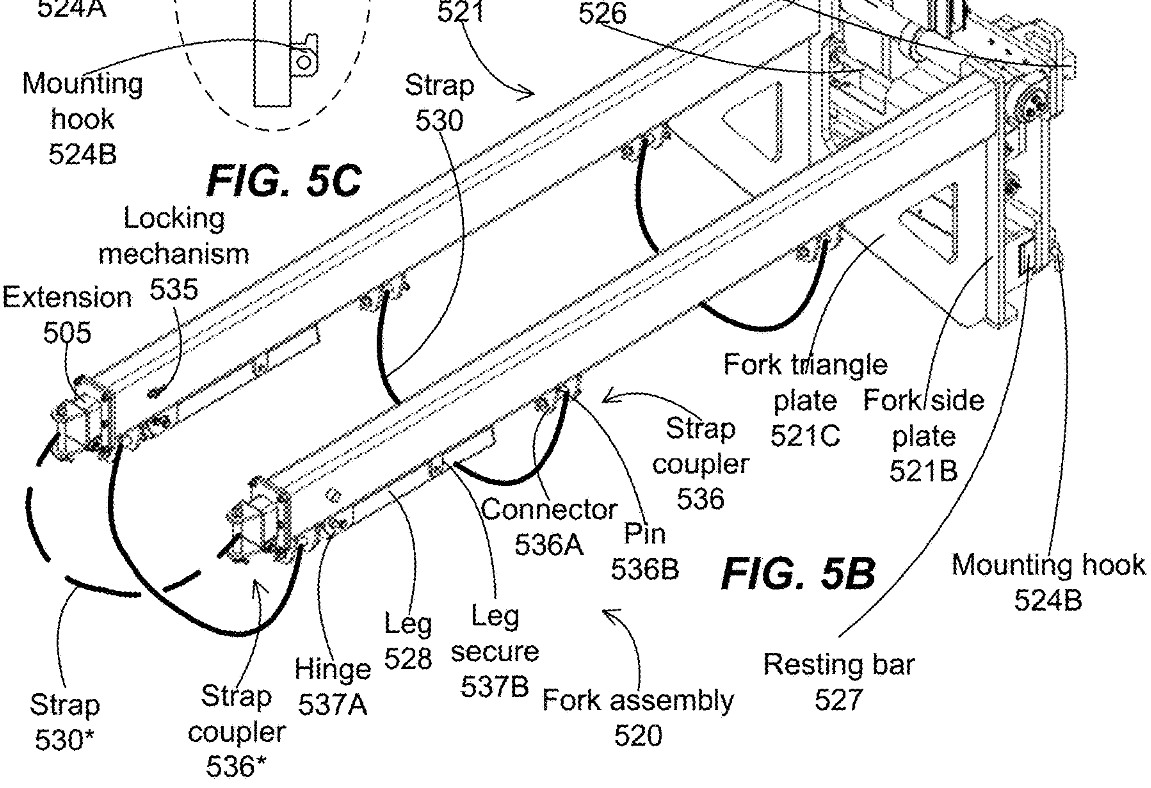

FIGS. 5A-5C illustrate a fork assembly according to some embodiments. FIG. 5A shows a side view and FIG. 5B shows a perspective view of a fork assembly 520. As shown, the fork assembly 520 includes 2 forks 521. Other configurations can be used, such as 1 fork, or more than 2 forks.

A fork 521 can include a beam 521A, coupled to a side plate 521B through a triangle plate 521C. The fork beam can include multiple strap couplers 536 having connectors 536A and pins 536B. Each end of a strap 530 can be coupled to a strap coupler 536, for example, by looping through the pin 536B under the load. The straps 530 can be used to lift a load by positioning the forks in both sides of the load and the straps under the load.

The fork beam can include a leg coupler 537, which includes a hinge 537A for rotatably coupling to a leg 528, and a leg secure element 537B for securing the leg along the fork beam when the leg is not in use.

The fork 521 can include a mounting coupler 538 for coupling the fork 521 to a fork mounting body 524 to form a fork attachment assembly 520. The mounting body 524 in FIG. 6C is configured to couple the fork assembly 520 to a forklift, such as to a carriage of the forklift. For example, the mounting body 524 can have two mounting hooks 524A and 524B, which are configured to be attached to the carriage. The mounting coupler 538 can include a first linear guide coupler 538A, which can have a round hollow cylinder shape, which can slidably mated to the fork mounting body 524 through a rod 525 functioned as a linear guide for guiding the linear guide coupler 538A. The round linear guide 538A can allow the fork to slidably couple to the fork mounting body 524 along the direction of the rod 525, e.g., the fork can move toward or away from the other fork. The mounting coupler 538 can include an actuator coupler 538B, which can be used to coupled to an actuator, such as a hydraulic or pneumatic cylinder 526, for moving the fork along the direction of the rod 525, e.g., toward or away from the other fork. The mounting coupler 538 can include a second linear guide coupler 538C, which can have a U shape, and can rest on and mated to a linear bar 527 coupled to the fork mounting body 524. The U shape 538C can allow the fork to slidably couple to the fork mounting body along the direction of the bar, e.g., the U shape 538B and the bar function as a linear guide to allow the fork to move toward or away from the other fork. The rod and the bar are configured to be parallel, to serve as a double linear guide for guiding the movements of the fork.

The fork beam can include a fork extension 505, slidably coupled to the interior of the fork beam. A secure element, e.g., a locking mechanism 535 can be used to secure the fork extension, such as securing the fork extension in an extended configuration or in a retract configuration. Additional strap couplers 536* can be coupled to the end of the extension, which can be used to secure a strap 530*, for contacting a load for pulling when the forklift is retracted.

Figure 6A:
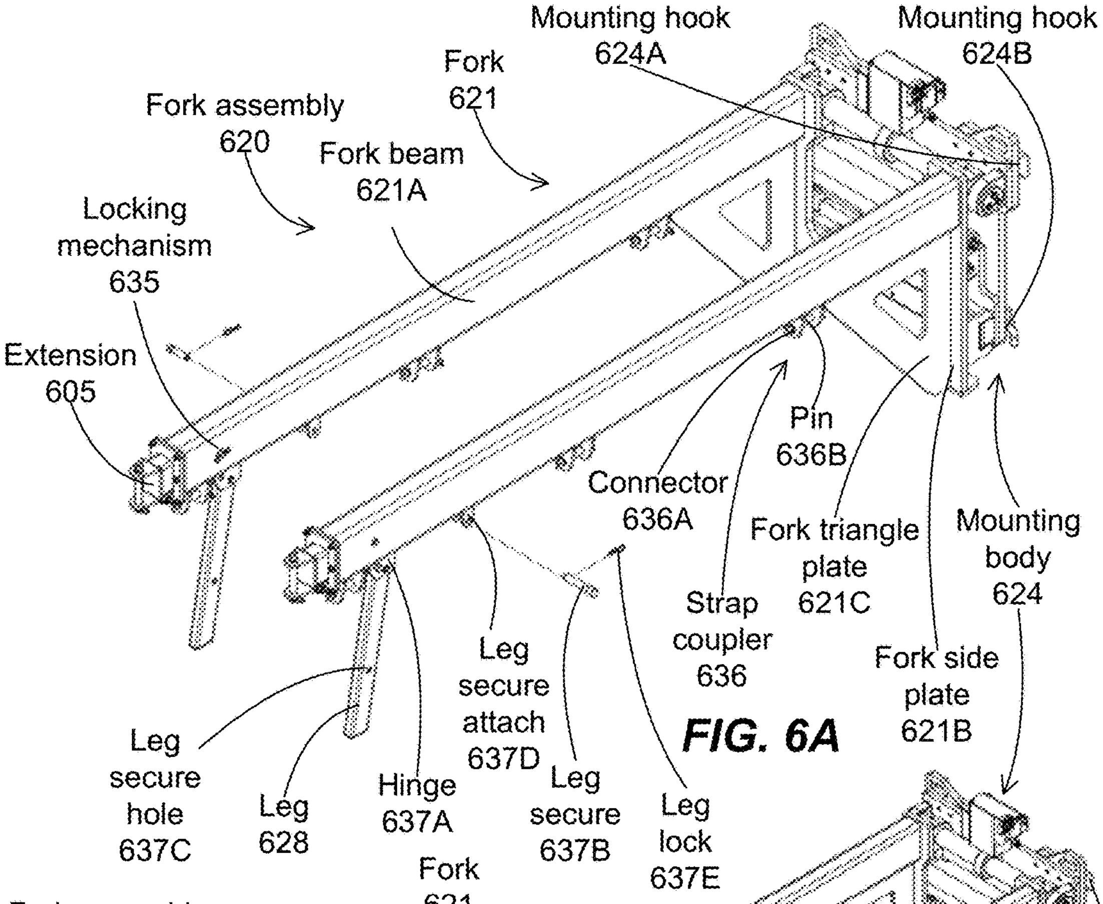
FIGS. 6A-6B illustrate configurations for a fork assembly according to some embodiments.
Figure 6B:
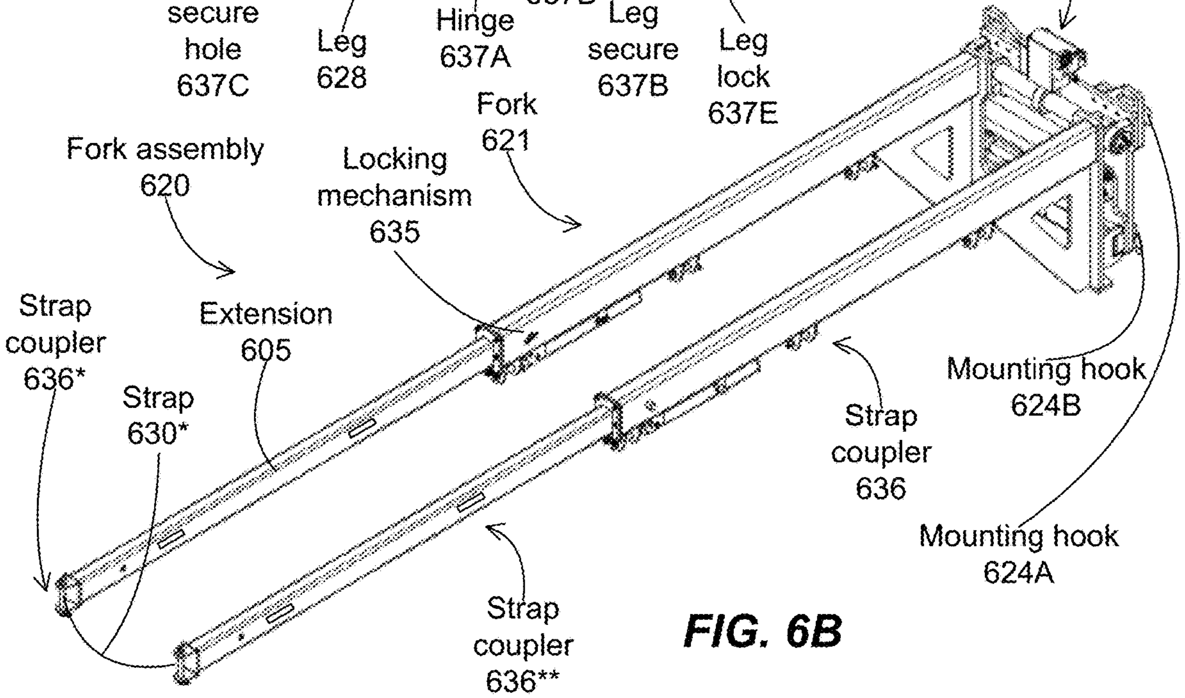

FIGS. 6A-6B illustrate configurations for a fork assembly according to some embodiments. FIG. 6A shows a leg support configuration and FIG. 6B shows an extension configuration of a fork assembly 620.

In FIG. 6A, a fork assembly 620 can include a fork 621 coupled to a mounting body 624, with the mounting body 624 configured have mounting attachments 624A and 624B for coupling to a forklift, such as to a carriage of a forklift. The fork 621 can include a beam 621A coupled to a side plate 621B through a triangle plate 621C. The fork beam can include multiple strap couplers 636 having connectors 636A and pins 636B. The ends of a strap can be coupled to the strap coupler 636, for example, by looping through the pins 636B and passing under the load.

The side plate 621B can be coupled to a fork mounting body 624 through linear guide couplers, which allows the forks to move toward or away from each other. The fork beam can include a fork extension 605, slidably coupled to the interior of the fork beam. A locking mechanism, such as a secure element 635, can be used to secure the fork extension to the fork, such as securing the fork extension in an extended configuration or in a retract configuration.

The fork beam can include a leg coupler 637, which includes a hinge 637A for rotatably coupling to a leg 628, and a leg secure element 637B for securing the leg along the fork beam when the leg is not in use. The leg 628 can include a hole 637C, for mating with a leg secure attachment 637D, for example, by the leg secure element 637B. A lock pin 637E can be used to secure the leg secure element 637B. As shown, the fork assembly 620 is at a resting configuration, with the legs 628 extended to support the ends of the forks. The mounting body 624 supports the opposite ends of the forks.

In FIG. 6B, the fork assembly 620 is shown with the fork extension 605 in an extended configuration, e.g., the fork extension is extended from the fork beam. A secure element, or a locking mechanism 635, can be used to secure the fork extension, such as securing the fork extension in an extended configuration or in a retract configuration.

At the end of the fork extension 605, there can be a strap coupler 636* for connecting to an end load support element, such as a strap 630*. The strap 630* can be connected after a load is placed between the two forks. Thus, when the forklift moves backward, the strap 630* can pull on the load, dragging the load in the direction of the forklift movement. Additional straps can be used to connect to strap coupler 636, for lifting the load.

Figure 7:
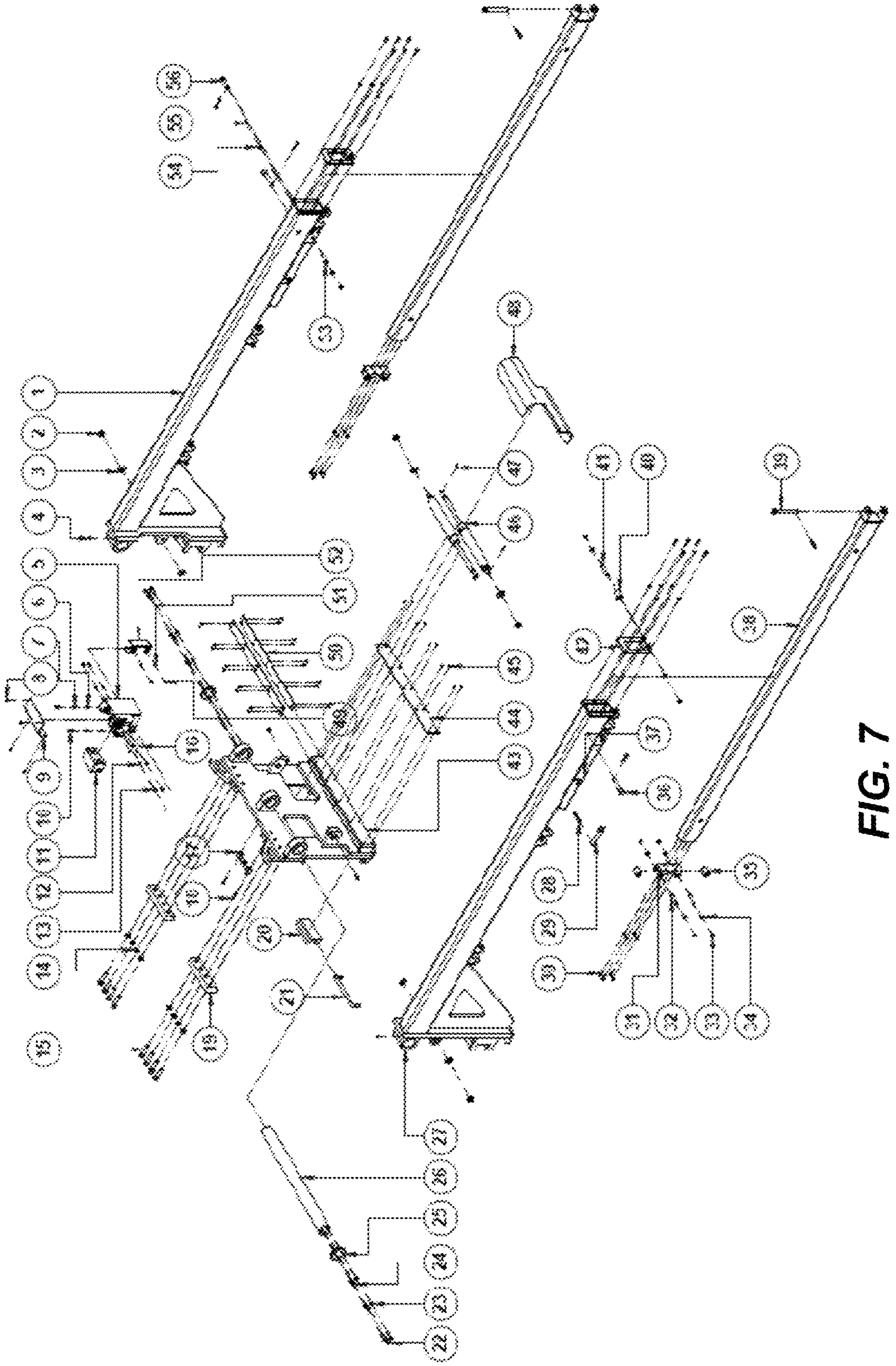
FIG. 7 illustrates an exploded view of a fork assembly according to some embodiments.

FIG. 7 illustrates an exploded view of a fork assembly according to some embodiments. A fork beam 1 has a rectangular hollow tube configuration, with a fork extension 38 freely slidable within the hollow portion. At the ends of the fork beam, there are welded blocking portions. In the hollow portion, there are welded connectors and sliders. The fork beam also includes a triangular support and multiple couplers for connecting to straps. The fork extension 38 has rectangular hollow tube configuration, which is slightly smaller than the inner dimension of the fork beam. At the inner end of the fork extension, there is a welded an end portion to prevent the fork extension from falling out of the fork beam. At the outer end of the fork extension, there is a U shape coupler for connecting to a strap.

A fork assembly body 43 is in the form of a plate with one side of the plate having welded couplers for rod 26 for coupling with the fork beam side support 27. The plate also has welded attachments for hydraulic cylinders 46, and guiding portions for guiding the fork beams when moving toward or away from each other. At the opposite side of the plate, there is a top hook portion 19 and a bottom hook portion 20 for coupling to the carriage of the forklift. The top and bottom hook portions 19 and 20 have mating portions in the carriage of the forklift, functioned to secure the fork assembly to the carriage. The top hook is assembled by bolts and the bottom hook by locking rod 21.

Coupler rod 26 has a cylindrical shape, with lock rings 25 at two ends. The rod 26 functions to couple the fork beam 1 with the fork assembly 43, together with acting as a linear guide for the movements of the two fork beams when moving toward or away from each other.

Pins 29 function as connector for strap to support the bottom of the load. Pins 29 have cylindrical shape, with one flattened end for hand turning, and the other end having screw configuration for bolting to the coupler of the fork beam. Secure pins can be used to prevent loosing the pins 29.

Inner support 31 is attached to the inner end of the fork extension, and having supports for roller attachment for rolling the fork extension on the inner wall of the fork beam.

Outer fork end support 42 is attached to the outer end of the fork beam, having supports for roller installation for rolling fork extension. The outer end fork support can be used to prevent complete removal of the fork extension from the fork beam.

Figure 8B:
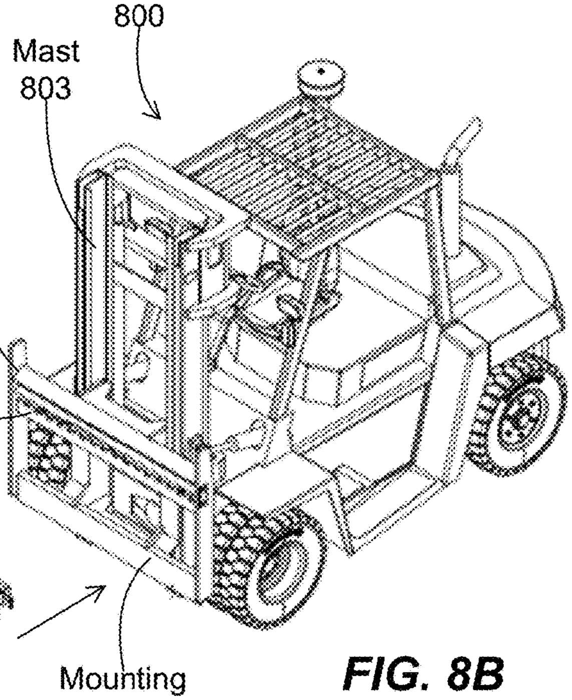
FIGS. 8A-8C illustrate a process for installing the fork assembly to a forklift according to some embodiments.
Figure 8A:
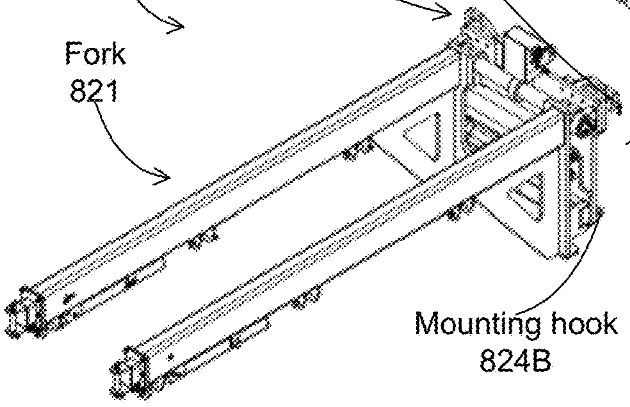
Figure 8C:
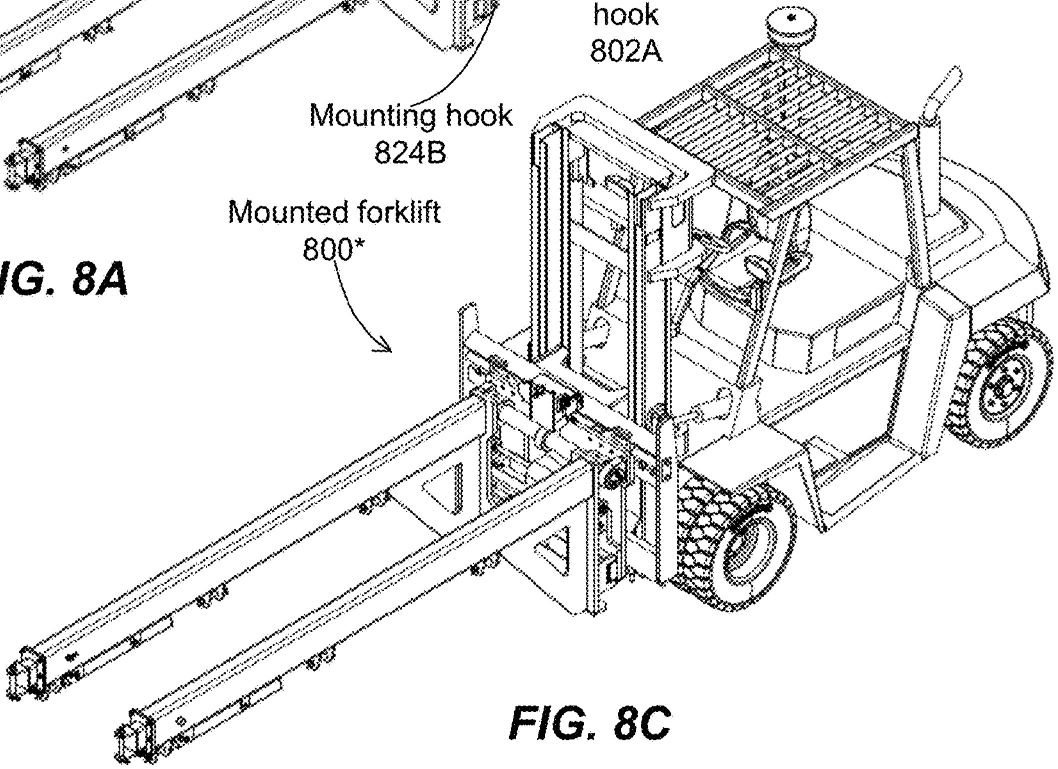

FIGS. 8A-8C illustrate a process for installing the fork assembly to a forklift according to some embodiments. FIG. 8A shows a fork assembly 820 having a fork 821 coupled to a mounting body 824. The fork assembly 820 is positioned on the ground, with the legs 828 extended for putting the mounting body parallel to the carriage. The mounting body can include mounting hooks 824A and 824B, which are configured to mount on corresponded mounting receptacles 802A and 802B on the forklift, such as on the carriage 802 of the forklift, respectively. FIG. 8B shows a forklift 800 having the forks removed. The forklift can be driven to the fork assembly, so that the mounting body is facing and contacting the carriage. The fork assembly can then be mounted to the carriage 802 of the forklift, such as using the mounting hooks on the mounting body on mated receptacles on the carriage. Alternatively, the mounting hooks can be unbolted from the mounting body, and then rebolted to secure the fork assembly to the forklift. FIG. 8C shows the forklift 800 having the fork assembly 820 installed. After being mounted, the legs 828 can be folded in the storage position, and secured with locking pins.

Figure 9A:
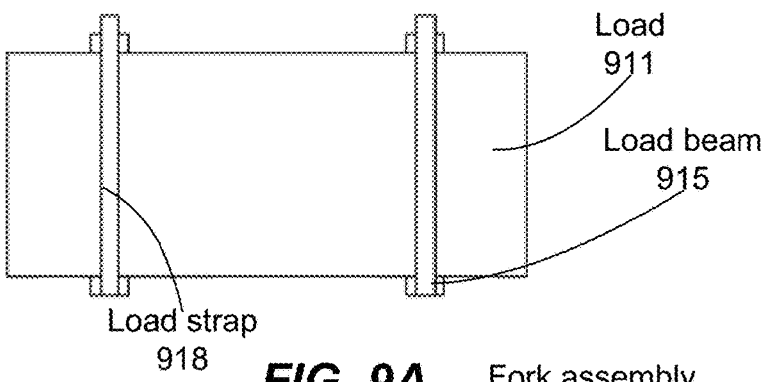
FIG. 9A-9C illustrate a process for transporting a load according to some embodiments.
Figure 9B:
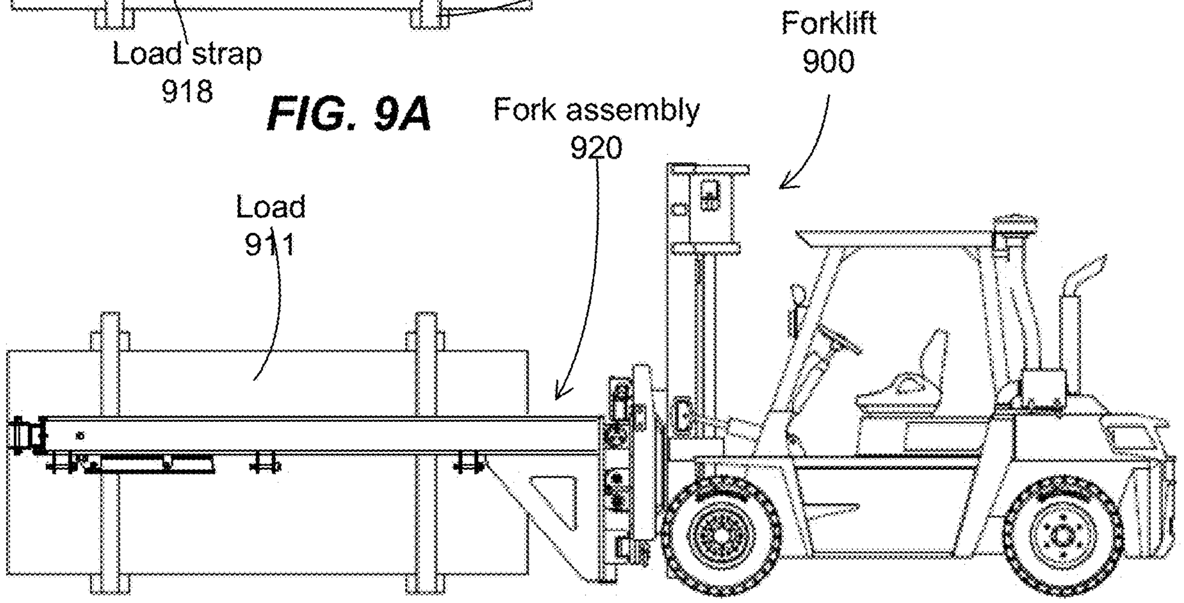
Figure 9C:
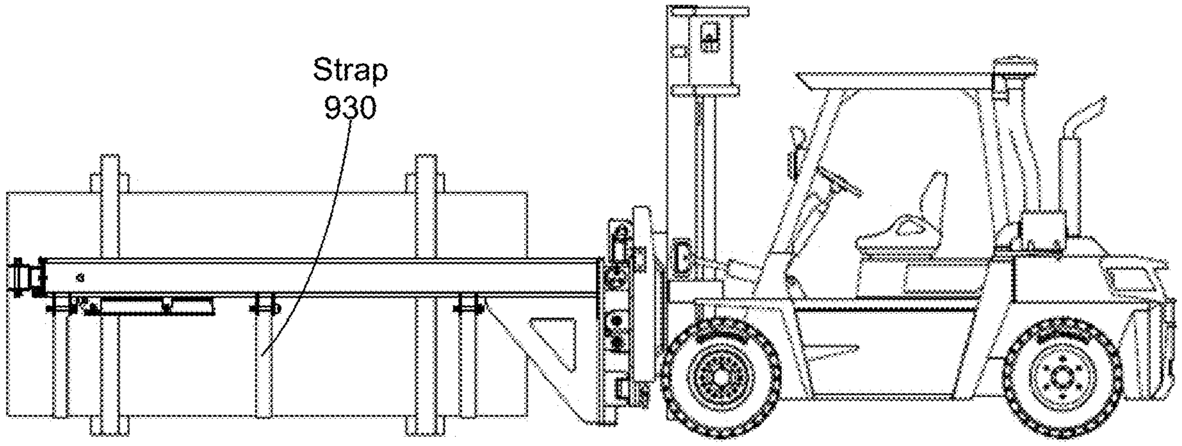

FIG. 9A-9C illustrate a process for transporting a load according to some embodiments. FIG. 9A shows a load 911 having outer straps 918 for securing the load. The load 911 can have load beams 915 for raising the load above the ground.

In FIG. 9B, a forklift 900 approaches the load and placing the load between the two forks. The distance between the forks can be adjusted to be slightly larger than the dimension of the load.

In FIG. 9C, straps 930 are used to secure the load to the forks. The strap can be coupled to the couplers on the forks, and passing under the load for supporting the load from the bottom. Alternatively, or additionally, the straps can be slidably coupled to the forks, such as forming a loop around the fork beam. Thus, the straps can be adjusted to balance the load and to avoid the load beams 915. After securing the load, the fork assembly can be lifted up, for example, by activating actuators for lifting the carriage in the forklift. After the load is off the ground, the forklift can transport the load to the destination.

Figure 10:
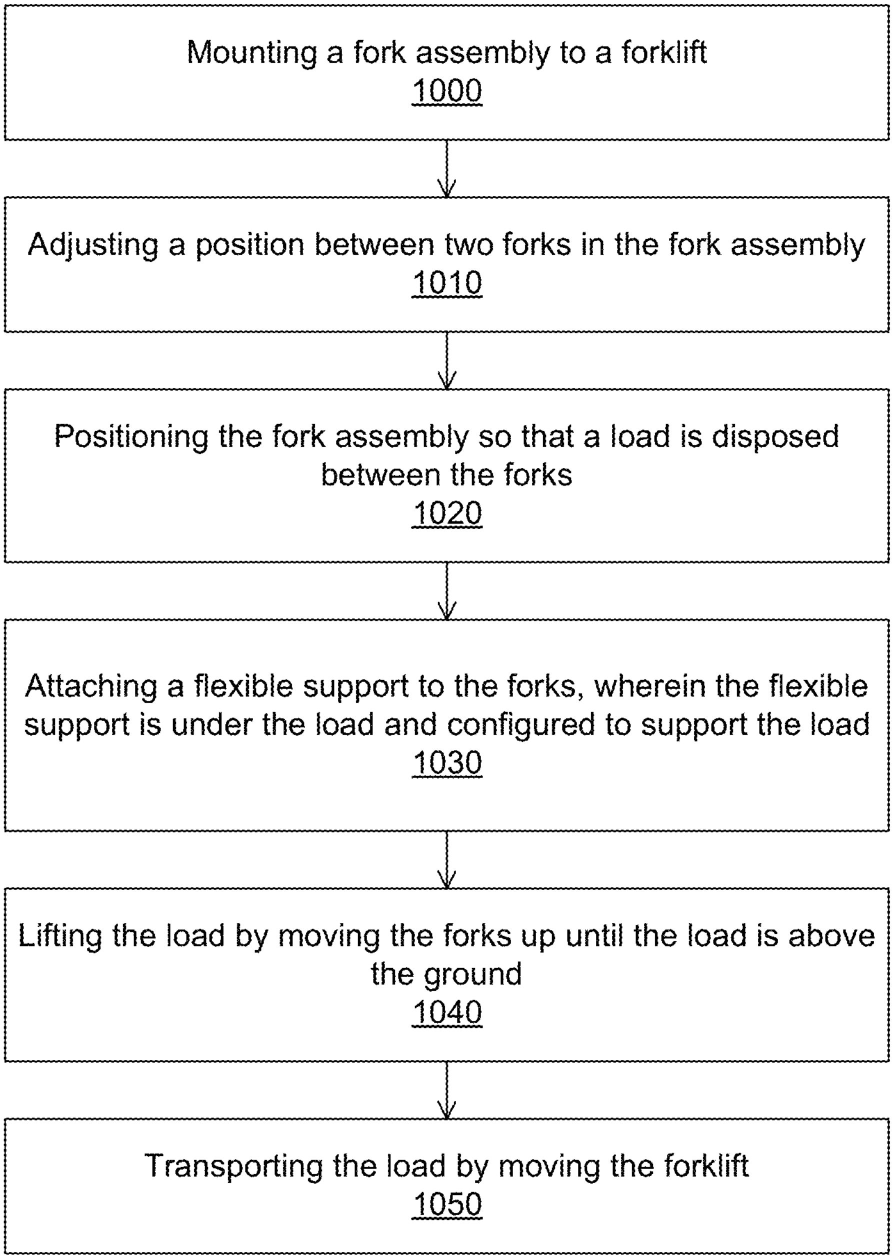
FIG. 10 illustrates a flow chart for transporting a load according to some embodiments.

FIG. 10 illustrates a flow chart for transporting a load according to some embodiments. Operation 1000 mounts a fork assembly to a forklift. Operation 1010 adjusts a position between two forks in the fork assembly, for example, to accommodate the load dimensions. Operation 1020 positions the fork assembly so that the load is disposed between the forks. For example, the forklift can be driven toward the load and maneuvered to guide the forks around the load.

Operation 1030 attaches a flexible support to the forks. The flexible support can be a strap, and going under the load and configured to support the load. There can be multiple supports. Operation 1040 lifts the load by moving the forks up until the load is above the ground. Operation 1050 transports the load by moving the forklift.

Figure 11A:
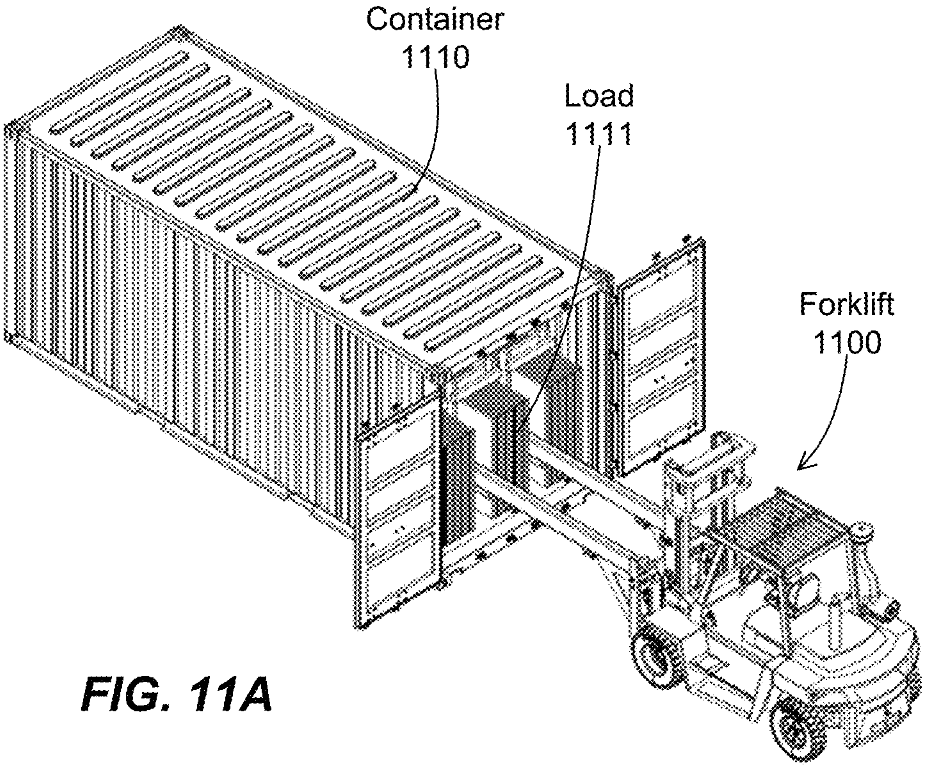
FIGS. 11A-11B illustrate a process for removing a load from a container according to some embodiments.
Figure 11B:
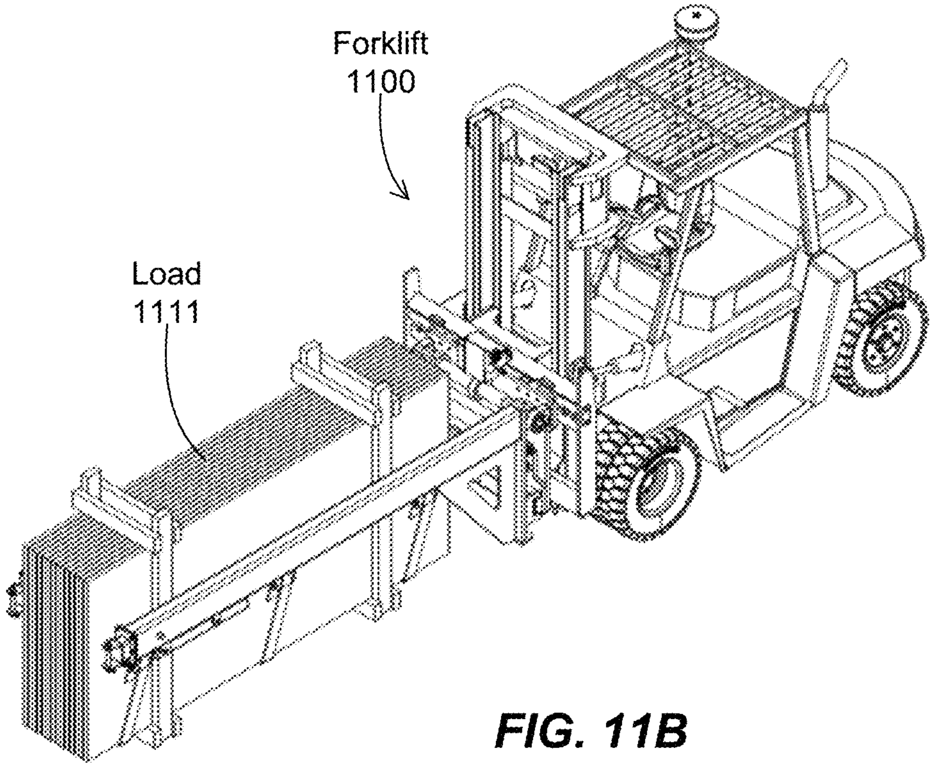

FIGS. 11A-11B illustrate a process for removing a load from a container according to some embodiments. In FIG. 11A, a forklift 1100 can approach and enter the container 1110 with the forks disposed on both sides of the load 1111 to be transported. Straps can then be secured to the forks under the load. In FIG. 11B, the forklift can lift the load and then transport the load to a destination.

Figure 12A:
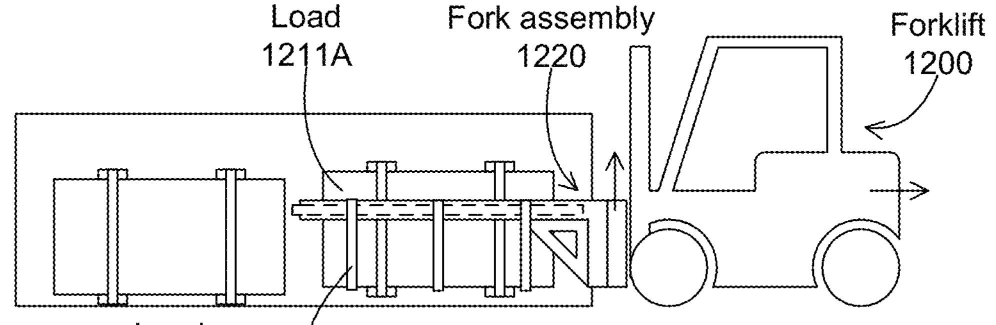
FIGS. 12A-12E illustrate a process for removing multiple loads from a container according to some embodiments.

FIGS. 12A-12E illustrate a process for removing multiple loads from a container according to some embodiments. In FIG. 12A, a forklift 1200 can approach the container 1210 with the forks of the fork assembly 1220 disposed on both sides of an outer load 1211A to be transported. Straps 1230 can be secured to the forks under the load. The forklift can lift the load and transport the load to a destination.

Figure 12B:
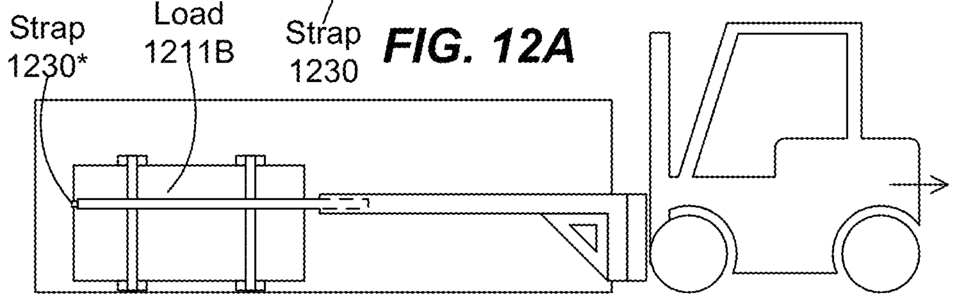
Figure 12C:
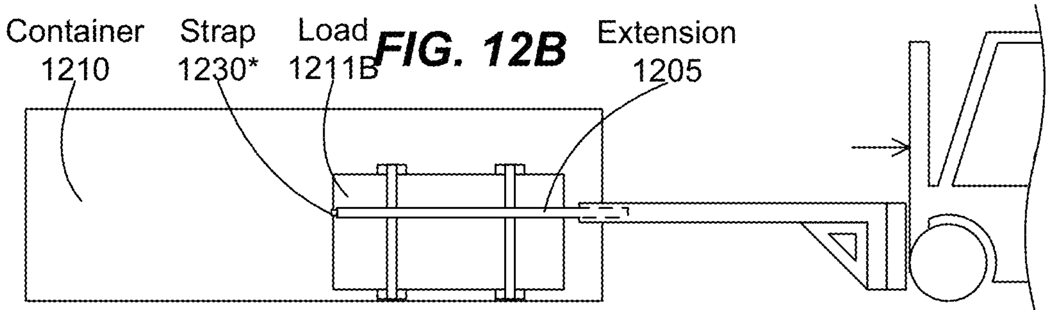
Figure 12D:
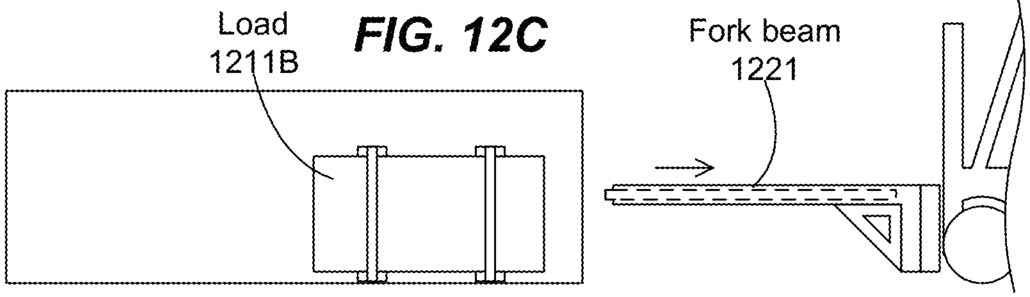

In FIG. 12B, the forks 1220 can have the fork extensions 1205 extended to reach the inner load 1211B. Strap 1230* can be attached to the hook ends of the fork extensions and covered the load 1211B at the far end of the load 1211B. In FIG. 12C, the forklift moves backward, pulling the load 1211B toward the opening on the container. The strap 1230* is then removed. In FIG. 12D, the fork extensions 1205 are retracted to the fork beams 1221.

Figure 12E:
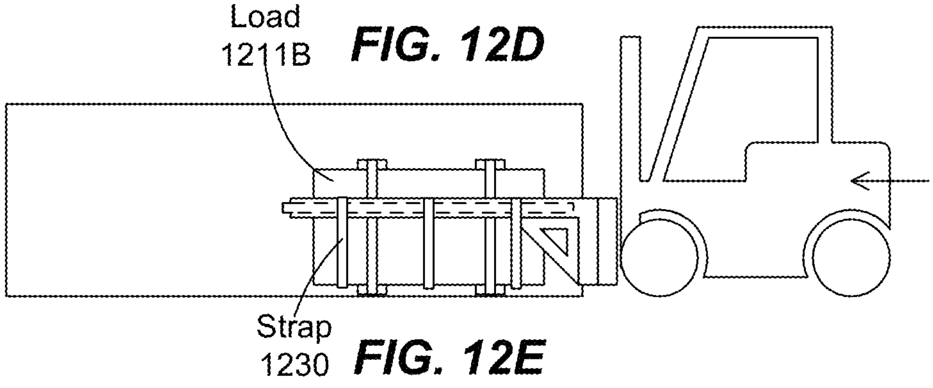

In FIG. 12E, the forklift moves forward, with the forks 1221 disposed on both sides of the load 1211B, and the fork extensions retracted in the forks. Straps 1230 can be secured to the forks under the load. The forklift can lift the load 1211B and transport the load to a destination.

FIG. 13 illustrates a flow chart for transporting a load according to some embodiments. Operation 1300 extends each fork of two forks of a forklift by pulling fork extensions from the forks. Operation 1310 positions the fork extension around a load in the container, with the second load disposed farther than a reach of the two forks. Operation 1320 attaches a side support to the fork extensions, with the side support disposed around a side of the load and configured to couple the load to the forklift when the forklift is pulling on the load. Operation 1330 pulls the load to within the reach of the two forks. Operation 1340 attaches a bottom support to the two forks, wherein the bottom support is disposed under a load and configured to support the load from a bottom of the load. Operation 1350 lifts and transports the load out of the container.

Figure 14:
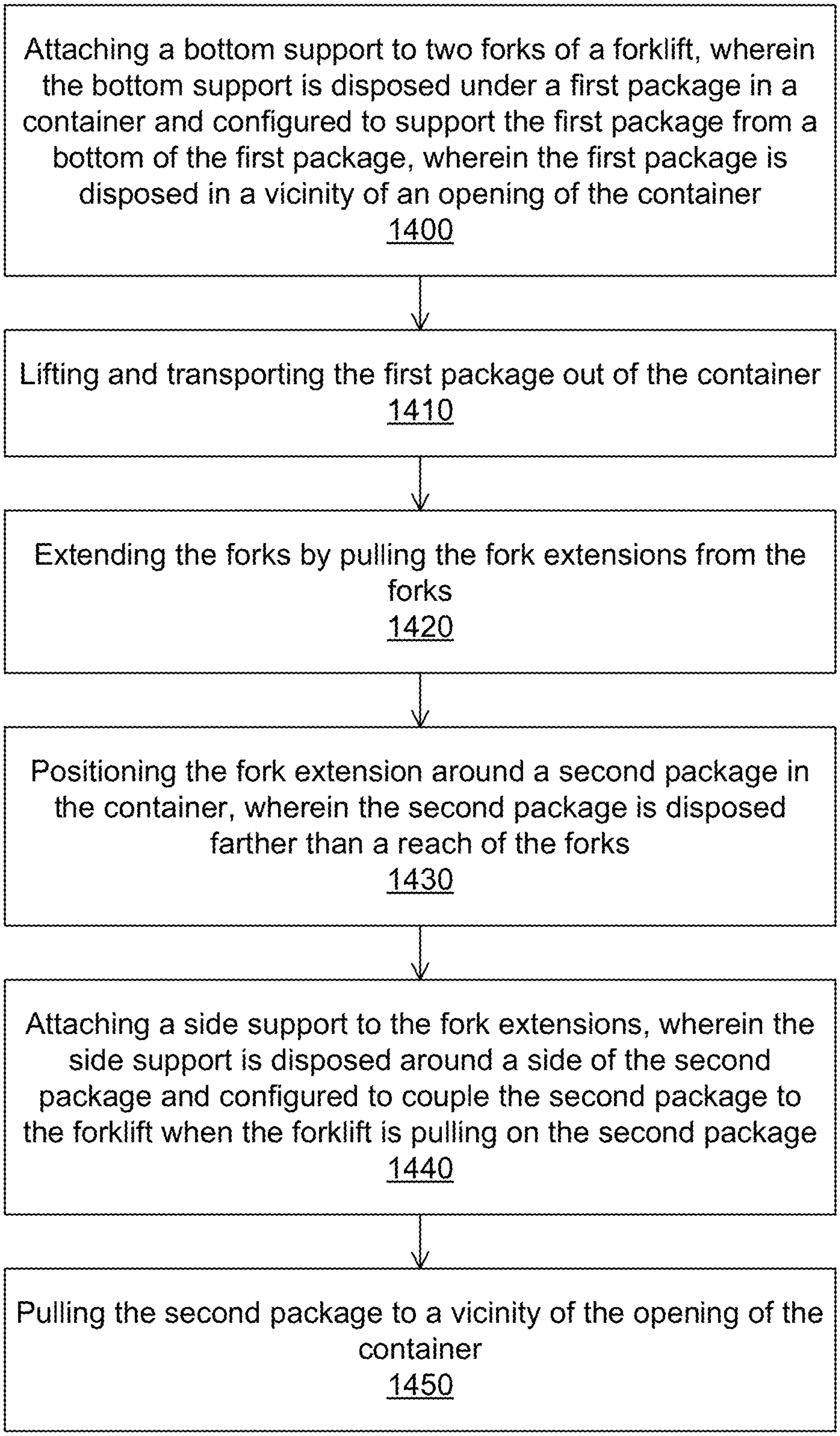
FIG. 14 illustrates a flow chart for transporting a load according to some embodiments.

FIG. 14 illustrates a flow chart for transporting a load according to some embodiments. Operation 1400 attaches a bottom support to two forks of a forklift, wherein the bottom support is disposed under a first load in a container and configured to support the first load from a bottom of the first load, wherein the first load is disposed in a vicinity of an opening of the container. Operation 1410 lifts and transports the first load out of the container. Operation 1420 extends the forks by pulling the fork extensions from the forks. Operation 1430 positions the fork extension around a second load in the container, wherein the second load is disposed farther than a reach of the forks. Operation 1440 attaches a side support to the fork extensions, wherein the side support is disposed around a side of the second load and configured to couple the second load to the forklift when the forklift is pulling on the second load. Operation 1450 pulls the second load to a vicinity of the opening of the container.

Alternate Fork Assembly

In some embodiments, the present invention discloses another configuration for a fork assembly, which can lift a load from a side without a need for the operator to leave the forklift vehicle. For example, the fork assembly can provide rotatable blades for side lifting of the load, with the blades configured to swing from a first position parallel to the fork assembly to a second position under the load for lifting the load. Using the blade swinging action, the fork assembly can be able to lift loads that are positioned close to each other, with only a small gap in between, such as in space-premium location such as in a container used for shipping the load.

In some embodiments, the swinging action of the blades is performed remotely, e.g., from an operator operating the forklift vehicle. For example, the operator can move the fork assembly downward and upward, which can toggle the blades between a lifting position, e.g., positioned partially or totally under the load for lifting the load, and a non-lifting position, e.g., positioned outside of the load, such as parallel to the load or pointing outward away from the load.

In some embodiments, the strap fork assembly described above and the rotatable blade fork assembly can share common elements and features, and thus can be omitted or only briefly mentioned in the description. However, all common features in one fork assembly can be used in another fork assembly.

Figure 15A:
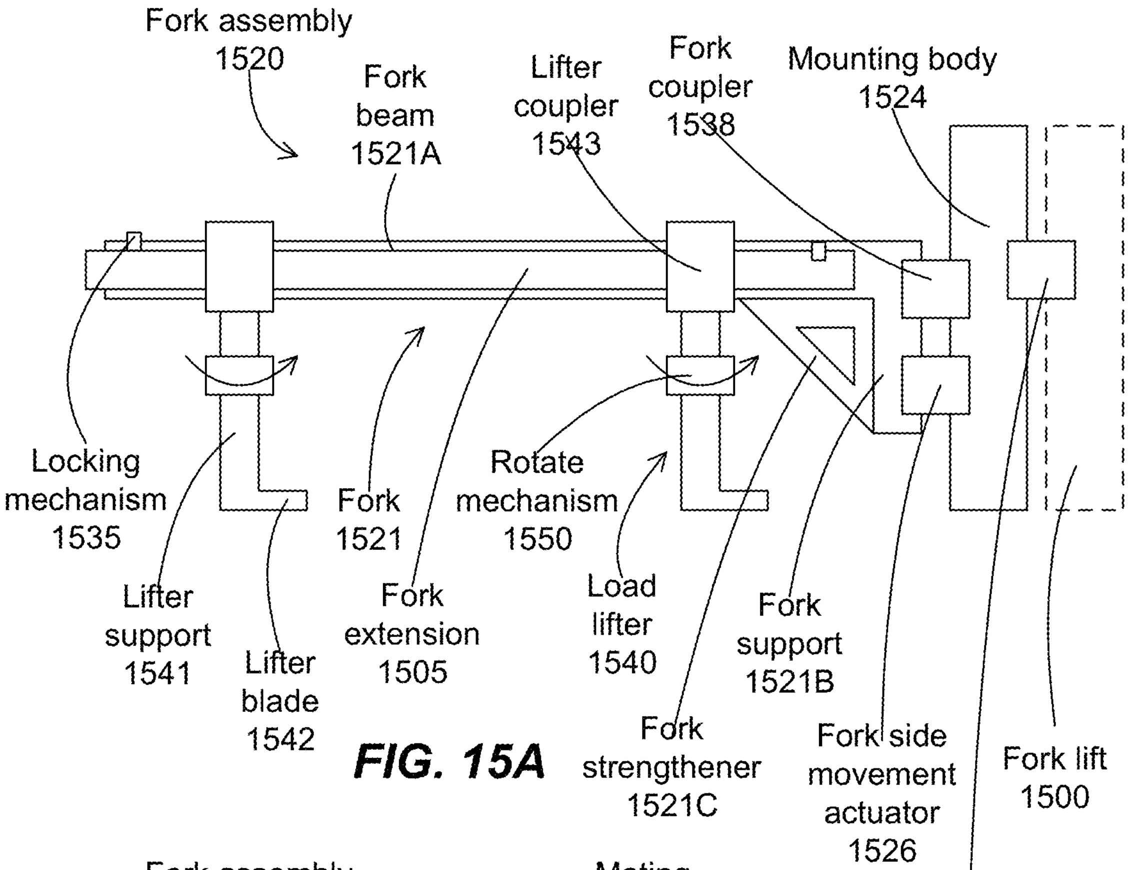
FIGS. 15A-15B illustrate schematic configurations of a fork assembly according to some embodiments.
Figure 15B:
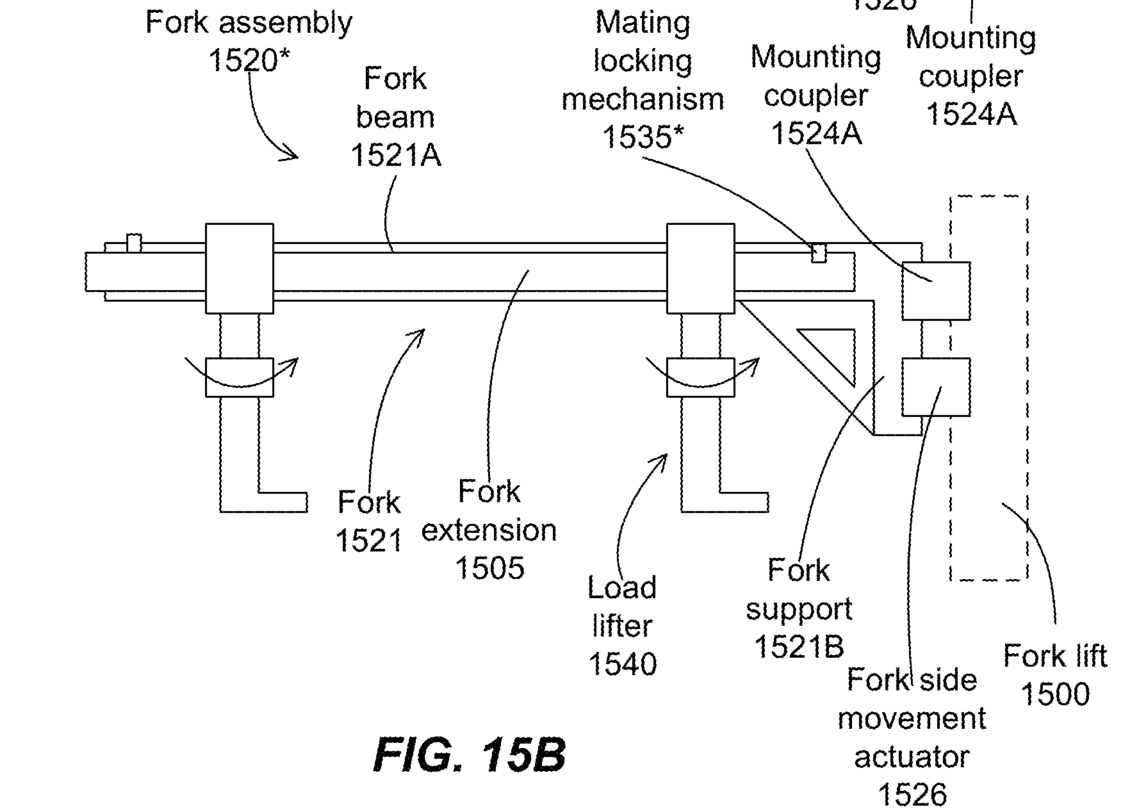

FIGS. 15A-15B illustrate schematic configurations of a fork assembly according to some embodiments. In FIG. 15A, a fork assembly 1520 can include one or more forks 1521, which are coupled to a mounting body 1524. For example, two forks 1521 can be parallelly coupled to the mounting body, with optional actuators 1526 for adjusting a distance between the two forks.

Each fork 1521 can couple to the mounting body 1524 through a fork coupler 1538. An optional actuator 1526 can couple the fork 1521 to the mounting body 1524, for example, to move the fork 1521 relative to the mounting body, such as to adjust a distance between two forks 1521 coupled to the mounting body. The mounting body can include a removable mounting coupler 1524A, which is configured to mount the mounting body to a forklift vehicle 1500, such as to a carriage of the forklift vehicle. With the carriage movable in up/down, sideway, and tilted direction, the fork assembly can also be moved to position the forks at appropriate locations for lifting a load.

The fork assembly can be configured to be used with different types of forklift vehicles, and also to other lifting devices, such as by using different mounting couplers 1524A, to provide a carrying capacity for lifting, transporting, and depositing loads that outside the carrying capacity of forklift vehicles not equipped with the present fork assembly.

A fork 1521 can include a fork beam 1521A, which extends from the mounting body, e.g., extending from the forklift vehicle. A fork support 1521B and a fork strengthener 1521C can be coupled to the fork beam 1521A, to provide strength to the fork beam when the fork beam is coupled with the mounting body.

A fork extension 1505 can be slidably coupled to the fork beam 1521A, such as to slide within the fork beam. For example, the fork beam can be a hollow tube, such as a hollow square tube or a hollow round tube. The fork extension can have a matching dimension, such as a square tube or bar for a hollow square tube fork, or a round tube or bar for a hollow round tube fork, with the outer dimension of the fork extension matching the inner dimension of the fork beam. Thus, the fork extension can slide within the fork beam, and can extend the length of the fork beam. A locking mechanism 1535, e.g., a stop element, can be provided on an outer end of the fork beam, and a mated locking mechanism 1535* can be provided on an inner end of the fork extension, for example, to prevent the fork extension from falling out of the fork beam when extending too far away from the fork beam.

One or more load lifters 1540 can be coupled to the fork beam 1521A, such as fixed coupled, slidably coupled, or removably coupled. For example, a load lifter 1540 can be coupled to the form beam through a lifter coupler 1543, which can be welded to the fork beam, or which can be configured for continuously or discretely sliding along the fork beam, or which can be secured to the fork beam at discrete locations.

The load lifter 1540 can include a lifter support 1541, such as a tube or a bar extending downward from the fork beam. The load lifter 1540 can include a blade 1542, which can be an integral part of the lifter support 1541 or which can be coupled to the lifter support 1541, for positioning under a load for lifting the load. The blade can be a tube, a bar, or a flat plate configured to slide under the load, such as to swing from a position outside the load to a position under the load.

A rotating mechanism 1550 can be coupled to the fork assembly, such as coupled to the fork beam 1521A, coupled to the load lifter 1540, coupled between the fork beam and the load lifter, coupled to the lifter support 1541, or coupled between the lifter support 1541 and the blade 1542. The rotate mechanism 1550 is configured to rotate the blade 1542 between a position outside the load and a position under the load. As shown, the rotate mechanism is coupled between two portions of the lifter support 1541, which can allow the bottom portion, including the blade, to rotate.

The rotate mechanism can be manually operated or can be automatically operated, e.g., remotely operated by an operator driving the forklift vehicle. For example, the rotate mechanism can be actuated, e.g., performing a rotation, by the operator moving the fork assembly downward until contacting a surface, and the moving the fork assembly upward. The rotate mechanism can be a toggling mechanism, e.g., by performing a same actuating operation of moving the fork assembly downward and upward, the rotate mechanism can rotate the blade from an under-the-load position to an outside-the-load position, and from an outside-the-load position to an under-the-load position.

The shapes and sizes of the components of the fork assembly 1520, such as the fork beam 1521A, the fork extension 1505, the lifter support 1541, and the blade 1542, are schematically shown. In practice, different shapes and sizes can be used to accommodate the requirements of engineering and applications. For example, a width dimension of the fork beam 1521A, e.g., the dimension parallel to the ground surface, can be as small as possible, in order to place the fork beam between two loads positioned next to each other. Or a thickness dimension of the blade 1542, e.g., the dimension of the blade perpendicular to the ground surface, can be as thin as possible while providing adequate strength for lifting, in order to place the blade in a gap between a bottom surface of the load and the ground surface.

In FIG. 15B, a fork assembly 1520 can include one 1521, which is configured to be coupled to the forklift vehicle. For example, a fork 1521 can include a mounting coupler 1524A configured to couple the fork to the forklift vehicle, such as to the carriage of the forklift vehicle. Two or more fork assemblies can be coupled to the carriage, with optional actuators 1526 coupled between the fork assemblies and the carriage for changing a distance between the fork assemblies. Each fork 1521 can include a fork extension with locking mechanisms, one or more load lifter 1540 with blade and rotate mechanism.

Operation of a Fork Assembly

During use, the fork assembly is first secured to the lift chassis of a forklift vehicle, such as to the carriage of the forklift vehicle, by positioning the mounting body of the fork assembly near the carriage so that the mounting couplers on the fork assembly can be coupled to the carriage. For example, the mounting body can have a fixed mounting coupler in the form of a hook for hooking on the carriage. The mounting body can have a quick-connect mounting coupler in the form of a hook. After the fixed mounting coupler is coupled to the carriage, the quick-connect mounting coupler can be connected to secure the mounting body, e.g., and also the fork assembly, to the carriage.

A distance between the forks of the fork assembly can be adjusted to be slightly larger than a width of a load. Positions of the load lifters can be optionally adjusted along the fork beams of the forks, for example, to avoid the foot beams that are coupled to the bottom of the load. Heights of the load lifters can also be optionally adjusted so that the blades of the load lifters can fit into the gaps between the load bottom surface and the ground surface generated by the foot beams. Alternatively, the fork assembly can be raised up or lowered down, instead of adjusting the heights of the load lifters.

The forklift vehicle can move to put a load between the forks of the fork assembly, with the blades just slightly above the ground. In resting position, the blades are outside the load, such as parallel to the fork beam. After the fork assembly is positioned surrounding the load, the rotate mechanisms can be actuated to rotate the blades to be under the load. The fork assembly then can be lifted up, and the load can then be transported to a destination.

The fork assembly can allow the forklift vehicle to side lifting loads with a minimum separation between the loads.

Long fork beams in the fork assembly can also allow the lifting and transporting of long load from a shorter dimension of the load. In some embodiments, the fork assembly can be suitable for loading and unloading loads in a container, with long loads stored in the container very close to each other and with the shorter side of the loads facing the opening door of the container.

Figure 16A:
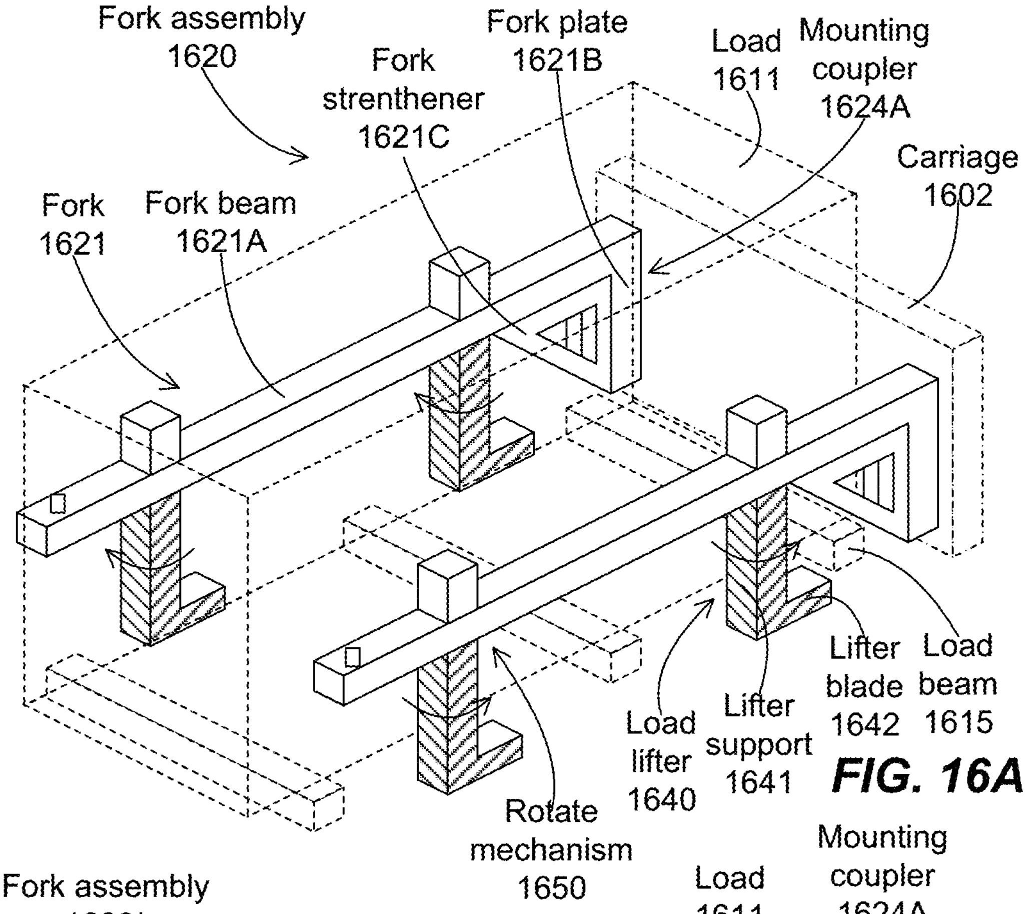
FIGS. 16A-16B illustrate a schematic operation of a fork assembly according to some embodiments.
Figure 16B:
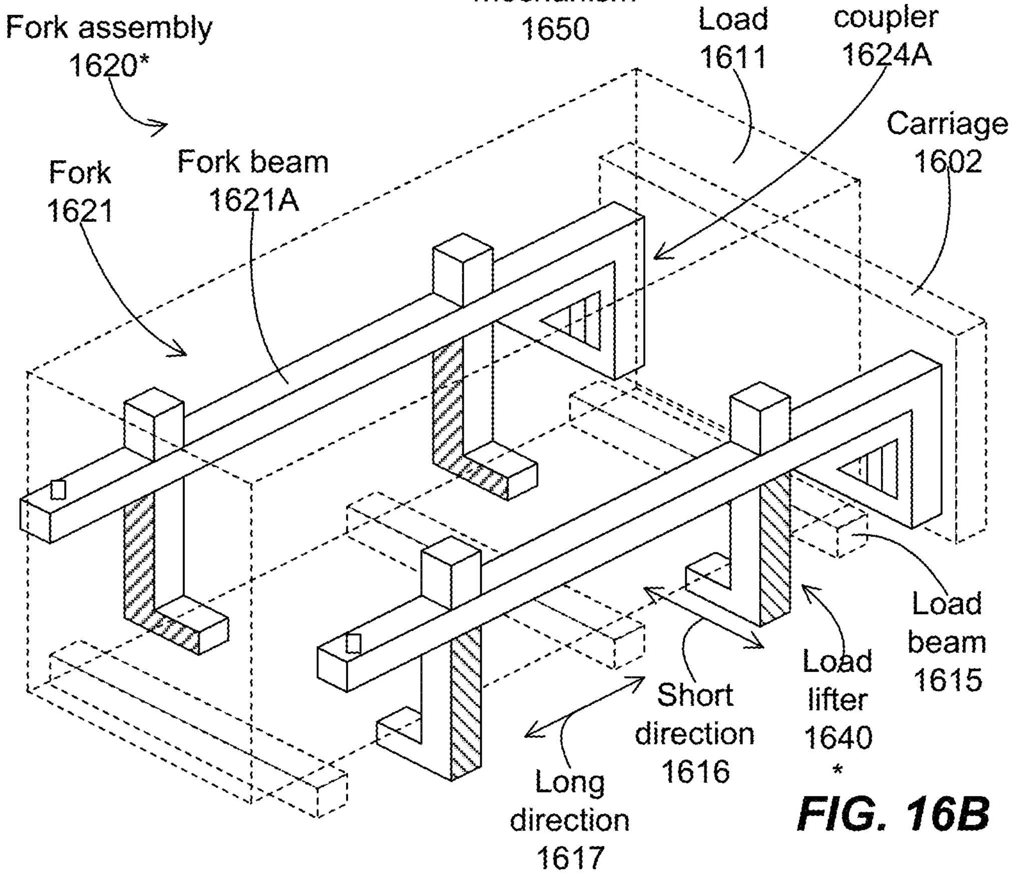

FIGS. 16A-16B illustrate a schematic operation of a fork assembly according to some embodiments. In FIG. 16A, a fork assembly 1620 is mounted on a forklift vehicle, such as mounting to a carriage 1602 of the forklift vehicle, through mounting couplers 1638. The fork assembly can include two forks 1621, with each fork 1621 having a fork beam 1621A coupled to a fork plate 1621B and a fork strengthener 1621C. Two fork lifters 1640 can be coupled to each fork beam, with each fork lifter having a lifter support 1641 coupled to a lifter blade 1642. The fork blades are positioned not for lifting a load, e.g., so that the forklift vehicle can maneuver the fork assembly around the load 1611. For example, the blades can be positioned parallel to the fork beams, in order to minimize the effective width of the fork.

The forklift vehicle is driven toward the load 1611, so that the fork assembly surrounds the load with the fork beams positioned parallel with the long direction 1617 of the load, and the forklift vehicle facing the short direction 1616 of the load. The load 1611 can have foot beam or load beam 1615 running along the short direction 1616. The fork lifters are positioned at positions on the fork beams so that the blades 1642 can rotate to the gaps under the load bottom surface and not contacting the load beams 1615.

FIG. 16B shows a lifting configuration for the fork assembly 1620. After the fork assembly is properly positioned surrounding the load 1611, the rotate mechanism 1650 is activated to rotate the blades toward the load, e.g., so that the blades can be positioned under the load for lifting. The fork assembly then can be raised up by the forklift vehicle actuating the carriage, which can lift the load. The forklift vehicle can then move backward, and toward a destination for placing the load.

After reaching the destination, the fork assembly can be lowered until the load contacts the ground. The rotate mechanism can then be actuated to rotate the blades outside the load, such as to the position parallel to the fork beam. The forklift vehicle can then move backward to clear the fork assembly from the load.

Fork Configuration for a Fork Assembly

FIGS. 17A-17B illustrate forming processes for a fork assembly according to some embodiments. FIG. 17A shows a process for forming a double fork assembly. Operation 1700 forms a fork assembly configured to be coupled to a forklift, with the fork assembly including one or more forks coupled to a mounting body, which is configured to be coupled to the forklift. Each fork includes a fork beam, with an end of the fork beam configured to be coupled to the mounting body, and a fork lifter, with the fork lifter coupled to the fork beam. The fork lifter includes a fork blade coupled to a rotate mechanism, which is configured to rotate the fork blade between a first position in which the fork blade is at least partially disposed under a load and a second position in which the fork blade is not under the load. The rotate mechanism includes a manual operation or a remote operation mechanism for an operator in the forklift to rotate the fork blade.

FIG. 17B shows a process for forming a single fork assembly. Operation 1720 forms a fork assembly configured to be coupled to a forklift, with the fork assembly includes a fork, which has a fork beam, with an end of the fork beam configured to be coupled to the forklift, and a fork lifter coupled to the fork beam. The fork lifter includes a fork blade coupled to a rotate mechanism, which is configured to rotate the fork blade between a first position in which the fork blade is at least partially disposed under a load and a second position in which the fork blade is not under the load. The rotate mechanism includes a manual operation or a remote operation mechanism for an operator in the forklift to rotate the fork blade.

In some embodiments, the fork assembly can include a mounting body configured to accept one or more forks. The mounting body is coupled to the forklift through a mounting coupler. The mounting coupler includes one or more mounting hooks, with a first fixed coupled to the mounting body, and a second hook quick-releasably coupled to the mounting body. The fork beam can include one or more fork couplers, with the fork couplers configured to be coupled to mating elements on the mounting body to function as a linear guide. An actuator can be coupled between the fork beam and the mounting body to move the fork beam along the linear guide. The fork beam can be configured to accept a fork extension slidable within the fork beam, with a locking mechanism to prevent falling out, with rollers for ease of sliding.

In some embodiments, the fork lifter can be configured to move along the fork beam, and can be configured to couple to the fork beam at different heights of the fork lifter.

In some embodiments, the rotate mechanism can be configured to rotate only the fork blade or the fork blade and a portion of a lifter support coupled to the fork blade. The rotate mechanism can optionally include an actuator such as a spring to bias the fork blade in a downward or extend direction from the fork beam. The rotate mechanism can be activated by moving the fork beam in one direction (such as down) so that the fork blade contacts a surface to push the blade toward to fork beam, followed by a moving in an opposite direction (such as up) to extend the fork blade away from the fork beam.

In some embodiments, the rotate mechanism can include 2 slanting surfaces interacting with one or more pins for rotating the one or more pins. The pins can rotate in one direction for rotate the blades. Alternatively, the pins can rotate in opposite directions for toggle the blades back and forth.

Moving a Fork Assembly for Load and Unload a Load

FIGS. 18A-18B illustrate processes for loading and unloading a load according to some embodiments. FIG. 18A shows a process to put blades of a fork assembly under the load using a rotate mechanism. Operation 1800 moves a forklift so that two fork beams of a fork assembly coupled to the forklift surround a load, with blades of fork lifters coupled to the two fork beams disposed outside the load. Operation 1810 moves the fork assembly downward so that blades contact a surface, with the downward movement activating rotating mechanisms coupled to the fork lifters to rotate the blades from outside the load toward under the load. Operation 1820 moves the fork assembly upward so that blades contact the load or a spring pushes the blades downward, with the upward movement activating the rotating mechanisms to rotate the blades to be under the load.

FIG. 18B shows a process to put blades of a fork assembly outside the load using a rotate mechanism. Operation 1840 moves a fork assembly coupled to a forklift downward so that blades contact a surface, with the downward movement activating rotating mechanisms coupled to the fork lifters to rotate the blades from under the load toward outside the load. Operation 1850 moves the fork assembly upward so that blades contact the load or a spring pushes the blades downward, with the upward movement activates the rotating mechanisms to rotate the blades to be outside the load. Operation 1860 moves the forklift away from the load.

Rotate Mechanism—Rotate in One Direction

In some embodiments, the fork assembly can include one or more rotate mechanisms, with each rotate mechanism configured to rotate at least a blade, for example, between a position outside the load, such as parallel to the fork beam for not interfere with the load when the fork assembly moves, and a position under the load, such as pointing toward the load for lifting the load.

The rotate mechanism can be configured with a remote operation, e.g., an operator running the forklift vehicle can activate the rotate mechanism for rotate the blade while sitting at the control of the forklift vehicle, e.g., without the need to leave the forklift vehicle to the location of the load for rotating the blade.

In general, the rotate mechanism is configured to convert a linear movement to a rotational movement, for example, through a pin interfacing with a slanting surface, e.g., a surface curved and slanted around a cylinder, such as a helical curve.

Figures 19A, 19B:
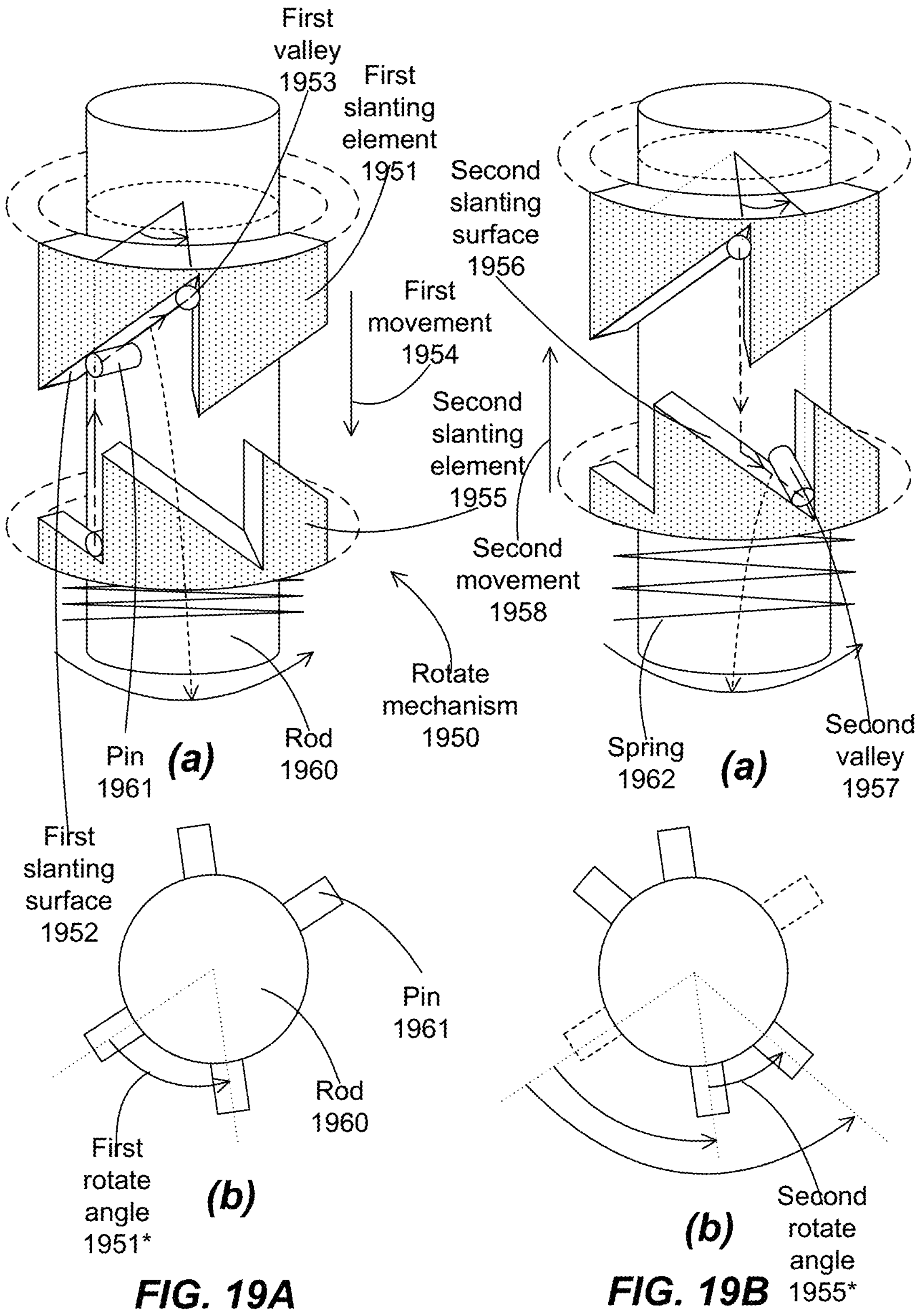
FIGS. 19A(a)(b)-19B(a)(b) illustrate a schematic of a conversion mechanism according to some embodiments.

FIGS. 19A(a)(b)-19B(a)(b) illustrate a schematic of a conversion mechanism according to some embodiments. A linear movement can be converted to a rotational movement through an interaction of a component, such as a pin, with a slanting surface, such as a curve helix surface around a cylinder. To allow for a repeat conversion, two linear movements can be used, which can be converted into two rotational angles.

FIG. 19A(a)-19A(b) show a perspective view and a top view, respectively, of a conversion of a linear upward movement to a counterclockwise rotation in a rotate mechanism. The rotate mechanism can include a first element having a first slanting element 1951, which includes a first slanting surface 1952 curving around a cylindrical shape, such as a helical curve. The first slanting surface can curve up, and stop at a first valley 1953, e.g., the first slanting element 1951 can have an abrupt surface transitioned from the first slanting surface 1952. The rotate mechanism can include a pin 1961 protruded from a rod 1960.

In operation, the pin 1961 can be pushed up to contact the first slanting surface 1952, for example, by pushing the rod 1960 upward relative to the first slanting element 1951 (or the first slanting element 1951 can be pushed downward relative to the rod 1960). After contacting the first slanting surface 1952, the pin 1961 can slide along the first slanting surface 1952 until reaching the first valley 1953. When the pin slides along the first slanting surface, the rod rotates a first rotate angle 1951*.

FIG. 19B(a)-19B(b) show a perspective view and a top view, respectively, of a conversion of a linear downward movement to another counterclockwise rotation in the rotate mechanism. The rotate mechanism can include the first element having a second slanting element 1955, which has a second slanting surface 1956 curving around a cylindrical shape, such as a helical curve. The second slanting surface can curve down, and stop at a second valley 1957, e.g., the second slanting surface 1956 can have an abrupt transitioned surface.

In operation, the pin 1961 can be pushed down from the first valley 1953 to contact the second slanting surface 1956, for example, by pushing the rod 1960 downward relative to the second slanting element 1955 (or the second slanting element 1955 can be pushed upward relative to the rod 1960). An actuator, such as a spring 1962 can be used to provide the pushing up of the second slanting element 1955. After contacting the second slanting surface 1956, the pin 1961 can slide along the second slanting surface 1956 until reaching the second valley 1957. When the pin slides along the second slanting surface, the rod rotates a second rotate angle 1955*.

Thus, the rotate mechanism can include a first element having first and second slanting elements 1951 and 1955 having one or more slanting surfaces, and a second element having one or more pins 1961. As shown, the pins are coupled to a rod disposed within a hollow portion of the first element.

By moving up and down of the rod relative to the first slanting elements, the rod can rotate a combination of a first rotate angle 1951* and a second rotate angle 1955*.

Fork Lifter Having a One-Directional Rotate Mechanism

Figure 20A:
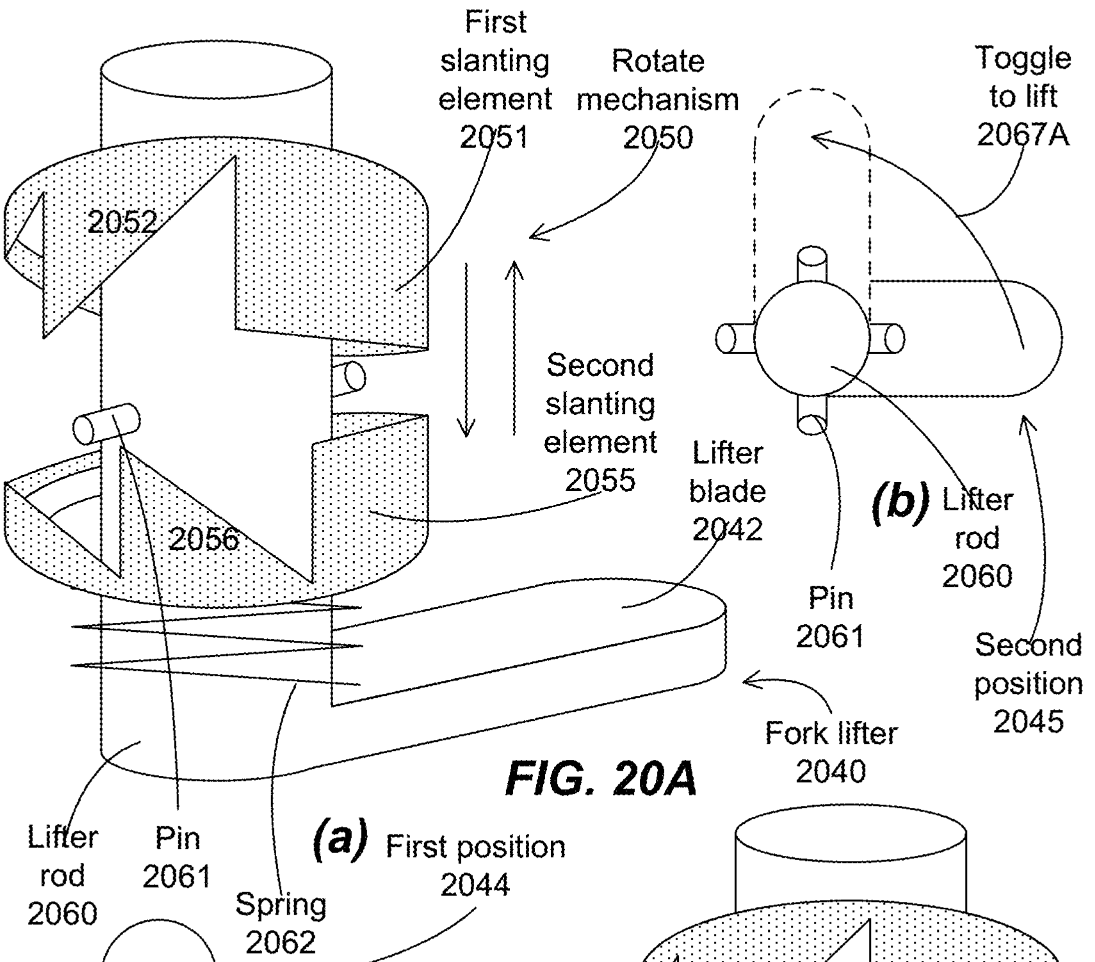
FIGS. 20A(a)(b)-20B(a)(b) illustrate a fork lifter configuration with a rotate mechanism according to some embodiments.

FIGS. 20A(a)(b)-20B(a)(b) illustrate a fork lifter configuration with a rotate mechanism according to some embodiments. FIGS. 20A(a)-20A(b) show a perspective view and a top view of a fork lifter in a second position, which is a position outside the load, to be transitioned to a first position, which is a position under the load. A fork lifter 2040 can include a lifter rod 2060 coupled to a lifter blade 2042. The lifter rod can be a bottom portion of a lifter support. A rotate mechanism 2050 can be coupled to the bottom portion and to a top portion of the lifter support. For example, the rotate mechanism 2050 can include one or more pins 2061. The pins 2061 can be disposed in opposite directions on the lifter rod 2060, such as protruding from the lifter rod from a center point of the lifter rod.

The rotate mechanism can include a first element having a first slanting element 2051 having first slanting surfaces 2052 and 2052*, and a second slanting element 2055 having second slanting surfaces 2056 and 2056*, which are coupled to the top portion of the lifter support of the fork lifter. The rotate mechanism can further include a second element, such as a lifter rod, having one or more pins, which are configured to rotate the lifter rod when the pins slide on the slanting surfaces. The rotate mechanism can optionally include an actuator, such as a spring 2062, which is configured to bias the bottom portion of the lifter away from the top portion, e.g., the spring 2062 can function to push the blade away from the fork beam.

In operation, the top portion can move down, relative to the bottom portion, e.g., the top portion can move down or the bottom portion can move up. The downward movement of the top portion (or the upward movement of the bottom portion) can be performed by an operator lowering the fork assembly while sitting in the forklift vehicle and actuating the carriage on which the fork assembly is attached to. For example, when contacting a surface, such as the ground surface, the ground can exert a force on the bottom portion, such as the blade, to push the bottom portion upward. With the upward movement of the blade, the pins can contact and slide on the slanting surface 2052 of the first slanting element to rotate a first angle.

The top portion then can move up, relative to the bottom portion, e.g., the top portion can move up or the bottom portion can move down. The upward movement of the top portion (or the downward movement of the bottom portion) can be performed by an operator raising the fork assembly while sitting in the forklift vehicle and actuating the carriage. For example, when the fork assembly is lifted up, gravity, e.g., the weight of the blade or the load can exert a force on the bottom portion, such as the blade, to pull the bottom portion downward. Alternatively, the upward movement of the top portion (or the downward movement of the bottom portion) can be performed by the spring, which can pull down the bottom portion relative to the top portion. With the downward movement of the blade, the pins can contact and slide on the slanting surface 2056 to rotate a second angle.

The combination of the first angle and the second angle can toggle 2067A the blade to a lift position, e.g., to rotate the blade from the second position 2045 to the first position 2044. The rotation angle can be 90 degrees, e.g., from the blade parallel and outside the load to the blade under and perpendicular toward the load.

Figure 20B:
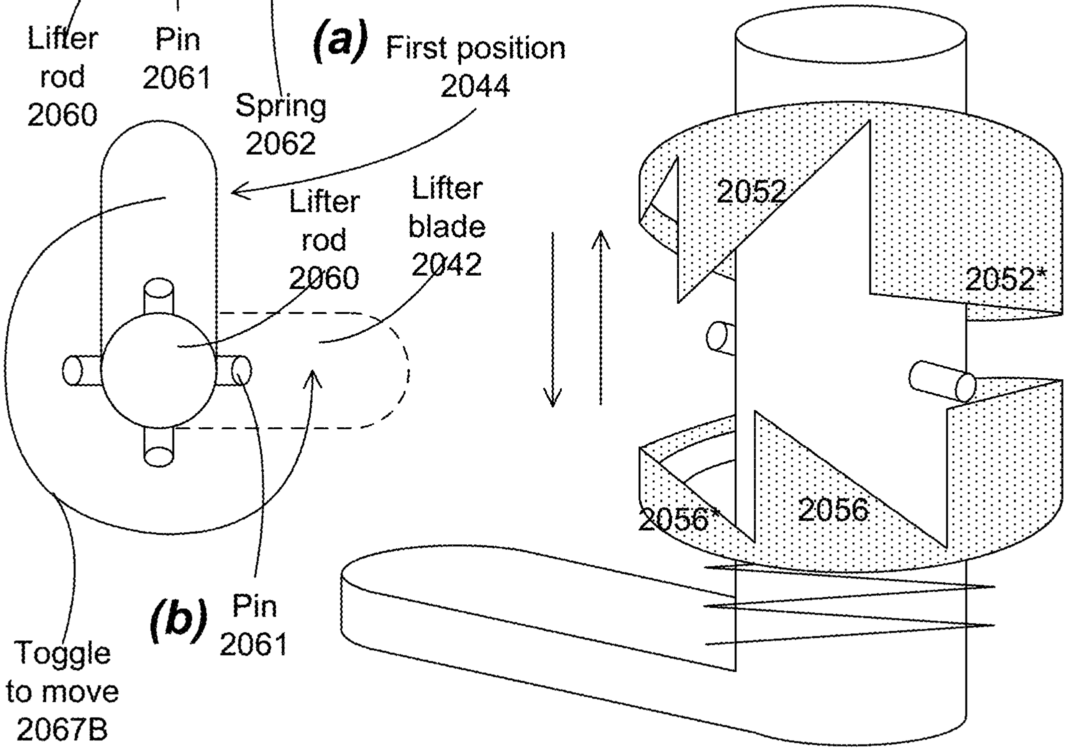

FIGS. 20B(a)-20B(b) show a perspective view and a top view of a fork lifter in the first position, to be transitioned to the second position, using repeated movements of the fork assembly to generate the relative downward movement followed by the relative upward movement of the top portion.

For example, the top portion can move down, relative to the bottom portion. The downward movement of the top portion can be performed by an operator lowering the fork assembly while sitting in the forklift vehicle and actuating the carriage. When contacting the ground surface, the ground can exert a force on the blade to push the bottom portion upward. With the upward movement of the blade, the pins can contact and slide on the slanting surface 2052* of the first element to rotate another first angle.

The top portion then can move up, relative to the bottom portion. The upward movement of the top portion can be performed by an operator raising the fork assembly while sitting in the forklift vehicle and actuating the carriage. When the fork assembly is lifted up, gravity or the spring force can exert a force on the blade to pull the bottom portion downward. With the downward movement of the blade, the pins can contact and slide on the slanting surface 2056* to rotate another second angle.

The combination of the another first angle and the another second angle can toggle 2067B the blade to a non-lift position, e.g., to rotate the blade from the first position 2044 to the second position 2045. The rotation angle can be 270 degrees, e.g., from the blade under and perpendicular toward the load to the blade parallel and outside the load.

Variations of One-Directional Rotate Mechanisms

In general, the rotate mechanism can include a first element having a first slanting surface and a second slanting surface. The rotate mechanism can include a second element having a component, such as one or more pins, for interacting with the first and second slanting surfaces. In practice, there can be multiple configurations of the rotate mechanism, including coupling configurations of the rotate mechanism to the fork assembly, and structural configurations of the rotate mechanism.

In the coupling configurations, the rotate mechanism can be coupled between a fork beam of the fork assembly and a blade of the fork lifter. For example, the rotate mechanism can be coupled between the fork beam and a lifter support of the fork lifter. The rotate mechanism can be coupled between a top portion and a bottom portion of the lifter support. The rotate mechanism can be coupled between the bottom portion and the blade of the fork lifter.

In the coupling configurations, the rotate mechanism can have the slanting surfaces in the first element facing each other. Alternatively, the rotate mechanism can have the slanting surfaces in the first element facing away from each other.

The rotate mechanism can have the first element having the slanting surfaces coupled to the fork beam and the second element having the pins coupled to the blade. Alternatively, the rotate mechanism can have the first element having the slanting surfaces coupled to the blade and the second element having the pins coupled to the fork beam.

The rotate mechanism can have the first element having the slanting surfaces slidably disposed within the second element having the pins. Alternatively, the rotate mechanism can have the first element having the slanting surfaces slidably disposed surrounding the second element having the pins coupled to the fork beam.

FIGS. 21A-21H illustrate configurations for a rotate mechanism according to some embodiments. Each rotate mechanism includes a first element having first and second slanting surfaces, and a second element having one or more pins. The first and second elements can be arranged in different configurations to form a rotate mechanism. As shown, the rotate mechanism is coupled between a lifter support 2141 and a lifter blade 2142 of a fork lifter. The rotate mechanism can also be coupled to different components of the fork assembly, such as between the fork beam and the fork lifter, or between portions of the fork lifter.

Figures 21A, 21B, 21C, 21D, 21E, 21F, 21G, 21H:
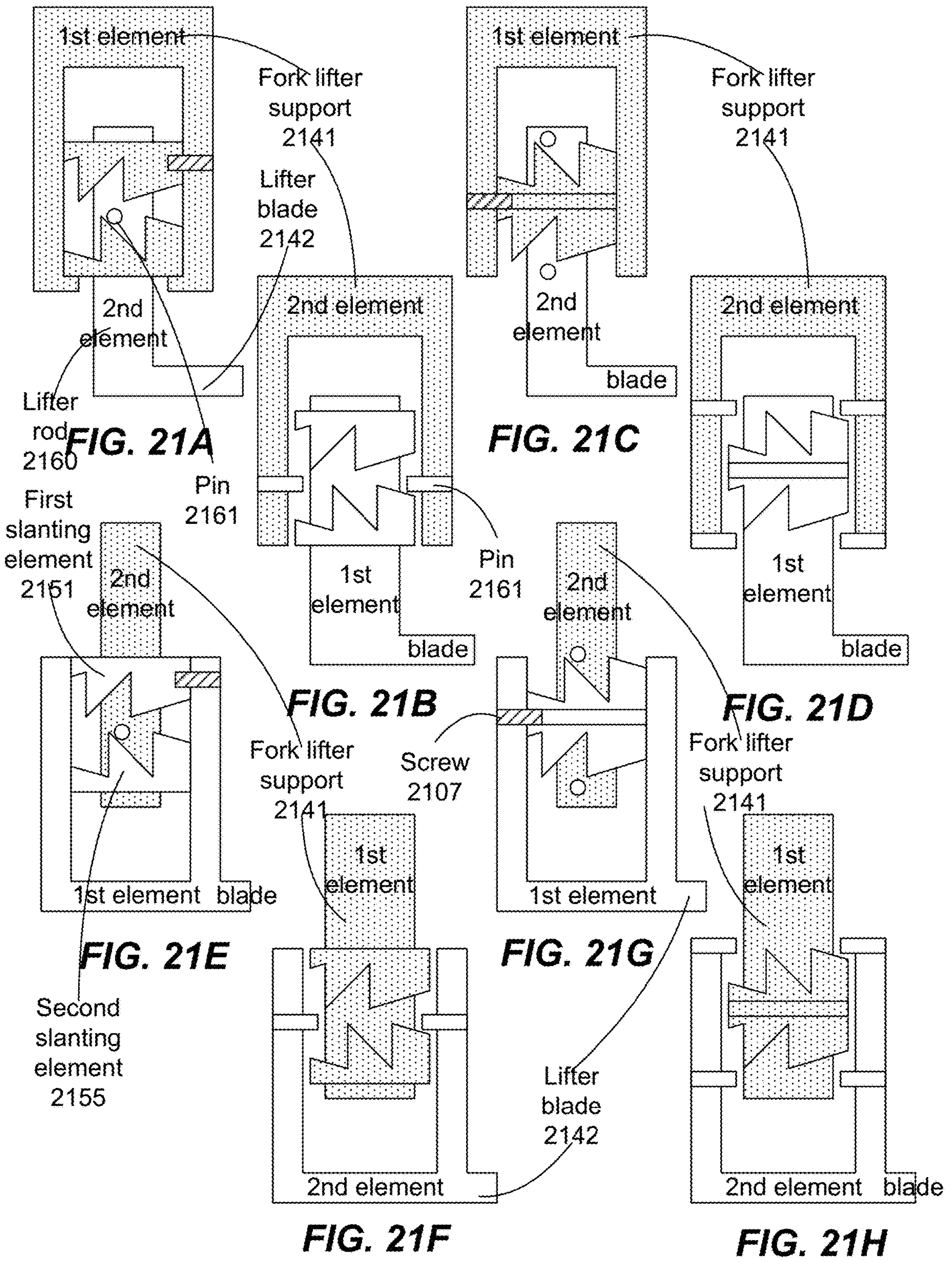
FIGS. 21A-21H illustrate configurations for a rotate mechanism according to some embodiments.

FIG. 21A shows a rotate mechanism in which the first element is coupled to a fork lifter support 2141, and the second element is coupled to a fork blade 2142. The first element has first and second slanting surfaces facing each other, with the pins 2161 of the second element disposed in between the slanting surfaces, and protruded outward toward the slanting surfaces. Further, the second element is disposed inside the first element, such as the first element has annular shape slanting surfaces, and the second element has a rod 2160 shape component configured to be slidable inside the annular first element. A secure element, such as a screw 2107, can be used for securing the first element to the fork lifter support.

FIG. 21B shows a rotate mechanism in which the second element is coupled to a fork lifter support 2141, and the first element is coupled to a fork blade 2142. The first element has first and second slanting surfaces facing each other, with the pins 2161 of the second element disposed between the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

FIG. 21C shows a rotate mechanism in which the first element is coupled to a fork lifter support 2141, and the second element is coupled to a fork blade 2142. The first element has first and second slanting surfaces facing away from each other, with the pins 2161 of the second element disposed on both sides of the slanting surfaces, and protruded outward toward the slanting surfaces. Further, the second element is disposed inside the first element, such as the first element has annular shape slanting surfaces, and the second element has a rod shape component configured to be slidable inside the annular first element. A secure element can be used for securing the first element to the fork lifter support.

FIG. 21D shows a rotate mechanism in which the second element is coupled to a fork lifter support 2141, and the first element is coupled to a fork blade 2142. The first element has first and second slanting surfaces facing away from each other, with the pins 2161 of the second element disposed on both sides of the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

FIG. 21E shows a rotate mechanism in which the second element is coupled to a fork lifter support 2141, and the first element is coupled to a fork blade 2142. The first element has first and second slanting surfaces facing each other, with the pins 2161 of the second element disposed in between the slanting surfaces, and protruded outward toward the slanting surfaces. Further, the second element is disposed inside the first element, such as the first element has annular shape slanting surfaces, and the second element has a rod shape component configured to be slidable inside the annular first element. A secure element can be used for securing the first element to the fork lifter support.

FIG. 21F shows a rotate mechanism in which the first element is coupled to a fork lifter support 2141, and the second element is coupled to a fork blade 2142. The first element has first and second slanting surfaces facing each other, with the pins 2161 of the second element disposed between the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

FIG. 21G shows a rotate mechanism in which the second element is coupled to a fork lifter support 2141, and the first element is coupled to a fork blade 2142. The first element has first and second slanting surfaces facing away from each other, with the pins 2161 of the second element disposed on both sides of the slanting surfaces, and protruded outward toward the slanting surfaces. Further, the second element is disposed inside the first element, such as the first element has annular shape slanting surfaces, and the second element has a rod shape component configured to be slidable inside the annular first element. A secure element can be used for securing the first element to the fork lifter support.

FIG. 21H shows a rotate mechanism in which the first element is coupled to a fork lifter support 2141, and the second element is coupled to a fork blade 2142. The first element has first and second slanting surfaces facing away from each other, with the pins 2161 of the second element disposed on both sides of the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

Forming a One-Directional Rotate Mechanism

In some embodiments, the rotate mechanism can be configured to convert linear movements, such as up/down, to rotational moving in one direction. For example, a first set of linear movements can rotate the blade from an outside position to an under position in one rotational direction, such as counterclockwise (or clockwise). A second set of linear movements can rotate the blade from the under position to the outside position in the same rotational direction, such as counterclockwise (or clockwise).

FIGS. 22A-22B illustrate processes to form a rotate mechanism according to some embodiments. FIG. 22A forms a rotate mechanism having slanting surface and interactive pins. Operation 2200 forms a rotate mechanism, with the rotate mechanism including a first element and a second element. The first element includes a first slanting surface connected to a first valley, and a second slanting surface connected to a second valley. The first slanting surface is spaced from the second slanting surface. The first and second slanting surfaces form an angle greater than zero.

The second element includes one or more pins configured to interact with the first and second slanting surfaces through relative motions between the one or more first elements and the one or more second elements. The relative motions include a first movement in which the one or more pins relatively move along the first slanting surface to rest at the first valley and to cause the one or more pins to rotate a first angle relative to the one or more elements. The relative motions includes a second movement in which the one or more pins relatively move along the second slanting surface to rest at the second valley and to cause the one or more pins to rotate a second angle relative to the one or more elements.

FIG. 22B forms a rotate mechanism coupled to at least one of a fork beam, a fork lifter body, or a blade. Operation 2220 forms a rotate mechanism, with the rotate mechanism including a first element including a first slanting surface and a second slanting surface, and a second element including one or more pins configured to interact with the first and second slanting surfaces to rotate a blade between a first and a second positions.

The blade or a fork beam is configured to couple to either the first or second element respectively. In the first position, the blade is disposed under a load. In the second position, the blade is disposed outside the load.

In some embodiments, the first element can include a first slanting element and a second slanting element, each having at least a slanting surface. The second element can include one second component coupled to at least a pin, with the pin disposed between the two slanting surfaces of the first and second slanting elements.

In some embodiments, the first element is coupled to a fork beam, and the second element is coupled to a blade. Alternatively, the first element is coupled to a blade, and the second element is coupled to a fork beam.

In some embodiments, the second component is disposed inside the first two components. Alternatively, the first two components are disposed inside the second component.

In some embodiments, the first element can include a first slanting element having a first slanting surface and a second slanting element having a second slanting surface, with the two slanting surfaces facing away from each other. The second element can include one second component coupled to at least two pins, with the pins disposed outside the two slanting surfaces.

In some embodiments, the first element is coupled to a fork beam, and the second element is coupled to a blade. Alternatively, the first element is coupled to a blade, and the second element is coupled to a fork beam.

In some embodiments, the second component is disposed inside the first two components. Alternatively, the first two components are disposed inside the second component.

Moving or Toggling a Blade Between 2 Positions

FIGS. 23A-23C illustrate processes for activating the rotate mechanism with the fork assembly according to some embodiments. FIG. 23A provides a process for toggling a blade between an under a load position and an outside the load position. Operation 2300 toggles a lifter blade between a first position and a second position of a fork lifter coupled to a fork assembly of a forklift. The toggling process is activated when the fork assembly is positioned around the load with the lifter blade in a vicinity of a ground. In the first position, the lifter blade is disposed under the load for lifting the load. In the second position, the lifter blade is outside the load for not lifting the load.

FIG. 23B provides a process for toggling a blade by fork lifter moving to contact a surface and then moving in an opposite direction. Operation 2320 moves a fork lifter coupled to a fork assembly of a forklift downward. When the fork lifter contacts a surface and then releases from the surface, a toggling mechanism is activated to toggle a blade of the fork lifter between a first position and a second position. In the first position, the lifter blade is disposed under a load for lifting the load. In the second position, the lifter blade is outside the load for not lifting the load.

FIG. 23C provides a process for toggling a blade by moving a fork assembly in two opposite directions. Operation 2340 moves a fork assembly of a forklift in two opposite directions to toggle a blade of a fork lifter coupled to the fork assembly between under a load for lifting the load and outside the load for not lifting the load.

Rotate Mechanism—Rotate in Two Opposite Directions

In some embodiments, the rotate mechanism can be configured to rotate back and forth, instead of continuously in one direction. The slanting surfaces can be configured to be nested, e.g., one slanting surface is within the other slanting surface to allow rotations in forward direction then backward direction.

Figure 24A:
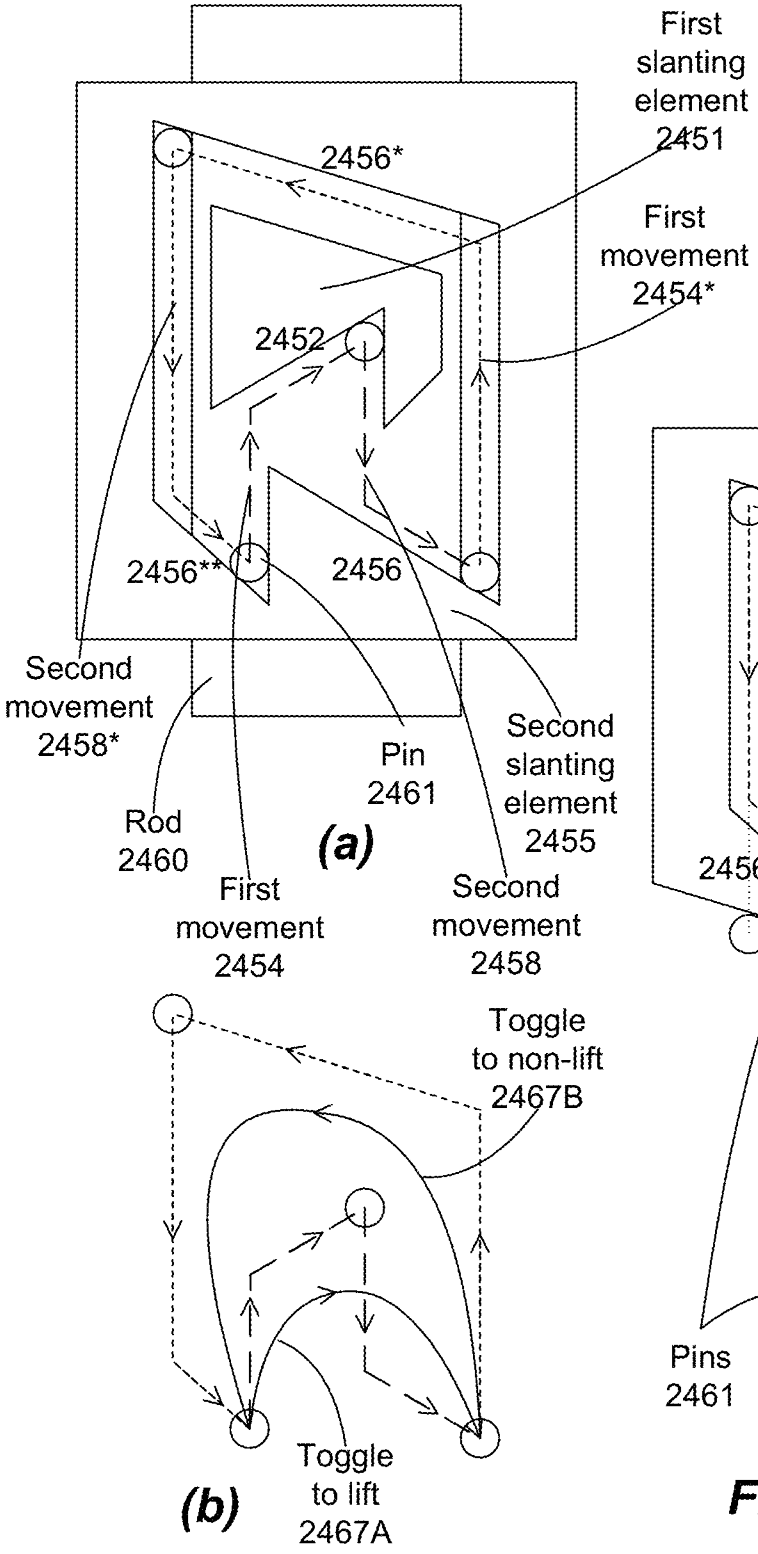
FIGS. 24A(a)(b)-24B illustrate a schematic of a conversion mechanism according to some embodiments.

FIGS. 24A(a)(b)-24B illustrate a schematic of a conversion mechanism according to some embodiments. The pins can be configured to move in one direction, and then return in an opposite direction.

FIGS. 24A(a)-24A(b) show a side view of a rotate mechanism having a conversion of linear upward/downward movements to counterclockwise/clockwise rotations in a rotate mechanism. The rotate mechanism can include a first element including a first slanting element 2451 and a second slanting element 2455. The first slanting element 2451 can have multiple first slanting surfaces, and the second slanting element 2455 can have one second slanting surface, configured so that the multiple first slanting surfaces surround the second slanting surface. For example, the first slanting element 2451 can have first slanting surface 2452. The second slanting element 2455 can have second slanting surfaces 2456, 2456*, and 2456. The second element can have a pin 2461**.

In operation, in a first movement 2454, the pin 2461 can be pushed up to contact the first slanting surface 2452, for example, by pushing the rod 2460 upward relative to the first slanting element 2451. After contacting the first slanting surface 2452, the pin 2461 can slide along the first slanting surface 2452 until reaching a first valley. When the pin slides along the first slanting surface 2452, the rod rotates a first rotate angle.

In a second movement 2458, the pin 2461 can be pushed down to contact the second slanting surface 2456, for example, by pushing the rod 2460 downward relative to the second slanting element 2455. After contacting the second slanting surface 2456, the pin 2461 can slide along the second slanting surface 2456 until reaching a valley. When the pin slides along the second slanting surface 2456, the rod rotates a second rotate angle. The combination of the first and second rotation angles rotates the blade between the first and second positions, such as toggle the blade to a lift position 2467A.

For the next blade rotation, another first movement 2454* can cause the pin to move upward to contact and slide along the second slanting surface 2456*. The movement can cause the rod to rotate another first rotate angle. Then, another second movement 2458* can cause the pin to move downward to contact and slide along the second slanting surface 2456. The movement can cause the rod to rotate another second rotate angle. The combination of the another first and second rotation angles rotates the blade between the first and second positions, such as toggle the blade to a non-lift position 2467**B.

Figure 24B:
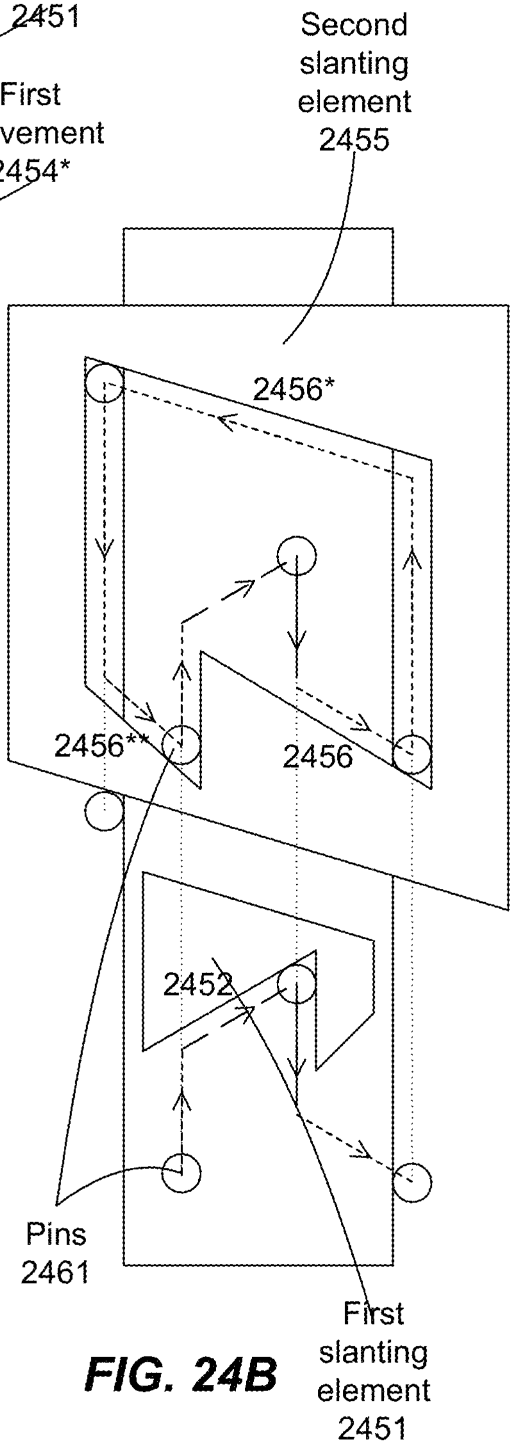

FIG. 24B shows a side view of another rotate mechanism having a conversion of linear upward/downward movements to counterclockwise/clockwise rotations in a rotate mechanism. The rotate mechanism can include a first element having a first slanting element 2451 and a second slanting element 2455, with the first and second slanting surfaces configured so that the multiple first slanting surfaces are separated from the second slanting surface. In addition, the second element includes 2 pins separated a fixed distance, with one pin configured to contact and slide along a first or second slanting surface at a time.

Fork Lifter Having a One-Directional Rotate Mechanism

Figure 25A:
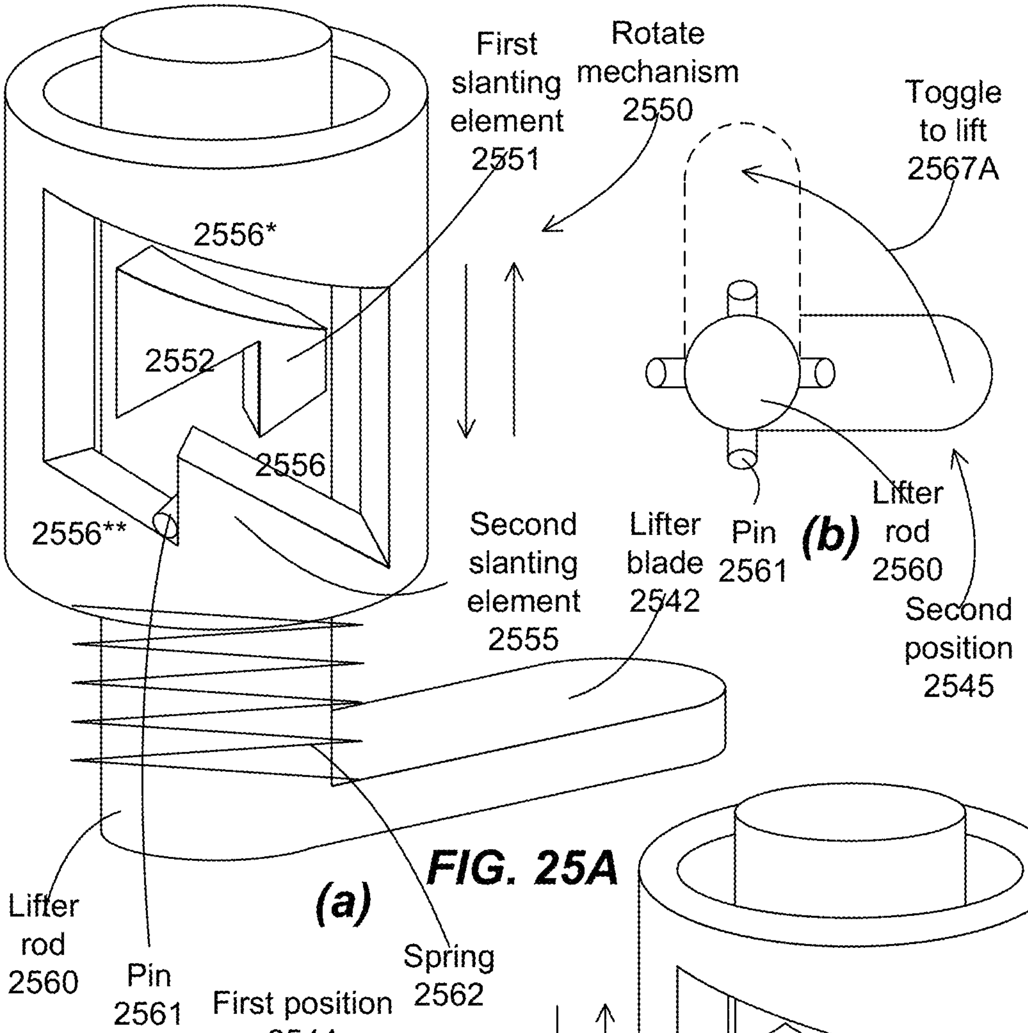
FIGS. 25A(a)(b)-25B(a)(b) illustrate a fork lifter configuration with a rotate mechanism according to some embodiments.

FIGS. 25A(a)(b)-25B(a)(b) illustrate a fork lifter configuration with a rotate mechanism according to some embodiments. FIGS. 25A(a)-25A(b) show a perspective view and a top view of a fork lifter in a second position, which is a position outside the load, to be transitioned to a first position, which is a position under the load. A fork lifter 2540 can include a lifter rod 2560 coupled to a lifter blade 2542. The lifter rod can be a bottom portion of a lifter support. A rotate mechanism 2550 can be coupled to the bottom portion and to a top portion of the lifter support. For example, the rotate mechanism 2550 can include one or more pins 2561. The pins 2561 can be disposed in opposite directions on the lifter rod 2560, such as protruding from the lifter rod from a center point of the lifter rod.

The rotate mechanism can include a first element having a first slanting element 2551 having first slanting surfaces 2552, and a second slanting element 2555 having second slanting surfaces 2556, 2556*, and 2556, which are coupled to the top portion of the lifter support of the fork lifter. The rotate mechanism can further include a second element, such as a lifter rod, having one or more pins, which are configured to rotate the lifter rod when the pins slide on the slanting surfaces. The rotate mechanism can optionally include an actuator, such as a spring 2562, which is configured to bias the bottom portion of the lifter away from the top portion, e.g., the spring 2562** can function to push the blade away from the fork beam.

In operation, the top portion can move down, relative to the bottom portion. The relative downward movement of the top portion can be performed by an operator lowering the fork assembly. With the upward movement of the blade, the pins can contact and slide on the slanting surface 2552 of the first slanting element to rotate a first angle.

The top portion then can move up, relative to the bottom portion. The relative upward movement of the top portion can be performed by an operator raising the fork assembly. With the downward movement of the blade, the pins can contact and slide on the slanting surface 2556 to rotate a second angle.

The combination of the first angle and the second angle can toggle 2567A the blade to a lift position, e.g., to rotate the blade from the second position 2545 to the first position 2544. The rotation angle can be 90 degrees, e.g., from the blade parallel and outside the load to the blade under and perpendicular toward the load.

Figure 25B:
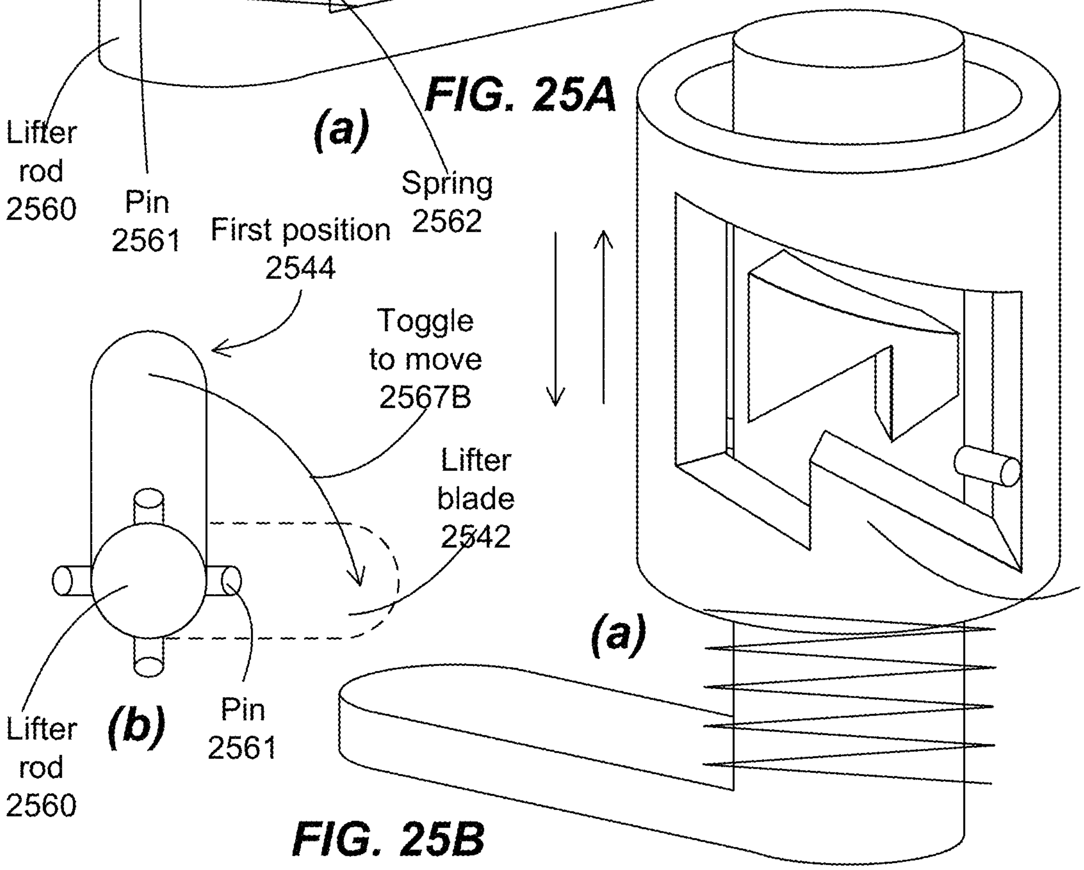

FIGS. 25B(a)-25B(b) show a perspective view and a top view of a fork lifter in the first position, to be transitioned to the second position, using repeated movements of the fork assembly to generate the relative downward movement followed by the relative upward movement of the top portion.

For example, the top portion can move down, relative to the bottom portion. With the upward movement of the blade, the pins can contact and slide on the slanting surface 2556* to rotate another first angle.

The top portion then can move up, relative to the bottom portion. With the downward movement of the blade, the pins can contact and slide on the slanting surface 2556** to rotate another second angle.

The combination of the another first angle and the another second angle can toggle 2567B the blade to a non-lift position, e.g., to rotate the blade from the first position 2544 to the second position 2545. The rotation angle can be −90 degrees, e.g., from the blade under and perpendicular toward the load to the blade parallel and outside the load, in opposite direction.

Variations of One-Directional Rotate Mechanisms

FIGS. 26A-26H illustrate configurations for a rotate mechanism according to some embodiments. Each rotate mechanism includes a first element having first and second slanting surfaces, and a second element having one or more pins. The first and second elements can be arranged in different configurations to form a rotate mechanism. As shown, the rotate mechanism is coupled between a lifter support 2641 and a lifter blade 2642 of a fork lifter. The rotate mechanism can also be coupled to different components of the fork assembly, such as between the fork beam and the fork lifter, or between portions of the fork lifter.

FIG. 26A shows a rotate mechanism in which the first element is coupled to a fork lifter support 2641, and the second element is coupled to a fork blade 2642. The first element has first and second slanting surfaces nesting in each other, with the pins 2661 of the second element disposed in between the slanting surfaces, and protruded outward toward the slanting surfaces. Further, the second element is disposed inside the first element, such as the first element has annular shape slanting surfaces, and the second element has a rod 2660 shape component configured to be slidable inside the annular first element. A secure element, such as a screw 2607, can be used for securing the first element to the fork lifter support.

FIG. 26B shows a rotate mechanism in which the second element is coupled to a fork lifter support 2641, and the first element is coupled to a fork blade 2642. The first element has first and second slanting surfaces nesting in each other, with the pins 2661 of the second element disposed between the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

FIG. 26C shows a rotate mechanism in which the first element is coupled to a fork lifter support 2641, and the second element is coupled to a fork blade 2642. The first element has first and second slanting surfaces separated from each other, with the pins 2661 of the second element disposed on both sides of the slanting surfaces, and protruded outward toward the slanting surfaces. Further, the second element is disposed inside the first element, such as the first element has annular shape slanting surfaces, and the second element has a rod shape component configured to be slidable inside the annular first element. A secure element can be used for securing the first element to the fork lifter support.

FIG. 26D shows a rotate mechanism in which the second element is coupled to a fork lifter support 2641, and the first element is coupled to a fork blade 2642. The first element has first and second slanting surfaces separated from each other, with the pins 2661 of the second element disposed on both sides of the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

FIG. 26E shows a rotate mechanism in which the second element is coupled to a fork lifter support 2641, and the first element is coupled to a fork blade 2642. The first element has first and second slanting surfaces nesting in each other, with the pins 2661 of the second element disposed in between the slanting surfaces, and protruded outward toward the slanting surfaces. Further, the second element is disposed inside the first element, such as the first element has annular shape slanting surfaces, and the second element has a rod shape component configured to be slidable inside the annular first element. A secure element can be used for securing the first element to the fork lifter support.

FIG. 26F shows a rotate mechanism in which the first element is coupled to a fork lifter support 2641, and the second element is coupled to a fork blade 2642. The first element has first and second slanting surfaces nesting in each other, with the pins 2661 of the second element disposed between the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

FIG. 26G shows a rotate mechanism in which the second element is coupled to a fork lifter support 2641, and the first element is coupled to a fork blade 2642. The first element has first and second slanting surfaces separated from each other, with the pins 2661 of the second element disposed on both sides of the slanting surfaces, and protruded outward toward the slanting surfaces. Further, the second element is disposed inside the first element, such as the first element has annular shape slanting surfaces, and the second element has a rod shape component configured to be slidable inside the annular first element. A secure element can be used for securing the first element to the fork lifter support.

FIG. 26H shows a rotate mechanism in which the first element is coupled to a fork lifter support 2641, and the second element is coupled to a fork blade 2642. The first element has first and second slanting surfaces separated from each other, with the pins 2661 of the second element disposed on both sides of the slanting surfaces, and protruded inward toward the slanting surfaces. Further, the first element is disposed inside the second element, such as the second element has annular shape with the pins pointing inward, and the first element has a rod shape fixedly coupled to the first and second slanting surfaces. The first element is configured to be slidable inside the annular second element.

Forming a One-Directional Rotate Mechanism

In some embodiments, the rotate mechanism can be configured to convert linear movements, such as up/down, to rotational movements moving in one direction or in opposite directions.

Figures 27A, 27B:
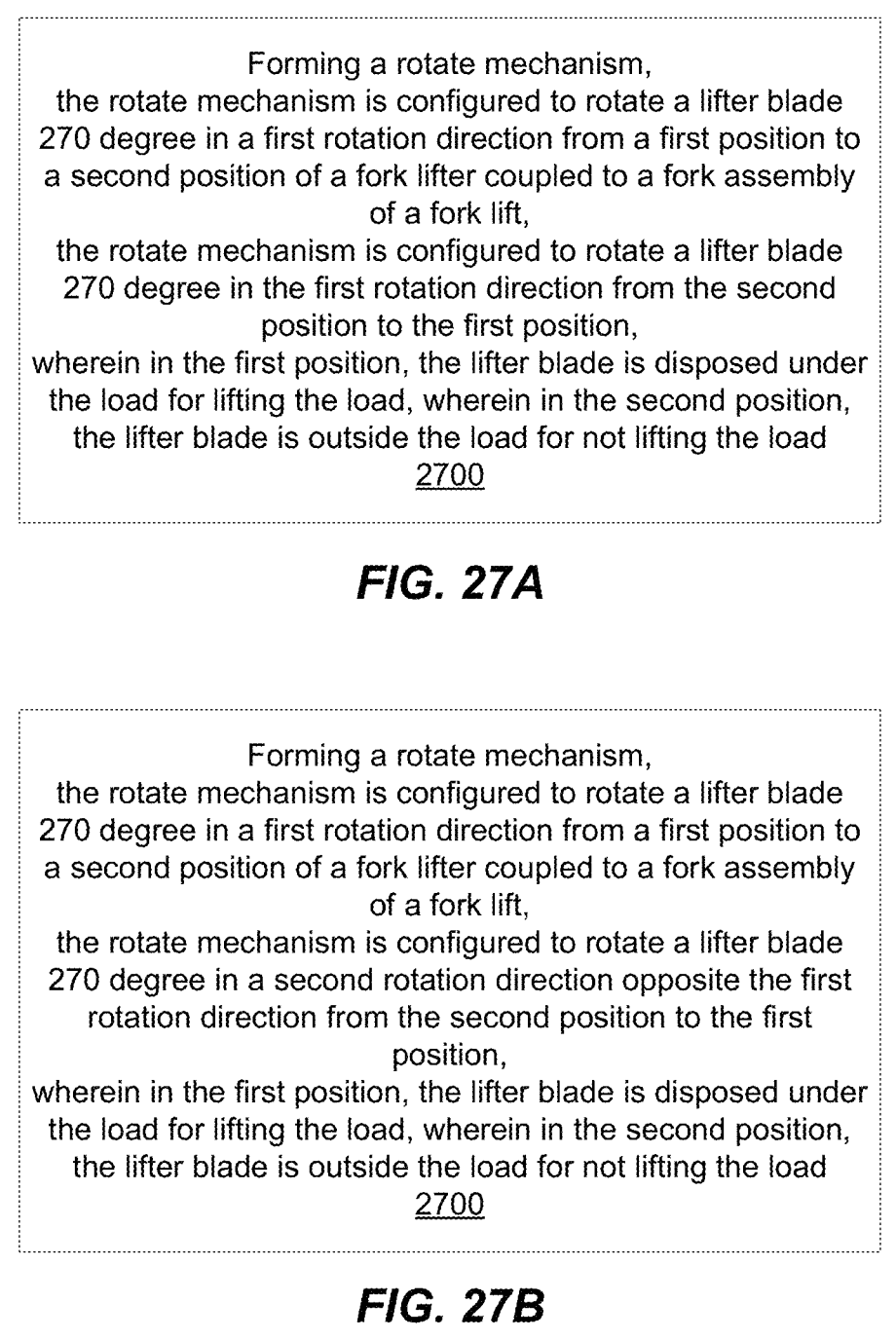

FIGS. 27A-27B illustrate processes to form a rotate mechanism according to some embodiments. FIG. 27A forms a rotate mechanism for rotating a blade repeatedly in a same direction. Operation 2700 forms a rotate mechanism, with the rotate mechanism configured to rotate a lifter blade 270 degree in a first rotation direction from a first position to a second position of a fork lifter coupled to a fork assembly of a fork lift, and with the rotate mechanism configured to rotate a lifter blade 90 degree in the first rotation direction from the second position to the first position. In the first position, the lifter blade is disposed under the load for lifting the load. In the second position, the lifter blade is outside the load for not lifting the load.

FIG. 27B forms a rotate mechanism for rotating a blade backward and forward in two opposite directions. Operation 2720 forms a rotate mechanism, with the rotate mechanism configured to rotate a lifter blade 90 degree in a first rotation direction from a first position to a second position of a fork lifter coupled to a fork assembly of a fork lift, and with the rotate mechanism configured to rotate a lifter blade 90 degree in a second rotation direction opposite the first rotation direction from the second position to the first position. In the first position, the lifter blade is disposed under the load for lifting the load. In the second position, the lifter blade is outside the load for not lifting the load.

Operation of a Fork Assembly Having a Rotate Mechanism

The rotate mechanism can be incorporated into a fork assembly for automatically (or remotely) rotate the lifter blades from an outside-the-load position to an under-the-load position. The outside-the-load position can be parallel to the fork beams, to minimize the width of the fork beam. The under-the-load position can be perpendicular to the fork beam and pointing toward the load, for lifting the load. The rotate mechanism can allow the lifter blades to rotate from a fork-assembly-moving configuration, in which the fork assembly is configured for moving to position around the load, to a fork-assembly-lifting configuration, in which the fork assembly is configured for lifting the load, all with the operator remaining in the driver seat of the forklift vehicle.

Further, the rotate mechanism can allow the fork assembly to deliver the load to a destination, and then automatically (or remotely) rotate the blades to the outside-the-load position, so that the fork assembly can withdraw from the load, and ready to approach another load for pick up.

Figures 28A, 28B, 28C:
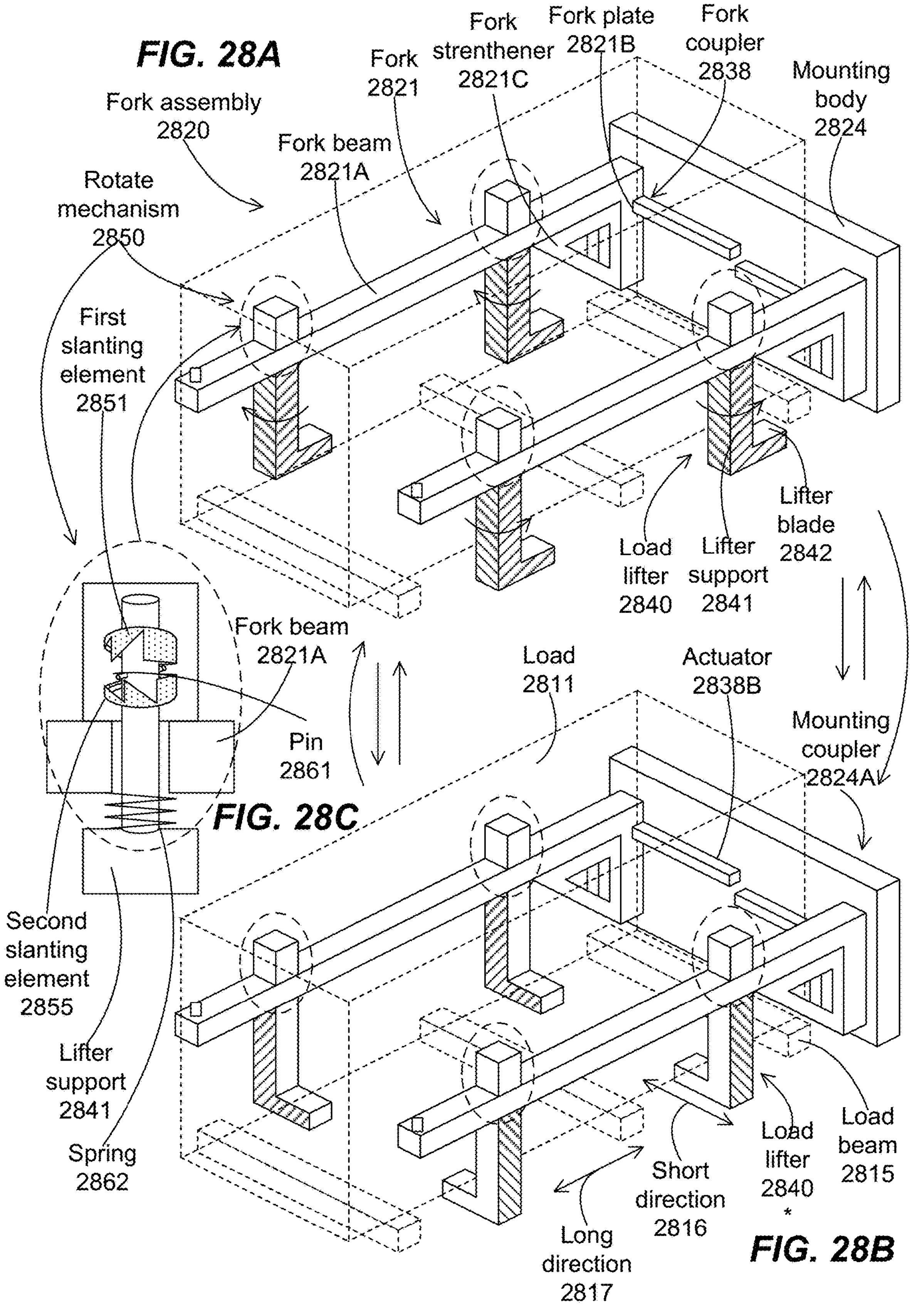
FIGS. 28A-28C illustrate a schematic operation of a fork assembly with rotate mechanisms according to some embodiments.

FIGS. 28A-28C illustrate a schematic operation of a fork assembly with rotate mechanisms according to some embodiments. In FIG. 28A, a fork assembly 2820 is mounted on a forklift vehicle, such as mounting to a carriage of the forklift vehicle, through mounting couplers 2824A. The fork assembly can include two forks 2821, with each fork 2821 having a fork beam 2821A coupled to a fork plate 2821B and a fork strengthener 2821C. The forks can be coupled to the mounting body through fork couplers 2838. Optional actuators 2838B can be coupled between the forks and the mounting body for adjusting a distance between the forks. Multiple fork lifters 2840 can be coupled to each fork beam, with each fork lifter having a lifter support 2841 coupled to a lifter blade 2842. A rotate mechanism 2850 can coupled between the fork beam and each fork lifter. The fork blades are positioned not for lifting a load, e.g., so that the forklift vehicle can maneuver the fork assembly around the load 2811. For example, the blades can be positioned parallel to the fork beams, in order to minimize the effective width of the fork.

During operation, the forklift vehicle is driven toward the load 2811, so that the fork assembly surrounds the load with the fork beams positioned parallel with the long direction 2817 of the load, and the forklift vehicle facing the short direction 2816 of the load. The load 2811 can have foot beam or load beam 2815 running along the short direction 2816. The fork lifters are positioned at positions on the fork beams so that the blades 2842 can rotate to the gaps under the load bottom surface and not contacting the load beams 2815.

FIG. 28B shows a lifting configuration for the fork assembly 2820. After the fork assembly is properly positioned surrounding the load 2811, the rotate mechanism 2850 is activated to rotate the blades toward the load, e.g., so that the blades can be positioned under the load for lifting. The activation process can include lowering the fork assembly, followed by raising the fork assembly. After actuating the lifter blades, the fork assembly then can continue raise up to lift the load. The forklift vehicle can then move toward a destination for placing the load.

After reaching the destination, the fork assembly can be lowered until the load contacts the ground. The rotate mechanism can then be actuated to rotate the blades outside the load, such as to the position parallel to the fork beam. The same activation process can be used, e.g., including lowering the fork assembly, followed by raising the fork assembly. The forklift vehicle can then move backward to clear the fork assembly from the load.

FIG. 28C shows a rotate mechanism coupled between the fork beam 2821A and the lifter support 2841. For example, first and second slanting elements 2851 and 2855 are coupled to the fork beam 2821A. The lifter blade 2841 includes one or more pins 2861 disposed between the slanting surfaces of the first and second slanting elements. An optional spring 2862 is included for biasing the lifter support against the fork beam.

The rotate mechanism can allow the fork blades to rotate by an operator lowering and raising the fork assembly from the driver seat of the forklift vehicle.

Fork Lifter Coupled to Fork with a Rotate Mechanism

Figure 29A:
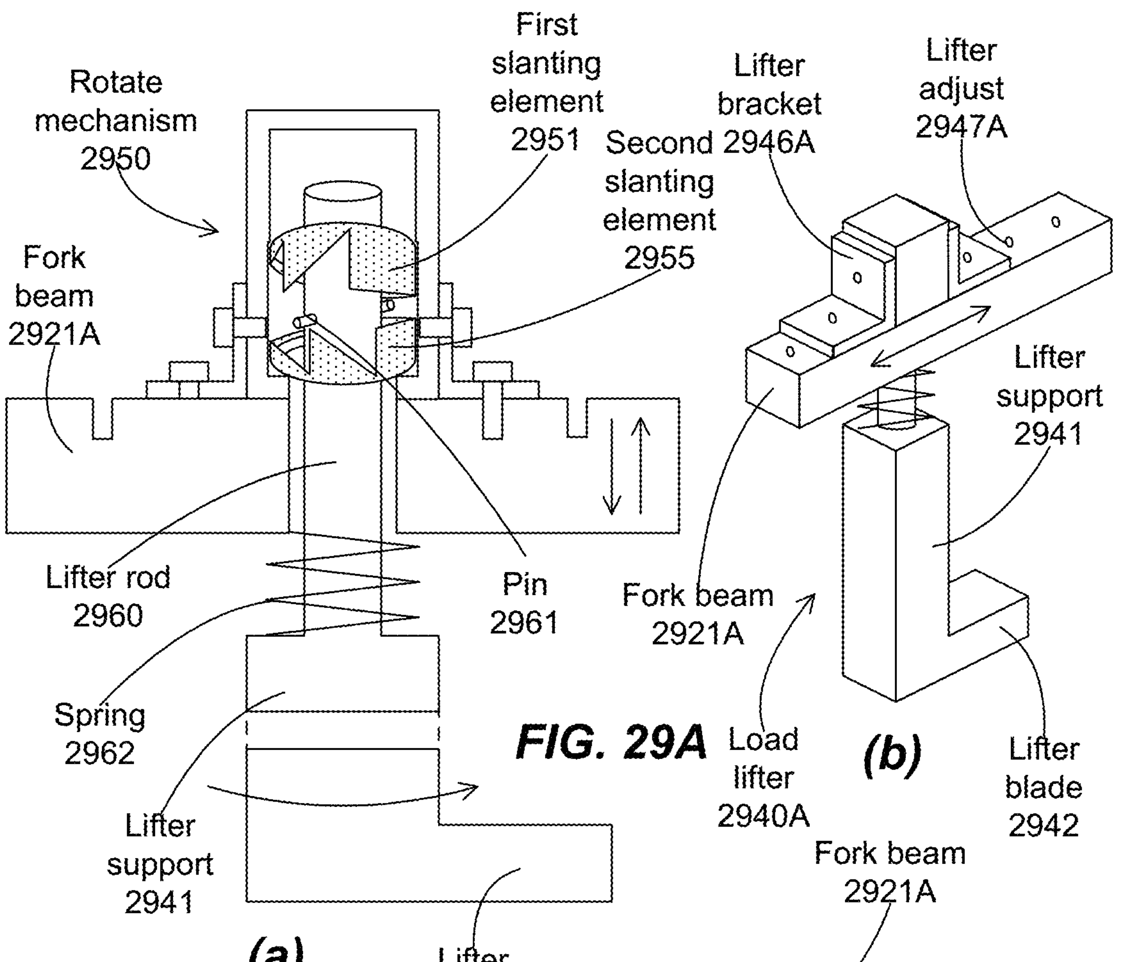
FIGS. 29A(a)(b)-29B(a)(b) illustrate coupling configurations of a fork lifter according to some embodiments.

FIGS. 29A(a)(b)-29B(a)(b) illustrate coupling configurations of a fork lifter according to some embodiments. FIGS. 29A(a)-29A(b) show a perspective view and a top view of a coupling configuration in which fork lifter is coupled to a top side of a fork beam. A fork lifter 2940A can include a lifter support 2941 coupled to a lifter blade 2942, with the lifter support coupled to a lifter rod 2960. The lifter rod can be a top portion of the lifter support. A rotate mechanism 2950 can be coupled to a top portion of a fork beam 2921A. For example, the rotate mechanism 2950 can include a housing containing first and second slanting elements 2951 and 2955. The housing can be coupled to the fork beam through lifter brackets 2946A. Multiple lifter adjusts 2947A can be formed along the fork beam, to allow adjustments of the load lifter along the fork beam.

The rotate mechanism 2950 can include the lifter rod 2960 disposed within the first and second slanting elements 2951 and 2955. One or more pins 2961 can be protruded from the lifter rod, such as disposing in opposite directions on the lifter rod 2960, for interacting with the first and second slanting elements 2951 and 2955.

The rotate mechanism can optionally include an actuator, such as a spring 2962, which is configured to bias the bottom portion of the lifter away from the top portion, e.g., the spring 2962 can function to push the blade away from the fork beam.

In operation, the fork beam can move down, e.g., toward the ground, for example, by an operator operating a carriage of the forklift vehicle in which the fork assembly is attached to. The ground contacting action due to the downward movement of the fork beam can exert a force on the blade, to push the lifter rod upward so that the pins can contact and slide on the slanting surface of the first slanting element to rotate a first angle.

The fork beam then can move up, for example, by the operator. Gravity, e.g., the weight of the blade or the load, can exert a force on the blade, to pull the lifter rod downward so that the pins can contact and slide on the slanting surface of the second slanting element to rotate a second angle. The combination of the first angle and the second angle can toggle the blade, from a non-liftable position to a lift position, such as from a position in which the blade is parallel to the fork beam to a position in which the blade is perpendicular to the fork beam and under the load.

Figure 29B:
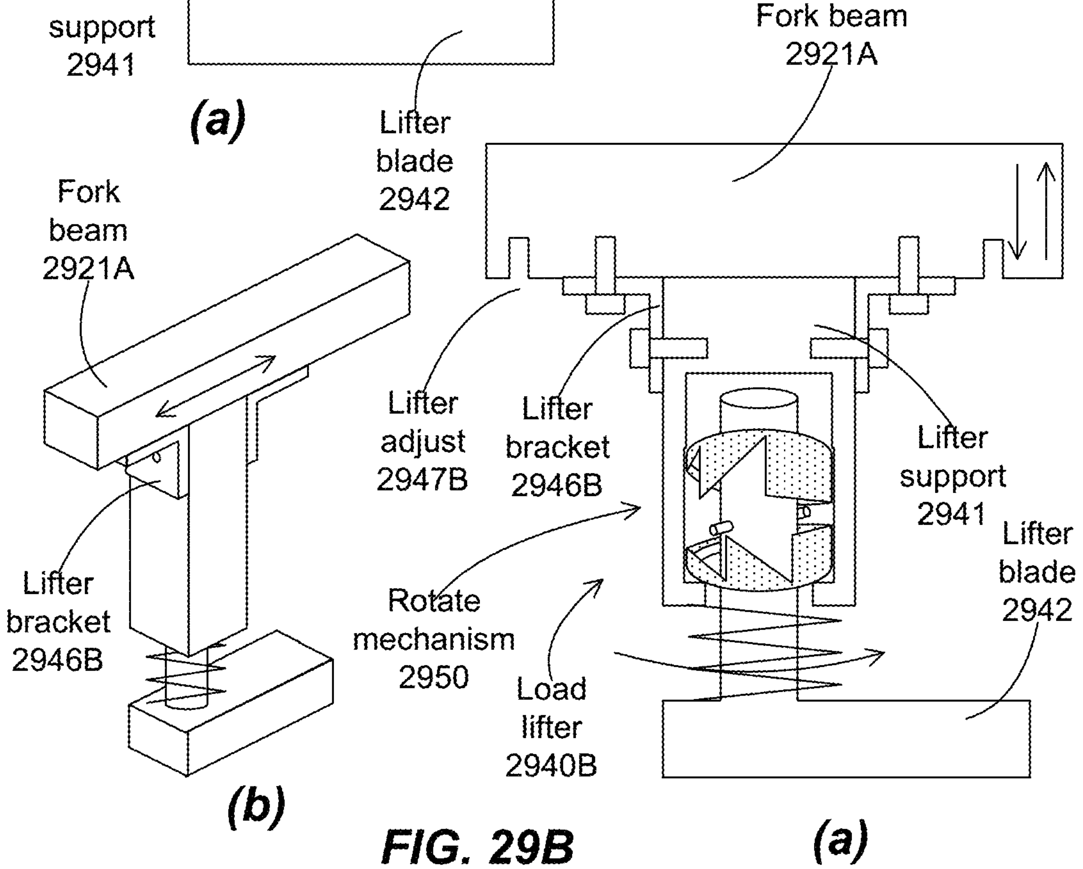

FIGS. 29B(a)-29B(b) show a perspective view and a top view of another coupling configuration in which fork lifter is coupled to a bottom side of a fork beam. A fork lifter 2940B can include a lifter support 2941 coupled to a lifter blade 2942, with the lifter support being the lifter rod 2960. Other configuration can be used, such as the lifter rod can be a top portion of the lifter support. A rotate mechanism 2950 can be coupled to a bottom side of a fork beam 2921A. For example, the rotate mechanism 2950 can include a housing containing first and second slanting elements. The housing can be coupled to the fork beam through lifter brackets 2946B. Multiple lifter adjusts 2947B can be formed along the fork beam, to allow adjustments of the load lifter along the fork beam.

Adjusting a Fork Lifter Position on a Fork Beam

Figure 30A:
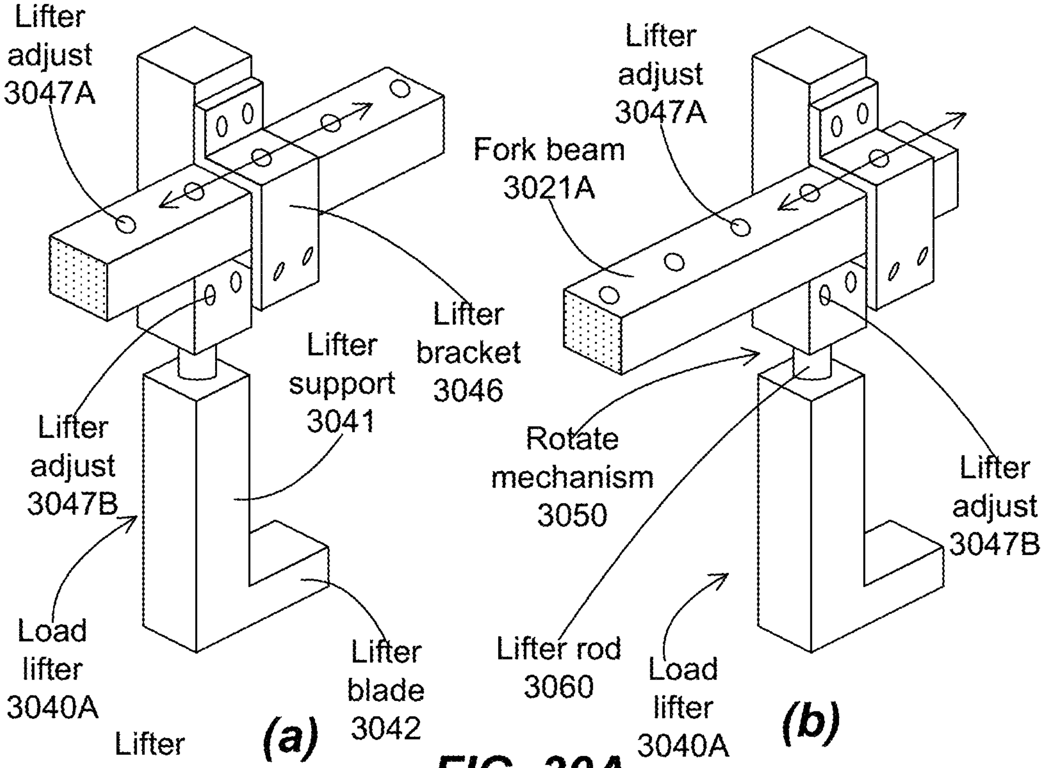
FIGS. 30A(a)(b)-30B(a)(b)(c) illustrate coupling configurations of a fork lifter according to some embodiments.

FIGS. 30A(a)(b)-30B(a)(b)(c) illustrate coupling configurations of a fork lifter according to some embodiments. FIG. 30A(a) shows a side coupling of a fork lifter to a fork beam. FIG. 30A(b) shows a side coupling of the fork lifter to another location on the fork beam. A fork lifter 3040A can include a lifter support 3041 coupled to a lifter blade 3042, with the lifter support coupled to a lifter rod 3060 at a top portion of the lifter support. A rotate mechanism 3050 can be coupled to a top portion of the fork lifter. The fork lifter can be coupled to a side of the fork beam 3021A through lifter brackets 3046. Multiple lifter adjusts 3047A can be formed along the fork beam, to allow horizontal adjustments of the load lifter along the fork beam. The fork lifter can be coupled to the fork beam 3021A at lifter adjusts 3047B among multiple lifter adjusts 3047B formed along the fork lifter, to allow vertical adjustments of the load lifter.

Figure 30B:
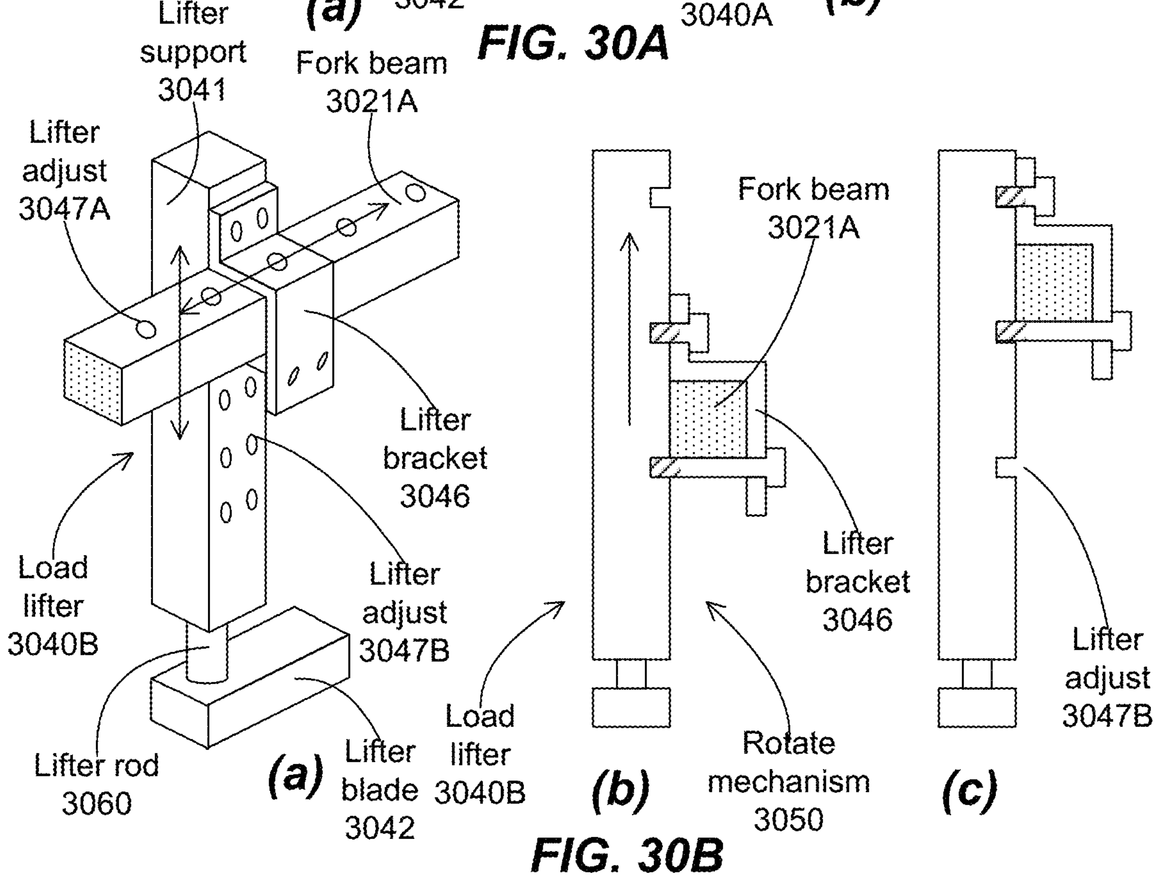

FIG. 30B(a) shows a perspective view of a side coupling of another fork lifter to a fork beam. FIGS. 30B(b)-30B(c) shows side views of the coupling of the fork lifter to different locations on the fork lifter. A fork lifter 3040B can include a lifter support 3041 coupled to a lifter blade 3042, with a lifter rod 3060 disposed between the lifter support and the lifter blade. A rotate mechanism 3050 can be coupled to a bottom portion of the lifter support. For example, the rotate mechanism 3050 can be disposed within the lifter support, including first and second slanting elements with the lifter rod disposed within the first and second slanting elements.

The fork lifter can be coupled to the fork beam through lifter brackets 3046. Multiple lifter adjusts 3047A can be formed along the fork beam, to allow horizontal adjustments of the load lifter along the fork beam. Also, multiple lifter adjusts 3047B can be formed along the lifter support, to allow vertical adjustments of the load lifter at a particular position on the fork beam.

Forming a Lifter

FIGS. 31A-31C illustrate a fork lifter for a fork assembly according to some embodiments. FIG. 31A shows a process to form a fork lifter, or a load lifter configured to lift a load, to allow an automatic rotation of a blade of the load lifter, e.g., the blade rotation can be controlled by an operator operating a forklift vehicle.

Operation 3100 forms a load lifter coupled to a fork for lifting a load. The load lifter includes a rotate mechanism coupled to the fork and a blade coupled to the rotate mechanism. The rotate mechanism is configured to rotate the blade between under the load and outside the load. The load lifter is configured to be coupled to the fork at discrete or continuous locations along a fork beam of the fork. The load lifter is configured to be coupled to the fork at discrete or continuous locations to adjust a height of the load lifter.

FIG. 31B shows a process to couple a fork lifter to a fork assembly depending on the load, e.g., the fork lifter can be positioned along a fork beam to balance a load and to allow a blade of the fork lifter to swing to a gap under the load.

Operation 3120 couples a load lifter to a fork for lifting a load. The load lifter includes a rotate mechanism coupled to the fork and a blade coupled to the rotate mechanism. The rotate mechanism is configured to rotate the blade between under the load and outside the load. The load lifter is configured to be coupled to the fork at discrete or continuous locations along a fork beam of the fork. The load lifter is configured to be coupled to the fork at discrete or continuous locations to adjust a height of the load lifter.

FIG. 31C shows a process to adjust a fork lifter along a fork assembly or at a location on the fork assembly e.g., the fork lifter can be positioned along a fork beam or can be adjusted up or down so that the blades can be slightly above the ground.

Operation 3140 adjusts a load lifter to a fork for lifting a load. The load lifter is positioned along a fork beam of the fork so that a blade of the load lifter is capable of rotating to under the load without obstruction. The load lifter is positioned along a support of the load lifter so that the blade is capable of rotating to under the load without obstruction.

Blade Configurations

In some embodiments, the fork lifter includes a blade configured to lift a load. Multiple blades from multiple fork lifters can be arranged around and under the load with good balance to prevent tipping. For example, a fork assembly can include 2 opposite forks configured to be placed at two sides of the load, such as at two parallel planes that are perpendicular to the front face of the forklift vehicle. Each fork can have two or more fork lifters disposed at or near two ends of the fork. For example, there can be 4 or 6 fork lifters disposed on two forks, e.g., there can be 2 or 3 fork lifters on each fork. The fork lifters can be disposed facing each other from two opposite forks, or can be disposed in any other configurations.

Figure 32A:
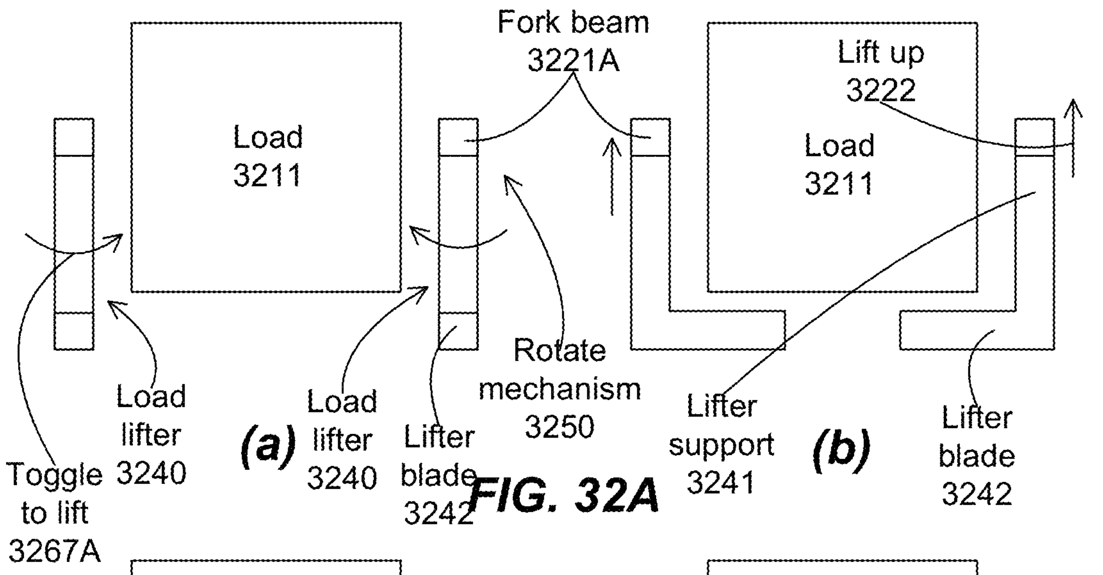
FIGS. 32A(a)(b)-32B(a)(b)-32C(a)(b) illustrate configurations for fork lifter blades in a fork assembly according to some embodiments.

FIGS. 32A(a)(b)-32B(a)(b)-32C(a)(b) illustrate configurations for fork lifter blades in a fork assembly according to some embodiments. FIGS. 32A(a)-32A(b) show a configuration in which two blades of two opposite fork lifters are disposed under the load for supporting the load. A forklift vehicle can move a fork assembly toward a load so that a fork assembly surrounds the load with two fork lifters 3240 disposed on opposite sides of a load 3211. The fork lifters can be facing each other, or can be offset from each other. As shown, the length of the blades is shorter than half the width of the load, e.g., the blades from two opposite fork lifters do not overlap or touch.

FIG. 32A(a) shows two fork beams 3221A disposed on both sides of a load 3211, for example, by a forklift vehicle moving a fork assembly around the load. A fork lifter 3240 is coupled to a fork beam, with a blade 3242 of the fork lifter disposed in parallel with the load. The fork lifters can be toggled to lift 3267A, for example, by rotating the fork support 3241, to move the blades from the position parallel to the load to a position under the load.

FIG. 32A(b) shows the blades after the toggling process to be under the load. As shown, the blades are shorter than half the width of the load, and do not touch or contact each other. The fork assembly can be lifted up 3222, e.g., the fork beam moving up. The blades contact the bottom of the load and the support the load for transferring to a new destination.

Figure 32B:
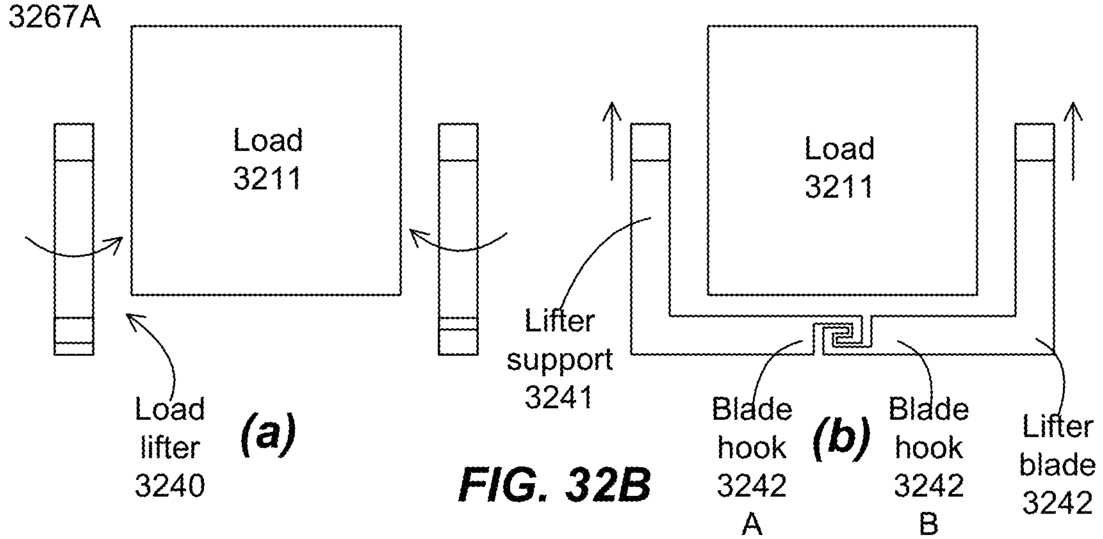

FIGS. 32B(a)-32B(b) show a configuration in which two blades of two opposite fork lifters are hooked together under the load for strengthening the support for the load. FIG. 32B(a) shows two fork beams disposed on both sides of a load 3211. FIG. 32B(b) shows the blades after being toggled to be under the load. As shown, the blades are slightly longer than half the width of the load, and are configured to hook together. For example, at the end of each blade, there is a hook, such as a hook 3242A for one blade and a mating hook 3242B for the opposite blade. The hooks are configured to couple the opposite blades in a direction along the length of the blades, e.g., in the direction across the load for strengthening the blade support for the load. The hooks are also configured to allow the blades to engage and release the hooks by rotating.

After rotating to the lift position, the blades are hooked together. The fork assembly can then move up to lift and transfer the load to a new destination.

Figure 32C:
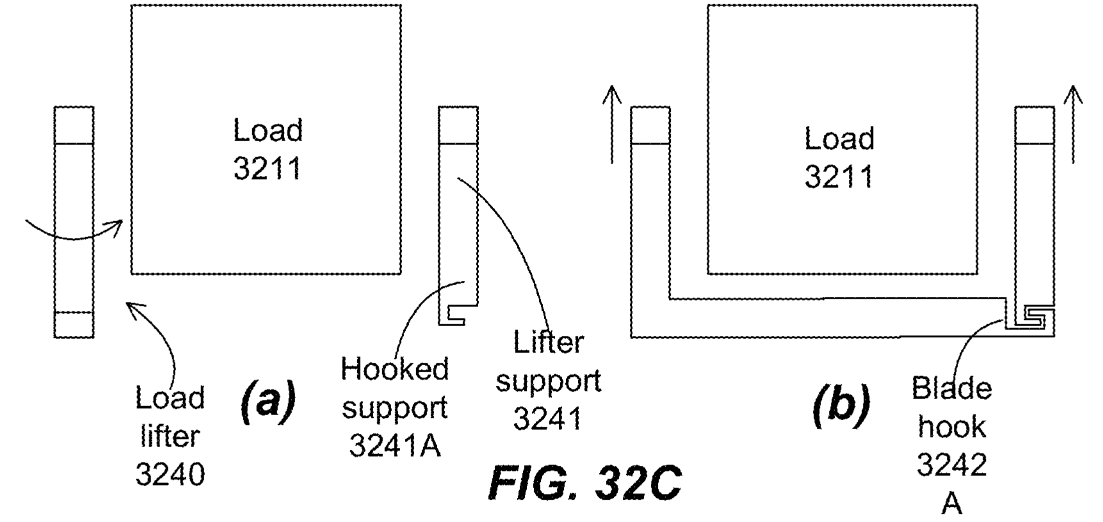

FIGS. 32C(a)-32C(b) show a configuration in which a blade includes a hook to hook into a mating hook at a body of an opposite fork lifter. FIG. 32C(a) shows two fork beams disposed on both sides of a load 3211, with each fork beam having one or more fork lifters. A fork lifter on a fork beam has a blade with an end hook. This fork lifter has a rotating mechanism for rotate the blade. Another fork lifter on an opposite fork beam does not have a blade, and has a mating hook. This fork lifter does not have a rotating mechanism. Thus, this fork lifter can be just a beam with one end coupled to the fork beam and an opposite end having a mating hook.

FIG. 32C(b) shows the blade of the fork lifter having a blade after being toggled to be under the load. As shown, the blade is longer than the width of the load, and is configured to hooked with the mating hook on the opposite fork lifter support. After rotating to the lift position, the blades are hooked together. The fork assembly can then move up to lift and transfer the load to a new destination.

Blade Configurations

FIGS. 33A-33C illustrate configurations for blades of a fork lifter according to some embodiments. The blades can be configured to rotate to be under the load and not touching or hooked together. Alternatively, a blade can be configured to hook to a support of the opposite fork lifter.

FIG. 33A shows configurations in which one or two blades are disposed hooked or unhooked under the load. Operation 3300 couples a fork lifter to each fork of a two-fork fork assembly. The fork assembly includes two forks, with a first fork lifter coupled to a first fork of the two forks, and a second fork lifter coupled to a second fork of the two forks. Each fork lifter has a rotating mechanism for rotating a blade from a position outside the load to a position under the load.

The blades of the fork lifters are configured to operate independently for lifting the load. In this case, the blades are straight blades, e.g., without any hook. Alternatively, the blades of the fork lifters are configured to be coupled together under the load when rotated to be under the load, with the fork lifters disposed in opposite sides of the load. In this case, one blade includes a hook at an end, and the other blade includes a mating hook at an end, with the hook and the mating hook configured to couple together when the fork lifters rotate to the lift position.

FIG. 33B shows a configuration in which there is only one blade configured to hook to a support of an opposite fork lifter. Operation 3320 forms a fork assembly having two forks, with a first fork lifter coupled to a first fork of the two forks, and a second fork lifter coupled to a second fork of the two forks. Only one fork lifter has a rotating mechanism for rotating a blade from a position outside the load to a position under the load, with the blade having a hook at an end. The other fork lifter is configured not to be rotated, such as not having a rotating mechanism, and not having an attached blade. The other fork lifter can have just a fork support beam, extended from the fork beam. The other fork lifter has a mating hook configured to be mated with the hook at the end of the blade of the opposite fork lifter. For example, the other fork lifter can have hook at an end of the fork support beam.

FIG. 33C shows a coupling process for a fork assembly having only one blade configured to hook to a support of an opposite fork lifter. Operation 3340 couples a fork lifter to each fork of a two-fork fork assembly. The fork assembly has two forks, with a first fork lifter coupled to a first fork of the two forks, and a second fork lifter coupled to a second fork of the two forks. Only one fork lifter has a rotating mechanism for rotating a blade from a position outside the load to a position under the load, with the blade having a hook at an end. The other fork lifter is configured not to be rotated, such as not having a rotating mechanism, and not having an attached blade. The other fork lifter can have just a fork support beam, extended from the fork beam. The other fork lifter has a mating hook configured to be mated with the hook at the end of the blade of the opposite fork lifter. For example, the other fork lifter can have hook at an end of the fork support beam.

Cable Lifter for a Fork Assembly

In some embodiments, the fork lifter can include a cable, e.g., a cable lifter, which can be used instead of the blade for lifting the load. The cable lifter can have a cable with a hook at an end for coupling with a mating hook of a cable from an opposite cable lifter. For example, a cable with an end hook can be disposed along a lifter support and a lifter blade. Two opposite cable lifters can rotate so that the hooks from the two cables engaged. The fork assembly can then be lifted up so that the cables support the load.

Figures 34A, 34B, 34C:
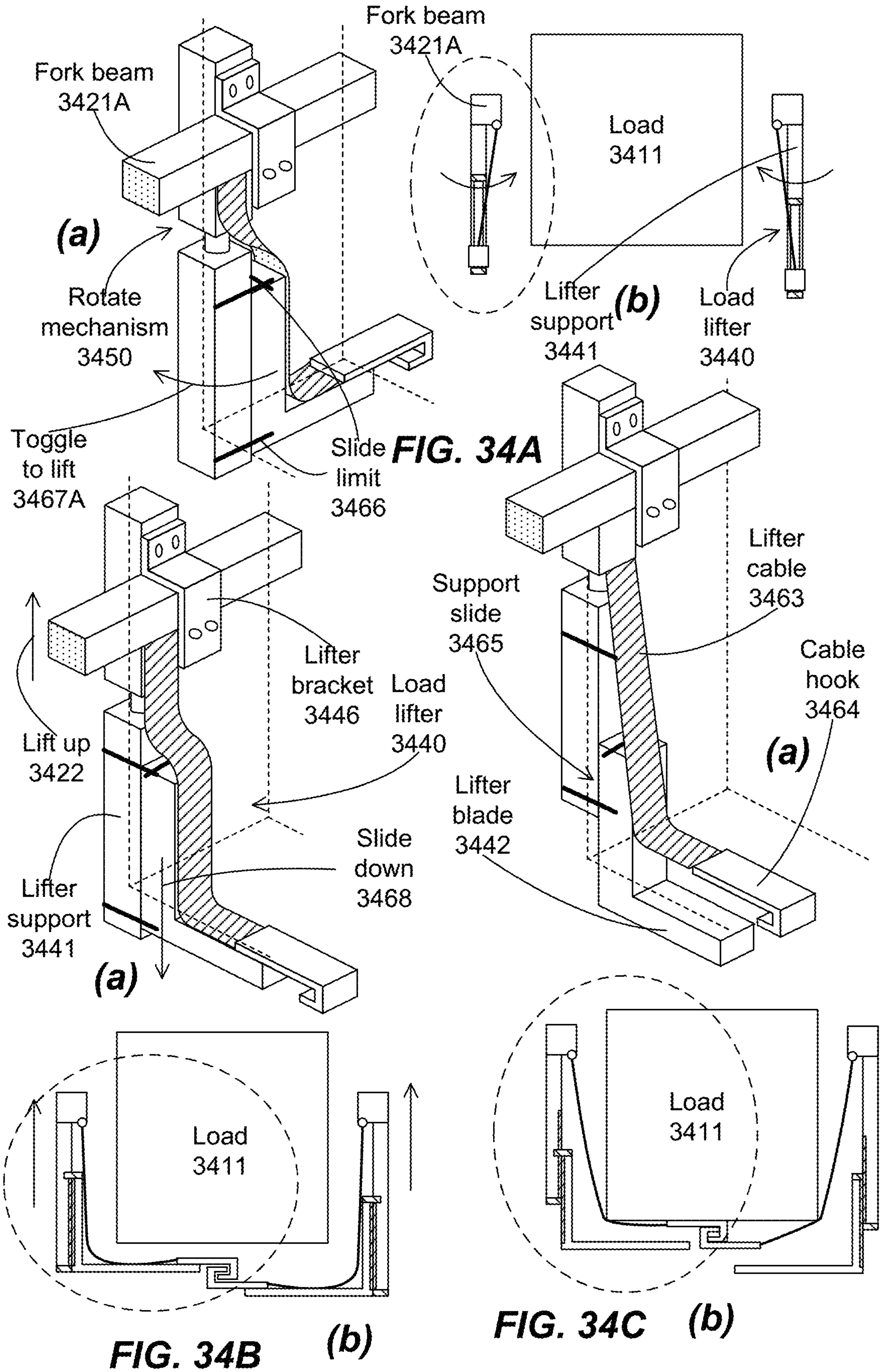
FIGS. 34A(a)(b)-34B(a)(b)-34C(a)(b) illustrate a process for operating a cable lifter according to some embodiments.

FIGS. 34A(a)(b)-34B(a)(b)-34C(a)(b) illustrate a process for operating a cable lifter according to some embodiments. FIGS. 34A(a)-34A(b) show a perspective view of a cable lifter and a front view of a fork assembly surrounding a load, e.g., after a forklift vehicle moves the fork assembly toward the load with the cable lifter being at rest or non-lifting configuration, such as the blade is parallel to the fork beam. A cable lifter 3440 can include a lifter support 3441 coupled to a lifter blade 3442. The cable lifter is coupled to a fork beam 3421A by a lifter bracket 3446 at a suitable location so that the blade can rotate to be under the load. As shown, a top portion of the lifter support is coupled to the fork beam. A rotating mechanism 3450 can be coupled to the cable lifter 3440, such as coupled between a top portion and a bottom portion of the lifter support, as indicated by a rod joining the two portions. The rod has one or more disposed between first and second slanting elements for rotating the rod when pushed against the first and second slanting elements. Other configurations for the rotating mechanism can be used, such as coupling to the top portion or to the bottom portion of the lifter support.

The lifter blade 3442 is coupled to the lifter support 3441 through a support slide 3465, which is configured to slide the lifter blade along a length of the lifter support. Optional slide limits 3466 can be included, to prevent the lifter blade from sliding away from the lifter support, or to prevent the lifter blade from sliding too far up the lifter support. The slide limits can include a magnetic coupling or a mechanical blockage at a bottom end or at an area of the lifter support. For example, the slide limits can include two limit bars extending from the lifter support at two extreme limit positions. The slide limits can include a contact bar coupled to a top end of the blade, which extends outward to contact the limit bars. Thus, the lifter blade can be constrained to slide along the lifter support between two slide limit bars. The slide limits can include a magnetic material, so that the contact bar can adhere to the limit bar with a weak force, e.g., the adhesion can be easily broken by exerting a force.

The cable lifter 3440 also includes a lifter cable 3463, which is coupled to a top portion of the cable lifter, such as to the top portion of the lifter support. The lifter cable 3463 runs along the lifter support and the lifter blade, such as along a side of the lifter support and then on top of the lifter blade. At the end of the lifter cable is a cable hook, which is configured to mate with a mating cable hook from a lifter cable of an opposite cable lifter.

FIGS. 34B(a)-34B(b) show a perspective view of the cable lifter and a front view of the fork assembly after the cable lifter toggles to a lift position 3467A, e.g., the blade rotates to be under the load. The cable hooks are mated, e.g., the hooks from the opposite cables engage after the opposite cable lifters rotate to the lift positions. The hooks can be configured to engage to each other along a direction along the blades, e.g., across the load between the two forks of the fork assembly. The hooks can be configured to allow the blades carrying the cables to engage or disengage the hooks. The fork assembly can be lifted up 3422, for example, by the forklift vehicle. After the blades engage with the load, a force on the blade can cause the blade to slide down 3468.

FIGS. 34C(a)-34C(b) show a perspective view of the cable lifter and a front view of the fork assembly after the fork assembly continues to lift up, causing the cables to be tightened under the load and the blades sliding down along the support slide 3465. The blade can continue to slide down until being stopped by the slide limits 3466. The load is now supported by the cables stretching between the forks of the fork assembly.

FIGS. 35A-35B illustrate a cable lifter for a fork assembly according to some embodiments. FIG. 35A forms a fork assembly having one or more cable lifters. Operation 3500 forms a fork assembly having two forks. At least a fork lifter, or a cable lifter, is coupled to at least a fork of the two forks. The fork lifter includes a rotate mechanism for rotating a blade The fork lifter includes a sliding mechanism for sliding the blade relative to another component of the fork lifter, such as to a fork support, or relative to the fork. The fork lifter includes a cable disposed on the blade, with the cable having a first hook at an end of the cable. The hooks from opposite fork lifters are configured for mating with each other.

In operation, when the opposite fork lifters rotate so that the blades of the fork lifters are disposed under the load, the hooks are hooked together. The cables are configured to move from the fork lifters to support the load when the fork assembly is raised up.

FIG. 35B operates a fork assembly having one or more cable lifters. Operation 3520 activates rotate mechanisms of load lifter coupled to a fork assembly to rotate blades under a load so that hooks coupled to cables on the blades are coupled together. Afterward, the fork assembly is lifted up so that the coupled cables support the load and the blades slide down the load lifters.

Moving a Forklift to Take a Load

In some embodiments, the fork assembly having fork lifters is configured for lifting and transferring a load. The load lifting is performed from sides of the load, for example, to account for loads that can only approach, but cannot be accessed, from the front. An advantage of the fork assembly is the ability to lift and transfer the load by an operator running the forklift vehicle, e.g., similar to a forklift vehicle accessing a load from the front of the load.

FIGS. 36A-36D illustrate a process for lifting and transferring a load according to some embodiments. In FIG. 36A, a forklift vehicle 3600 is driven toward a load 3611 to face the load at a direction parallel to load beams 3615 used to support the load. The forklift vehicle can have a fork assembly 3620, such as by attaching the fork assembly 3620 to the forklift vehicle, for example, to a carriage of the forklift vehicle so that the forklift vehicle can operate the fork assembly by an operator sitting at a console of the forklift vehicle. The fork assembly 3620 can include fork lifters 3640 coupled to the forks of the fork assembly for lifting the load from opposite sides of the load. The fork lifters can include rotation mechanisms for remote rotating blades of the fork lifters. The blades are positioned in non-lift position 3645, e.g., in a position to be outside the area between the forks, such as parallel to the forks. If the blades are positioned in lift position 3644, e.g., pointing toward the area between the forks or having any portion of the blades to be under a load to be picked up by the fork assembly, an operator can operate the fork assembly, such as moving the fork assembly down and up, to rotate the blades to the non-lift position.

The fork lifters can be adjusted, for example, to adjust 3648B the rotation direction of the blades from the non-lift position to the lift position, such as the fork lifters can be configured to provide the blades to be able to rotate to be under the load. For example, external blades can be positioned to rotate inward toward the load. As shown, the blade at the far left can be configured to rotate clockwise toward the load, while the blade at the far right can be configured to rotate counterclockwise toward the load.

The positions of the fork lifters along the forks can be adjusted, for example, to adjust 3648A the position of the lifter supports to avoid obstacles, such as to avoid the support beams 3615 under the load 3611.

In FIG. 36B, the forklift vehicle moves toward the load to place the load between the forks of the fork assembly. The forklift vehicle can have minor adjustment on the positions of the blades by moving the fork assembly toward or away from the load, such as to avoid the load beams. The operator of the forklift vehicle then can move the fork assembly downward in a first movement 3654 so that the blades contact the ground to provide an upward force on the blades.

The force on the blades activates the rotate mechanism, such as to drive a pin up to contact a first slanting surface, which can rotate the blades a first rotate angle 3651*, so that the blades rotate from the position outside the load 3645 to a position partially under the load.

In FIG. 36C, the operator of the forklift vehicle then can move the fork assembly upward in a second movement 3658 so that the blades contact the bottom of the load to provide a downward force on the blades. Alternatively, optional springs on the rotate mechanisms can exert a downward force on the blades. The force on the blades activates the rotate mechanism, such as to drive the pin down to contact a second slanting surface, which can rotate the blades a second rotate angle 3655*, so that the blades rotate from the position partially under the load to a position under the load 3644.

In FIG. 36D, the operator of the forklift vehicle then can continue to move the fork assembly upward 3622 to lift the load from the ground using the blades under the load. For the case of cable lifters, the support on the load can be provided by the cables instead of by the blades. The forklift vehicle then can move the load to a destination.

FIG. 37 illustrates a flow chart for moving a forklift to take and transport a load according to some embodiments. Operation 3700 mounts a fork assembly to a forklift. Operation 3710 optionally adjusts a lateral position of a load lifter along a fork beam of a fork of the fork assembly to clear a rotation of a blade of the fork lifter from a load beam. Operation 3720 optionally adjusts a height of the load lifter to allow the blade to freely move to a gap between a bottom of a load and the ground. Operation 3730 optionally adjusts a distance between the forks of the fork assembly to be larger than a dimension of the load. Operation 3740 moves the forklift to position the load to be between 2 forks of the fork assembly and the blade above the ground. Operation 3750 moves the fork assembly downward to exert an upward force on the blade for rotating the blade a first angle to be under the load. Operation 3760 moves the fork assembly upward to exert a downward force on the blade for rotating the blade a second angle to be under the load. Operation 3760A optionally mates hooks on the blades in the case of hooked blades. Operation 3760B optionally mates hooks on cables disposed on the blades in the case of cable lifters having hooked cables. Operation 3770 continues moving the fork assembly upward to lift the load off the ground. Operation 3770A optionally moves upward for the blades to contact the load. Alternatively, operation 3770B optionally moves upward for the cables to contact the load. Operation 3780 transports the load by moving the forklift to a destination.

Moving a Forklift to Release a Load

Figures 38A, 38B, 38C, 38D:
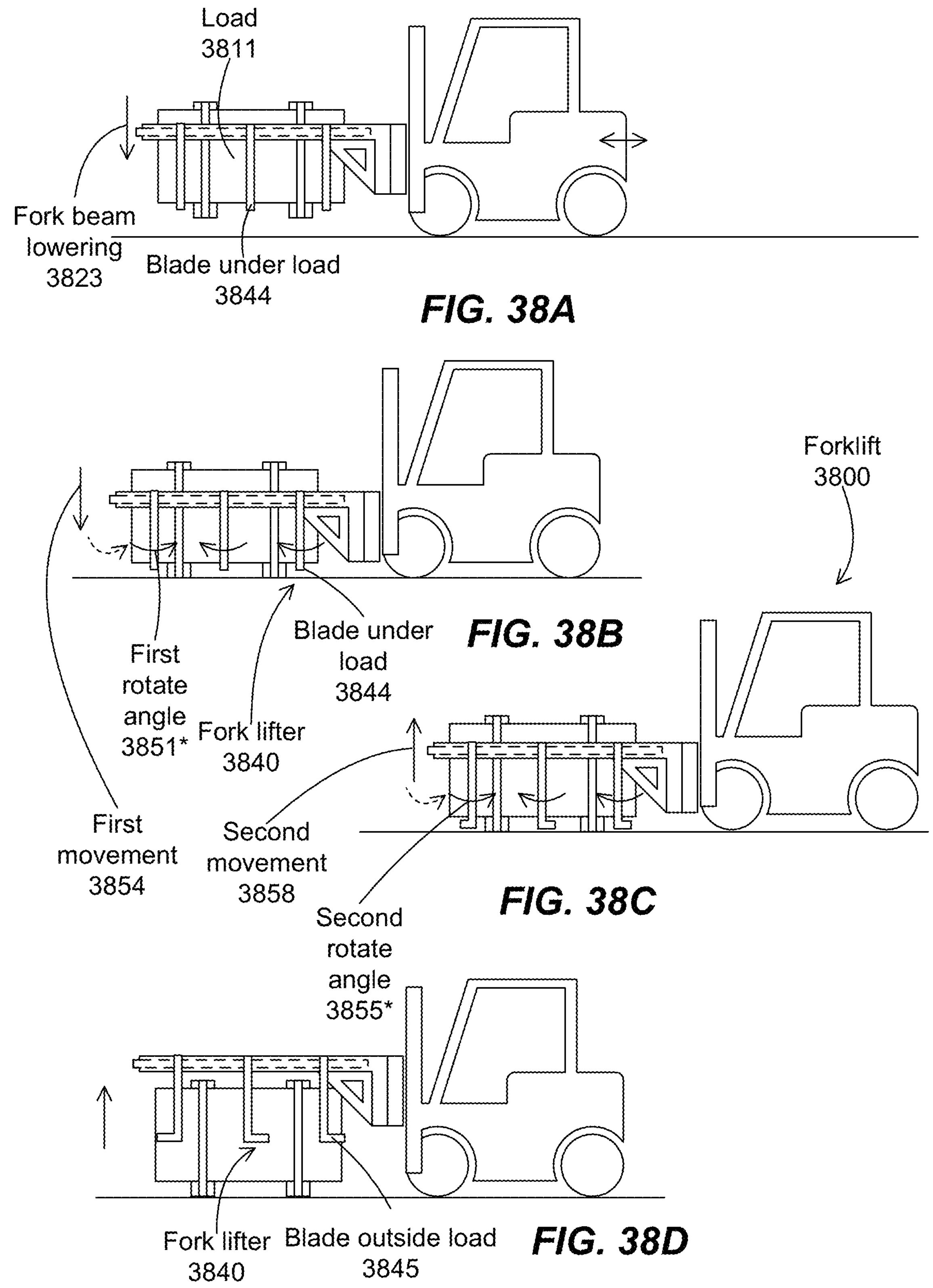
FIGS. 38A-38D illustrate a process for releasing a load after reaching a destination according to some embodiments.

FIGS. 38A-38D illustrate a process for releasing a load after reaching a destination according to some embodiments. In FIG. 38A, a forklift vehicle 3800 drives a load 3811 to a destination, with the blades of the fork lifters coupled to the fork assembly are in lift position 3844. After reaching the destination, the operator of the forklift vehicle then can move the fork assembly downward, e.g., the fork beams of the forks are lowered 3823.

In FIG. 38B, the operator of the forklift vehicle then can further move the fork assembly downward in a first movement 3854 so that the blades contact the ground to provide an upward force on the blades. The force on the blades activates the rotate mechanism, such as to drive a pin up to contact a first slanting surface, which can rotate the blades a first rotate angle 3851*, so that the blades rotate from the position under the load 3844 to a position partially under the load.

In FIG. 38C, the operator of the forklift vehicle then can move the fork assembly upward in a second movement 3858 so that the blades contact the bottom of the load to provide a downward force on the blades. Alternatively, optional springs on the rotate mechanisms can exert a downward force on the blades. The force on the blades activates the rotate mechanism, such as to drive the pin down to contact a second slanting surface, which can rotate the blades a second rotate angle 3855*, so that the blades rotate from the position partially under the load to a position outside the load 3846.

In FIG. 38D, the operator of the forklift vehicle then can continue to move the fork assembly upward to velar the fork assembly from the load. The forklift vehicle then can move the empty fork assembly away from the load. The forklift vehicle can move to a new load for lifting and transferring the new load to a new destination. Alternatively, the fork assembly can be un-mounted from the forklift vehicle.

FIG. 39 illustrates a flow chart for moving a forklift to release a load according to some embodiments. Operation 3900B optionally moves the fork assembly downward until cables of fork lifters coupled to the fork assembly are disposed on blades of the fork lifters, in the case of cable lifters coupled to the fork assembly. Operation 3910 moves the fork assembly downward to exert an upward force on the blade for rotating the blade a first angle toward outside the load. Operation 3910A optionally releases hooks on the blades. Operation 3910B optionally releases hooks on the cables. Operation 3920 moves the fork assembly upward to exert a downward force on the blade for rotating the blade a second angle to be outside the load. Operation 3930 continues moving the fork assembly upward to clear the blades off the ground. Operation 3940 moves the forklift away from the load. Operation 3950 optionally unmounts the fork assembly from the forklift.

Fork Extension with Rotate Mechanism

In some embodiments, the present invention discloses an accessory for a forklift vehicle, such as a fork assembly having fork extensions for attaching to the forklift vehicle for pulling a load. The fork extensions coupled to the fork assembly can function as a towing attachment, configured for pulling on a load disposed far away from the forklift vehicle, e.g., farther than the reach of the for assembly. In conjunction with the forks on the fork assembly for lifting a load, the fork extension can be used for pulling the load from far-away toward the forklift vehicle so that the forks can be used to lift the load.

Figures 40A, 40B, 40C:
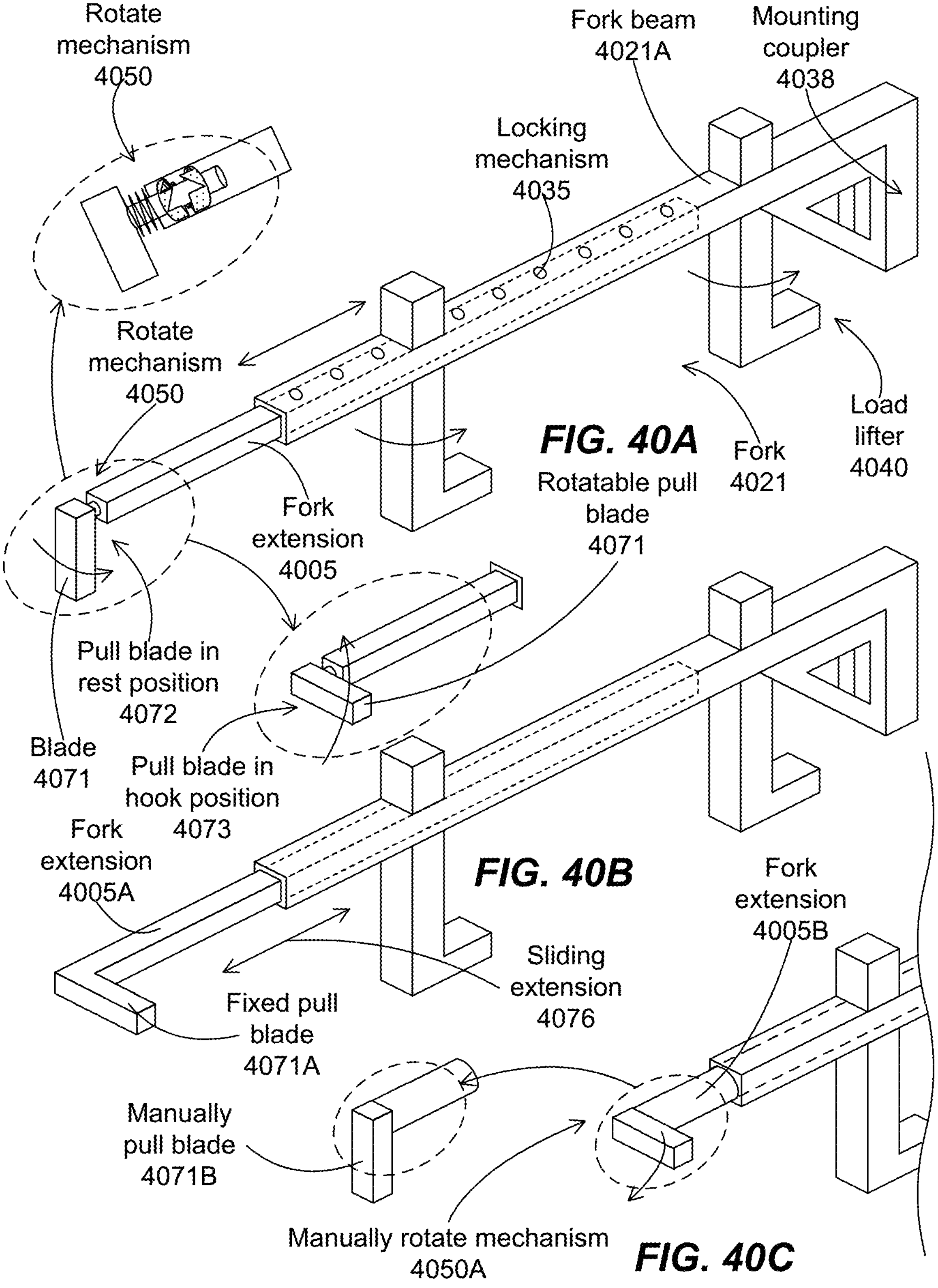
FIGS. 40A-40C illustrate configurations for a fork extension according to some embodiments.

FIGS. 40A-40C illustrate configurations for a fork extension according to some embodiments. FIG. 40A shows a configuration in which a fork extension 4005 can be remotely rotated, for example, by an operator operating a forklift vehicle. The remote rotation ability can be accomplished by a rotate mechanism 4050 having one or more pins interfacing with two slanting surfaces.

A fork 4021 of a fork assembly can include a fork beam 4021A, such as a hollow tube. A mounting coupler 4038 can be coupled to an end of the fork beam so that the fork beam can be coupled to a mounting body or to a forklift vehicle. One or more fork lifters 4040 can be coupled to the fork beam for lifting the load. The fork lifters can include a rotate mechanism for remotely rotating blades between a non-lift position and a lift position.

Coupling to an opposite end of the fork beam is the fork extension 4005. For example, the fork extension 4005 can be disposed within a hollow portion of the fork beam, e.g., the fork extension can slide 4076 along the fork beam. In a fully retract position, the fork extension can be mostly stored in the fork beam. In a fully extended position, the fork extension can extend a length of the fork beam to be almost double the length of the fork beam.

A locking mechanism 4035 can be included to secure the fork extension to the fork beam, such as to place the fork extension at a particular extended position or to prevent the fork extension from slipping away from the fork beam. For example, the locking mechanism 4035 can include multiple spaced holes along the length of the fork beam. The locking mechanism 4035 can include a pin at the fork extension, such as a pin biased to be protruded from the fork extension by a spring. The pin is configured to mate with any of the multiple spaced holes, so that the pin can come out of any hole and secure the fork extension to the fork beam. Alternatively, or additionally, the fork beam can have a guard at the extended end, and the fork extension can be a guard plate at an inner end, e.g., the end in the fork beam. The guard can be mated with the guard plate, to prevent the fork extension from moving out of the fork beam.

At the outer end, e.g., the exposed end, of the fork extension, there is a blade 4071, which can be configured for pulling on a load. For example, the blade 4071 can be at a rest position 4072, which can be pointing not-toward from the load, such as away from the load or parallel to the load, e.g., either pointing upward or downward as shown. The blade 4071 can be at a hook position 4073, which can be pointing toward the load, such as parallel to the load as shown. For example, in the hook position, the left blade, e.g., the blade from the fork extension on the left fork beam as view from the operator sitting on the forklift vehicle, points to the right toward the load, and the right blade points to the left, also toward the load. With the blade in hook position, the fork extension can be able to pull the load when the forklift vehicle moves backward.

In some embodiments, the blade 4071 on the fork extension 4005 can be configured to be remotely or automatically rotate between a rest position 4072, e.g., a non-pullable position 4072 in which the blade is not configured for pulling on a load, to a hook position 4073, e.g., a pullable position 4073 in which the blade is configured for pulling on a load. A rotate mechanism 4050 can be coupled to the blade 4071 so that the blade 4071 can rotate by an operator operating the fork assembly having the forks 4021, such as pushing the fork assembly to contact a surface, and to retract the fork assembly from the surface.

FIG. 40B shows another configuration of a fork extension 4005A in which a blade 4071A is fixed coupled to the fork extension. For the fixed blade configuration, the two forks on the fork assembly can be open wide, e.g., the distance between the two forks can be so that distance between the tips of the blades is larger than the width of the load. In this configuration, the fork assembly can move forward so that the load is disposed between the two fork extensions. The forks can then narrow, e.g., the two forks move toward each other until the blades can hook on the load.

Alternatively, the fork assembly can be lifted up above the load so that the blades are clear from the load. The fork assembly can move forward until the blades pass the end of the load. The fork assembly then can lower, until the blades can hook on the load.

FIG. 40C shows another configuration of a fork extension 4005B in which a blade 4071B is fixed coupled to the fork extension with the fork extension manually rotatable in the fork beam. Alternatively, the blade can be manually rotatably coupled to the fork extension, with the fork extension not rotatable in the fork beam. In these configurations, an operator can manually rotate the blades to a pullable position from the two fork extensions after the fork extensions surround the load. Alternatively, the fork extension having a manually rotatable blade can be operated as a fork extension having a fixed blade, by rotating the blade into the pullable position.

Figure 41A:
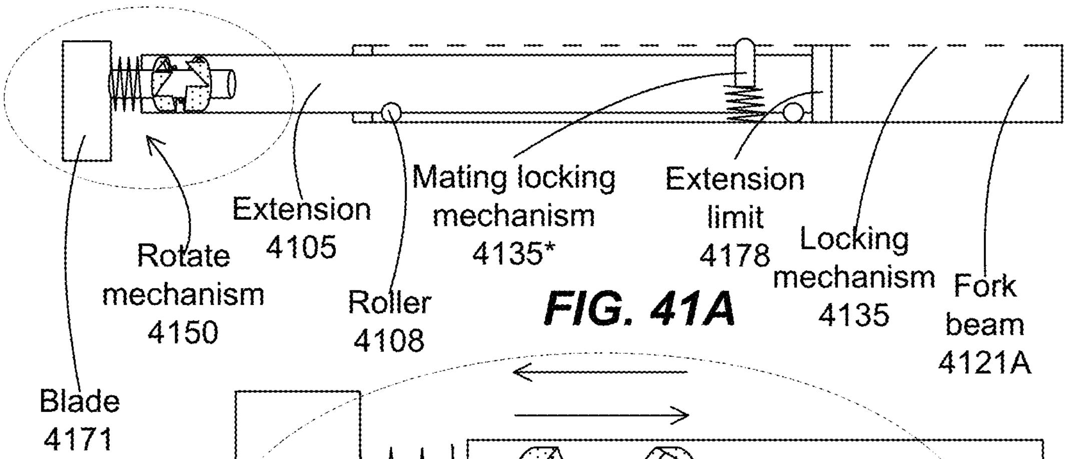
FIGS. 41A-41C illustrate a configuration of a fork extension having a rotate mechanism according to some embodiments.
Figure 41B:
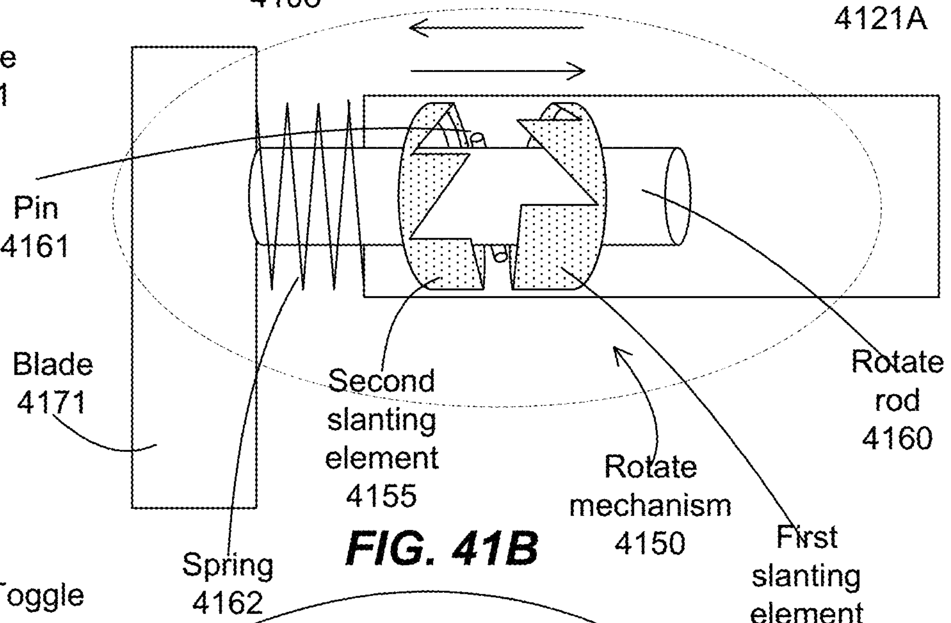
Figure 41C:
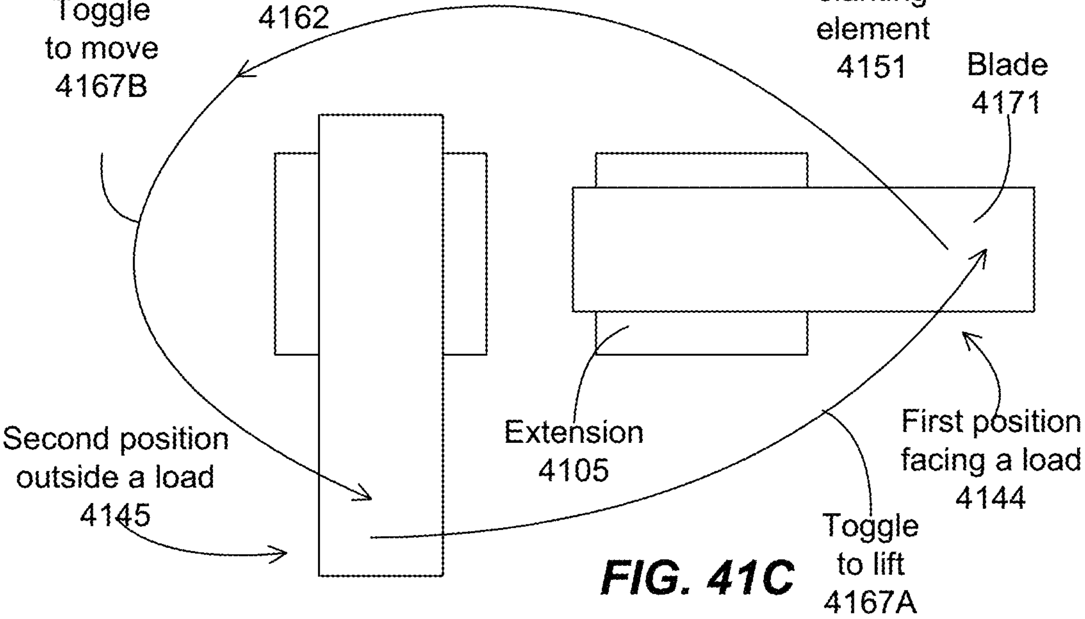

FIGS. 41A-41C illustrate a configuration of a fork extension having a rotate mechanism according to some embodiments. The rotate mechanism can be a remote rotate mechanism, e.g., rotatable by an operator operating the forklift vehicle. In some embodiments, the remote rotate mechanism can be considered as an automatic rotate mechanism, sine the rotate mechanism can automatically rotate a blade without an operator contacting the blade.

FIG. 41A shows a side view of a fork extension 4105 coupled to a fork beam 4121A. The fork extension 4105 can include a blade 4171 coupled to the fork extension through a rotate mechanism 4150. The fork extension is coupled to the fork beam by sliding within the hollow portion of the fork beam. Rollers 4108 can be used for ease of sliding, for example, a roller can be disposed at the extreme inner end of the fork extension, and another roller can be disposed at the opening of the fork beam.

An extension limit 4178 can be used to prevent the fork extension from dropping out of the fork beam, e.g., preventing the fork extension from extending too far from the fork beam. The extension limit 4178 can include a guard plate at the extreme inner end of the fork extension and a guard at the opening of the fork beam. The guard can have an opening for the fork extension to pass through, but not the guard plate at the end of the fork extension.

A locking mechanism 4135 and 4135* can be used to secure the fork extension at a desire extended length. The locking mechanism 4135 can include one or more holes on the fork beam. The locking mechanism 4135* can include a pin biased by a spring on the fork extension. The pin can be configured to mate with the holes on the fork beam, such as a diameter of the pin is slightly smaller than the diameter of the holes. When the fork extension is extended, the locking mechanism 4135 can secure the fork extension at discrete locations, by the pin protruding into an appropriate hole.

FIG. 41B shows an enlarged view of a rotate mechanism 4150. The rotate mechanism 4150 can include first and second slanting elements 4151 and 4155, with each slanting element having one or more slanting surfaces. A rod 4160 can be disposed within the slanting elements, with one or more pins 4161 disposed between the first and second slanting elements. The pins are configured to interface with the slanting surfaces on the slanting elements for rotating the rod 4160. An actuator 4162, such as a spring, can be used to bias the rod against the fork beam. For example, the spring can be used to bias the rod to an extended position, e.g., so that the pins contact the slanting surfaces on the second slanting element. A blade 4171 is coupled to the rod, such as fixed coupled.

In operation, the fork extension can move in a direction from the fork beam toward the blade until hitting a surface. After contacting the surface, the fork extension can move a little further, so that the blade and the rod are pushed toward the fork extension. The pins then contact the first slanting element and the rod rotates a first angle when the pins slide along the slanting surface of the first slanting element.

The fork extension can then move in an opposite direction, e.g., in the direction from the blade toward the fork extension. The spring 4162 can push the blade and the rod away from the fork extension, causing the pins to contact the slanting surface of the second slanting element. Alternatively, the blade can contact the load and caused the rod to move from the first slanting element to the second slanting element. The rod then rotates a second angle when the pins slide along the slanting surface of the second slanting element. The combination of the first and second angle can toggle 4167B the blade between a rest position, e.g., a second position outside a load 4145, and a pull position, e.g., a first position facing the load 4144, as shown in FIG. 41C.

FIGS. 42A-42C illustrate configurations for a fork extension according to some embodiments. FIG. 42A shows a fork extension with a rotate mechanism. Operation 4200 forms a fork having a fork extension for extending a length of the fork. The fork extension is configured to be slidable along the length of the fork. The fork extension optionally has a limiter for preventing the fork extension from sliding out of the fork. The fork extension optionally has rollers for ease of sliding. The fork extension optionally has a locking mechanism for locking to discrete extension positions along the fork length. The fork extension has a rotate mechanism coupled to the fork extension and a blade coupled to the rotate mechanism. The rotate mechanism is configured to rotate the blade between facing the load (sideway toward the load) and outside the load (downward or upward).

FIG. 42B shows a fork extension with a fixed blade. Operation 4220 forms a fork having a fork extension for extending a length of the fork. The fork extension has a fixed blade at an end facing the load (sideway toward the load).

FIG. 42C shows a fork extension with a manual rotate mechanism. Operation 4240 forms a fork having a fork extension for extending a length of the fork. The fork extension has a fixed blade coupled to a manually rotate mechanism configured to rotate the blade between facing the load (sideway toward the load) and outside the load (downward or upward).

Fork Extension for Pull Load

In some embodiments, the fork assembly having fork extensions is configured for pulling a load closer to the forklift vehicle so that the forks can lift and transfer the load. The load pulling is performed by the fork extensions, for example, with the blades on the fork extensions rotated to the pullable position. The rotation of the blades can be performed remotely by an operator running the forklift vehicle.

Figure 43A:
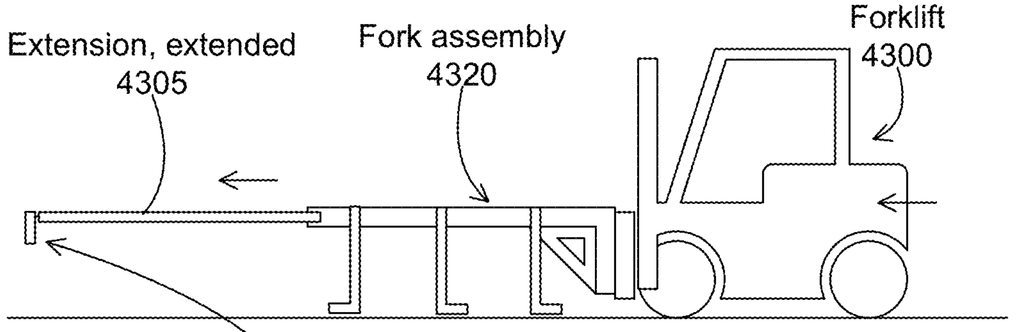
FIGS. 43A-43D illustrate a process for pulling a load according to some embodiments.

FIGS. 43A-43D illustrate a process for pulling a load according to some embodiments. In FIG. 43A, a forklift vehicle 4300 can have a fork assembly 4320, such as by attaching the fork assembly 4320 to the forklift vehicle, for example, to a carriage of the forklift vehicle so that the forklift vehicle can operate the fork assembly by an operator sitting at a console of the forklift vehicle. The fork assembly 4320 can include fork extensions 4305 coupled to the fork beams of the fork assembly. The fork extensions are extended, for example, by a distance to reach an end of the load 4311.

The fork extensions can include rotation mechanisms for remote rotating blades of the fork extensions. The blades are positioned in non-pullable or rest position 4372, e.g., in a position to be outside the area between the forks, such as parallel to the forks. If the blades are positioned in pullable or hook position 4373, e.g., pointing toward the area between the forks or having any portion of the blades to be contacted by a load when pulling, an operator can operate the fork assembly, such as moving the fork assembly forward and backward, to rotate the blades to the non-pullable position.

Figure 43B:
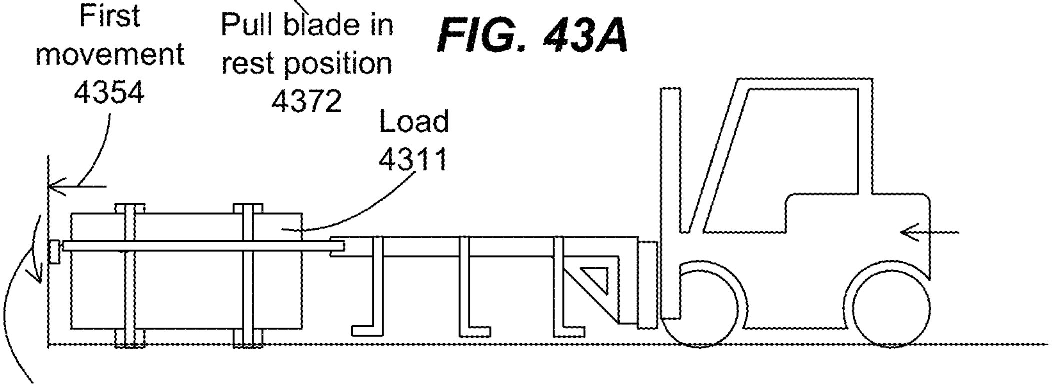

In FIG. 43B, the forklift vehicle moves toward the load to place the load between the fork extensions of the fork assembly. The operator of the forklift vehicle then can move the fork assembly forward in a first movement 4354 so that the blades contact a surface to provide a backward force on the blades. The force on the blades activates the rotate mechanism, such as to drive a pin backward to contact a first slanting surface, which can rotate the blades a first rotate angle 4351*, so that the blades rotate from the position 4372 outside the load to a position partially toward the load.

Figure 43C:
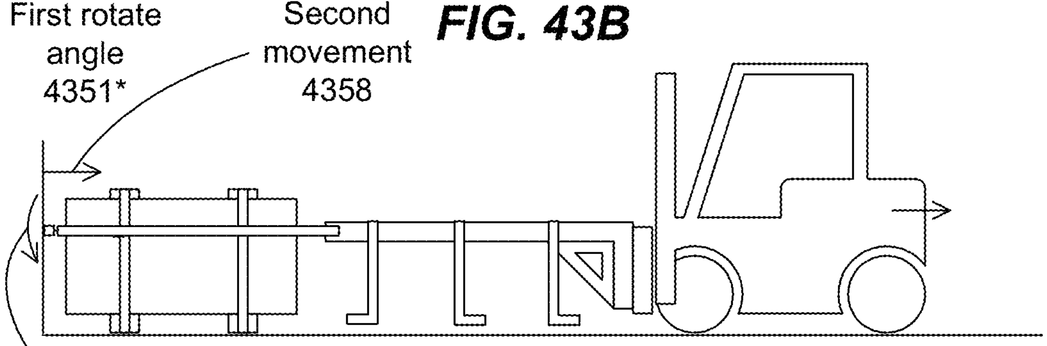

In FIG. 43C, the operator of the forklift vehicle then can move the fork assembly backward in a second movement 4358 so that the blades contact the load to provide a forward force on the blades. Alternatively, optional springs on the rotate mechanisms can exert a forward force on the blades. The force on the blades activates the rotate mechanism, such as to drive the pin forward to contact a second slanting surface, which can rotate the blades a second rotate angle 4355*, so that the blades rotate from the position partially toward the load to a position 4373 for pulling the load.

Figure 43D:
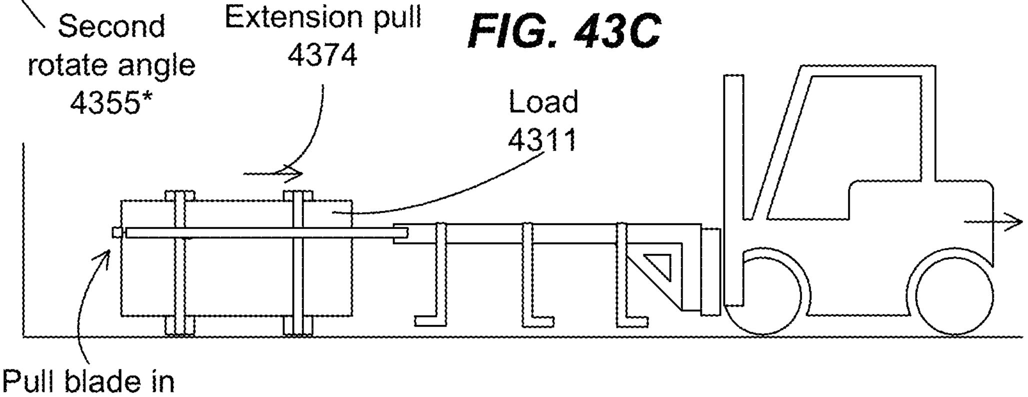

In FIG. 43D, the operator of the forklift vehicle then can continue to move the fork assembly backward 4374 to pull the load backward using the blades contacting the load. The forklift vehicle stops pulling when the load is pulled to a desired location, such as a location that the load can be accessible by the fork assembly.

Fork Extension Retract after Pull Load

Figure 44A:
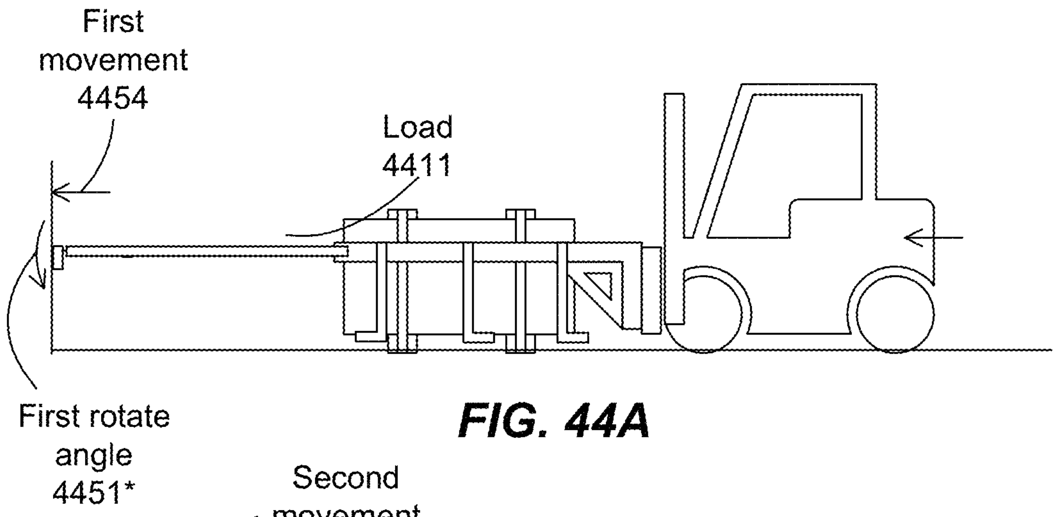
FIGS. 44A-44C illustrate a process for retracting the fork extensions according to some embodiments.
Figure 44B:
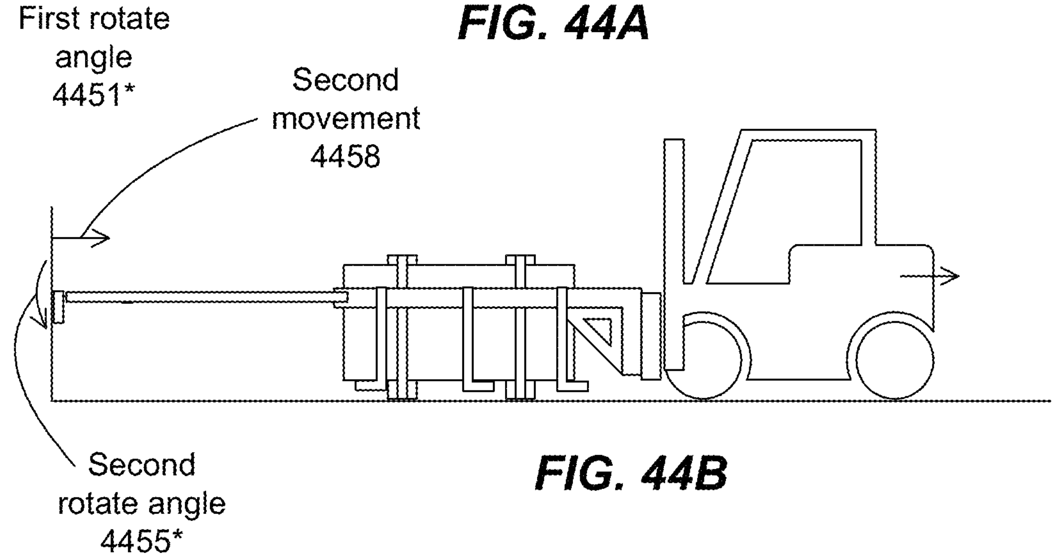
Figure 44C:
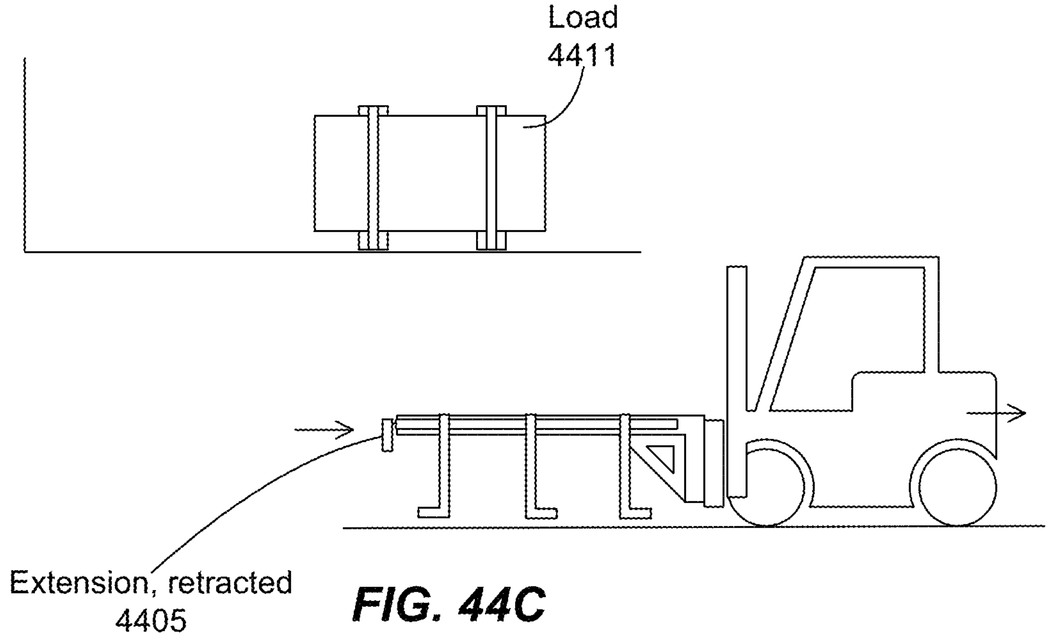

FIGS. 44A-44C illustrate a process for retracting the fork extensions according to some embodiments. In FIG. 44A, after finish pulling a load 4411 to a desired location, the forklift vehicle 4400 can move forward passing the load in a first movement 4454 so that the blades contact a surface to provide a backward force on the blades. The force on the blades activates the rotate mechanism, such as to drive a pin backward to contact a first slanting surface, which can rotate the blades a first rotate angle 4451*, so that the blades rotate from the pullable position, e.g., the position toward the load, to a position partially toward the load.

In FIG. 44B, the operator of the forklift vehicle then can move the fork assembly backward in a second movement 4458 so that the springs on the rotate mechanisms can exert a forward force on the blades. The force on the blades activates the rotate mechanism, such as to drive the pin forward to contact a second slanting surface, which can rotate the blades a second rotate angle 4455*, so that the blades rotate from the position partially toward the load to a non-pullable position.

In FIG. 44C, the fork extensions can be retracted, for example, by the operator of the forklift vehicle.

Operation of Fork Extension

FIGS. 45A-45B illustrate operations of the fork extensions according to some embodiments. FIG. 45A shows a process for pulling a load using the fork extensions. Operation 4500 extends a fork extension out of a fork of the fork assembly. Operation 4510 adjusts a blade of the fork extension to be outside of a load (downward, upward, or outward from the load). Operation 4520 moves the forklift to position the load to be between 2 fork extensions of the fork assembly. Operation 4530 moves the fork assembly forward to contact a surface to exert a force toward the fork extension on the blade for rotating the blade a first angle toward facing the load. Operation 4540 moves the fork assembly backward to exert a force away from the fork extension on the blade (by hooking on the load or by a bias spring) for rotating the blade a second angle to be facing the load. Operation 4550 continues moving the fork assembly backward to pull the load toward the forklift.

FIG. 45B shows a process for return the fork extensions to non pullable positions. Operation 4560 moves the fork assembly forward to contact a surface to exert a force toward the fork extension on the blade for rotating the blade a first angle toward outside the load. Operation 4570 moves the fork assembly backward to exert a force away from the fork extension on the blade (by hooking on the load or by a bias spring) for rotating the blade a second angle to be outside the load. Operation 4580 continues moving the fork assembly backward to move the fork assembly away from the load. The fork extensions can be retracted back into the fork beams of the fork assembly.

Figure 46A:
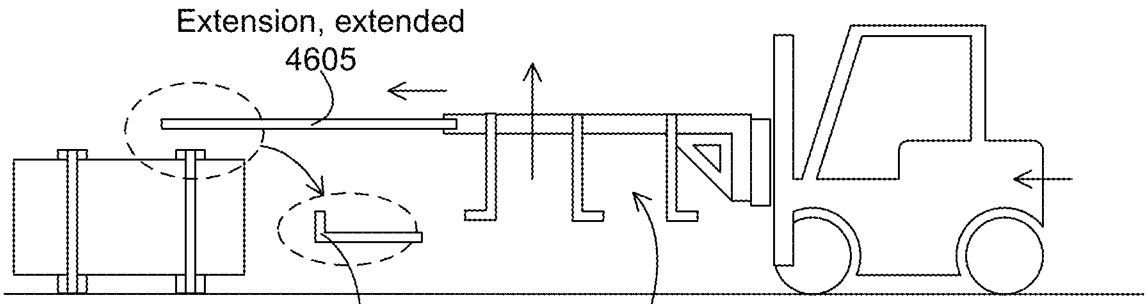
FIGS. 46A-46D illustrate an operation of a fork extension having fixed or manually rotate blade according to some embodiments.

FIGS. 46A-46D illustrate an operation of a fork extension having fixed or manually rotate blade according to some embodiments. In FIG. 46A, a forklift vehicle 4600 can have a fork assembly 4620, such as by attaching the fork assembly 4620 to the forklift vehicle, for example, to a carriage of the forklift vehicle so that the forklift vehicle can operate the fork assembly by an operator sitting at a console of the forklift vehicle. The fork assembly 4620 can include fork extensions 4605 coupled to the fork beams of the fork assembly. The fork extensions are extended, for example, by a distance to reach an end of the load 4611.

The fork extensions can include fixed blades 4671* pointing toward the load, or manually rotatable blades rotated toward the load, or remotely rotatable blades rotated toward the load. The blades are positioned in pullable or hook position, e.g., pointing toward the area between the forks or having any portion of the blades to be contacted by a load when pulling.

Figure 46B:
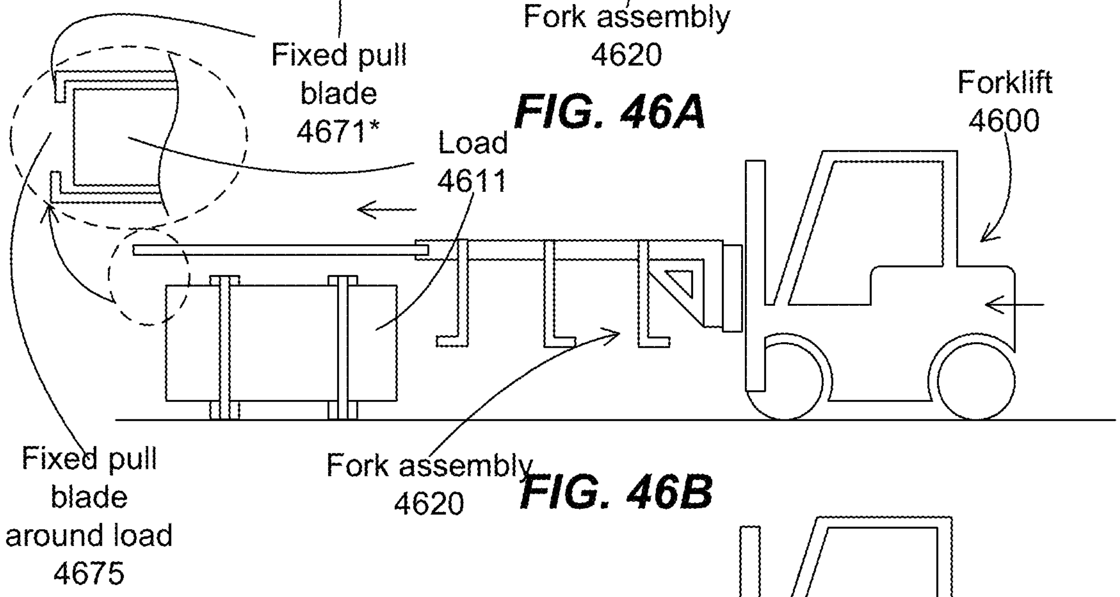

The fork assembly is lifted up, for example, by the operator operating the forklift vehicle, to be above the load. In FIG. 46B, the forklift vehicle moves toward the load so that the blades pass the load, e.g., the load is positioned under the fork extensions and the blades. Thus, the blades, such as the fixed blades, are positioned around the load 4675.

Figure 46C:
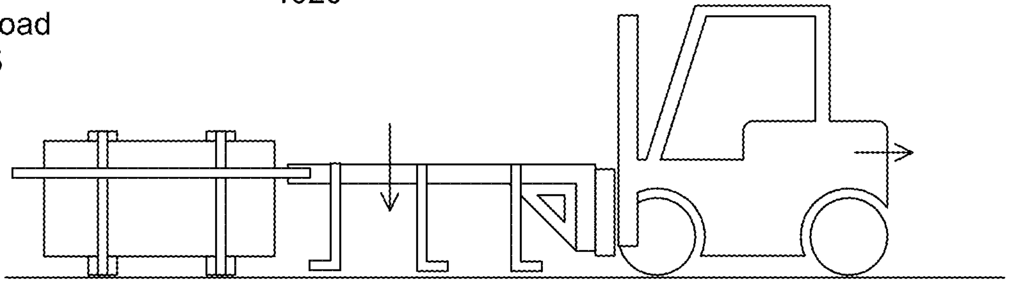

In FIG. 46C, the operator of the forklift vehicle then can move the fork assembly downward so that the fork extensions are lower than the top surface of the load. In some embodiments, the fork extensions are lowered to be as close to a middle of the load as possible, in order to have a better balance when pulling on the load. The lowering of the fork extensions is constrained by the fork lifter blades contacting the ground, thus, the fork extensions can be lowered until the blades of the fork lifters almost touch the ground.

Figure 46D:
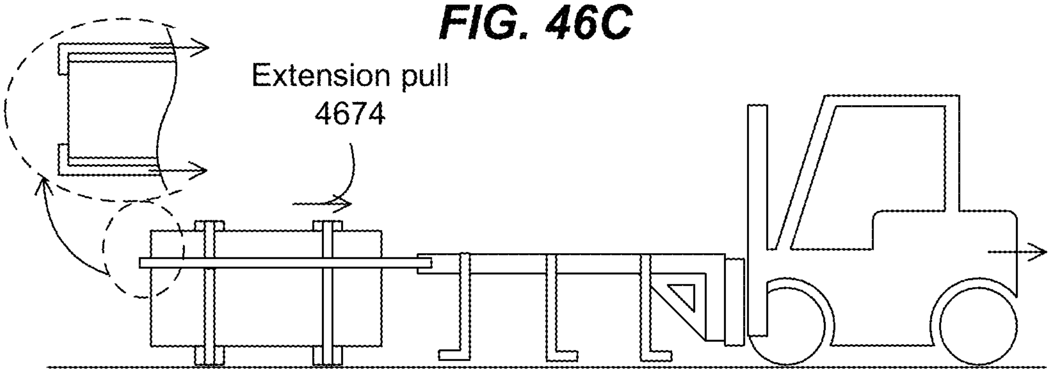

In FIG. 46D, the operator of the forklift vehicle then can move the fork assembly backward to pull 4674 on the load.

FIGS. 47A-47B illustrate flow charts for an operation of the fork extensions according to some embodiments. FIG. 47A shows a process for the fork extensions to pull on a load. Operation 4700 extends a fork extension out of a fork of the fork assembly. Operation 4710 optionally adjusts a blade of the fork extension to be outside of a load (downward, upward, or outward from the load). Operation 4720 moves the forklift to position the load to be under and between 2 fork extensions of the fork assembly. Operation 4730 lowers the fork assembly downward for the blade to face the load. Operation 4740 moves the fork assembly backward to pull the load toward the forklift.

FIG. 47B shows a process for the fork extensions to move away from a load. Operation 4760 moves the fork assembly forward and upward to clear a fork extension extended from a fork of a fork assembly. Operation 4770 moves the fork assembly backward to move the fork assembly away from the load.

Unload 2 Loads from Container

In some embodiments, the fork assembly having fork extensions can be used for unloading loads from a container. The loads can be stored in a container in two rows, e.g., one or more inner loads arranged in an inner area of the container, and one or more outer loads arranged in an outer area of the container. The container can have a door to provide access to the loads, with the door positioned at the outermost portion of the outer area.

In some embodiments, the fork assembly can be configured to lift and transfer the outer loads using the fork lifters coupled to the fork beams of the fork assembly. The fork assembly then can have the fork extensions extended, which can be used to pull the inner loads to the outer area of the container. The fork assembly then can be configured to lift and transfer the inner loads positioned at the outer area.

Figure 48A:
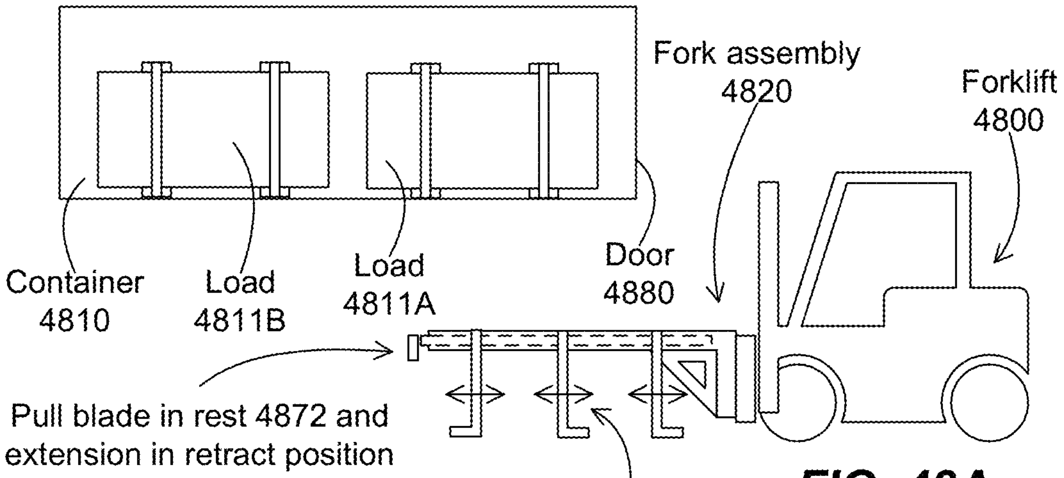
FIGS. 48A-48F illustrate a process for unloading outer and inner loads from a container according to some embodiments.

FIGS. 48A-48F illustrate a process for unloading outer and inner loads from a container according to some embodiments. FIG. 48A shows a container 4810 with a door 4880 at one side and walls at other sides. The container can be configured to store loads at multiple rows. For example, as shown, there are two rows of loads, such as a load 4811B placed at an inner area (relative to the door 4880) or a far-door area of the container and a load 4811AB placed at an outer area (relative to the door 4880) or a near-door area of the container. The loads 4811A and 4811B can be arranged with the long direction of the load running along the long direction of the container. Further, the loads can have support beams and straps along the short direction. Thus, the loads can be picked up from the sides, e.g., from the area facing the long direction. Further, the inner load, e.g., the load placed at the inner area, can be too far and out of reach for the fork assembly. Thus, fork extensions can be used for pulling the load toward nearer the door to be picked up.

A forklift vehicle 4800 having a forklift assembly 4820 can be prepared for unloading the loads from the container. The fork extensions on the fork assembly are retracted 4872, with the pull blades at rest position. The fork lifters are optionally adjusted for picking the loads.

Figure 48B:
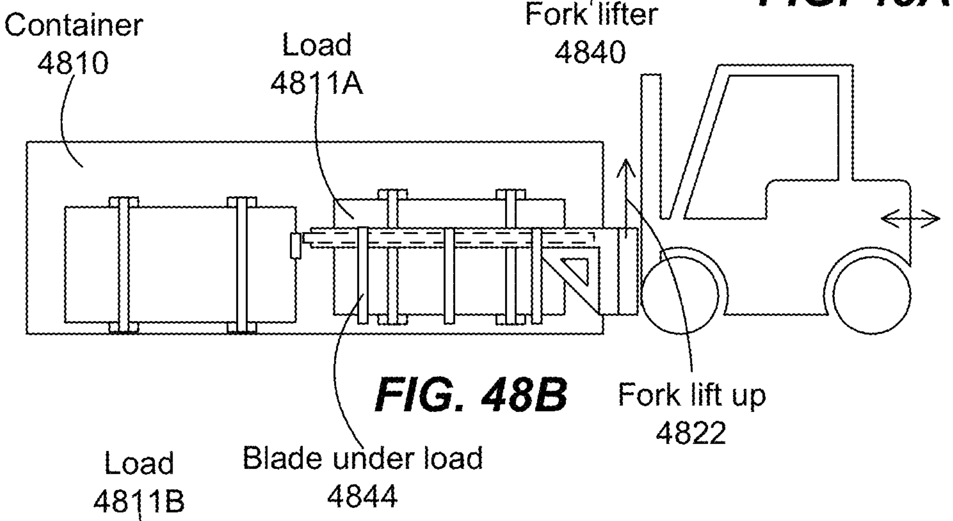

In FIG. 48B, the forklift vehicle moves to the container door, and then extending the fork assembly surrounding the outer load 4811A for unloading the outer load. The unloading process can include toggling the blades on the fork lifters for rotating to the lift position 4844, and then lifting up 4822 the fork assembly for lifting the load 4811A. The forklift vehicle then moves backward to clear the loads from the container, and then moves to transfer the load to a destination.

Figure 48C:
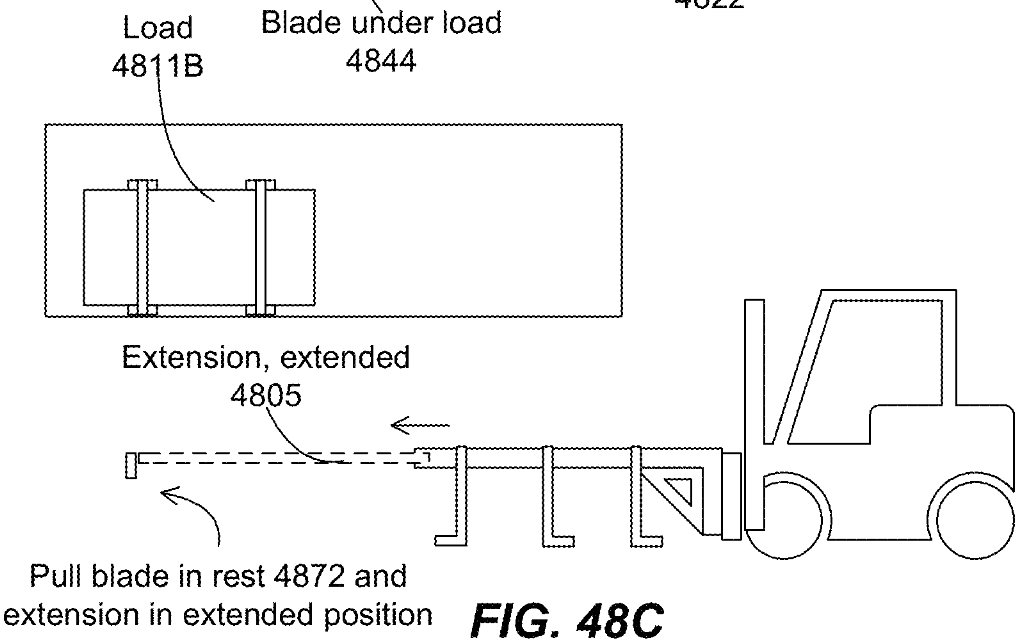

In FIG. 48C, after dropping the load 4811A at the destination, the forklift vehicle moves back to the container. The fork extensions 4805 on the fork assembly are extended, with the pull blades still at rest position 4872.

Figure 48D:
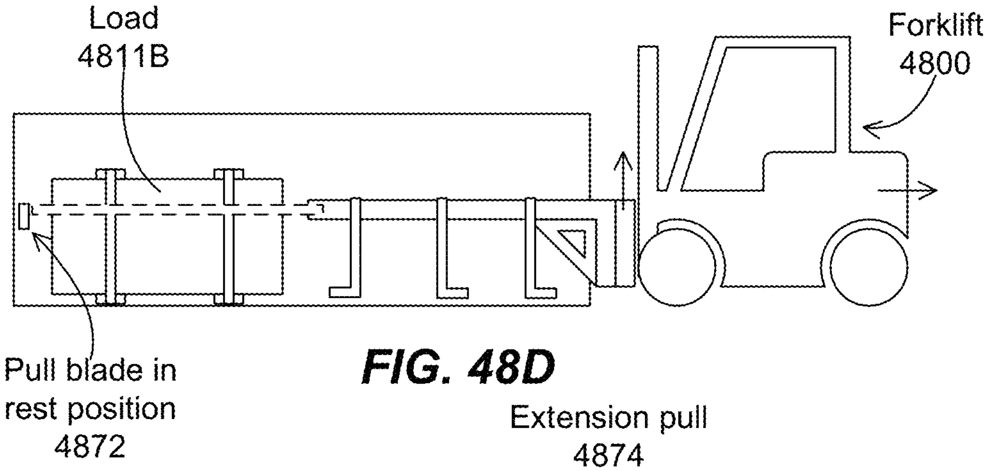

In FIG. 48D, the forklift vehicle moves to the container door, and then extending the fork assembly into the container so that the fork extensions surround the inner load 4811B for pulling the inner load to be nearer the container door. The pulling process can include toggling the blades on the fork extensions for rotating to the pull or hook position 4873. The toggling process can including moving the fork assembly forward until the blades of the fork extensions push on the inner wall of the container, followed by moving the fork assembly backward.

Figure 48E:
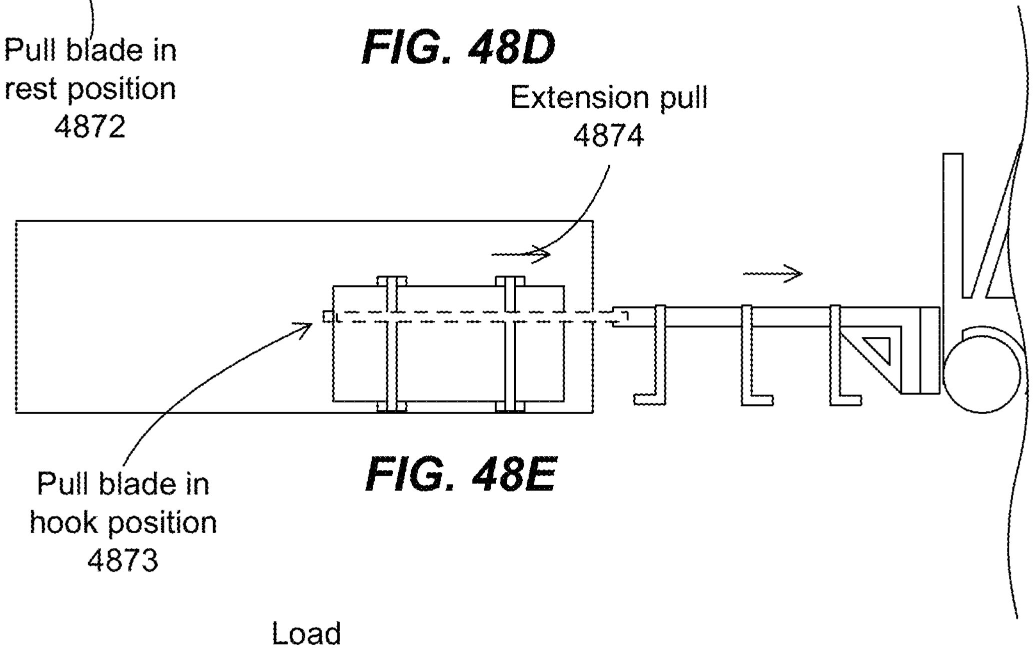

In FIG. 48E, the forklift vehicle then moves backward to pull the load 4811B from the inner area to the outer area nearer the door of the container. Since the blades of the fork extensions are in pullable position or hook position 4873, moving the fork extensions backward also functions to pull the load 4811B backward.

The fork assembly can then move forward, until the blades of the fork extensions hitting the inner wall of the container, and then moves backward. The forward and backward movements activate the rotate mechanism to rotate the blades of the fork extensions to the rest position 4872.

Figure 48F:
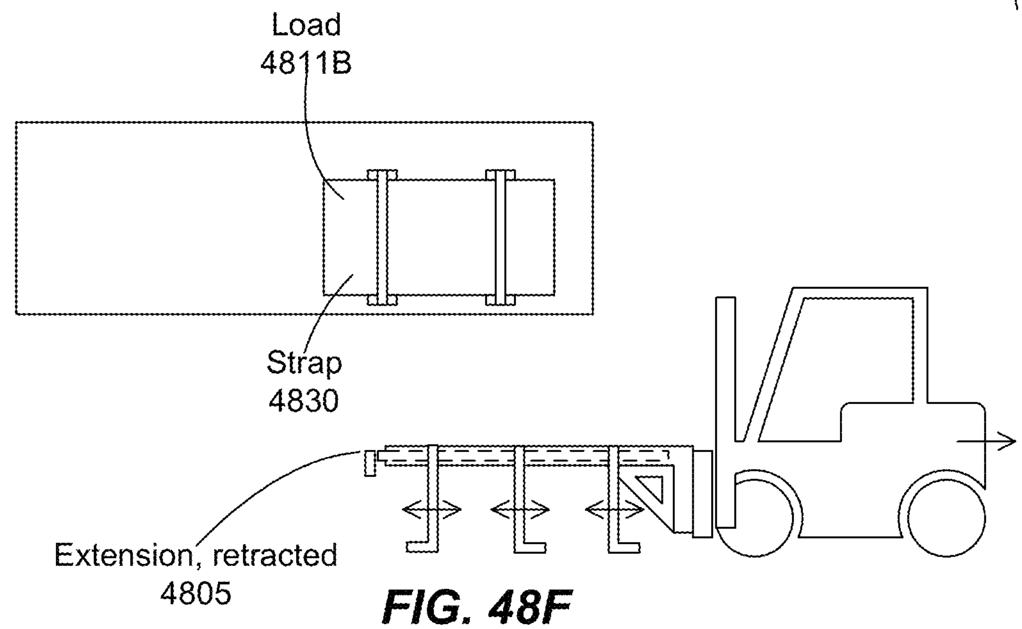

In FIG. 48F, the fork extensions 4805 on the fork assembly are retracted, with the pull blades at rest position 4872. The forklift vehicle then moves to the container door, and then extending the fork assembly surrounding the inner load 4811B, now disposed at the outer area, for unloading the inner load.

Figure 49A:
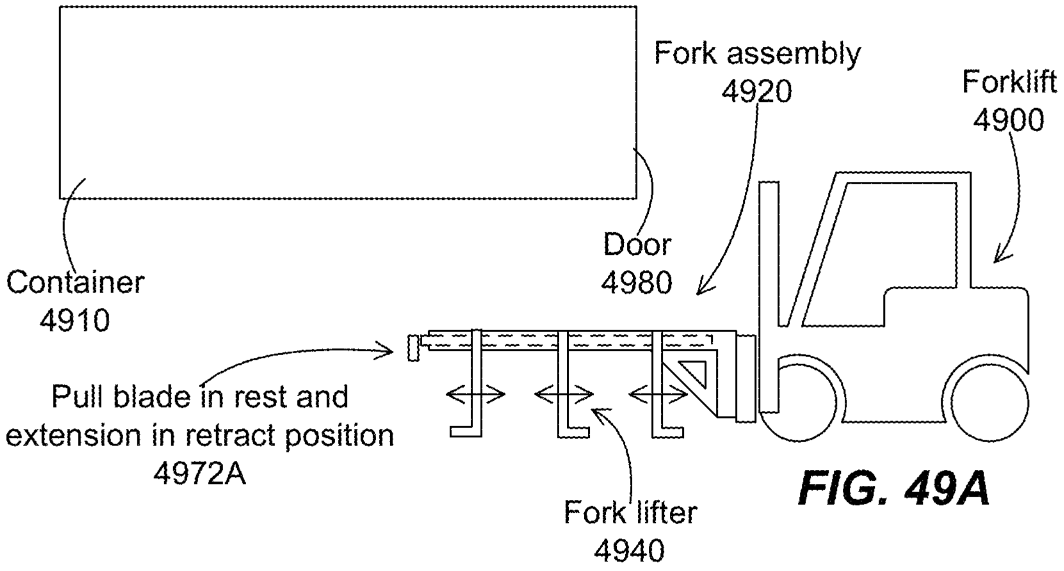
FIGS. 49A-49E illustrate a process for loading loads to outer and inner areas of a container according to some embodiments.

FIGS. 49A-49E illustrate a process for loading loads to outer and inner areas of a container according to some embodiments. FIG. 49A shows a container 4910 with a door 4980 at one side and walls at other sides. The container can be configured to store loads at multiple rows.

A forklift vehicle 4900 having a forklift assembly 4920 can be prepared for loading the loads to the container. The fork extensions on the fork assembly are retracted 4972, with the pull blades at rest position. The fork lifters are optionally adjusted for picking the loads.

Figure 49B:
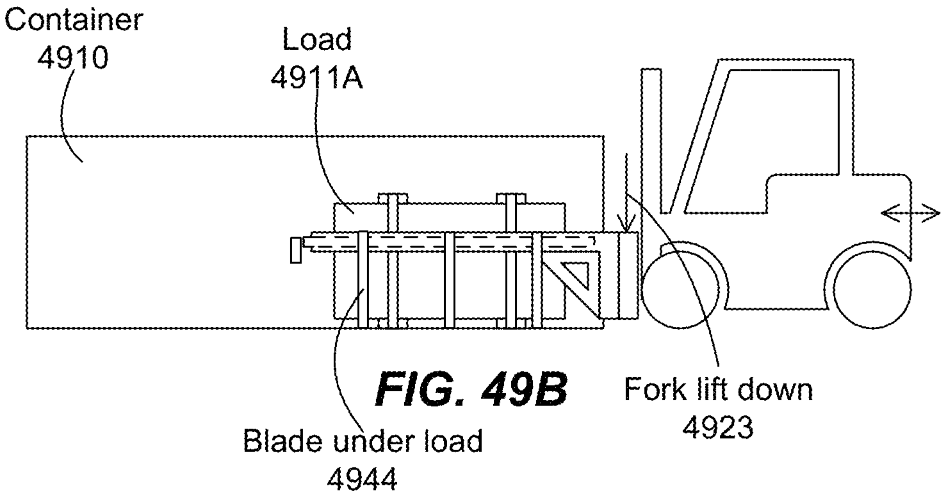

In FIG. 49B, the forklift vehicle moves to a load 4911A and picks up the load. The picking process can include toggling the blades on the fork lifters for rotating to the lift position 4944, and then lifting up the fork assembly for lifting the load 4911A. The forklift vehicle then moves to the container door, and then extending the fork assembly carrying a load 4911A into the container for loading the load 4911A to an outer area of the container, e.g., to place the load at the outer area. The loading process can include lowering 4923 the load to the floor of the container, and then toggling the blades on the fork lifters for rotating to the non-lift position 4945. The forklift vehicle then moves backward to clear the fork assembly from the load 4911A.

Figures 1, 49C:
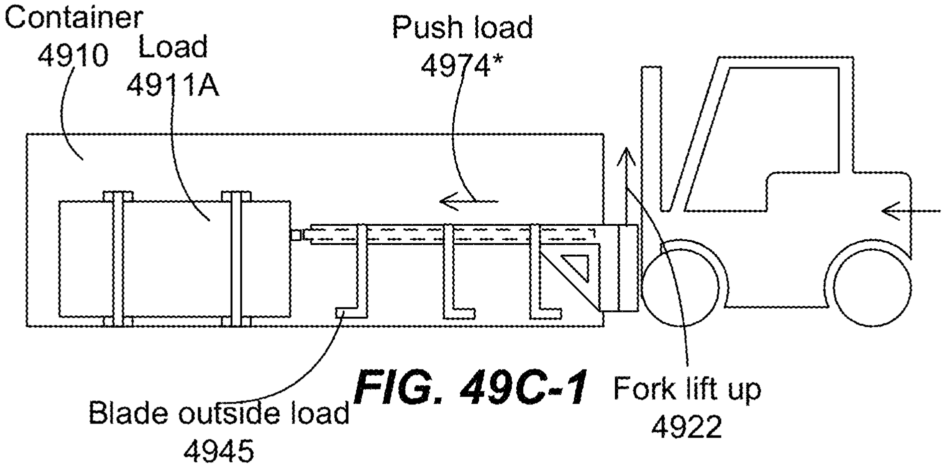

In FIG. 49C-1, the blades of the fork extensions (still in the retract position) are toggled to the pullable position, e.g., to the position toward the load. The toggling process can including moving the fork assembly forward until the blades of the fork extensions push on a surface, followed by moving the fork assembly backward. For example, the fork assembly can move sideway, such as to the left, so that a right fork of the fork assembly can contact the load 4911A. The fork assembly then moves forward until the right blade of the right fork extension hitting the load, which rotates the right blade a first angle. After the fork assembly moves backward, the right blade rotates a second angle. The combination of the first and second angles toggles the right blade from a rest position to a pullable position. The process is repeated for the left blade of the left fork extension. For example, the fork assembly can move sideway to the right, so that a left fork of the fork assembly can contact the load 4911A. The fork assembly then moves forward until the left blade of the left fork extension hitting the load, which rotates the left blade a first angle. After the fork assembly moves backward, the left blade rotates a second angle. The combination of the first and second angles toggles the left blade from a rest position to a pullable position.

The forklift vehicle then moves forward, using the blades in pullable position to push 4974* on the load 4911A to an inner area of the container.

Figures 2, 49C:
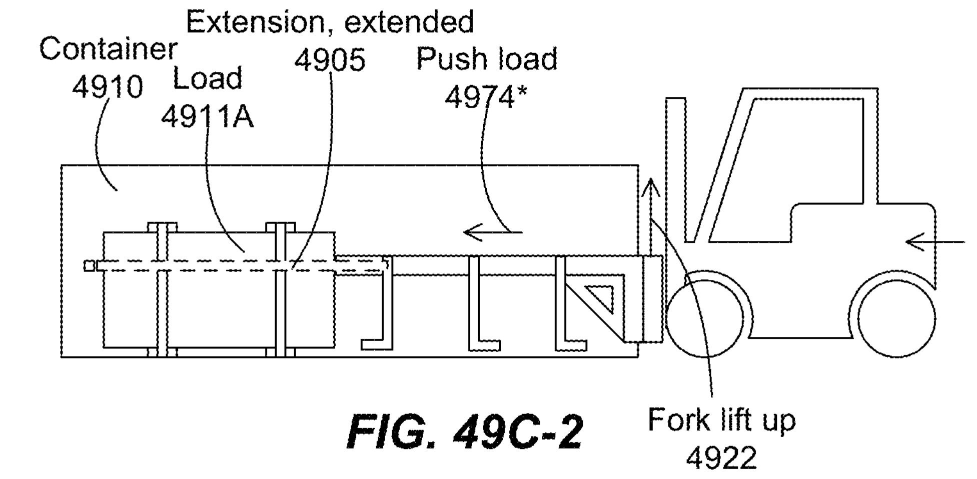

FIG. 49C-2 shows an alternate process for moving the load 4911A from the outer area to the inner area of the container. The fork extensions are extended, with the blades in pullable position around the load. By moving the forklift vehicle forward, the fork extensions can guide the load to the inner area.

Figure 49D:
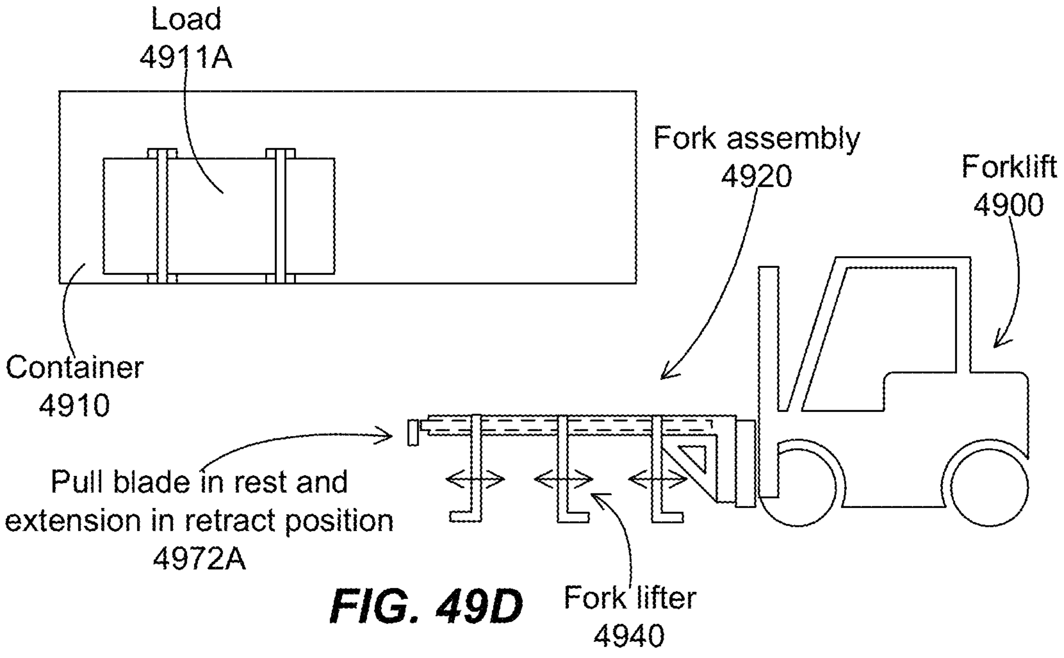

In FIG. 49D, the forklift assembly 4920 is prepared for loading a new load 4911B to the container. The fork extensions on the fork assembly are retracted 4972, with the pull blades at rest position. The fork lifters are optionally adjusted for picking the loads.

Figure 49E:
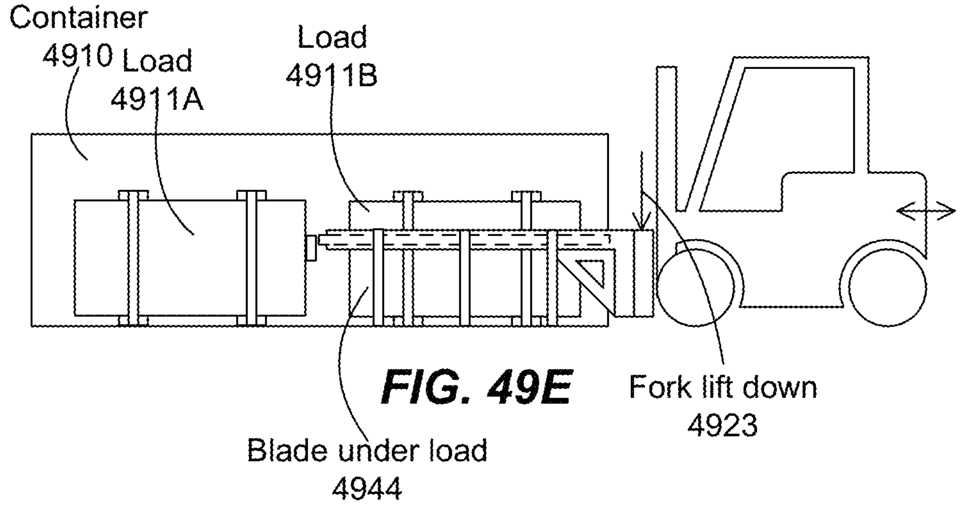

The forklift vehicle moves to a load 4911B and picks up the load. The picking process can include toggling the blades on the fork lifters for rotating to the lift position 4944, and then lifting up the fork assembly for lifting the load 4911B. The forklift vehicle then moves to the container door, and then extending the fork assembly carrying a load 4911B into the container for loading the load 4911B to an outer area of the container, e.g., to place the load at the outer area. The loading process can include lowering 4923 the load to the floor of the container, and then toggling the blades on the fork lifters for rotating to the non-lift position (FIG. 49E).

Operation Unload/Load 2 Loads from/to Container

FIGS. 50A-50B illustrate flow charts for unloading multiple loads from a container and for loading multiple loads to a container. FIG. 50A shows a process for unloading two loads at inner and outer positions in a container. Operation 5000 configures a fork assembly on a forklift to unload an outer load in a container. Operation 5001 unloads the outer load to a first destination. Operation 5002 extends a fork extension from a fork of the fork assembly. Operation 5003 pulls an inner load in the container to an outer position. Operation 5004 retracts the fork extension. Operation 5005 configures the fork assembly to unload the inner load at the outer position. Operation 5006 unloads the inner load to a second destination.

FIG. 50A shows a process for loading two loads at inner and outer positions in a container. Operation 5010 configures a fork assembly on a forklift to unload a first load to a container. Operation 5011 unloads the first load to an outer position in a container. Operation 5012 extends a fork extension from a fork of the fork assembly. Operation 5013 pushes the first load to an inner position in the container. Operation 5014 retracts the fork extension. Operation 5015 configures the fork assembly to unload a second load to the container. Operation 5016 unloads the second load to an outer position in the container.

In some embodiments, the element labeling can be similar for the last two digits, e.g., two elements having same last two digits in their labels are similar. For example, a fork assembly can be labeled as X20, such as 220, 1520, 1620, or 4920.

Roller Legs

In some embodiments, the fork attachment assembly for a forklift or a forklift vehicle can include roller legs coupled at far ends of the fork beams or the fork extensions. The forks of the fork attachment assembly, or simply fork assembly, can be long, such as long enough to reach into the far end of a container, which can be 10, 20 or 40 feet long, e.g., more than 3, 6, or 12 m long. Thus, a fork beam or a fork extension can be more than 6 m long, and a combination of a fork beam and a fork extension can be more than 12 m, which is adequate for the fork assembly to reach pallets of boxes located at the far end of the container.

The length of the fork beam and fork extension can require special fork supports at the coupling areas of the fork beam to the fork lift vehicle. To reduce demands on the fork supports, a roller leg can be coupled to an end of a fork extension, which can be able to support the fork assembly from the free end of the fork. The roller leg can have one or more rollers at one end, which are configured for rolling on the floor of the container, for example. The roller leg can have a coupler at an opposite end, which is configured to be mounted onto the fork extension. The fork extension can have provisions for the mounting of the roller legs, such as having holes for accepting bolts that can be used to secure the roller leg to the fork extension. The roller leg can have a hydraulic cylinder along the leg, which can enable an automatic adjustment of the length of the roller leg, for example, to allow the rollers in the roller leg to contact the ground even when the fork is raised or lowered.

Figure 51A:
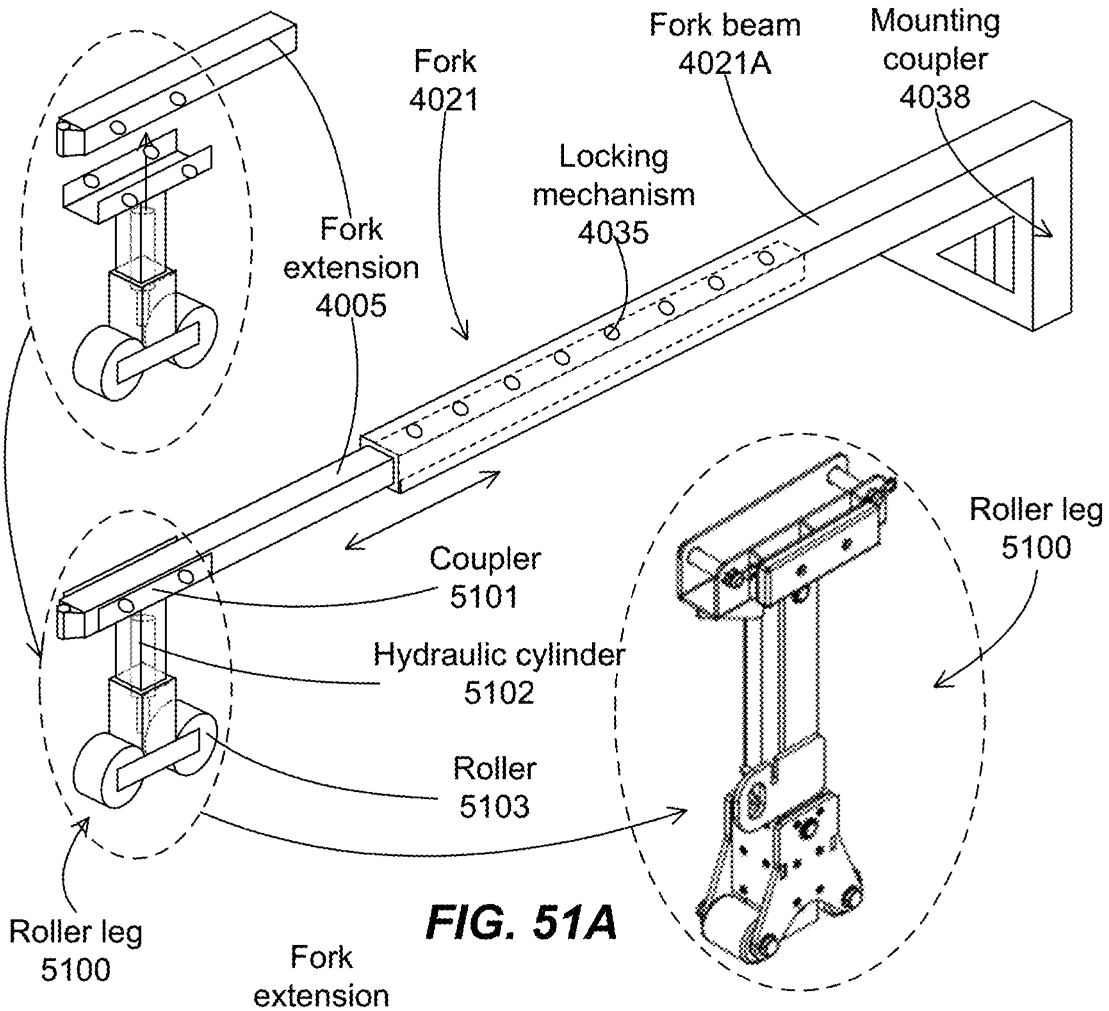
FIGS. 51A-51B illustrate a configuration for a roller leg according to some embodiments.
Figure 51B:
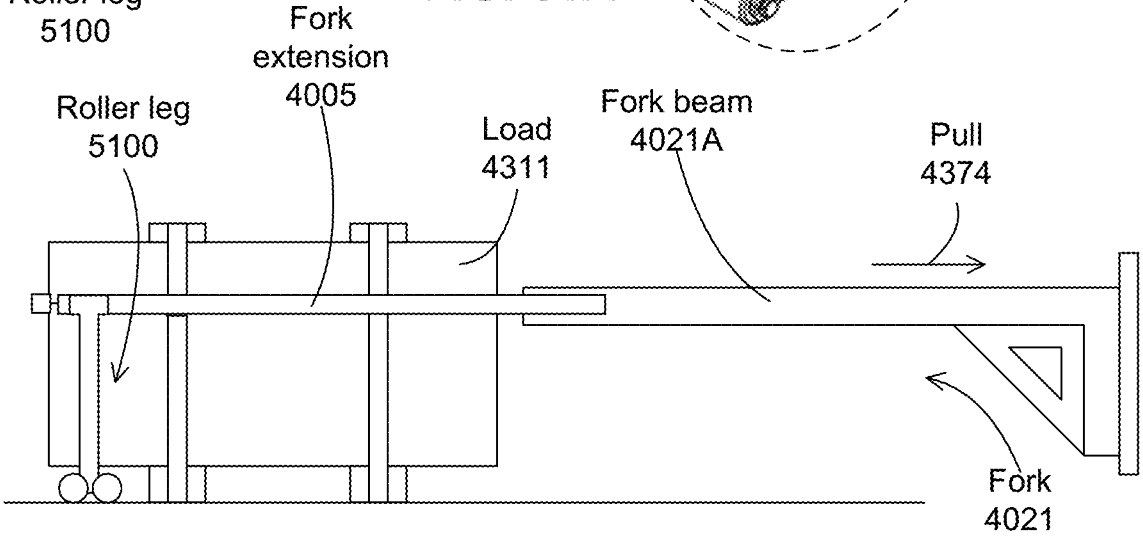

FIGS. 51A-51B illustrate a configuration for a roller leg according to some embodiments. In FIG. 51A, a roller leg 5100 is coupled to a far end of a fork extension 4005, with the fork extension slidable within a fork beam 4021A of a fork 4021. The fork beam can include a mounting coupler 4038, which is configured to mount the fork to the fork lift vehicle. The mounting coupler can also be used as a support for the fork beam, e.g., to prevent the fork beam from being sagged, especially with the extended fork extension.

The fork beam can include a locking mechanism 4035, which can be a series of pins and holes, and which is configured to secure the fork extension at a desired combined length for the fork beam and the fork extension.

The roller leg can have a coupler 5101 with holes, which match the holes in the fork extension. Bolts can pass through the holes in both the roller leg coupler and the fork extension to secure the roller leg to the fork extension. The roller leg can have a hydraulic cylinder 5102, which can be lengthened or shortened to allow the rollers 5103 of the roller leg to roll on the ground.

FIG. 51B shows a schematic of an operation of a fork 4021 having an attached roller leg 5100. The fork extension 4005 is configured to hook on the load 4311, with the roller leg supporting the end of the fork extension. The fork lift vehicle can move backward, pulling 4374 the load, for example, out of the container.

Figure 52A:
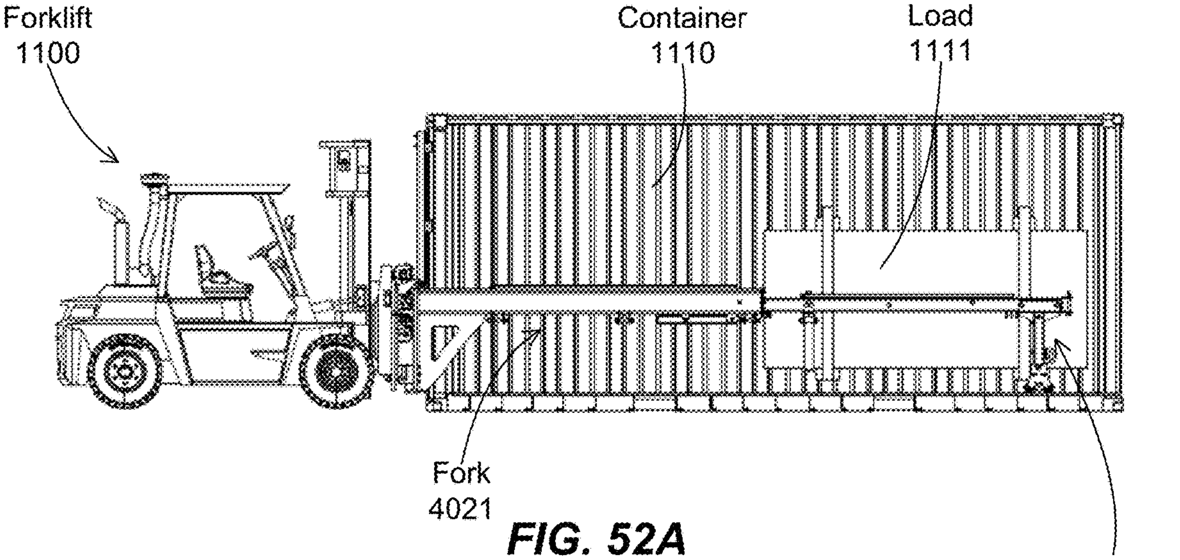
FIGS. 52A-52B illustrate a fork lift vehicle with an attached fork assembly having a roller leg according to some embodiments.
Figure 52B:
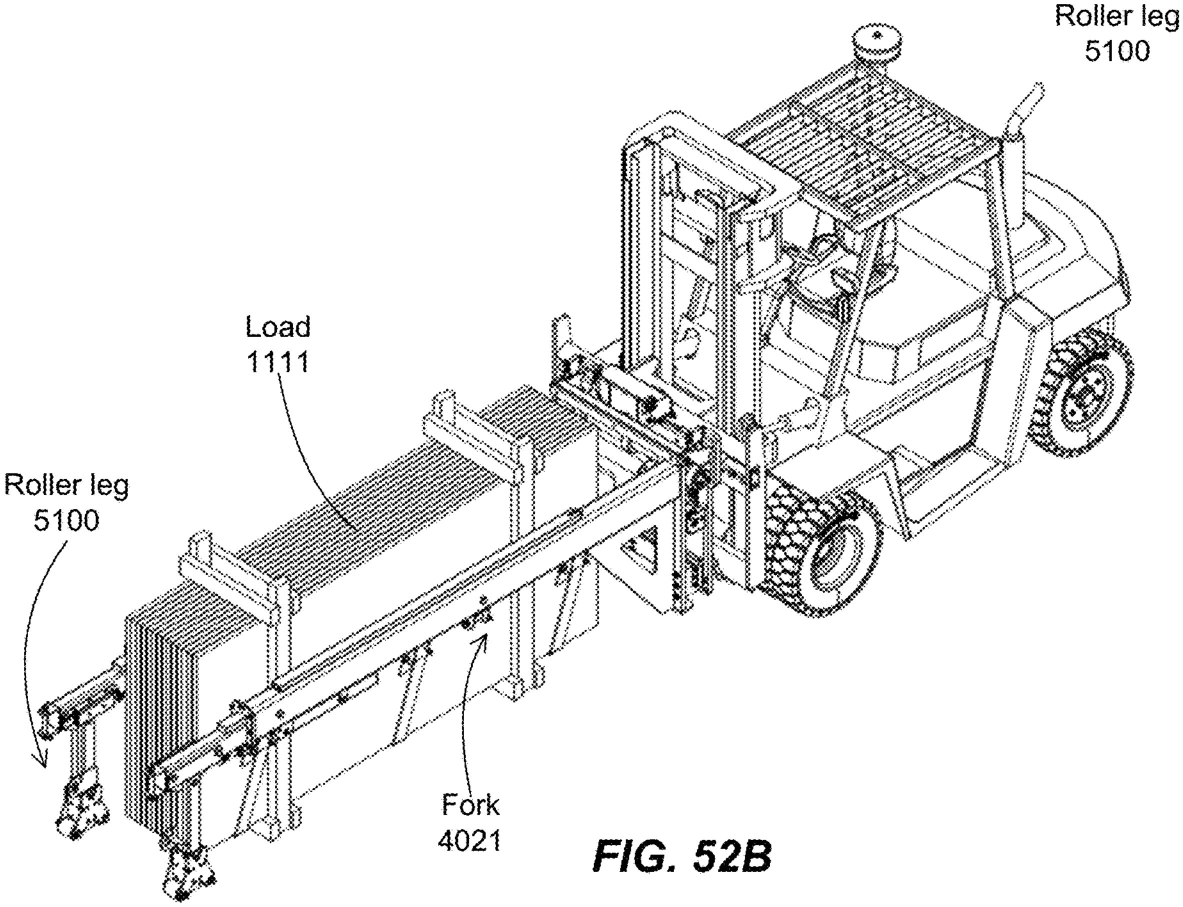

FIGS. 52A-52B illustrate a fork lift vehicle with an attached fork assembly having a roller leg according to some embodiments. In FIG. 52A, a fork assembly 4021 is assembled to a fork lift vehicle 1100 configured to bring or to remove a load 1111 to or from a container 1110. The load is positioned at a far end of the container, and can only be accessible from a door side. The fork assembly can support the load, e.g., lifting the load from the ground. With a long fork beam/fork extension, a roller leg 5100 can be used to support the load at one end of the fork extension.

FIG. 52B shows an assembled fork assembly 4021 configured to carry a load 1111. The fork extension can be retracted, for example, only the fork beam is used for carrying a load to or from a door end of a container. The roller legs 5100 can be used to support the ends of the fork beams.

FIG. 53 illustrates a flow chart for removing a load from a far end of a container according to some embodiments. Operation 5105A extends a fork extension out of a fork of the fork assembly. Operation 5105B assembles a roller leg on the fork extension. Operation 5105C moves the fork lift to position a load to be between 2 fork extensions of the fork assembly. Operation 5105D moves the fork assembly backward to pull the load toward the fork lift with the roller legs supporting the fork extensions.

Clamping Device on One Fork

In some embodiments, the fork attachment assembly for a forklift or a forklift vehicle can include a clamping device coupled at a far end of the fork beam or the fork extension. Multiple panels, such as stone slabs or sheets of materials, can be stored in a container, for example, in a vertical stack. The clamping device can be driven by the fork lift vehicle to reach into the container for clamping on one or more panels for transferring out of the container into a destination. Alternatively, the fork lift vehicle can use the clamping device to transfer the panels from a storage location to the inside of a container, for transporting to another site.

Figures 54A, 54B:
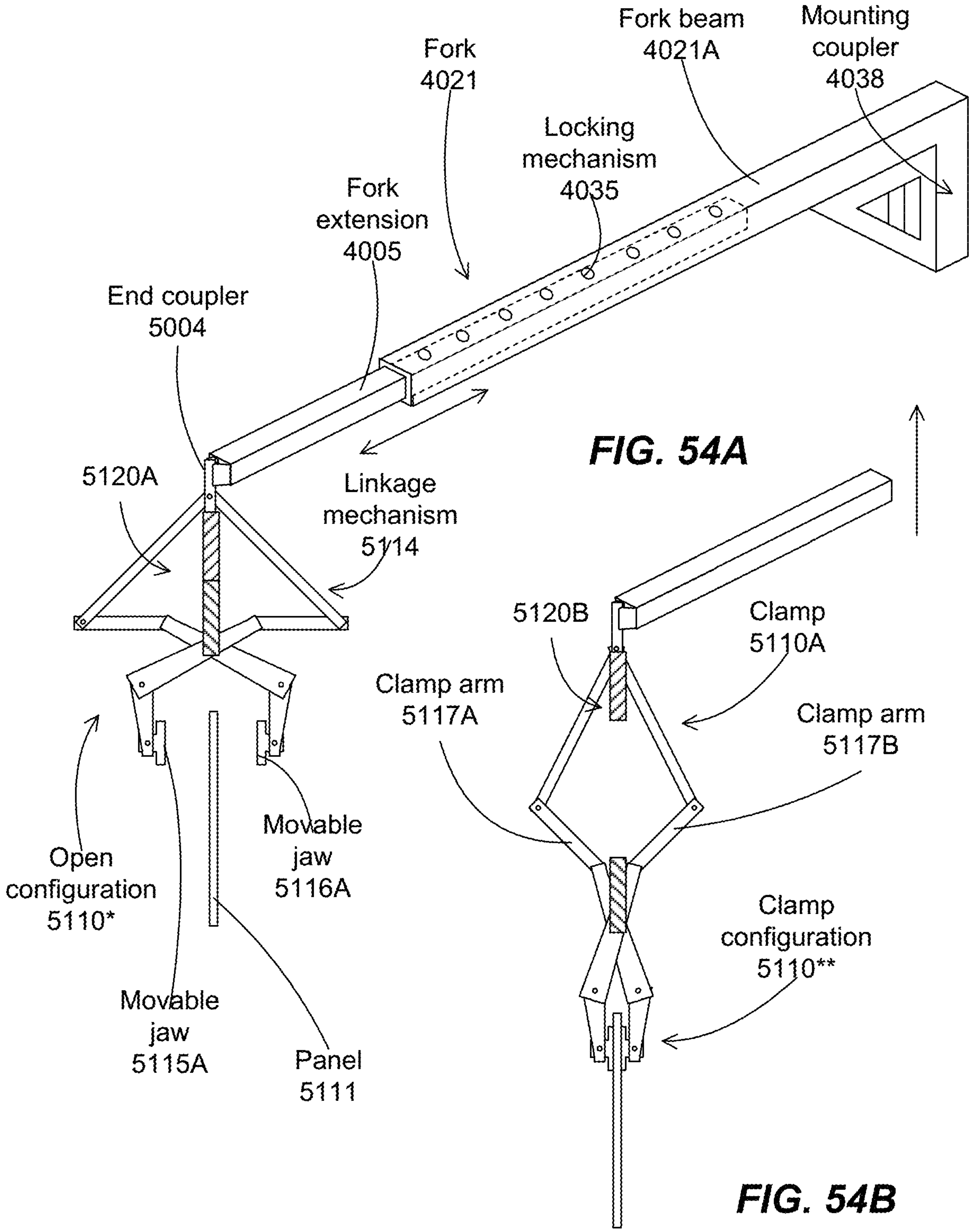
FIGS. 54A-54B illustrate a configuration of a fork having an assembled clamping device according to some embodiments.

FIGS. 54A-54B illustrate a configuration of a fork having an assembled clamping device according to some embodiments. FIG. 54A shows a clamping device 5110A coupled to a far end of a fork extension 4005, with the fork extension slidable within a fork beam 4021A of a fork 4021. The fork beam can include a mounting coupler 4038, which is configured to mount the fork to the fork lift vehicle. The mounting coupler can also be used as a support for the fork beam, e.g., to prevent the fork beam from being sagged, especially with the extended fork extension. For example, the fork beam can be coupled to one end of the support or mounting coupler 4038, which is opposite to the other end facing the ground. Thus, the fork beam can be positioned higher from the ground, even when at the lowest position of the fork lift vehicle. Since the fork is configured to raise a load by strapping at sides of the load or to lift large panels, the high position of the fork beam is advantageous. The fork beam can include a locking mechanism 4035.

The end of the fork extension 4005 can have a coupler 5004, which can be used to couple to an end of a clamping device or a clamping device 5110A. The coupler 5004 can be also configured to attach a strap or a robe for pulling on a load.

The clamping device can include a gripping device normally fabricated from structural steel components, that are designed to securely hold and lift construction materials though a scissor movement. The gripping device can use freely rotating pin connections to create a scissor configuration with two scissor arms. A first end of the scissor arms is configured to rotate towards each other in reaction to the opposite second end of the scissor arms being lifted vertically. The first end of the scissor arms rotate inwards and generate a compression force clamping on the object to be lifted. Essentially, the weight of the object is used to generate this clamping action.

A clamping device 5110A can include two scissor arms 5117A and 5117B, which can freely rotate about pivot points. The scissor arms 5117A and 5117B can include sectional arms connected at the freely rotating pivots. The top sectional arms can be coupled to a pulling element, for example, through a freely rotating pin connection. The pulling element can be coupled to the coupler 5004 at the end of the fork extension 4005.

The bottom sectional arms can be coupled to left and right clamps or jaws 5115A and 5116A, e.g., holding pads for holding an object such as a panel 5111. In the clamping device having a scissor arm configuration, the jaws 5115A and 5116A are movable jaws, e.g., both jaws are moved toward the object for clamping on the object.

In operation, the fork lift can be driven to a container in which multiple panels are stacked in a vertical configuration, e.g., the panels are stacked on their thickness surface, e.g., the surface of a thickness with a width or height of the panels. The clamping device is positioned in an open configuration 5110*, in which the jaws 5115A and 5116A are separated. The open configuration can be maintained by a locking mechanism having two elements coupled together to form a lock configuration 5120A.

One or more panels 5111 are placed between the jaws 5115A and 5116A. The fork 4021 is driven to activate the locking mechanism, for example, by lowering the clamping device until contacting the panels, and then pulling up. The locking mechanism is toggled to a close configuration 5110, in which the jaws 5115A and 5116**A are freely moved.

The fork 4021 is continued to pull up, which pulls on the couplers 5004. The coupler can in turn pull on the top sectional arms. The scissor movement between the top sectional arms and the bottom sectional arms around the pivot points can turn the pulling action into a pressing action of the jaws 5115A and 5116A, which presses on the panels. The clamping device 5110A thus holds the panels for lifting and then moving to new location. The weight of the panels can be converted to a gripping force from the jaws for securing the object. An operation to transfer panels to the container is in reverse.

Clamping Device on Two Forks

In some embodiments, the clamping device can be coupled to two forks of a fork attachment assembly, for example, to increase rigidity for the fork beams to lift panels from a far end of a container. A fork coupler can be used to interface between the clamping device and the end couplers of the two fork extensions.

Figure 55A:
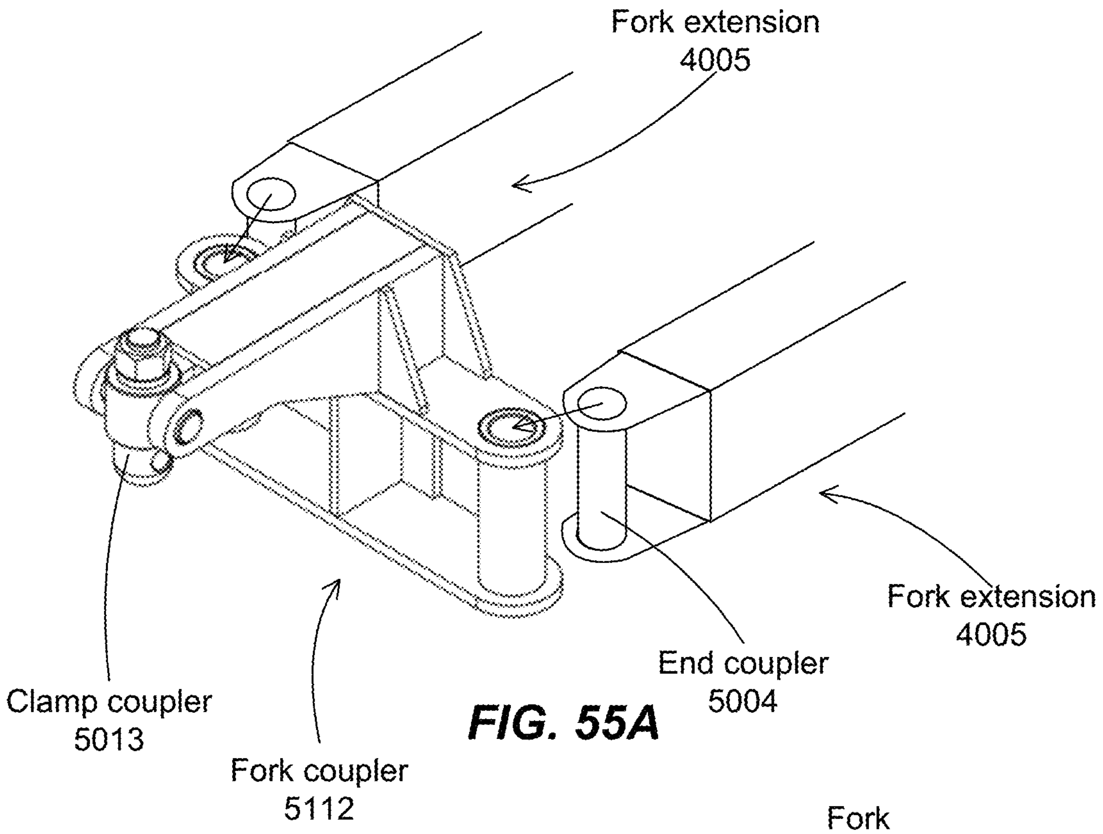
FIGS. 55A-55B illustrate a configuration of a fork coupler coupled to two forks according to some embodiments.
Figure 55B:
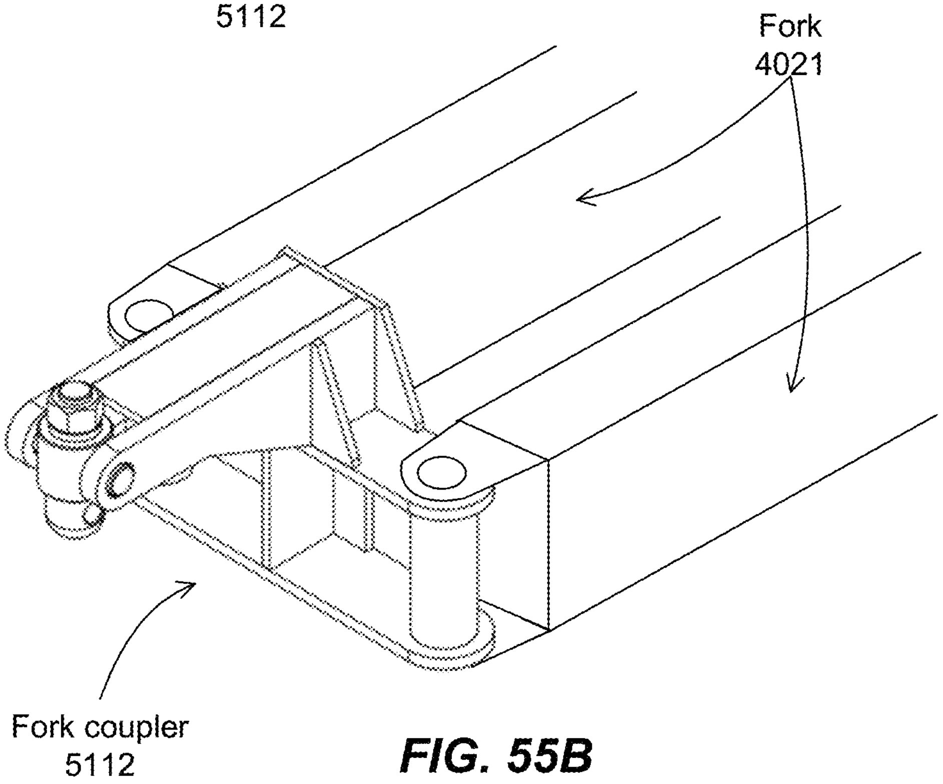

FIGS. 55A-55B illustrate a configuration of a fork coupler coupled to two forks according to some embodiments. A fork coupler 5012 can have two mated couplers with two end couplers 5004 of two fork extensions 4005. The fork coupler 5012 can include a clamp coupler 5013, which is configured to be coupled with a pulling element of a clamping device.

FIGS. 56A-56D illustrate a configuration of a clamping device coupled to a fork coupler according to some embodiments. A fork assembly can have a fork coupler 5012 coupled with two fork extensions 4005 of the fork assembly. The clamp coupler 5013 of the fork coupler 5012 is configured to couple with a pulling element of a clamping device 5110B.

Figure 56A:
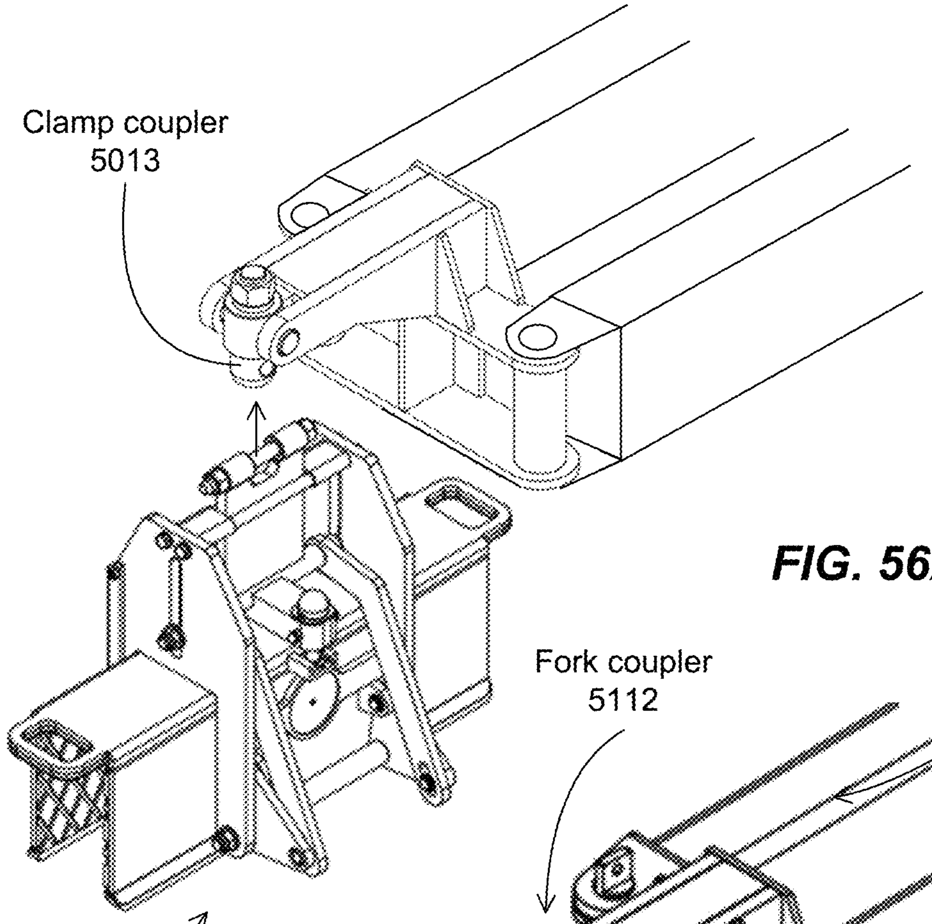
FIGS. 56A-56D illustrate a configuration of a clamping device coupled to a fork coupler according to some embodiments.
Figure 56B:
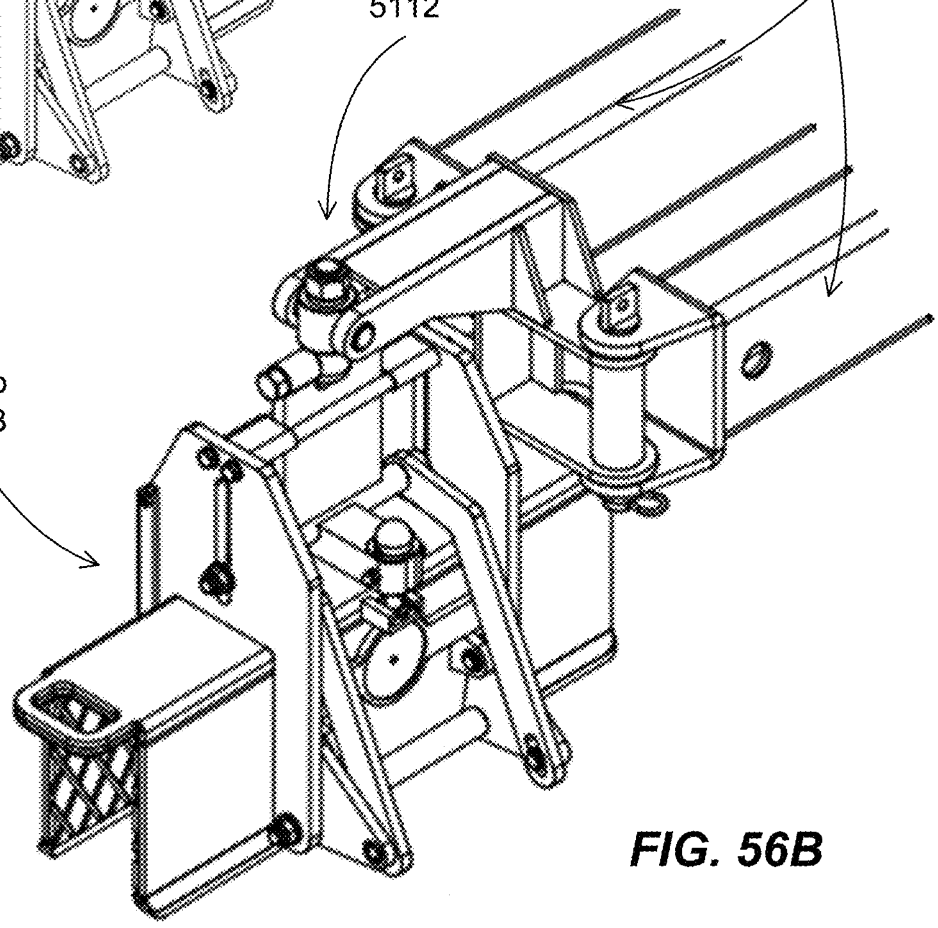
Figure 56C:
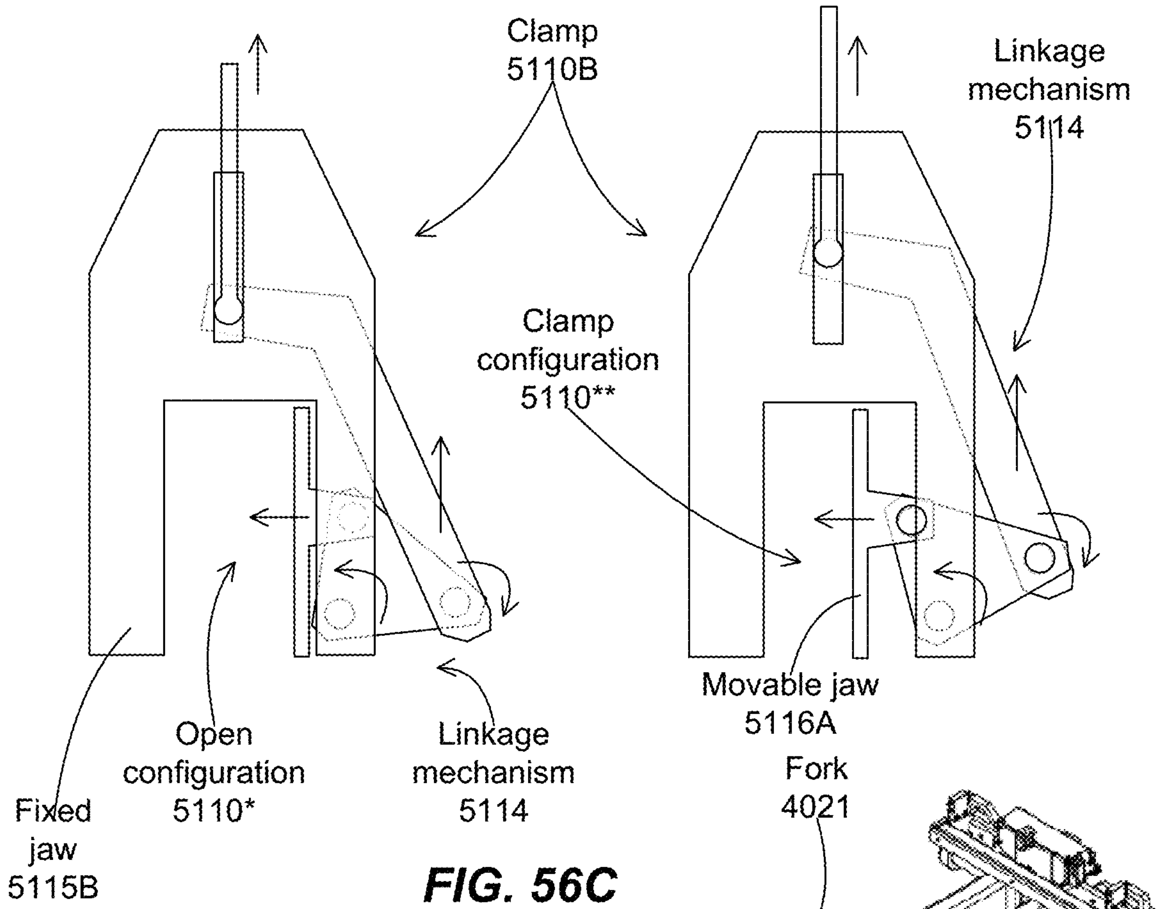

FIG. 56C shows a schematic of the clamping device 5110, showing an open configuration 5110* and a close configuration 5110 of the two jaws 5115B and 5116A of the clamping device. The clamping device 5110B can have a fixed jaw 5115B and a movable jaw 5116A. For example, the fixed jaw can be a part of the body of the clamping device, while the movable jaw is coupled to the body through a linkage mechanism 5114. The linkage mechanism can have multiple sections, such as a top pulling element which is configured to be coupled to the clamp coupler 5113 of the fork coupler 5112**. The linkage mechanism can have multiple arms linked together and to the movable jaw through pivot joints. The arms are configured so that when the pulling element is pulled up, the movable jaw move toward the fixed jaw for clamping on the panels.

Figure 56D:
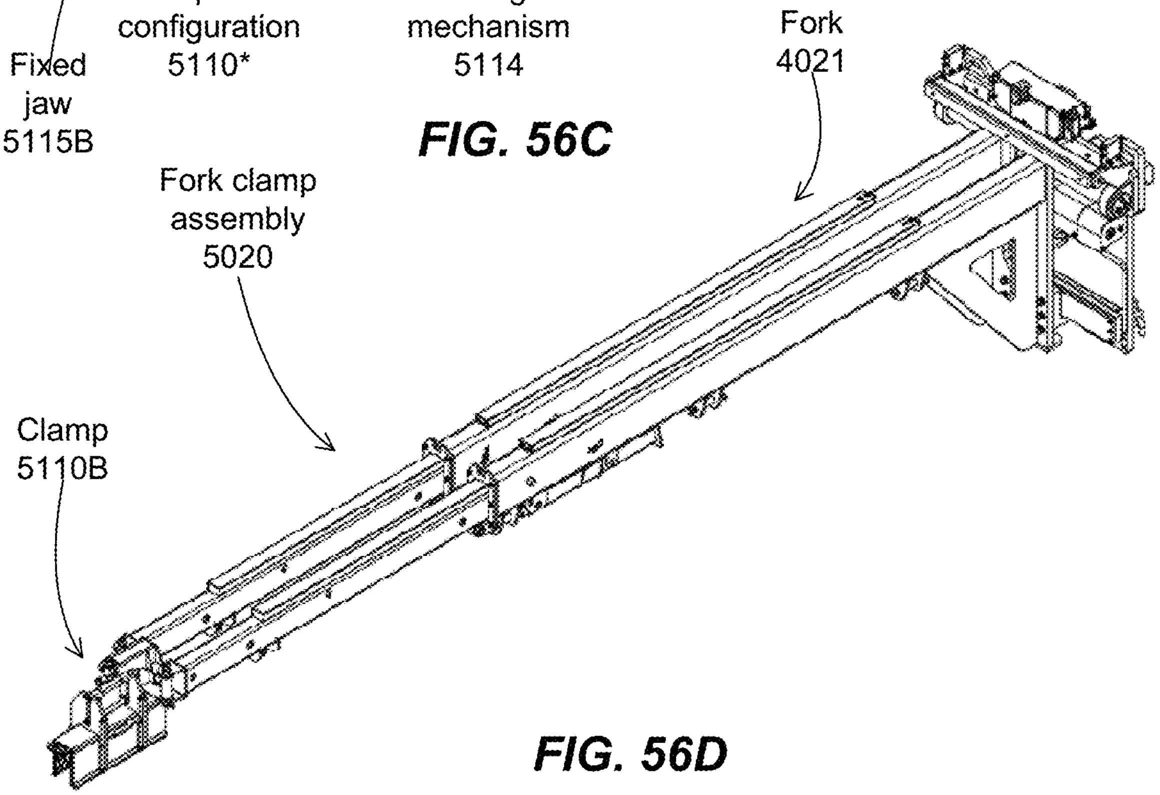

FIG. 56D shows a fork assembly 5020 having two forks 4021 with a clamping device 5110B coupled to the ends of the fork extensions of the forks 4021.

Figure 57A:
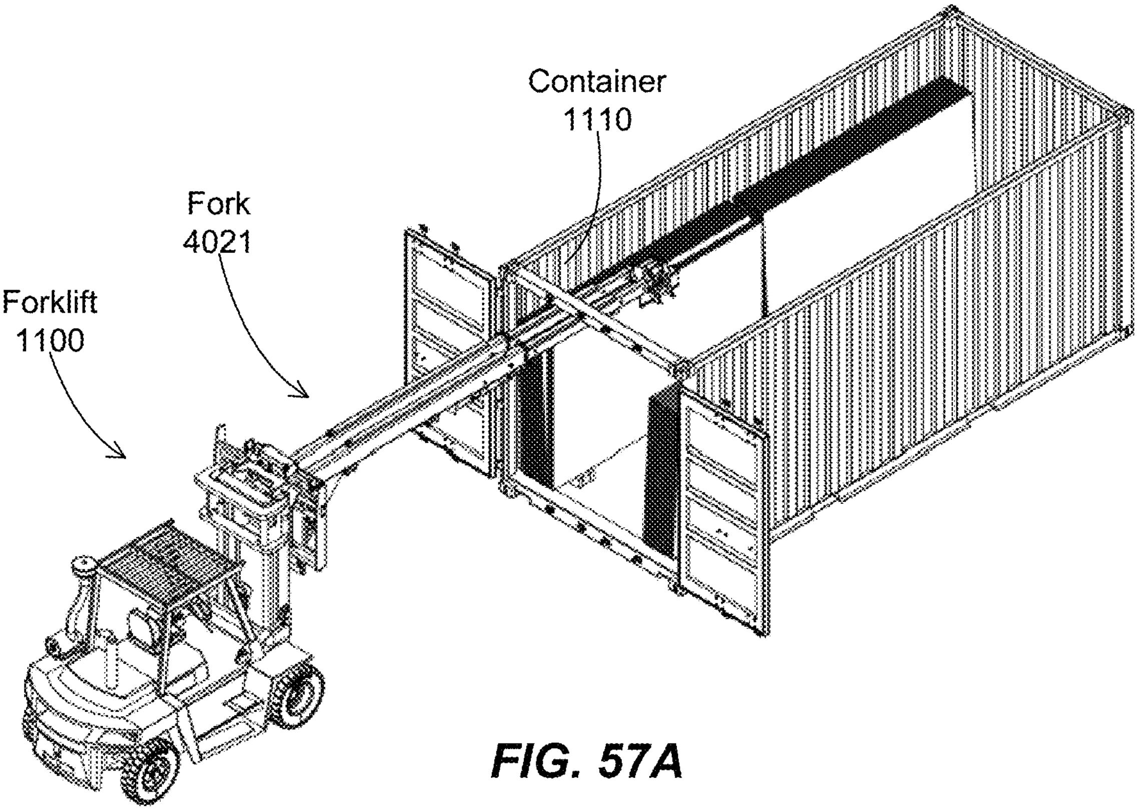
FIGS. 57A-57B illustrate an operation of a fork assembly to remove panels from a container according to some embodiments.
Figure 57B:
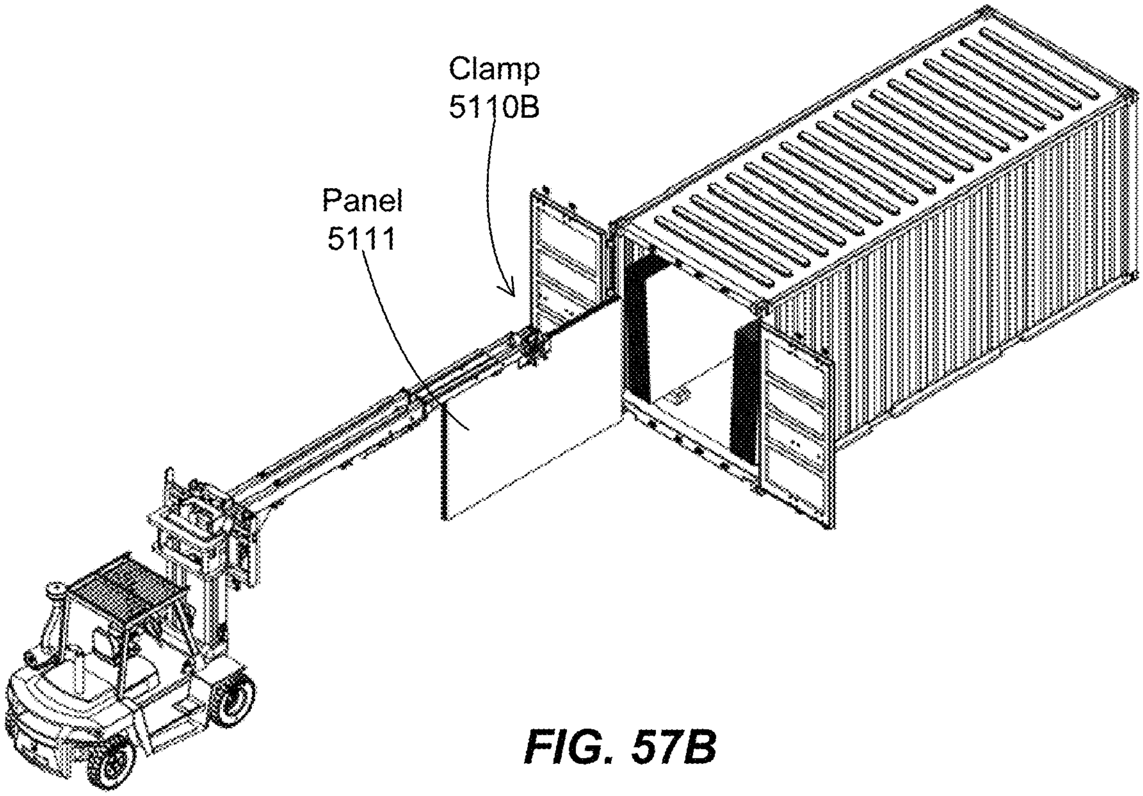

FIGS. 57A-57B illustrate an operation of a fork assembly to remove panels from a container according to some embodiments. A fork lift vehicle 1100 can have an assembled fork assembly having a clamping device 5110B coupled with two fork extensions of forks 4021 of the fork assembly.

In FIG. 57A, the fork lift vehicle is driven to approach a container 1110 to remove panels 5111 which are stacked vertically, e.g., stacked on edges of the panels. The combined length of the fork beam and the fork extension can be adjusted by sliding the fork extension along the fork beam, in order for the clamping device to reach the panels, such as at a middle portion of the panels. For example, the fork extension can be slide all the way in the fork beam, e.g., forming a shortest combined length, when the fork lift vehicle is configured to transfer panels at the door end of the container. The fork extension can be slide outward along the fork beam, e.g., forming a combined length enough for the forks to reach to the far end of the container, when the fork lift vehicle is configured to transfer panels at the far end of the container. Alternatively, the fork extensions can be slide out to transfer panels at both door end and far end of the container.

The fork lift vehicle can lower the forks so that the clamping device can clamp on one or more panels. Afterward, the forks can be raised to lift the panels of the floor.

In FIG. 57B, the fork lift vehicle is driven backward to remove the panels out of the container. After clearing the container, the fork lift vehicle can move to deliver the panels to a destination.

FIGS. 58A-58B illustrate flow charts for preparing a fork lift vehicle to remove a load from a container according to some embodiments. In FIG. 58A, operation 5106A assembles a clamping assembly on a fork extension, with the fork extension extended out of or retracted in a fork based on a load position. Operation 5106B moves a fork lift having the fork to position the load to be between 2 clamps of the clamping assembly. Operation 5106C lifts the fork to clamp on the load. Operation 5106D moves the fork lift backward to remove the load out of a storage position In FIG. 58A, operation 5107A adjusts a separation between two forks on a fork lift to match a spacing of a fork coupler. Operation 5107B assembles the fork coupler on the two fork extensions, with each fork extension extended out of or retracted in a fork based on a load position. Operation 5107C assembles a clamping assembly on the fork coupler. Operation 5107D moves a fork lift to position the load to be between 2 clamps of the clamping assembly. Operation 5107E lifts the fork to clamp on the load. Operation 5107F moves the fork lift backward to remove the load out of a storage position.

Different Clamping Devices

In some embodiments, the clamp mechanism in a clamping device can include a scissor arm configuration, a half scissor arm configuration, or a slanting interface configuration.

Figure 59A:
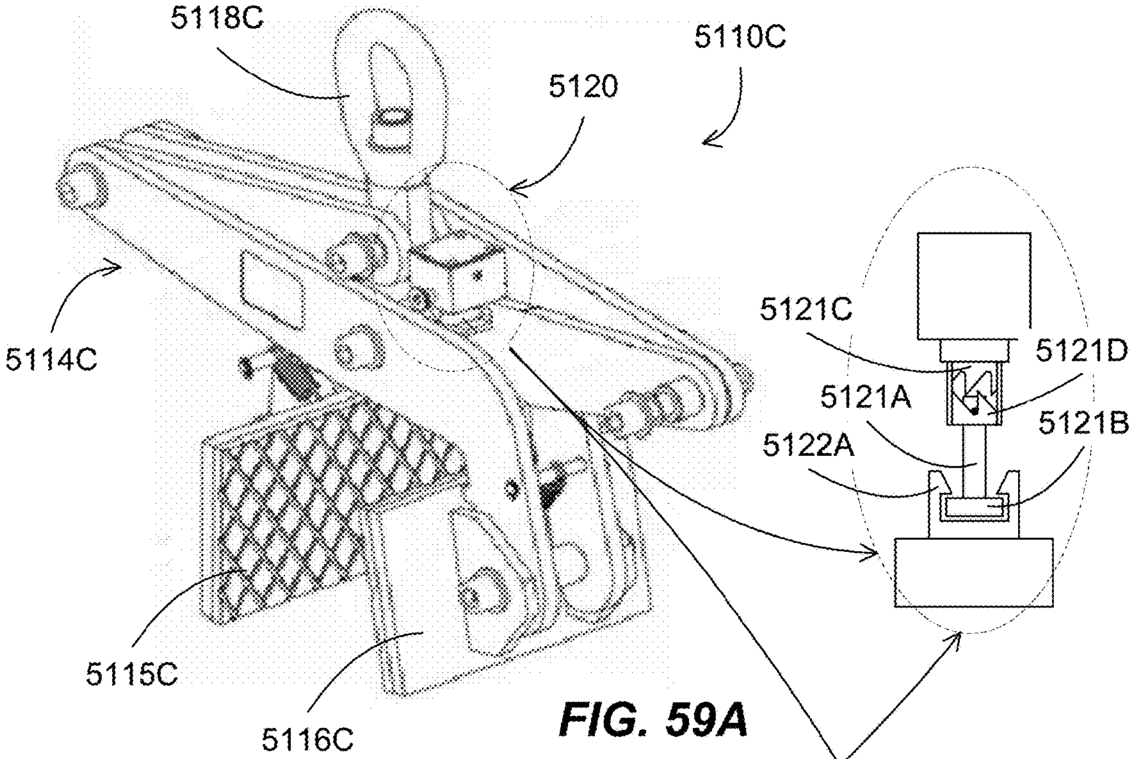
FIGS. 59A-59D illustrate different clamping device configurations according to some embodiments.

FIGS. 59A-59D illustrate different clamping device configurations according to some embodiments. In FIG. 59A, a clamping device 5110C can use a scissor mechanism, e.g., two jaws are coupled to a scissor mechanism to a pulling element. For example, a scissor mechanism 5114C can couple to jaws 5115C and 5116C, so that when a pulling element 5118C is pulled up or released, the jaws move toward each other or away from each other, respectively.

The scissor mechanism can include a pivot point, which is fixedly coupled to the body of the clamping device. The scissor mechanism can include a pulling element arm, which is connected to the pulling element, and a jaw arm, which is connected to the jaw, and rotatable over the pivot joint.

Thus, when the pulling element is pulled up, the scissor mechanism is activated. Due to the pivot point, the jaw arm is moved when the pulling element arm is moved, which can move the jaws together or away from each other.

Thus the scissor mechanism can function as a linkage mechanism, linking the pulling element 5118C with the jaws 5515C and 5116C. Pulling on the pulling element can move the jaws toward each other. Releasing the pull on the pulling element can move the jaws away from each other, for example, due to gravitation. The linkage mechanism can include the pulling element arms, coupled to the jaw arms through the pivot points.

A locking mechanism 5120 can be included, for hand-free actuating the clamping device using the scissor mechanism. The locking mechanism can allow or prevent the engagement of the scissor mechanism, e.g., allowing or prevent the linkage mechanism between the pulling element and the jaws. When the locking mechanism is activated or locked, the linkage mechanism is prevented or disable, meaning pulling on the pulling element does not move the jaws. When the locking mechanism is deactivated or unlocked, the linkage mechanism is allowed or enable, meaning pulling on the pulling element move the jaws away from each other.

The locking mechanism can include a top part 5121, which can be locked to or release from the bottom part 5122. The top and bottom parts 5121 and 5122 can be secured to different arms of the linkage mechanism. The top part can include a movable rod having an elongated head, which can be locked to or released from a mated hook in the bottom part.

The top part 5121 can include a rod 5121A having an elongated head 5121B. The elongated head can have one side longer than a side perpendicular to it, such as an ellipse shape or a rectangular shape. If the elongated head has the longer side disposed within the hook 5122A of the bottom part 5122, the rod can be secured to the hook, forming a lock status in which the top part is secured to the bottom part. If the elongated head has the shorter side disposed within the hook 5122A of the bottom part 5122, the rod can be movable out of the hook, forming an unlock status in which the top part can be moved from the bottom part.

The top part can include annular elements 5121C and 5121D having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element arm is fixedly coupled to the jaw arm. Thus the pulling element cannot move to activate the scissor mechanism, and the jaws are stationary when pulling on or lowering the pulling element.

When the locking mechanism is disengaged, meaning the top part is unlocked from the bottom part, the pulling element is freely to move, e.g., separatable with respect to the body of the clamping device. Thus the pulling element can move to activate the scissor mechanism, and the movable jaws can move toward or away from each other when pulling on or lowering the pulling element, respectively.

Figure 59B:
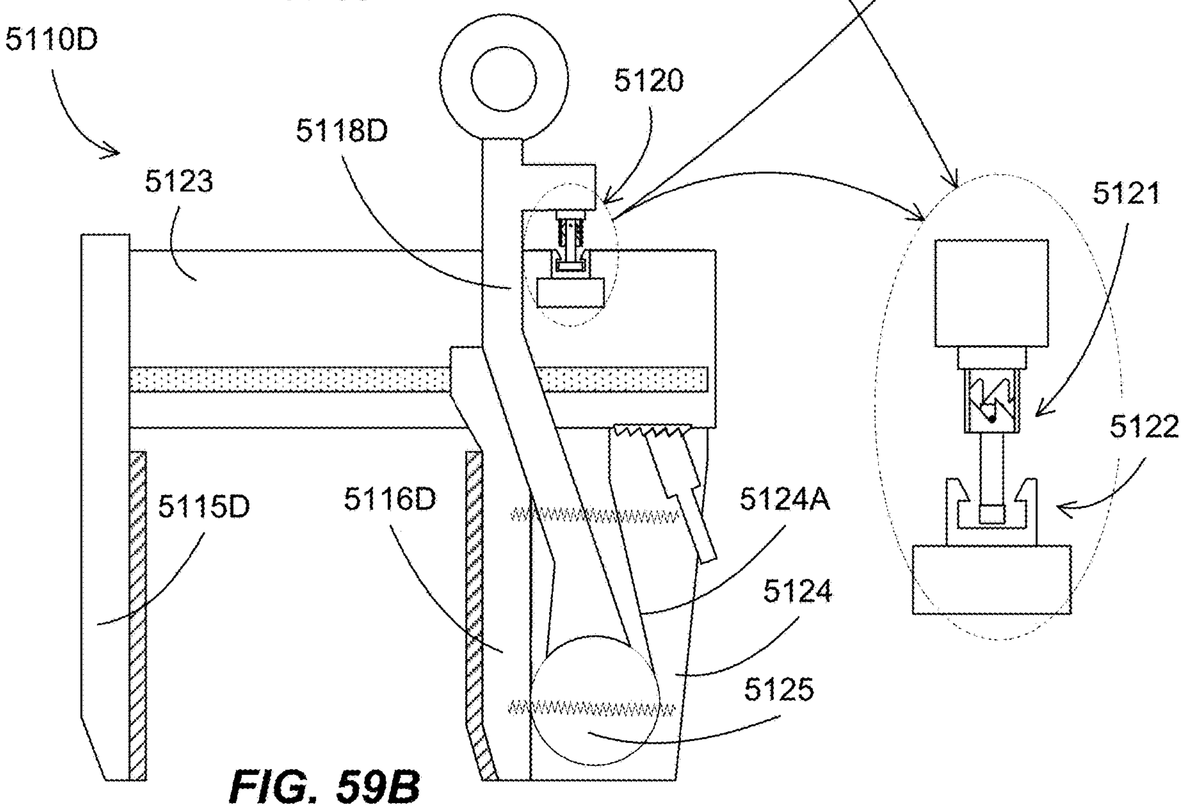

In FIG. 59B, a clamping device 5110D can use a slanting interface mechanism, e.g., a pulling element having a roller for rolling on a slanting surface of a jaw support. For example, the pulling element can be disposed between a jaw and a jaw support. When the pulling element rolls of the slanting surface of the jaw support, the jaw can move away from or toward the jaw support.

The clamping device 5110D can be configured for lifting heavy objects. The clamping device can include a first jaw 5115D coupled to a clamp bar 5123. The clamping device can include a second jaw assembly, which can be movably and lockably coupled to the clamp bar. The second jaw assembly can include a second jaw 5116D disposed opposite the first jaw. The second jaw assembly can include a jaw support 5124, which can slide along the clamp bar for movably coupled to the clamp bar. The second jaw assembly can be lockable to the clamp bar. The second jaw assembly can include stretchable elements, such as springs, which can be coupled to the second jaw and the jaw support, for pulling the second jaw toward the jaw support. The stretchable elements can allow the second jaw to move away from the jaw support, for a limited distance, such as a distance equal or smaller than a distance between the discrete locking locations of the discrete locking mechanism.

The clamping device can include a pulling element 5118D, which can be configured to be pulled on for lifting the clamped object. The pulling element can freely move in an up direction. The pulling element can be configured to exert a clamping force on the object when being pulled, for example, by rolling through roller 5125 on slanting surface 5124A of the jaw support.

A locking mechanism 5120 can be included, for hand-free actuating the slanting interface mechanism. The locking mechanism can allow or prevent the engagement of the linkage mechanism between the pulling element and the jaw. When the locking mechanism is activated or locked, the linkage mechanism is prevented or disable, meaning pulling on the pulling element does not move the pulling element. When the locking mechanism is deactivated or unlocked, the linkage mechanism is allowed or enable, meaning pulling on the pulling element move the pulling element for moving the jaw toward the other jaw.

Figure 59C:
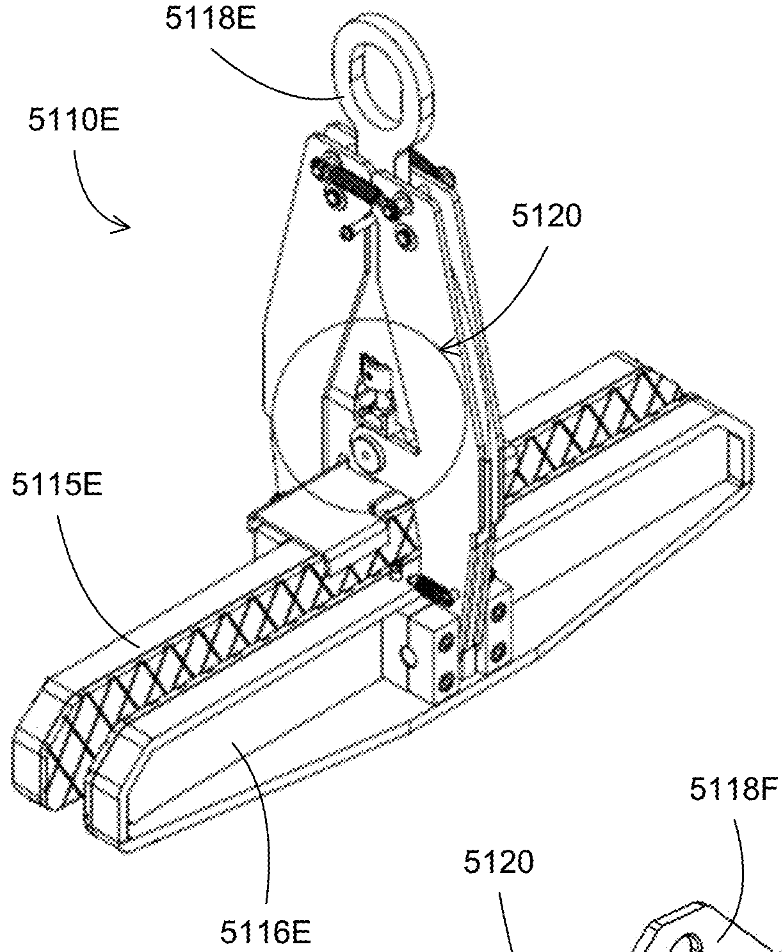

In FIG. 59C, a clamping device 5110E can use a slanting interface mechanism, e.g., a pulling element having a slanting surface can be coupled to scissor arms to move clamping jaws. For example, a triangle pulling element can employ the slanting sides to extend or retract two scissor arms, which can pivot around a pivot point to move opposite jaws.

The clamping device can include elongated jaws 5115E and 5116E. The clamping device can include a pulling element 5118E, which can activate scissor arms around a pivot point. Thus, when the pulling element is pulled up, the scissor arms can extend. Due to the pivot point, the jaw arm can move when the scissor arms extend, which can move the jaws for clamping on an object.

Thus the clamping device can have a linkage mechanism, linking the pulling element 5118E with the jaws 5115E and 5116E. Pulling on the pulling element can move the jaws together. Releasing the pull on the pulling element can separate the jaws, for example, due to gravitation.

A locking mechanism 5120 can be included, for hand-free actuating the clamping device. The locking mechanism can allow or prevent the engagement of the linkage mechanism between the pulling element and the jaws. When the locking mechanism is activated or locked, the linkage mechanism is prevented or disable, meaning pulling on the pulling element does not move the jaws. When the locking mechanism is deactivated or unlocked, the linkage mechanism is allowed or enable, meaning pulling on the pulling element move the jaws together.

Figure 59D:
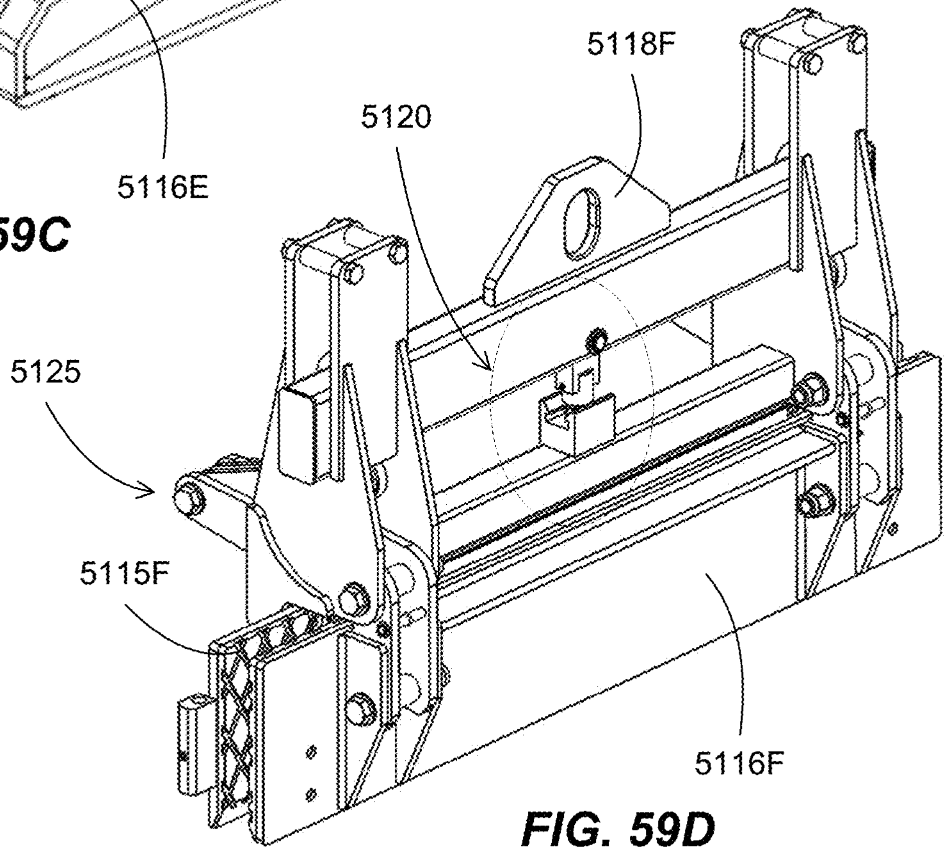

In FIG. 59D, a clamping device 5110F can use a half scissor mechanism, e.g., one jaw is fixed, and the opposite jaw is coupled by a scissor mechanism to a pulling element. For example, a half scissor mechanism 5125 can couple a movable jaw 5116F to move against a stationary jaw 5115F.

The clamping device can include multiple half scissor mechanisms, with each half scissor mechanism coupled to a movable jaw 5116F opposite a stationary jaw 5115F. The stationary jaws can be fixed coupled to a body of the clamping device. The half scissor mechanism can include a pivot point, also fixedly coupled to the body. A jaw arm coupled to the pivot point can be coupled to the movable jaw. An activation arm coupled to the pivot point can include a scissor joint. Thus, when the activation arm is pulled up, the scissor joint is activated. Due to the pivot point, the jaw arm is moved when the activation arm is moved, which can move the jaw toward the opposite jaw.

A connecting bar can be connected to ends of the activation arms of the multiple half scissor mechanisms, for example, to actuating all the half scissor mechanisms together. The half scissor mechanism can include multiple guides to guide the connecting bar into proper movements for actuating the half scissor mechanisms. A pulling element 5118F can be coupled to the connecting bar. When the pulling element is pulled up, the connecting bar also moves up, pulling on the activation arms of the half scissor mechanisms. Through the pivot points, the movable jaws move toward the opposite jaws, pressing the movable jaw plate toward the stationary jaw plate.

Thus the clamping device can have a linkage mechanism, linking the pulling element with the jaw plate. Pulling on the pulling element can move the movable jaw plate toward the stationary opposite jaw plate. Releasing the pull on the pulling element can move the movable jaw plate in the opposite direction, for example, due to gravitation. The linkage mechanism can include the connecting bar, coupled to the activation arms, coupled to the pivot points, and coupled to the jaw arms.

A locking mechanism 5120 can be included, for hand-free actuating the clamping device using the multiple half scissor mechanisms. The locking mechanism can allow or prevent the engagement of the half scissor mechanisms, e.g., allowing or prevent the linkage mechanism between the pulling element and the jaw plate. When the locking mechanism is activated or locked, the linkage mechanism is prevented or disable, meaning pulling on the pulling element does not move the jaw plate. When the locking mechanism is deactivated or unlocked, the linkage mechanism is allowed or enable, meaning pulling on the pulling element move the jaw plate toward the opposite jaw plate.

Automatic Locking Mechanism

In some embodiments, the present invention discloses an automatic locking assembly having an automatic locking mechanism that can be incorporated in a clamping device. The automatic locking assembly can use up and down movements of the clamping device to toggle a lock, e.g., switching between locked and unlocked states, of two movable components of the clamping device. In the locked state, the two movable components of the clamping device are coupled together, e.g., not removable or separatable from each other, thus keeping the jaws in a stationary configuration when the clamping device moves. In the unlocked state, the two movable components of the clamping device are separable, e.g., one component can move relative to the other component, thus imposing a force on the jaws for clamping on an object when the clamping device is lifted up.

In some embodiments, the automatic locking assembly can include a slanting surface, such as a curve slanting surface or a helical slanting surface, mating with a cylindrical element, such as a rotatable pin, e.g., a roller. The slanting surface can change a force direction, such as changing an up/down movement to a rotational movement. The interface between a slanting surface and a cylindrical element can reduce friction, e.g., the cylindrical can run easier on the slanting surface than a flat surface runs on the slanting surface, due to the minimum contact area. Further, a bearing can be incorporated, to further reduce friction between the cylindrical element and the slanting surface.

The automatic locking assembly can be coupled to a clamping device for automatic disabling or enabling a linkage mechanism of the clamping device. The linkage mechanism is configured to transfer a pulling force on the clamping device to a clamping force from the jaws of the clamping device. The linkage mechanism can include linkage arms, joints and/or elements connecting together, and movable with respect to the body of the clamping device.

In some embodiments, the automatic locking assembly can include two lockable elements that can be secured together, e.g., locked together, and can be removed from each other, e.g., separated from each other. The two lockable elements can include a hook and an eye, in which the hook can be coupled to the eye for securing the hook with the eye. The two lockable elements can include a rod and a receptacle, in which the rod can enter the receptacle to prevent the rod or the receptacle from moving sideway. The two lockable elements can include a rod having a hookable element such as an elongated end and a parallel hook receptacle, e.g., two hooks running parallel to each other. The hookable element can be inserted into the parallel hook receptacle, such as the elongated end positioned parallel to the parallel hook receptacle. In this configuration, the hookable element can enter and leave the receptacle, e.g., the two lockable elements are free to move relative to each other.

After the hookable element is inserted into the parallel hook receptacle, the hookable element can be rotated so that the elongated end can position perpendicular to the parallel hook receptacle. In this configuration, the hookable element is secured with the receptacle, since the hook ends of the parallel hook of the receptacle can prevent the elongated end from leaving the receptacle.

In some embodiments, the automatic locking assembly can include two slanting surfaces together with one or more curve shape elements for interacting with the slanting surfaces. The curve shape elements can include a curved surface such as a cylindrical or elliptical rod, or a partial cylindrical or elliptical rod. The curved surface can reduce friction with the slanting surfaces, for example, due to reduced surface contact area. The curve shape element can include a roller such as a ball bearing or a rod bearing. The roller can further reduce friction with the slanting surface, for example, due to the rollable action of the roller.

The slanting surfaces can change a direction of a movement of the curve shape element, such as rotating the curve shape element when the curve shape element moves toward and interacting with the slanting surfaces. The rotation of the curve shape element can coupled to a lockable configuration of the automatic locking assembly, such as the rotation of a rod having an elongated end in a parallel hook receptacle.

The automatic locking assembly can be configured so that two slanting surfaces can face each other, and also face the curve shape element, such as protruded pins from a rod. The first slanting surface can be configured to accept the protruded pins in a first moving direction of the pins, and then move the protruded pins along the slanting surface. The slanting surface can be a curve slanting surface, such as a helical surface. The movements of the protruded pins along the slanting surface can rotate the rod, e.g., when the pins run along the helical surface.

The second slanting surface can be configured to accept the protruded pins, e.g., the same protruded pins or new additional protruded pins from the rod. The second slanting surface can move the protruded pins along the slanting surface, for example, a helical surface, such as rotating the rod by the protruded pins running along the helical surface.

In some embodiments, the automatic locking assembly can be configured so that two slanting surfaces can face away from each other. There can be two or more curve shape elements that are configured to mate with the slanting surfaces, such as two protruded pins from a rod. The two slanting surfaces can be disposed between the two protruded pins, so that a first protruded pin interfaces with a first slanting surface and a second protruded pin interfaces with a second slanting surface. The slanting surface can be a curve slanting surface, such as a helical surface. The movements of the protruded pins along the slanting surface can rotate the rod, e.g., when the pins run along the helical surface.

The first slanting surface can be configured to accept the first protruded pin in a first moving direction of the pins or of the slanting surface, and then move the first protruded pin along the first slanting surface.

The second slanting surface can be configured to accept the second protruded pin. The second slanting surface can move the second protruded pin along the second slanting surface, for example, a helical surface, such as rotating the rod by the second protruded pin running along the helical surface.

FIGS. 60A-60C illustrate a schematic configuration for a locking mechanism or assembly having two slanting surfaces can face away from each other according to some embodiments. The locking mechanism can employ a slanting interface of two slanting surfaces for repeatedly rotating a rod through a repeatedly set of vertical forces.

In some embodiments, the locking mechanism can include two lockable elements, such as a rod with a hook end and a hook receptacle. Depending on the orientation of the hook end, the rod can be unseparatable from the hook receptacle, or the rod can move independent of the receptacle.

FIG. 60A shows a schematic detail of a first portion 5121 of a locking assembly using slanting interfaces. The locking assembly can include two portions 5121 and 5122, forming two lockable elements. A first portion 5121 can include a rod 5153, placed in an annular element 5170. The annular element 5170 can have opposite slanting surfaces, such as cyclic teeth on two opposite sides. The annular element 5170 can include two annular elements 5171 and 5176 secured together with the slanting surfaces facing opposite directions. The annular element 5170 can be a one piece annular element having slanting surfaces on opposite sides. A second portion 5122 can include a hook receptacle 5122A.

One end of the rod 5153 can include a hook end or a hookable element 5155, which can include a perpendicular elongated portion having a longer side 5155A and a shorter side 5155B. By rotating the rod, such as a 90 degree angle for this elongated hook element 5155, the status of the lock can be toggle between locked and unlocked states.

The rod 5153 can include at least two protruded elements, such as two pins 5154A and 5154B, which can be passing through the rod and protruded from both sides of the rod.

The annular element 5170 can include a ring-like element, with slanting surfaces in the form of helical or spiral surfaces. The annular element 5170 can have a hollow cylindrical shape, such as a ring or a hollow cylinder, with an axis of rotation. The annular element can have cyclic teeth, e.g., teeth configured around the circumference of the annular element. The number of teeth can be dividable by 2 or by 4, such as 4 teeth or 12 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

At one side, the annular element 5170 can have multiple teeth 5172, such as 4 teeth arranged cyclically around a circumference of the base of the annular element 5170. Each tooth can have a helical surface 5173. At the end of the helical surface 5173 near the base, there can be a valley point 5174, which can be followed by an adjacent tooth, e.g., an abrupt surface of the adjacent tooth.

At an opposite side, the annular element 5170 can have 4 teeth 5177, arranged cyclically around a circumference of the base of the annular element 5176. Each tooth can have a helical surface 5178. At the end of the helical surface 5178 near the base, there can be a valley point 5179, which can be followed by an adjacent tooth, e.g., an abrupt surface of the adjacent tooth.

The annular element 5170 can have teeth 5172 and 5177, and helical surfaces 5173 and 5178, facing each other. Further, the teeth of the annular element can be configured so that peaks of the teeth in one side are aligned along the axis of rotation 5151A with helical surfaces of teeth in an opposite side, and valley points of teeth in one side are aligned along the axis of rotation 5151A with helical surfaces of teeth in an opposite side.

The rod 5153 can be disposed in the annular element, such as the axis of the rod coincides with the axes of the annular element 5151A. The rod can be constrained inside the annular elements, e.g., the rod can move along the axis, and can rotate around the axis, in the absence of the protruded elements.

With the protruded elements such as the pins 5154A and 5154B, the rod 5153 is further constrained. For example, the pins can be inserted after the rod has been placed in the annular element, so that the pins are disposed surrounding the annular element. Thus the pins can prevent the rod from being removed or separated from the annular element.

The pins can further limit the movements of the rod, beside the constraint of limited movements along the axis, due to the teeth of the annular element preventing the pins from going pass the teeth. The rod can have limited rotational movements, constrained by the abrupt surfaces or the helical surfaces of the teeth. The rod can rotate a complete cycle, but only accompanied by axis movements, e.g., when the rotational movement is blocked by the teeth, the rod can move along the axis so that the pins are clear of the teeth before resuming the rotational movement.

The helical surfaces on the two sides of the annular element can be facing away from each other, and can be configured to provide a torque to rotate the rod through the protruded pins. For example, the rod can be pushed in one direction toward the annular element, with one protruded pin then contacting the helical surfaces of one side of the annular element. Due to the helical surfaces, the protruded pin can slide or roll on the helical surfaces, effectively rotating the rod an angle corresponded to the amount of the protruded pin sliding or rolling on the helical surfaces, from the point of contact to the point of rest at the bottom of the helical surfaces.

The rod can be retracted, e.g., pushing in an opposite direction toward the annular element. The other protruded pin then can be configured to contact the helical surfaces of the opposite side of the annular element. Due to the helical surfaces, the protruded pin can slide or roll on the helical surfaces, effectively rotating the rod another angle corresponded to the amount of the protruded pin sliding or rolling on the helical surfaces, from the point of contact to the point of rest at the bottom of the helical surfaces. Thus, by pushing and pulling, the rod can rotate an angle, such as a degrees angle.

For example, the pin 5154A can be facing the helical surface 5173, and the pin 5154B can be facing the helical surface 5178, e.g., the helical surfaces 5173 and 5178 of the annular element 5170 can be disposed between the two pins 5154A and 5154B.

The rod can be pushed, so that the pin 5154A contacts the helical surface 5173 of the annular element 5170. The pin can then run along the helical surface 5173 to the valley point 5174. The movement of the pin 5154A can cause the rod 5153 to rotate an angle corresponded to the length of the movement, e.g., the distance that the pin travels on the helical surface 5173.

The rod can be pulled, so that the pin 5154B contacts the helical surface 5178 of the annular element 5170. The pin can run along the helical surface 5178 to the valley point 5179 of the annular element 5170. The movement of the pin 5154B can cause the rod 5153 to rotate an angle corresponded to the length of the movement, e.g., the distance that the pin travels on the helical surface 5178.

FIGS. 60B(a)-60B(c) show perspective views of a toggle process from an unlocked state to a locked state according to some embodiments. A locking assembly can include a first portion that can be lockable to a second portion. The first portion can include an annular element together with a rod disposed in the annular element. The rod can have two protruded pins (or more than two protruded pins) placed surrounding the annular element. The rod can have a hook end. The second portion can include a hook receptacle, which can include a parallel hookable feature, which can be mated with the hook end of the rod.

In FIG. 60B(a), the first portion can be removable from the second portion, with the hook end 5155 of the rod 5153 parallel with the parallel hookable feature of the hook receptacle 5122A. Top pin 5154A can be rested on a valley point of the top teeth 5172 of the annular element 5170.

In FIGS. 60B(b), the first portion can be brought down on the second portion. Bottom pin 5154B contacts helical surface of bottom teeth 5177 of the annular element 5170. Bottom pin 5154B further moves along the helical surface to rest on a valley point of the bottom teeth 5177 of the annular element 5170. Rod 5153 is rotated a 45 degree angle, so that the hook end 5155 is partially hooked on the hook receptacle.

In FIGS. 60B(c), the first portion can be brought up away from the second portion. Top pin 5154A contacts helical surface of top teeth 5172 of the annular element 5170. Top pin 5154A further moves along the helical surface to rest on a valley point of the top teeth 5172 of the annular element 5170. Rod 5153 is rotated another 45 degree angle, for a total of 90 degrees, so that the hook end 5155 is hooked on the hook receptacle. The locking assembly has completed its toggling process from an unlocked state to a locked state.

FIGS. 60C(a)-60C(c) show perspective views of a toggle process from a locked state to an unlocked state according to some embodiments. The toggle process can use a same set of vertical movements, e.g., the set of vertical movements that are used to change states from the unlocked state to the locked state, which includes a downward movement followed by an upward movement of the first portion with respect to the second portion.

In FIG. 60C(a), the first portion can be locked with the second portion, with the hook end 5155 of the rod 5153 hooked with the parallel hookable feature of the hook receptacle 5122A. Top pin 5154A can be rested on a valley point of the top teeth 5172 of the annular element 5170.

In FIG. 60C(b), the first portion can be brought down on the second portion. Bottom pin 5154B contacts helical surface of bottom teeth 5177 of the annular element 5170. Bottom pin 5154B further moves along the helical surface to rest on a valley point of the bottom teeth 5177 of the annular element 5170. Rod 5153 is rotated a 45 degree angle, so that the hook end 5155 is partially hooked on the hook receptacle.

In FIG. 60C(c), the first portion can be brought up away from the second portion. Top pin 5154A contacts helical surface of top teeth 5172 of the annular element 5170. Top pin 5154A further moves along the helical surface to rest on a valley point of the top teeth 5172 of the annular element 5170. Rod 5153 is rotated another 45 degree angle, for a total of 90 degrees, so that the hook end 5155 is separatable from the hook receptacle, e.g., the hook end is parallel with the parallel hookable feature of the hook receptacle. The locking assembly has completed its toggling process from a locked state to an unlocked state.

Other configurations for the locking assembly can be used, such as the locking assemblies shown in FIG. 21A-21H or 26A-26H.

In some embodiments, the present invention discloses a fork assembly for attaching to a forklift vehicle for lifting a load. The fork assembly includes two forks, two fork extensions, a clamp coupler, and a clamping device.

The two forks can be configured to be movable with respect to each other to adjust a distance between the two forks. For example, each fork can be coupled to a hydraulic or pneumatic cylinder for moving toward or away from the other fork. Alternatively, a hydraulic or pneumatic cylinder can be coupled between the two forks.

Each fork can include a support component configured to be coupled to the forklift vehicle. The fork can include a fork beam coupled to the support component at an end portion farther from a ground when the support component is coupled to the fork lift vehicle. For example, the fork beam and the support component can form an L shape with the L shape rotating 90 degrees clockwise. The fork beam is configured to be extended away from the forklift vehicle.

The fork extension can be configured to be slidable along a fork beam for extending a length of the fork beam. The fork extension can include a first coupler coupled to an end of the each fork extension.

The clamp coupler can include two mating couplers with each mating coupler configured to couple to a first coupler of the two first couplers of the two fork extensions. The clamp coupler can be configured to couple to the first couplers of the two fork extensions.

The clamping device can be configured to be coupled to the clamp coupler. The clamping device can include two clamps movably with respect to each other for clamping on one or more panels.

In some embodiments, the two forks are coupled to a mounting body with the mounting body comprising multiple attachments for coupling to a movable component of the forklift vehicle. The two forks are coupled to a moving mechanism configured to adjust the distance between the two forks.

In some embodiments, the fork beam can have a length long enough to allow the clamping device to clamp on the one or more panels when the one or more panels are disposed in a container. The fork beam and corresponding fork extension can have a combined length long enough to allow the clamping device to clamp on the one or more panels when the one or more panels are disposed in a far end of a container.

In some embodiments, the fork assembly can further include a toggling mechanism. The toggling mechanism can be coupled to two elements of a clamping mechanism of the clamping device, with the two elements movable with respect to each other. The toggling mechanism can be configured to toggle the two elements between a first configuration and a second configuration by moving the fork assembly downward and then upward. In the first configuration, the two elements are movable with respect to each other for moving the two clamps to clamp on the one or more panels. In the second configuration, the two elements are not movable with respect to each other for keeping the two clamps at a fixed separation distance.

Alternatively, the toggling mechanism can include a first element comprising two slanting surfaces and a second element comprising one or more pins configured to interface with the two slanting surfaces. When the one or more pins interface with each slanting surface of the two slanting surfaces, the second element rotates an angle relative to the first element for toggling a first configuration and a second configuration. In the first configuration, the second element is movable from a hook for moving the two clamps to clamp on the one or more panels. In the second configuration, the second element is latched to the hook for keeping the two clamps at a fixed separation distance.

In some embodiments, the first element is at least partially disposed inside the second element so that the one or more pins protrude inward for contacting the two slanting surfaces; or the second element is at least partially disposed inside the first element so that the one or more pins protrude outward for contacting the two slanting surfaces.

In some embodiments, the first and second slanting surfaces can be configured to be facing toward each other or facing away from each other to rotate the first blade in a same direction when rotating from the first position to the second position and when rotating from the second position to the first position.

In some embodiments, the first and second slanting surfaces can be configured to be nested to rotate the first blade in two opposite directions when rotating from the first position to the second position and when rotating from the second position to the first position.

In some embodiments, the clamping device can include two movable arms each coupled to a clamp of the two clamps. The clamping device can include a movable arm and a fixed arm each coupled to a clamp of the two clamps. The clamping device can include a roller arm rolling on a slanting surface for moving a clamp of the two clamps toward the other clamp of the two clamps.

In some embodiments, the fork assembly can further include one or more lifter assemblies and one or more rotate mechanisms. At least a lifter assembly of the one or more lifter assemblies can be configured to be coupled to a fork of the two forks. At least a rotate mechanism of the one or more rotate mechanisms can be configured to be coupled between the fork beam of the fork and a blade of the at least a lifter assembly. The rotate mechanism can be configured to rotate the blade relative to the fork beam by moving the fork assembly. The rotate mechanism can be configured to rotate the blade relative to the fork beam between a first position and a second position. In the first position, the blade is disposed under the load. In the second position, the blade is disposed outside the load.

In some embodiments, the fork extensions can include a second blade coupled to an end of the fork extensions.

In some embodiments, the fork assembly can further include two roller legs. The roller leg can be configured to be coupled to a fork extension for supporting the fork extension. The roller leg can include rollers for rolling on a ground. The roller leg can include a hydraulic cylinder for adjusting a height of the fork extension.

In some embodiments, the present invention discloses a fork assembly for attaching to a forklift vehicle for lifting a load. The fork assembly includes a fork, a fork extension, and a clamping assembly.

The fork can include a support component configured to be coupled to the forklift vehicle. The fork can include a fork beam coupled to the support component at an end portion farther from a ground when the support component is coupled to the fork lift vehicle. The fork beam can be configured to be extended away from the forklift vehicle. The fork extension can be configured to be slidable along the fork beam for extending a length of the fork beam. The fork extension can include a first coupler coupled to an end of the fork extension.

The clamping assembly can be configured to be coupled to the first coupler. The clamping device can include two clamps movably with respect to each other for clamping on one or more panels.

The fork assembly can further include a second fork comprising a second fork beam, a second fork extension configured to be slidable along the second fork beam, with the fork extension comprising a second coupler. The clamping assembly can be configured to be coupled to the first and second couplers through a clamp coupler.

The fork assembly can include a toggling mechanism. The toggling mechanism can be coupled to two elements of a clamping mechanism of the clamping device, with the two elements movable with respect to each other. The toggling mechanism can be configured to toggle the two elements between a first configuration and a second configuration by moving the fork assembly downward and then upward. In the first configuration, the two elements can be movable with respect to each other for moving the two clamps to clamp on the one or more panels. In the second configuration, the two elements can be not movable with respect to each other for keeping the two clamps at a fixed separation distance.

In some embodiments, the present invention discloses a fork assembly for attaching to a forklift vehicle for lifting a load. The fork assembly includes a fork, a fork extension, a clamping assembly, and a toggling mechanism. The fork can include a support component configured to be coupled to the forklift vehicle. The fork can include a fork beam coupled to the support component at an end portion farther from a ground when the support component is coupled to the fork lift vehicle. The fork beam can be configured to be extended away from the forklift vehicle.

The fork extension can be configured to be slidable along the fork beam for extending a length of the fork beam. The fork extension can include a first coupler coupled to an end of the fork extension. The clamping assembly can be configured to be coupled to the first coupler. The clamping device can include two clamps movably with respect to each other for clamping on one or more panels.

The toggling mechanism can be coupled to two elements of a clamping mechanism of the clamping device, with the two elements movable with respect to each other. The toggling mechanism can be configured to toggle the two elements between a first configuration and a second configuration by moving the fork assembly downward and then upward. In the first configuration, the two elements can be movable with respect to each other for moving the two clamps to clamp on the one or more panels. In the second configuration, the two elements can be not movable with respect to each other for keeping the two clamps at a fixed separation distance.

The fork assembly further can include a second fork comprising a second fork beam, a second fork extension configured to be slidable along the second fork beam, with the fork extension comprising a second coupler. The clamping assembly can be configured to be coupled to the first and second couplers through a clamp coupler.

What is claimed is:

1. A fork assembly for attaching to a forklift vehicle for lifting a load, the fork assembly comprising
two forks,
wherein the two forks are configured to be movable with respect to each other to adjust a distance between the two forks,
wherein each fork comprises a support component configured to be coupled to the forklift vehicle,
wherein the each fork comprises a fork beam coupled to the support component at an end portion farther from a ground when the support component is coupled to the fork lift vehicle,
wherein the fork beam is configured to be extended away from the forklift vehicle,
two fork extensions,
wherein each fork extension is configured to be slidable along a fork beam for extending a length of the fork beam,
wherein each fork extension comprises a first coupler coupled to an end of the each fork extension,
a clamp coupler,
wherein the clamp coupler comprises two mating couplers with each mating coupler configured to couple to a first coupler of the two first couplers of the two fork extensions,
wherein the clamp coupler is configured to couple to the first couplers of the two fork extensions,
a clamping device,
wherein the clamping device is configured to be coupled to the clamp coupler,
wherein the clamping device comprises two clamps movably with respect to each other for clamping on one or more panels.

2. A fork assembly as in claim 1,
wherein the two forks are coupled to a mounting body with the mounting body comprising multiple attachments for coupling to a movable component of the forklift vehicle,
wherein the two forks are coupled to a moving mechanism configured to adjust the distance between the two forks.

3. A fork assembly as in claim 1,
wherein each fork beam comprises a length long enough to allow the clamping device to clamp on the one or more panels when the one or more panels are disposed in a container.

4. A fork assembly as in claim 1,
wherein each fork beam and corresponding fork extension comprises a combined length long enough to allow the clamping device to clamp on the one or more panels when the one or more panels are disposed in a far end of a container.

5. A fork assembly as in claim 1, further comprising
a toggling mechanism,
wherein the toggling mechanism is coupled to two elements of a clamping mechanism of the clamping device, with the two elements movable with respect to each other,
wherein the toggling mechanism is configured to toggle the two elements between a first configuration and a second configuration by moving the fork assembly downward and then upward,
wherein in the first configuration, the two elements are movable with respect to each other for moving the two clamps to clamp on the one or more panels,
wherein in the second configuration, the two elements are not movable with respect to each other for keeping the two clamps at a fixed separation distance.

6. A fork assembly as in claim 1, further comprising
a toggling mechanism,
wherein the toggling mechanism comprises a first element comprising two slanting surfaces and a second element comprising one or more pins configured to interface with the two slanting surfaces,
wherein when the one or more pins interface with each slanting surface of the two slanting surfaces, the second element rotates an angle relative to the first element for toggling a first configuration and a second configuration,
wherein in the first configuration, the second element is movable from a hook for moving the two clamps to clamp on the one or more panels,
wherein in the second configuration, the second element is latched to the hook for keeping the two clamps at a fixed separation distance.

7. A fork assembly as in claim 6, wherein one of
the first element is at least partially disposed inside the second element so that the one or more pins protrude inward for contacting the two slanting surfaces; or
the second element is at least partially disposed inside the first element so that the one or more pins protrude outward for contacting the two slanting surfaces.

8. A fork assembly as in claim 6,
wherein the first and second slanting surfaces are configured to be facing toward each other or facing away from each other to rotate the first blade in a same direction when rotating from the first position to the second position and when rotating from the second position to the first position.

9. A fork assembly as in claim 6,
wherein the first and second slanting surfaces are configured to be nested to rotate the first blade in two opposite directions when rotating from the first position to the second position and when rotating from the second position to the first position.

10. A fork assembly as in claim 1,
wherein the clamping device comprises two movable arms each coupled to a clamp of the two clamps.

11. A fork assembly as in claim 1,
wherein the clamping device comprises a movable arm and a fixed arm each coupled to a clamp of the two clamps.

12. A fork assembly as in claim 1,
wherein the clamping device comprises a roller arm rolling on a slanting surface for moving a clamp of the two clamps toward the other clamp of the two clamps.

13. A fork assembly as in claim 1, further comprising
one or more lifter assemblies, wherein at least a lifter assembly of the one or more lifter assemblies is configured to be coupled to a fork of the two forks, one or more rotate mechanisms, wherein at least a rotate mechanism of the one or more rotate mechanisms is configured to be coupled between the fork beam of the fork and a blade of the at least a lifter assembly, wherein the at least a rotate mechanism is configured to rotate the blade relative to the fork beam by moving the fork assembly, wherein the at least a rotate mechanism is configured to rotate the blade relative to the fork beam between a first position and a second position, wherein in the first position, the blade is disposed under the load, wherein in the second position, the blade is disposed outside the load.

14. A fork assembly as in claim 1, wherein the fork extensions each comprises a second blade coupled to an end of the fork extension.

15. A fork assembly as in claim 1, further comprising two roller legs, wherein each roller leg is configured to be coupled to a fork extension for supporting the fork extension, wherein each roller leg comprises rollers for rolling on a ground, wherein each roller leg comprises a hydraulic cylinder for adjusting a height of the fork extension.

16. A fork assembly for attaching to a forklift vehicle for lifting a load, the fork assembly comprising a fork, wherein the fork comprises a support component configured to be coupled to the forklift vehicle, wherein the fork comprises a fork beam coupled to the support component at an end portion farther from a ground when the support component is coupled to the fork lift vehicle, wherein the fork beam is configured to be extended away from the forklift vehicle, a fork extension, wherein the fork extension is configured to be slidable along the fork beam for extending a length of the fork beam, wherein the fork extension comprises a first coupler coupled to an end of the fork extension, a clamping assembly, wherein the clamping assembly is configured to be coupled to the first coupler, wherein the clamping device comprises two clamps movably with respect to each other for clamping on one or more panels, a toggling mechanism, wherein the toggling mechanism is coupled to two elements of a clamping mechanism of the clamping device, with the two elements movable with respect to each other, wherein the toggling mechanism is configured to toggle the two elements between a first configuration and a second configuration by moving the fork assembly downward and then upward, wherein in the first configuration, the two elements are movable with respect to each other for moving the two clamps to clamp on the one or more panels, wherein in the second configuration, the two elements are not movable with respect to each other for keeping the two clamps at a fixed separation distance.

17. A fork assembly as in claim 16, wherein the fork assembly further comprises a second fork comprising a second fork beam, a second fork extension configured to be slidable along the second fork beam, with the fork extension comprising a second coupler, wherein the clamping assembly is configured to be coupled to the first and second couplers through a clamp coupler.

18. A fork assembly for attaching to a forklift vehicle for lifting a load, the fork assembly comprising a fork, wherein the fork comprises a support component configured to be coupled to the forklift vehicle, wherein the fork comprises a fork beam coupled to the support component at an end portion farther from a ground when the support component is coupled to the fork lift vehicle, wherein the fork beam is configured to be extended away from the forklift vehicle, a fork extension, wherein the fork extension is configured to be slidable along the fork beam for extending a length of the fork beam, wherein the fork extension comprises a first coupler coupled to an end of the fork extension, a clamping assembly, wherein the clamping assembly is configured to be coupled to the first coupler, wherein the clamping device comprises two clamps movably with respect to each other for clamping on one or more panels, a toggling mechanism, wherein the toggling mechanism is coupled to two elements of a clamping mechanism of the clamping device, with the two elements movable with respect to each other, wherein the toggling mechanism is configured to toggle the two elements between a first configuration and a second configuration by moving the fork assembly downward and then upward, wherein in the first configuration, the two elements are movable with respect to each other for moving the two clamps to clamp on the one or more panels, wherein in the second configuration, the two elements are not movable with respect to each other for keeping the two clamps at a fixed separation distance.

19. A fork assembly as in claim 18, wherein the fork assembly further comprises a second fork comprising a second fork beam, a second fork extension configured to be slidable along the second fork beam, with the fork extension comprising a second coupler, wherein the clamping assembly is configured to be coupled to the first and second couplers through a clamp coupler.

* * * * *